United States Patent [19]

Sakata et al.

[11] Patent Number: 5,287,488
[45] Date of Patent: Feb. 15, 1994

[54] SOFTWARE DESIGN SUPPORTING METHOD FOR CLASSIFYING PORTIONS POSSIBLY AFFECTED BY A MODIFICATION INTO THOSE PORTIONS THAT CAN AND CANNOT BE AUTOMATICALLY MODIFIED

[75] Inventors: Junko Sakata, Ichikawa; Toshio Kinoshita, Kawasaki; Takanobu Shimono, Kodaira; Hiroyuki Maezawa, Tama, all of Japan

[73] Assignee: Hitachi, Ltd., Tokyo, Japan

[21] Appl. No.: 500,257

[22] Filed: Mar. 27, 1990

[30] Foreign Application Priority Data

Mar. 31, 1989 [JP] Japan .................................. 1-78216
Jun. 23, 1989 [JP] Japan .................................. 1-159522

[51] Int. Cl.⁵ .............................................. G06F 15/60
[52] U.S. Cl. ..................................... 395/500; 395/155; 364/275.6; 364/DIG. 1
[58] Field of Search ................ 395/500, 155, 700, 800

[56] References Cited

U.S. PATENT DOCUMENTS

| | | | |
|---|---|---|---|
| 4,809,170 | 2/1989 | Leblang et al. | 395/700 |
| 4,813,013 | 3/1989 | Dunn | 395/159 |
| 5,005,119 | 4/1991 | Rumbaugh et al. | 395/650 |
| 5,008,853 | 4/1991 | Bly et al. | 395/153 |
| 5,133,063 | 7/1992 | Naito et al. | 395/500 |

FOREIGN PATENT DOCUMENTS 62-84337 4/1987 Japan .

*Primary Examiner*—Thomas C. Lee
*Assistant Examiner*—Paul Harrity
*Attorney, Agent, or Firm*—Fay, Sharpe, Beall, Fagan, Minnich & McKee

[57] ABSTRACT

A design supporting method having a specification edit function in an information processing system having a computer and an interactive terminal is disclosed. Items to be described in a specification are correlated among specifications so that when an item described in the specification is modified, a portion which is possibly affected by the modification can be analyzed.

26 Claims, 127 Drawing Sheets

F I G. 2
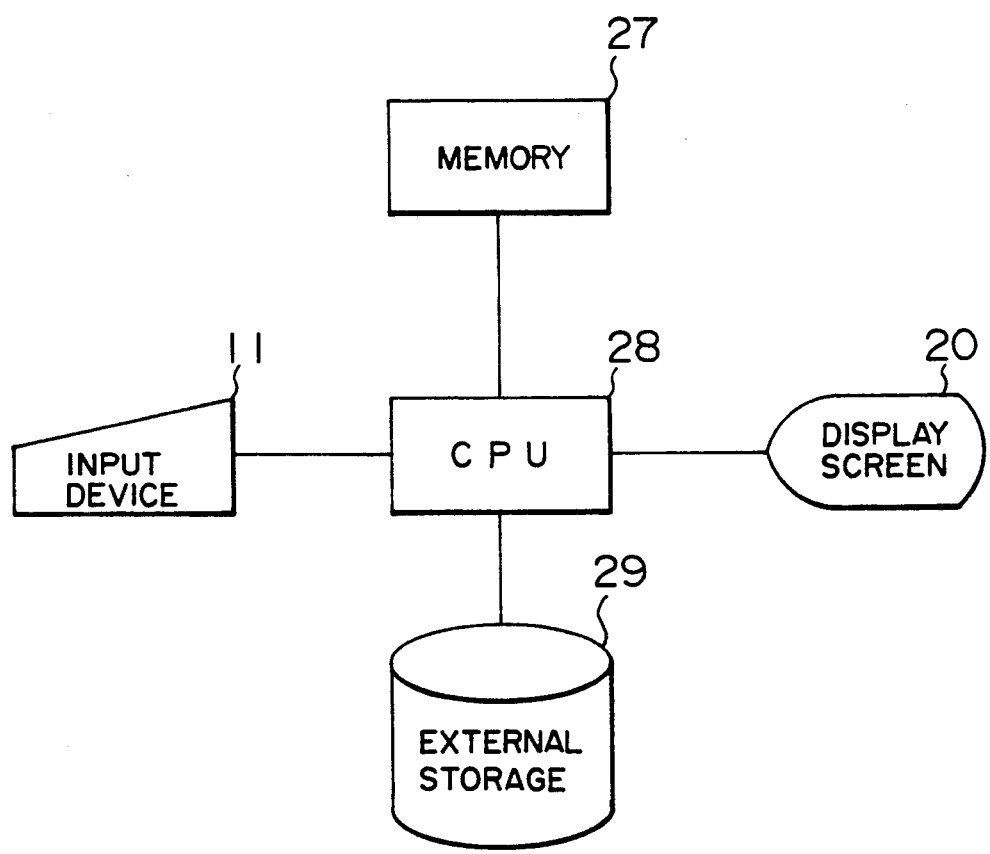

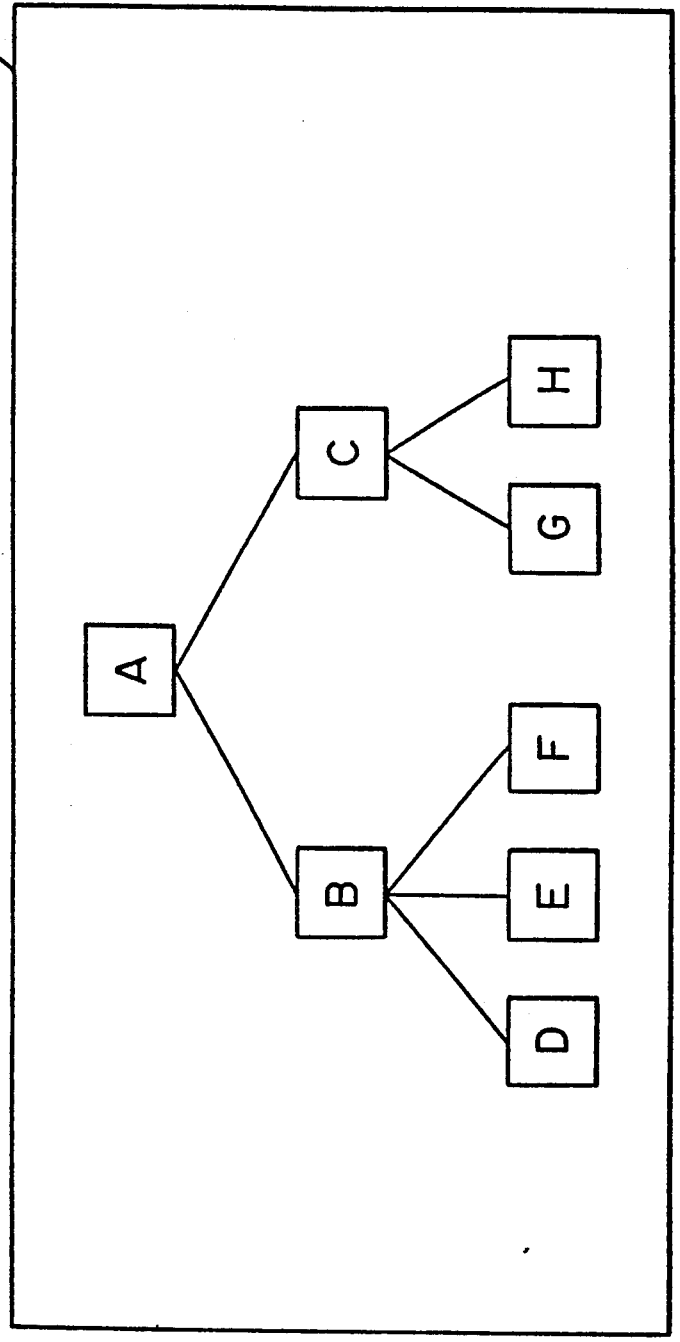

| NAME | hystbℓ |
| --- | --- |

| LEVEL | NAME | TYPE | CONTENT | INITIAL VALUE |
| --- | --- | --- | --- | --- |
| 1 | hystbℓ (MAx) | struct | HISTORY TABLE | |
| 2 | com (CMAx) | char | COMMAND NAME | null |
| 2 | obj1 (OMAx) | char | 1ST OBJECT OF COMMAND | null |
| 2 | obj2 (OMAx) | char | 2ND OBJECT OF COMMAND | null |
| | | | | |

TABLE SPECIFICATION

FIG. 4
(a)
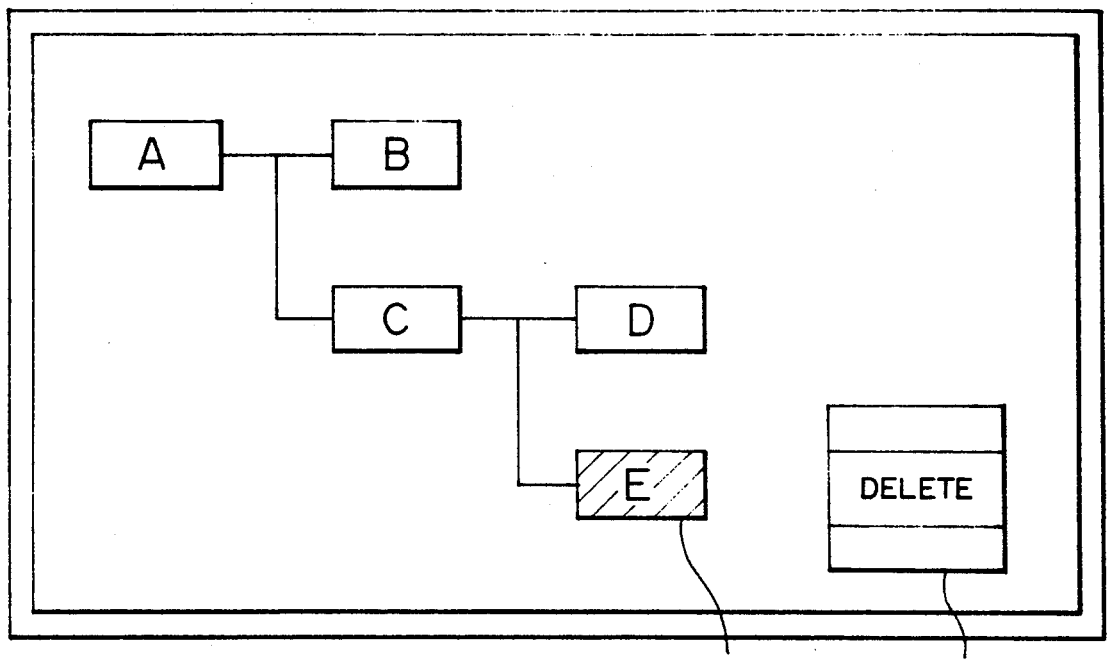
(b)
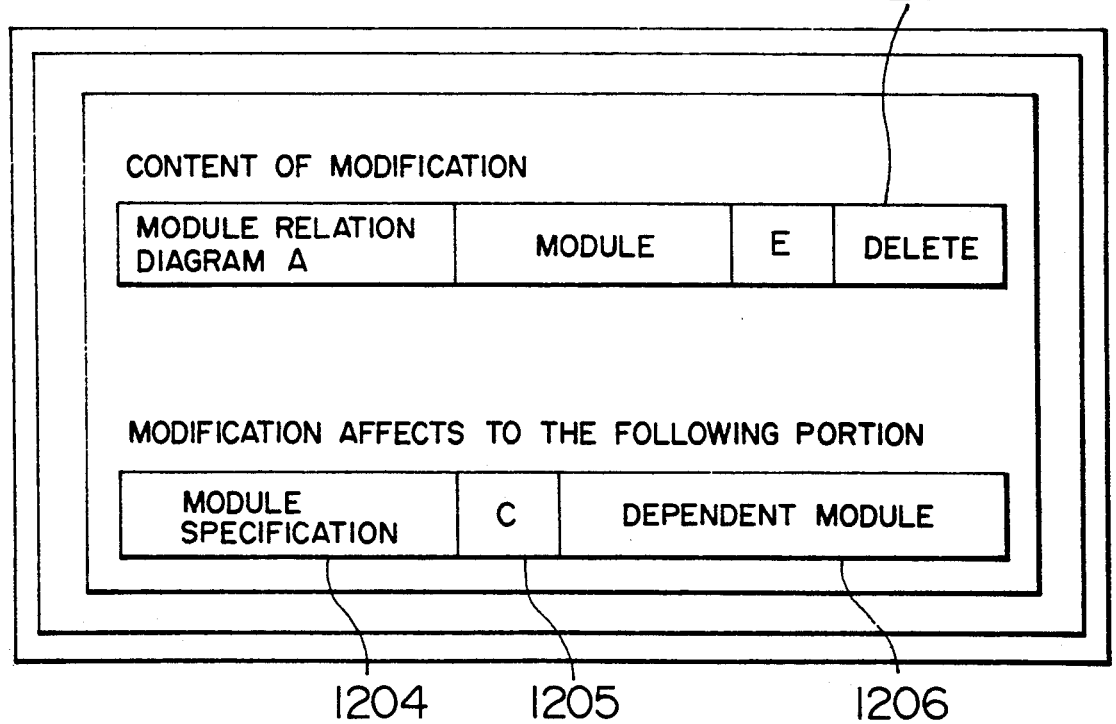

FIG. 6

OBJECT OF MODIFICATION

|  | TYPE | NAME |
|---|---|---|
| SPECIFICATION | MODULE SPECIFICATION | C |
| ITEM | ARGUMENT INFORMATION | tcxt |
| ELEMENT | TYPE | int |

TYPE OF MODIFICATION

| ADD | DELETE | MODIFY |
|---|---|---|

1601

TO WHICH MODULE DOES IT BELONG ?

| MODULE NAME | A |
|---|---|

1602

HOW IS IT TO BE MODIFIED ?

| AFTER MODIFICATION | Short |
|---|---|

| No. | SPECIFICATION TO BE MODIFIED (1721) | CONTENT OF MODIFICATION (1722) | AFFECTED PORTION (1723) |
|---|---|---|---|
| 1 | MODULE RELATION DIAGRAM | ADD OR DELETE MODULE | DEPENDENT MODULE COLUMN AND CONTENT OF PROCESS COLUMN OF MODULE SPECIFICATION OF MODULE WHICH IS AT HIGHER LEVEL THAN MODIFIED MODULE |
| 2 | MODULE SPECIFICATION | ADD OR DELETE MODULE IN DEPENDENT MODULE COLUMN | MODULE RELATION DIAGRAM WHICH CONTAINS MODULE WHOSE MODULE SPECIFICATION WAS MODIFIED |
| 3 | MODULE SPECIFICATION | ADD OR DELETE ARGUMENT INFORMATION COLUMN | CONTENT OF PROCESS COLUMN OF MODULE SPECIFICATION OF MODULE WHICH IS AT HIGHER LEVEL THAN MODULE WHOSE MODULE SPECIFICATION WAS MODIFIED |
| 4 | TABLE SPECIFICATION | ADD OR DELETE ELEMENT OF TABLE | CONTENT OF PROCESS COLUMN OF MODULE SPECIFICATION WHICH CONTAINS IN EXTERNAL INFORMATION COLUMN, TABLE WHOSE TABLE SPECIFICATION WAS MODIFIED |

FIG. 10

| | le01 | le02 | le03 | le04 |
|---|---|---|---|---|
| | TYPE OF DATA | DATA NAME | TYPE OF SPECIFICATION | SPECIFICATION NAME |
| | MODULE | A | MODULE RELATION DIAGRAM | A |
| | MODULE | B | MODULE SPECIFICATION | A |
| | MODULE | B | MODULE RELATION DIAGRAM | A |
| | TABLE | hystbl | TABLE SPECIFICATION | hystbl |
| | TABLE | hystbl | MODULE SPECIFICATION | B |
| | TABLE | hystbl | MODULE SPECIFICATION | C |

FIG. 13

| NO. | SPECIFICATION TO BE MODIFIED (IC01) | MODIFICATION OPERATION (IC02) | OBJECT TO BE MODIFIED (IC03) | | AFFECTED SPECIFICATION (IC04) | RELATION (IC05) | | AFFECTED OBJECT (IC06) |
|---|---|---|---|---|---|---|---|---|
| | | | FIELD | ITEM | | OBJECT | TYPE OF RELATION | |
| 1 | MODULE RELATION DIAGRAM | ADD/DEL | MODULE | MODULE | MODULE SPECIFICATION | ITEM TO BE MODIFIED | HIGHER LEVEL | DEPENDENT MODULE |
| 2 | MODULE RELATION DIAGRAM | ADD/DEL | MODULE | MODULE | MODULE SPECIFICATION | ITEM TO BE MODIFIED | HIGHER LEVEL | CONTENT OF PROCESS |
| 3 | MODULE SPECIFICATION | ADD/DEL | DEPENDENT MODULE | MODULE | MODULE RELATION DIAGRAM | SPECIFICATION TO BE MODIFIED | INCLUSIVE | — |
| 4 | MODULE SPECIFICATION | ADD/DEL | ARGMENT INFORMATION | ARGMENT | MODULE SPECIFICATION | SPECIFICATION TO BE MODIFIED | HIGHER LEVEL | CONTENT OF PROCESS |
| 5 | MODULE SPECIFICATION | ADD/DEL | EXTERAL INFORMATION | TABLE | MODULE SPECIFICATION | SPECIFICATION TO BE MODIFIED | INCLUSIVE | CONTENT OF PROCESS |
| 6 | TABLE SPECIFICATION | ADD/DEL | TABLE | ELEMENT | MODULE SPECIFICATION | SPECIFICATION TO BE MODIFIED | INCLUSIVE | CONTENT OF PROCESS |

F I G. 16
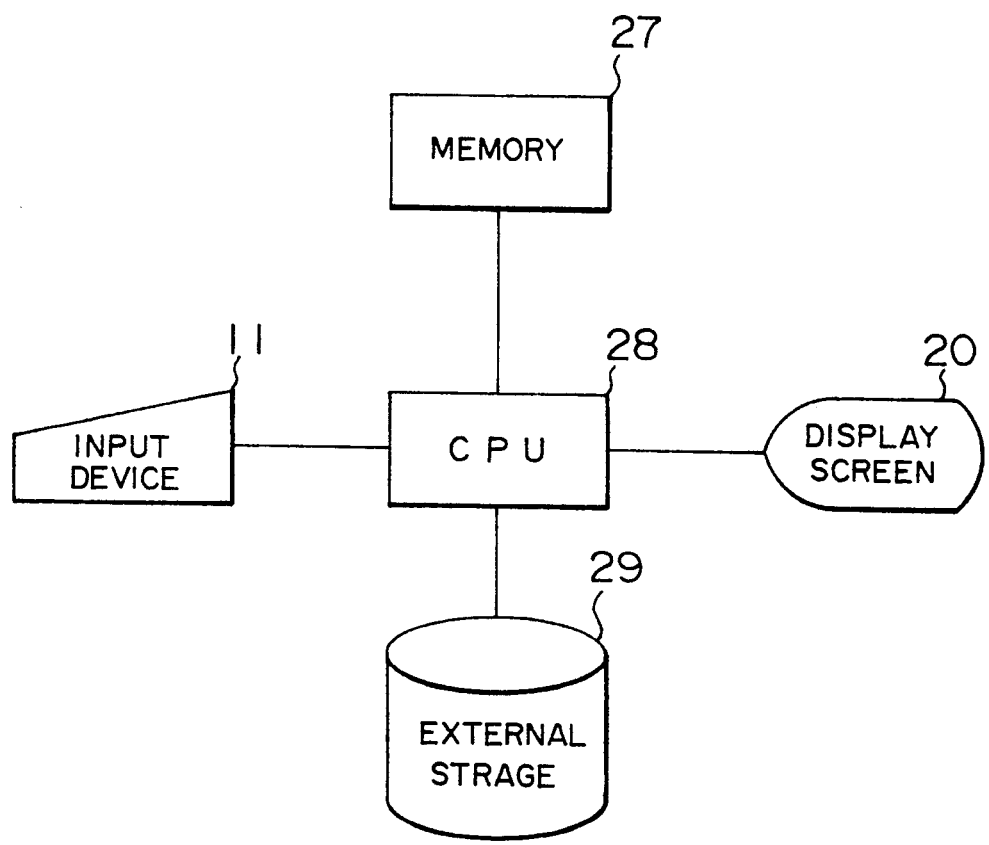

FIG. 17C

| MODULE NUMBER | USE STATUS | MODULE NAME | LOWER LEVEL MODULE | | | | | | | |
|---|---|---|---|---|---|---|---|---|---|---|
| 1 | USE | A | 2 | 3 | | | | | | |
| 2 | USE | B | 4 | 5 | 6 | | | | | |
| 3 | USE | C | | | | | | | | |
| 4 | USE | D | | | | | | | | |
| 5 | USE | E | 7 | 8 | | | | | | |
| 6 | USE | F | | | | | | | | |
| 7 | USE | G | | | | | | | | |
| 8 | USE | H | | | | | | | | |
| 9 | UNUSE | --- | --- | --- | --- | --- | --- | --- | --- | --- |

FIG. 17D

| MODULE NUMBER | USE STATUS | MODULE NAME | LOWER LEVEL MODULE | | | | | | | |
|---|---|---|---|---|---|---|---|---|---|---|
| 1 | USE | A | 2 | 3 | | | | | | |
| 2 | USE | B | 5 | 6 | | | | | | |
| 3 | USE | C | 7 | 8 | | | | | | |
| 4 | NON-USE | D | | | | | | | | |
| 5 | USE | E | | | | | | | | |
| 6 | USE | F | | | | | | | | |
| 7 | USE | G | | | | | | | | |
| 8 | USE | H | | | | | | | | |
| 9 | UNUSE | --- | --- | --- | --- | --- | --- | --- | --- | --- |

FIG. 18

| No | SPECIFI-CATION (105) | MODIFI-CATION OPERATION (106) | OBJECT TO BE MODIFIED (107) | | AFFECTED SPECIFI-CATION (108) | RELATION (109) | LEVEL (110) | AFFECTED PORTION (111) | |
|---|---|---|---|---|---|---|---|---|---|
| 1 | MODULE RELATION | MODIFY | MODULE NAME | / | MODULE SPEC. | SAME | LEVEL 1 | DEPENDENT MODULE | / |
| 2 | MODULE RELATION | MODIFY | MODULE NAME | / | MODULE SPEC. | SAME | LEVEL 2 | PAD | / |
| 3 | MODULE RELATION | MODIFY | MODULE NAME | / | MODULE SPEC. | SAME | LEVEL 2 | DEPENDENT MODULE | / |
| 4 | MODULE SPEC. | MODIFY | DEPENDENT MODULE | MODULE NAME | MODULE RELATION | / | LEVEL 1 | MODULE NAME | SYMBOL NAME |
| 5 | MODULE SPEC. | MODIFY | DEPENDENT MODULE | MODULE NAME | MODULE SPEC. | LOWER LEVEL | LEVEL 3 | FUNCTION | FUNCTION |
| 6 | MODULE SPEC. | MODIFY | DEPENDENT MODULE | MODULE NAME | MODULE SPEC. | SAME | LEVEL 2 | PAD | / |
| 7 | --- | --- | --- | --- | --- | --- | --- | --- | --- |
| --- | --- | --- | --- | --- | --- | --- | --- | --- | --- |

FIG. 19
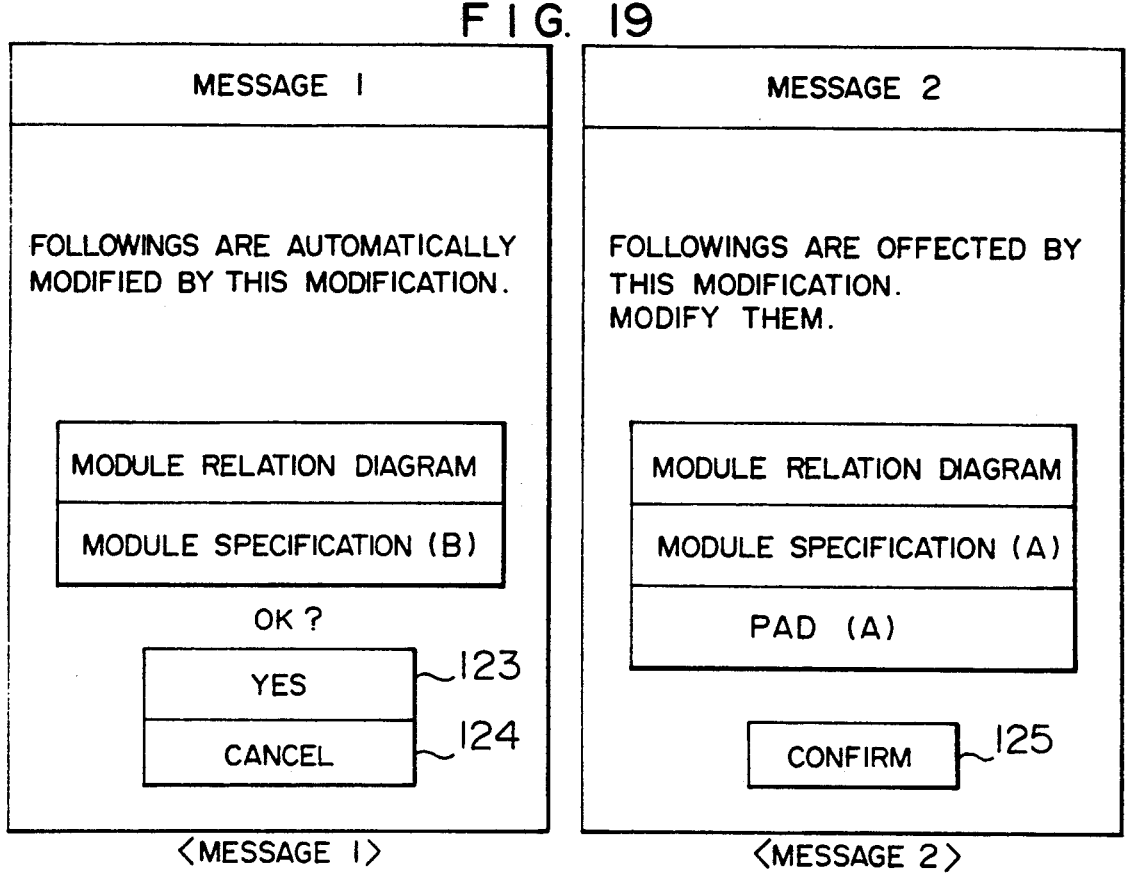
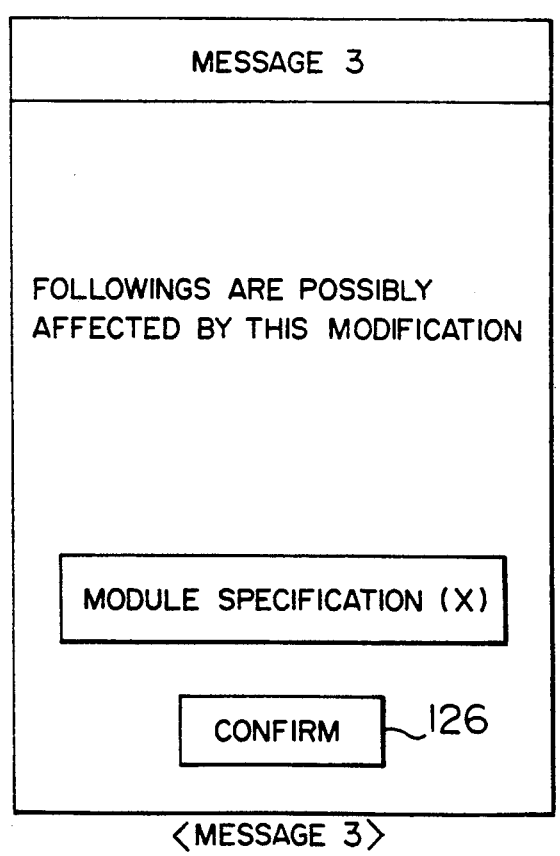

FIG. 20
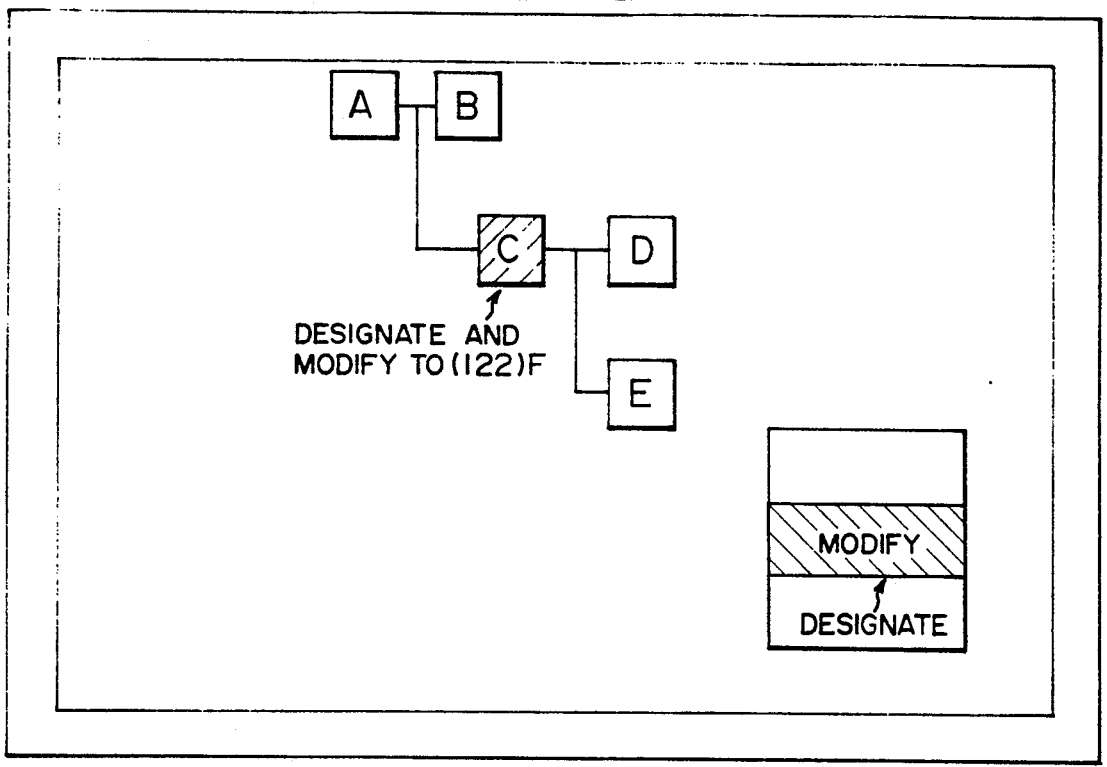
(a)
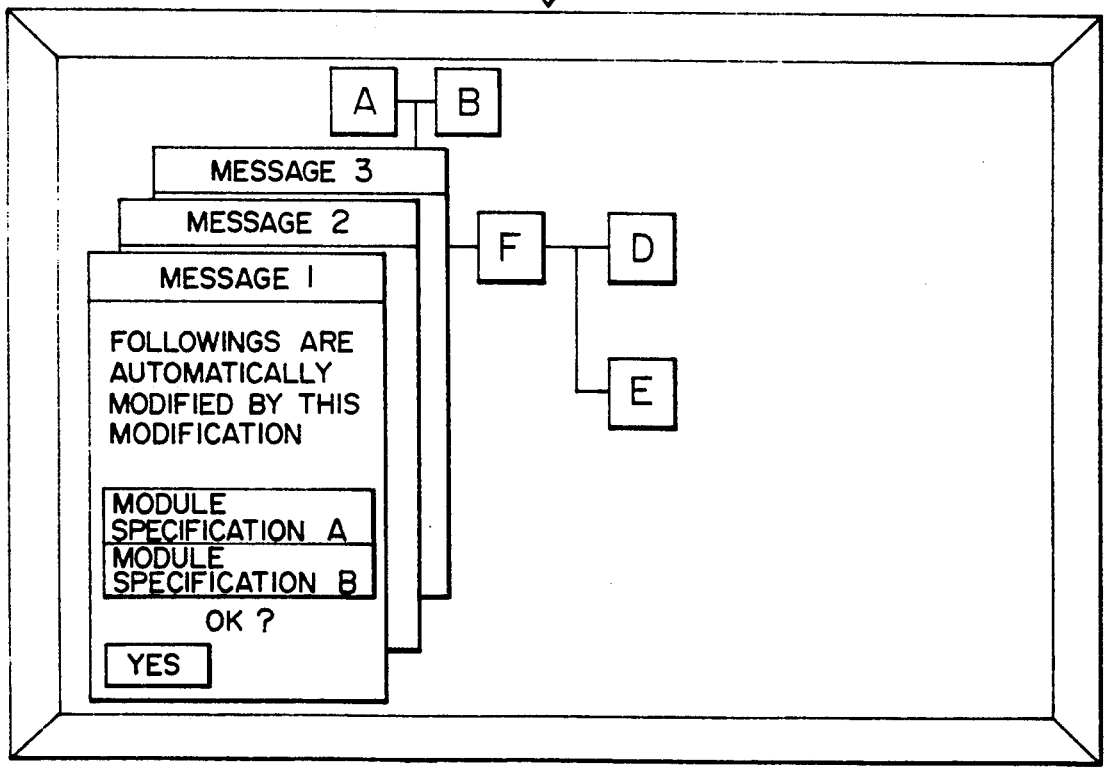
(b)

FIG. 24

| MESSAGE 1 |
|---|
| FOLLOWINGS ARE AUTOMATICALLY MODIFIED BY THIS MODIFICATION |
| MODULE RELATION DIAGRAM |
| MODULE SPECIFICATION (B) |
| OK ? |
| YES |
| CANCEL |

⟨MESSAGE 1⟩

| MESSAGE 2 | | |
|---|---|---|
| FOLLOWINGS ARE AFFECTED BY THIS MODIFICATION MODIFY THEM | | |
| MODULE RELATION DIAGRAM | MODIFY | RESERVE |
| MODULE SPECIFI- CATION (B) | MODIFY | RESERVE |
| PAD DIAGRAM (A) | MODIFY | RESERVE |
|  | 130 | 131 |

⟨MESSAGE 2⟩

| MESSAGE 3 | | | |
|---|---|---|---|
| FOLLOWINGS ARE POSSIBLY AFFECTED BY THIS MODIFICATION MODIFY AS MAY BE REQUIRED | | | |
| MOD REL | MODIFY | NOT MODIFY | RESERVE |
| MOD SPED (A) | MODIFY | NOT MODIFY | RESERVE |
| MOD SPED (B) | MODIFY | NOT MODIFY | RESERVE |
|  | 132 | 133 | 134 |

⟨MESSAGE 3⟩

F I G. 25

| OBJECT OF OPERATION 112 | MODULE NUMBER 113 | LEVEL 114 | OBJECT | | OBJECT DATA 116 | MODIFICATION STATUS 117 |
|---|---|---|---|---|---|---|
| | | | 115 | | | |
| MODULE SPECIFICATION | 1 | LEVEL 2 | DEPENDENT MODULE | | 3 | MOD |
| MODULE SELATION DIAGRAM | | LEVEL 2 | MODULE | JAPANESE NAME | 2 | RES |
| MODULE SPECIFICATION | 2 | LEVEL 3 | FUNCTION | | | NOT |
| MODULE SPECIFICATION | 3 | LEVEL 3 | PAD | | | RES |

MESSAGE HISTORY

F I G. 30
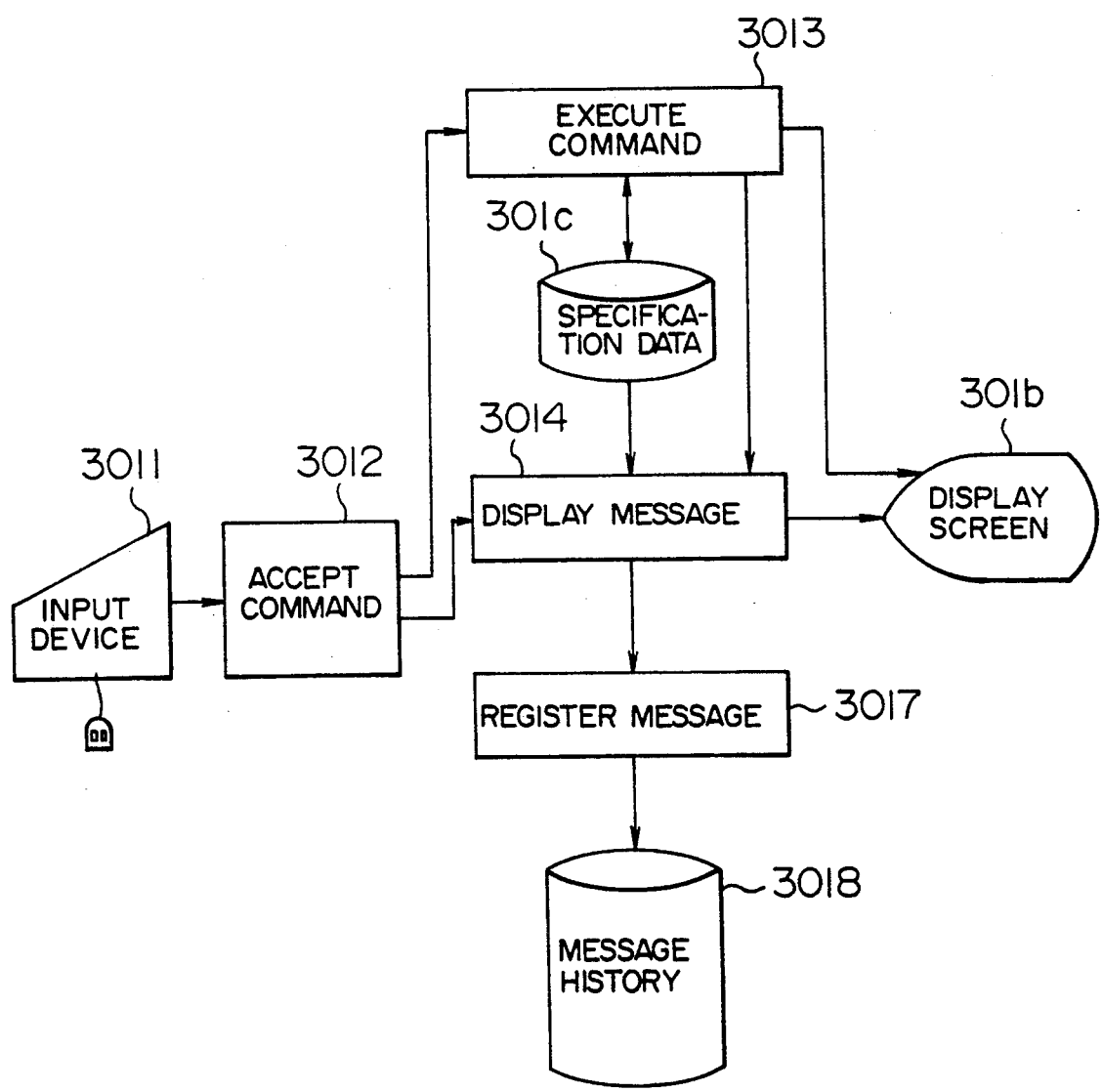

F I G. 32

| NO. | TOOL | OPERA-TION | OBJECT OF OPERATION | MESSAGE TEXT | OBJECT SPECIFICATION OF MESSAGE | RESPONSE TO MESSAGE |
|---|---|---|---|---|---|---|
| 1 | MODULE RELATION DIAGRAM EDITOR | DELETE | MODULE C | MODIFY FOLLOWING RELATED PORTIONS | MODULE SPECIFICATION A  P A D A | RESERVE |
| 2 | PDA EDITOR | INSERT | BOX 510 | NUMBE OF BOXES OF MODULE IS OVER 50. DEVIDE MODULE AND CHECK ALGORITHM | MODULE RELATION DIAGRAM I  P A D | CANNOT ANSWER |

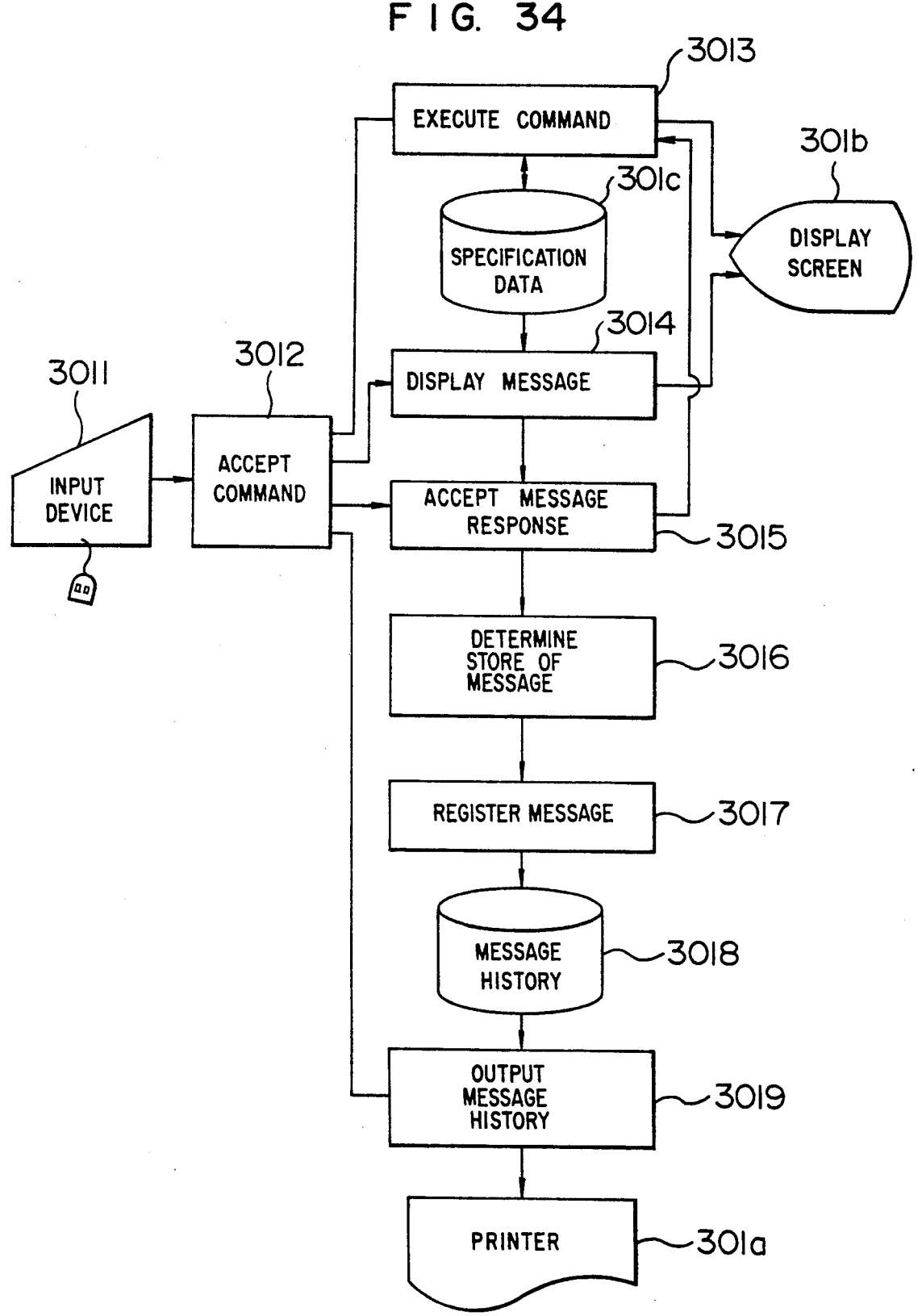

F I G. 36

| MESSAGE CODE | MESSAGE TEXT | RESPONSE MENU | | |
|---|---|---|---|---|
| | | NO. | CONTENT | OPERATION AFTER RESPONSE |
| 1 | (CONTENT OF MODIFICATION) MODIFY FOLLOWING RELATED PORTIONS | 1 | ⟨MODIFICATION AFFECTED PORTION⟩ | START EDITOR OF SELECTED SPECIFICATION |
| | | 2 | RESERVE | STORE HISTORY |
| 2 | (SPECIFICATION NAME) BASE DESIGN HAS NOT BEEN MODE. DESIGN FOLLOWING SPECIFICATION FIRST | 1 | ⟨BASE SPECIFI-CATION⟩ | START EDITOR OF SELECTED SPECIFICATION |
| | | 2 | RESERVE | STORE HISTORY |
| 3 | (CONTENT OF MODIFICATION) MAY FOLLOWING RELATED PORTIONS BE AUTOMATICALLY MODIFIED ⟨RELATED PORTIONS⟩ | 1 | YES | AUTOMATIC MODIFICATION |
| | | 2 | NO | STORE HISTORY |

| MESSAGE CODE | MESSAGE TEXT | RESPONSE MENU |||
|---|---|---|---|---|
| | | No. | CONTENT | POST-RESPONSE OPERATION |
| 3 | ADD FOLLOWING MODULE TO PAD DIAGRAM | 1 | ⟨PORTION TO BE ADDED⟩ | START EDITOR FOR SELECTED SPECIFICATION |
| | | 2 | RESERVE | — |
| 4 | CONFIRM IF FOLLOWING MODULE HAS BEEN ADDED TO PAD DIAGRAM ⟨PORTION TO BE ADDED⟩ | 1 | ADDED | — |
| | | 2 | NOT YET ADDED | — |

| No. | TOOL | OPERATION | OBJECT OF OPERATION | MESSAGE CODE | MESSAGE TEXT | OBJECT SPECIFICATION OF MESSAGE | | RESPONSE TO MESSAGE | REGISTRATION DATE AND TIME |
|---|---|---|---|---|---|---|---|---|---|
| 1 | MODULE RELATION DIAGRAM EDITOR | OPEN | MODULE A | 3 | ADD FOLLOWING MODULES TO PAD DIAGRAM | MODULE SPECIFICATION | MODULE X | RESERVE | 1988/ 12/21 13:45:30 |
|  |  |  |  |  |  | — |  |  |  |
| 2 | MODULE RELATION DIAGRAM EDITOR | DELETE | MODULE C | 1 | MODIFY FOLLOWING RELATED PORTIONS | MODULE SPECIFICATION A | PAD | RESERVE | 1989/ 1/17 20:12:26 |
|  |  |  |  |  |  | — |  |  |  |

| MESSAGE CODE | ACCOMPLISHMENT CRITERIA | | | | | | | LEVEL | POST-EVALUATION PROCESS | |
|---|---|---|---|---|---|---|---|---|---|---|
| | | | | | | | | | COMMAND | DATA |
| 3 | (PAD REGISTRATION DATE AND TIME) | > | (MASSAGE HISTORY REGISTRATION DATE AND TIME) | AND | (MESSAGE HISTORY RESPONSE) | = | <PORTION TO BE ADDED> | SAID TO DO | DISPLAY MESSAGE | MESSAGE CODE 4 |
| | DITTO | > | DITTO | AND | DITTO | = | (RESERVE) | LIKELY TO HAVE DONE | DITTO | MESSAGE CODE 4 |
| | DITTO | ≦ | DITTO | AND | DITTO | = | <PORTION TO BE ADDED> | NOT YET DONE | DITTO | MESSAGE CODE 3 |
| | DITTO | ≦ | DITTO | AND | DITTO | = | (RESERVE) | NOT YET DONE | — | — |

| MESSAGE CODE | MESSAGE CONTENT | OBJECT SPECIFICATION OF MESSAGE | | LEVEL | REGISTRATION DATE AND TIME |
|---|---|---|---|---|---|
| | | MODULE SPECIFICATION A | MODULE X | | |
| 3 | ADD FOLLOWING MODULES TO PAD DIAGRAM | | | LIKELY TO HAVE DONE | 1989/1/30 9:52:07 |
| | | | — | | |

FIG. 49A

| # | OBJECT SPECIFICA-TION | COMMAND | COMMAND DATA | | | REGISTRATION DATA AND TIME |
|---|---|---|---|---|---|---|
| | | | DATA 1 | DATA 2 | DATA 3 | |
| 1 | MODULE RELATION DIAGRAM | KEY ENTRY | BOX 1 | BOX 2 | — | |
| 2 | DITTO | CONNECT | BOX 1 | BOX 2 | — | |
| 3 | DITTO | OPEN | A | MODULE SPECIFICA-TION | — | |
| 4 | MODULE SPECIFICA-TION A | MESSAGE RESPONSE | MESSAGE CODE 3 | RESERVE RESPONSE | — | |
| 5 | PAD DIAGRAM MODULE A | START | — | — | — | |

FIG. 49B

| COMMAND | NUMBER OF DATA ITEMS | CONTENT OF COMMAND DATA | | |
|---|---|---|---|---|
| | | DATA 1 | DATA 2 | DATA 3 |
| KEY ENTRY | 2 | BOX No. | MODULE NAME | — |
| CONNECT | 2 | BOX No. | BOX No. | — |
| MESSAGE RESPONSE | 2 | MESSAGE CODE | CONTENT OF RESPONSE | — |

FIG. 49C

| MESSAGE CODE | ACCOMPLISHMENT CRITERIA | | | LEVEL | POST EVALUATION PROCESS | |
|---|---|---|---|---|---|---|
| | | | | | COMMAND | DATA |
| 3 | (PAD REGISTRATION DATA AND TIME) > (WORK HISTORY MESSAGE RESPONSE REGISTRATION DATA AND TIME) AND (MESSAGE RESPONSE CONTENT IN WORK HISTORY) = ⟨ADDITIONAL ITEM⟩ | | | SAID TO DO | DISPLAY MESSAGE | MESSAGE CODE 4 |
| | DITTO > DITTO AND DITTO = (RESERVE) | | | LIKELY TO HAVE DONE | DITTO | MESSAGE CODE 4 |
| | DITTO VIII DITTO AND DITTO = ⟨ADDITIONAL ITEM⟩ | | | HAVE NOT DONE | DITTO | MESSAGE CODE 3 |
| | DITTO VIII DITTO AND DITTO = (RESERVE) | | | HAVE NOT DONE | — | — |

F I G. 54

2121

| MESSAGE CODE | TYPE OF EXECUTION | ACCOMPLISHMENT CRITERIA | | POST-EVALUATION PROCESS | |
|---|---|---|---|---|---|
| | | | LEVEL | COMMAND | DATA |
| 3 | (a) AFTER ACCEPTANCE OF MESSAGE RESPONSE | (MESSAGE RESPONSE) = ⟨PORTION TO BE ADDED⟩ | SAID TO DO | — | — |
| | | (MESSAGE RESPONSE) = (RESERVE) | HAVE NOT DONE | — | — |
| | (b) WHEN EVALUATION RESULT OUTPUT COMMAND IS EXECUTION | $\begin{pmatrix}\text{PAD}\\\text{REGISTRATION}\end{pmatrix} > \begin{pmatrix}\text{EVALUATION RESULT}\\\text{REGISTRATION DATE}\\\text{AND TIME}\end{pmatrix}$ AND $\begin{pmatrix}\text{EVALUATION}\\\text{RESULT}\end{pmatrix} = \begin{pmatrix}\text{SAID}\\\text{TO DO}\end{pmatrix}$ | SAID TO DO | DISPLAY MESSAGE | MESSAGE CODE 4 |
| | | ( DITTO ) > ( DITTO ) AND ( DITTO ) = $\begin{pmatrix}\text{HAVE}\\\text{NOT}\\\text{DONE}\end{pmatrix}$ | LIKELY TO HAVE DONE | DITTO | MESSAGE CODE 4 |
| | | ( DITTO ) ≦ ( DITTO ) AND ( DITTO ) = $\begin{pmatrix}\text{SAID}\\\text{TO DO}\end{pmatrix}$ | HAVE NOT DONE | DITTO | MESSAGE CODE 3 |
| | | ( DITTO ) ≦ ( DITTO ) AND ( DITTO ) = $\begin{pmatrix}\text{HAVE}\\\text{NOT}\\\text{DONE}\end{pmatrix}$ | HAVE NOT DONE | DITTO | MESSAGE CODE 3 |

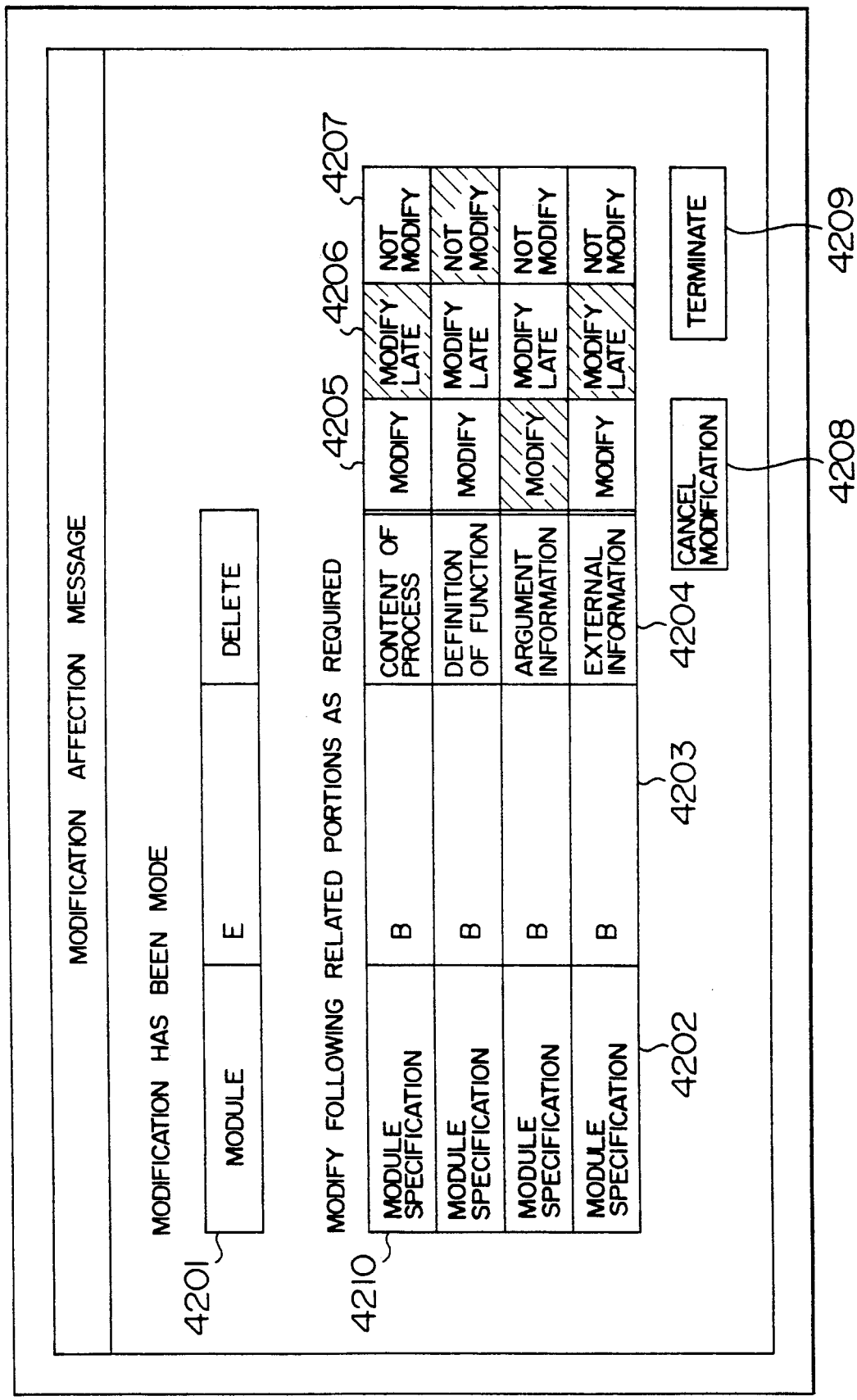

F I G. 58

| TYPE OF SPECIFI-CATION | CONTENT OF MODIFICATION ||||| AFFECTED PORTION |||| RESPONSE |
|---|---|---|---|---|---|---|---|---|---|
| | NAME OF SPECIFI-CATION | TYPE OF OBJECT | NAME OF OBJECT | OPERATION | | TYPE OF SPECIFI-CATION | NAME OF SPECIFI-CATION | ITEM | |
| 1 | MODULE RELATION DIAGRAM | A | MODULE | E | DELETE | MODULE SPECIFI-CATION | B | CONTENT OF PROCESS | MODIFY LATER |
| 2 | MODULE RELATION DIAGRAM | A | MODULE | E | DELETE | MODULE SPECIFI-CATION | B | DEFINITION OF FUNCTION | NOT MODIFY |
| 3 | MODULE RELATION DIAGRAM | A | MODULE | E | DELETE | MODULE SPECIFI-CATION | B | ARGUMENT INFOR-MATION | MODIFY |
| 4 | MODULE RELATION DIAGRAM | A | MODULE | E | DELETE | MODULE SPECI-CATION | B | EXTERNAL INFOR-MATION | MODIFY LATER |
| 4401 | 4402 | 4403 | 4404 | 4405 | | 4406 | 4407 | 4408 | 4409 |

F I G. 64A

⟨NOTICE TO MODIFICATION AFFECTED PORTION⟩

| MODIFI-CATION NUMBER | MODIFICATION AFFECTED PORTION 5402 | | | NOTICE 5403 | |
|---|---|---|---|---|---|
| 5401 | TYPE OF SPECIFICATION | NAME OF SPECIFICATION | ITEM | | |
| 1 | MODULE SPECIFICATION | B | REFERENCE MODULE | NOTIFY | NOT NECES-SARY |
| 1 | MODULE SPECIFICATION | B | CONTENT OF PROCESS | NOTIFY | NOT NECES-SARY |
| 1 | MODULE SPECIFICATION | B | DEFINITION OF FUNCTION | NOTIFY | NOT NECES-SARY |
| 1 | MODULE SPECIFICATION | B | ARGUMENT INFORMATION | NOTIFY | NOT NECES-SARY |
| 2 | MODULE SPECIFICATION | C | EXTERNAL INFORMATION | NOTIFY | NOT NECES-SARY |

| MODIFICATION NUMBER | SOURCE PORTION OF MODIFICATION 5501 | | AFFECTED PORTION 5502 | CONFIRMATION OF COUNTERMEASURE 5503 | |
|---|---|---|---|---|---|
| | TYPE OF SPECIFICATION | NAME OF SPECIFICATION | ITEM | | |
| 1 | MODULE RELATION DIAGRAM | A | REFERENCE MODULE | DONE | NOT YET | NOT NECESSARY |
| 1 | MODULE RELATION DIAGRAM | A | CONTENT OF PROCESS | DONE | NOT YET | NOT NECESSARY |
| 3 | MODULE RELATION DIAGRAM | D | DEFINITION OF FUNCTION | DONE | NOT YET | NOT NECESSARY |
| 3 | MODULE RELATION DIAGRAM | D | ARGUMENT INFORMATION | DONE | NOT YET | NOT NECESSARY |
| 7 | MODULE RELATION DIAGRAM | E | REFERENCE MODULE | DONE | NOT YET | NOT NECESSARY |

5504 — OK

F I G. 65

| 5601 MODIFI-CATION NUMBER | 5602 DATE AND TIME | 5603 MODIFIED BY | 5604 TYPE OF SPECIFICATION | 5605 NAME OF SPECIFICATION | 5606 TYPE OF OBJECT | 5607 NAME OF OBJECT | 5608 OPERATION | 5609 WORK NUMBER |
|---|---|---|---|---|---|---|---|---|
| 1 | 89/12/07 15:10 | SAKATA | MODULE RELATION DIAGRAM | A | MODULE | E | DELETE | 1 |
| 2 | 89/12/07 15:12 | SAKATA | MODULE RELATION DIAGRAM | A | MODULE | H | ADD | 1 |
| 3 | 89/12/10 8:59 | KINOSHITA | MODULE SPECIFICATION | B | ARGUMENT | X | DELETE | 2 |
| 4 | 89/12/10 11:22 | KINOSHITA | TABLE SPECIFICATION | T | ELEMENT | U | ADD | 3 |
| 5 | 89/12/10 11:52 | KINOSHITA | TABLE SPECIFICATION | T | ELEMENT | V | ADD | 3 |
| 6 | 89/12/08 13:15 | KOBAYASHI | MODULE SPECIFICATION | C | DEFINITION OF FUNCTION | — | MODIFY | 4 |
| 7 | 89/12/08 14:27 | KOBAYASHI | MODULE SPECIFICATION | C | CONTENT OF PROCESS | — | MODIFY | 4 |

FIG. 66

| MODIFICATION NUMBER (5611) | TYPE OF SPECIFICATION (5612) | NAME OF SPECIFICATION (5613) | ITEM (5614) | RESPONSE (5615) | WORK NUMBER (5616) | START/END (5617) |
|---|---|---|---|---|---|---|
| 1 | MODULE SPECIFICATION | B | REFERENCE MODULE | COUNTER-MEASURED | 0 | — |
| 1 | MODULE SPECIFICATION | B | CONTENT OF PROCESS | NOT COUNTER MEASURED YET | 2 | START |
| 1 | MODULE SPECIFICATION | B | DEFINITION OF FUNCTION | NOT NECCESSARY | 2 | END |
| 1 | MODULE SPECIFICATION | B | ARGUMENT INFORMATION | COUNTER-MEASURED | 2 | END |
| 1 | MODULE SPECIFICATION | B | EXTERNAL INFORMATION | NOT COUNTER MEASURED YET | 0 | END |
| 2 | MODULE SPECIFICATION | C | REFERENCE MODULE | COUNTER-MEASURED | 4 | — |
| 2 | MODULE SPECIFICATION | C | CONTENT OF PROCESS | COUNTER-MEASURED | 4 | END |
| 2 | MODULE SPECIFICATION | C | DEFINITION OF FUNCTION | COUNTER-MEASURED | 4 | END |
| 2 | MODULE SPECIFICATION | C | ARGUMENT INFORMATION | NOT NECCESSARY | 4 | START |
| 2 | MODULE SPECIFICATION | C | EXTERNAL INFORMATION | NOT NECCESSARY | 4 | START |
| 3 | MODULE SPECIFICATION | A | CONTENT OF PROCESS | NOT NOTICED | 0 | — |

| LIST OF MODULE SPECIFICATION | | | | | |
|---|---|---|---|---|---|
| SPECIFI-CATION NAME | DATE OF PREPARATION | PREPARED BY | DATE OF MODIFICATION | MODIFIED BY | MODIFICATION AFFECTION STATUS |
| A | 9 - 3 - 89 | KINOSHITA | — | — | UNCOUNTER-MEASURED PORTION INCLUDED |
| B | 9 - 2 - 89 | KINOSHITA | 12 - 8 - 89 | KINOSHITA | UNCOUNTER-MEASURED PORTION INCLUDED |
| C | 9 - 2 - 89 | KOBAYASHI | 12 - 8 - 89 | KOBAYASHI | COUNTER-MEASURED |
| D | 8 - 30 - 89 | KINOSHITA | — | — | NONE |
| E | 8 - 29 - 89 | KINOSHITA | 12 - 7 - 89 | SAKATA | — |
| F | 8 - 29 - 89 | KINOSHITA | — | — | NONE |

| MODIFI-CATION NUMBER | DATE AND TIME | MODIFIED BY | TYPE OF SPECIFICA-TION | NAME OF SPECIFICA-TION | TYPE OF OBJECT | NAME OF OBJECT | OPERATION | WORK NUMBER |
|---|---|---|---|---|---|---|---|---|
| 3 | 89/12/08 15:30 | KINOSHITA | MODULE SPECIFICATION | B | ARGUMENT | X | DELETE | 2 |
| 9 | 89/12/09 10:25 | KINOSHITA | MODULE SPECIFICATION | A | CONTENT OF PROCESS | — | MODIFY | 6 |
| 10 | 89/12/09 15:43 | NARITA | MODULE SPECIFICATION | G | ARGUMENT | Y | DELETE | 17 |
| 15 | 89/12/10 20:17 | SAKATA | MODULE SPECIFICATION | F | EXTERNAL INFORMATION | Z | ADD | 21 |
| 18 | 89/12/12 18:30 | KINOSHITA | MODULE SPECIFICATION | D | CONTENT OF PROCESS | — | MODIFY | 33 |

F I G. 71
(a)
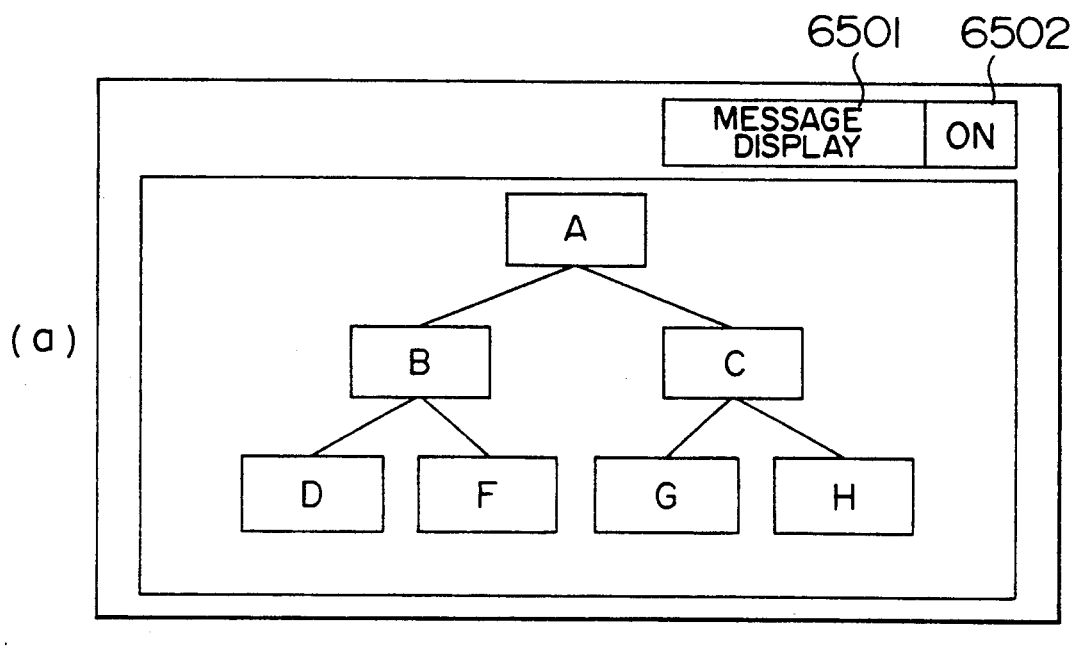
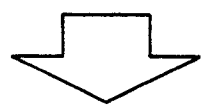
(b)
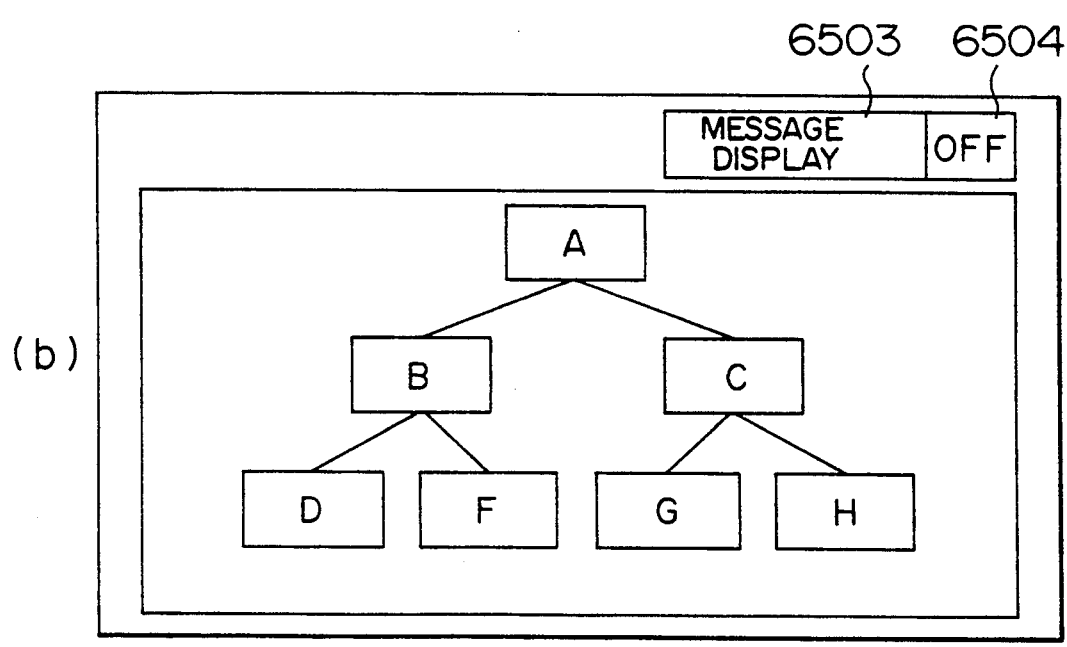

FIG. 72A

| USER NAME | LEVEL |
|---|---|
| KINOSHITA | 2 |
| KOBAYASHI | 2 |
| SAKATA | 2 |
| SATOH | 3 |
| NAKATANI | 3 |
| NARITA | 1 |

FIG. 72B

| TIMING | START | MODIFICATION | END | |
|---|---|---|---|---|
| MESSAGE | MODIFICATION NOTICE | MODIFICATION AFFECTION | MODIFICATION NOTICE | MODIFICATION AFFECTION |
| LEVEL 1 | ○ | ○ | ○ | ○ |
| LEVEL 2 | ○ | × | × | ○ |
| LEVEL 3 | × | × | × | ○ |

F I G. 75

| TYPE OF SPECIFICATION | NAME OF SPECIFICATION | OPERATOR |
|---|---|---|
| MODULE RELATION DIAGRAM | A | SAKATA |
| MODULE SPECIFICATION | A | KINOSHITA |
| MODULE SPECIFICATION | B | KINOSHITA |
| MODULE SPECIFICATION | C | KOBAYASHI |
| MODULE SPECIFICATION | D | KINOSHITA |
| | E | KINOSHITA |

FIG. 77
(A)
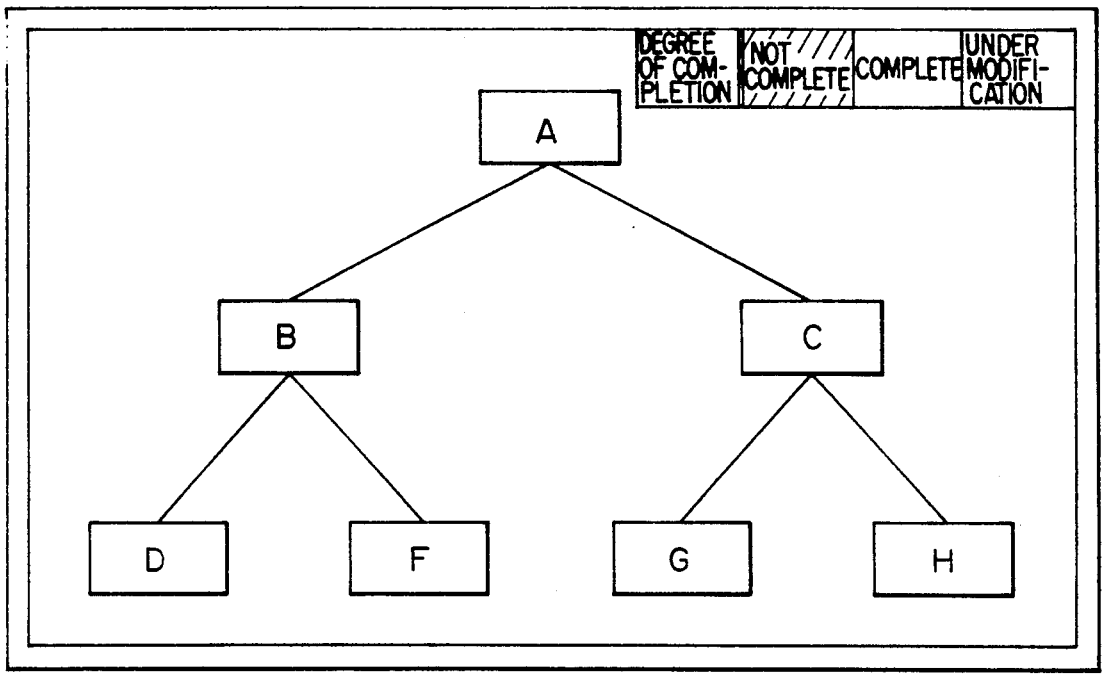
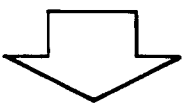
(B)
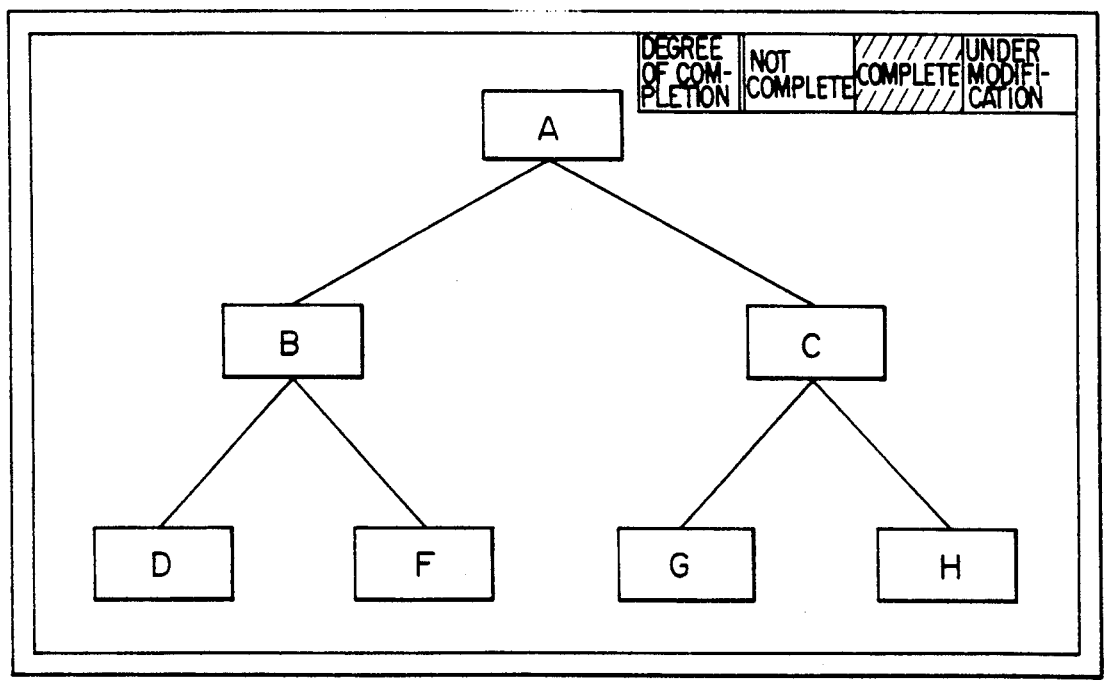

F I G. 78

| TYPE OF SPECIFICATION | NAME OF SPECIFICATION | DEGREE OF COMPLETION |
|---|---|---|
| MODULE RELATION DIAGRAM | A | COMPLETE |
| MODULE SPECIFICATION | A | COMPLETE |
| MODULE SPECIFICATION | B | UNDER MODIFICATION |
| MODULE SPECIFICATION | C | COMPLETE |
| MODULE SPECIFICATION | D | NOT COMPLETE |

6ao1

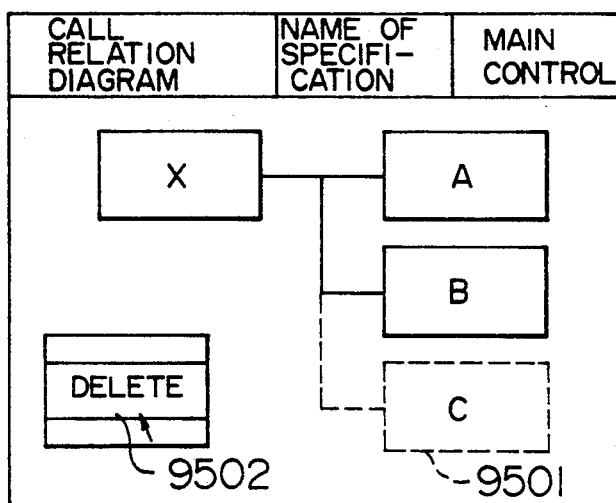
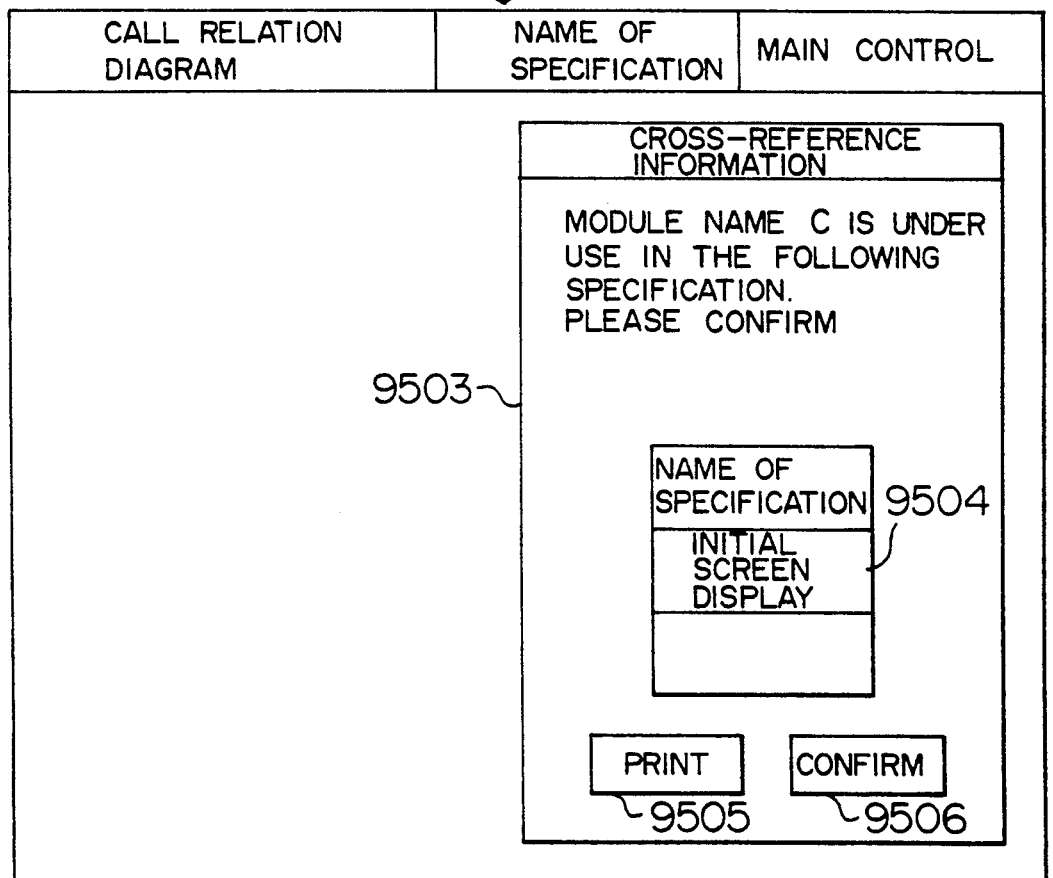
FIG. 83

F I G. 85

| EDIT OPERATION ITEM | CROSS-REFERENCE INFORMATION DISPLAY | CROSS-REFERENCE INFORMATION REGISTRATION |
|---|---|---|
| 9701 ADD | × | ○ |
| 9702 DELETE | ○ | ○ |
| 9703 STORE | — | — |
| 9703 END | — | — |

FIG. 87

| MODULE NAME | NAME OF SPECIFICATION WHICH USES MODULE AND NUMBER OF TIMES OF USAGE | | | | |
|---|---|---|---|---|---|
| | 1 | 2 | 3 | --- | n |
| MAIN | MAIN CONTROL | — | | | |
| A | MAIN CONTROL | — | | | |
| B | MAIN CONTROL | — | | | |
| C | MAIN CONTROL | — | | | |
| X | INITIAL SCREEN DISPLAY | — | | | |
| Y | INITIAL SCREEN DISPLAY | INITIAL SCREEN DISPLAY | | | |

9901 / 9902 / 9903

FIG. 90A
FIG. 90B
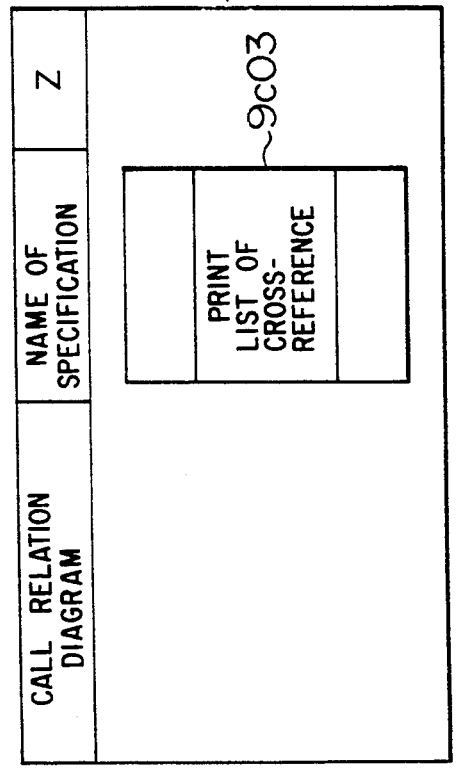
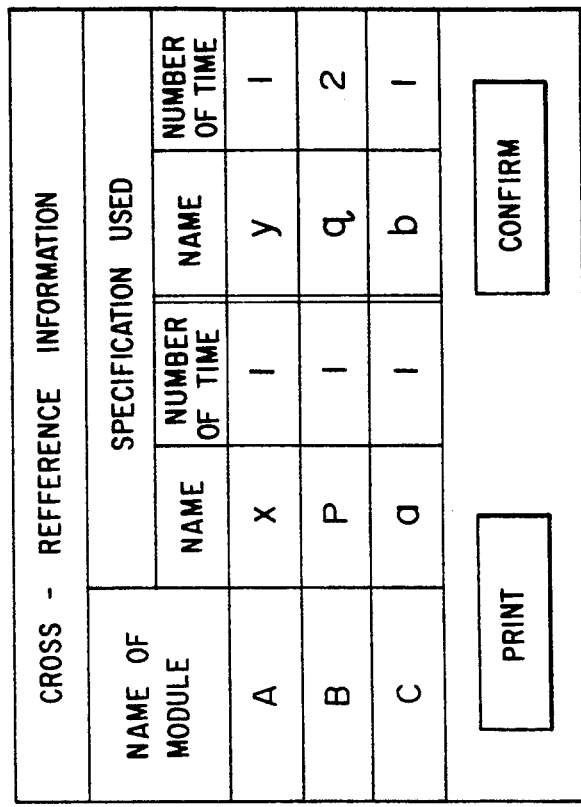

FIG. 93

| EDIT OPERATION ITEM | DISPLAY CROSS-REFERENCE INFORMATION (9f03) | REGISTER CROSS-REFERENCE INFORMATION | STORE EDIT OPERATION (9f01) | DISPLAY STORED EDIT OPERATION CROSS-REFERENCE (9f02) |
|---|---|---|---|---|
| ADD | × | ○ | ○ | × |
| DELETE | × | ○ | ○ | × |
| STORE | — | — | — | ○ |
| END | — | — | — | ○ |

FIG. 94

| NAME OF MODULE (9g01) | EDIT OPERATION ITEM (9g02) |
|---|---|
| TEST - DATA | ADD |
| COMPARE - DATA | ADD |
| OUTPUT - DATA | ADD |
| INPUT - DATA | ADD |
| TEST - MODE | DELETE |

FIG. 98

| EDIT OPERATION ITEM | DISPLAY CROSS-REFERENCE INFORMATION | REGISTER CROSS-REFERENCE INFORMATION | REGISTER CROSS-REFERENCE REFERENCE RESULT 9kO1 | DISPLAY CROSS-REFERENCE REFERENCE RESULT 9kO2 |
|---|---|---|---|---|
| ADD | × | ○ | ○ | × |
| DELETE | × | ○ | ○ | × |
| STORE | — | — | × | ○ |
| END | — | — | × | ○ |

FIG. 99

| MODULE NAME | EDIT OPERATION | NAME OF SPECIFICATION USED ||||
|---|---|---|---|---|---|
| | | 1 | 2 | ... | n |
| tast-data | ADD | DISPLAY INITIAL SCREEN | OUTPUT TEST RESULT | | — |
| compare-data | ADD | TESTER | OUTPUT TEST RESULT | | — |
| output-data | ADD | DISPLAY INITIAL SCREEN | TESTER | | — |
| input-data | ADD | INPUT TEST DATA | DISPLAY INITIAL SCREEN | | TESTER |
| test-mode | DELETE | CHANGE MODE | DISPLAY INITIAL SCREEN | | TESTER |

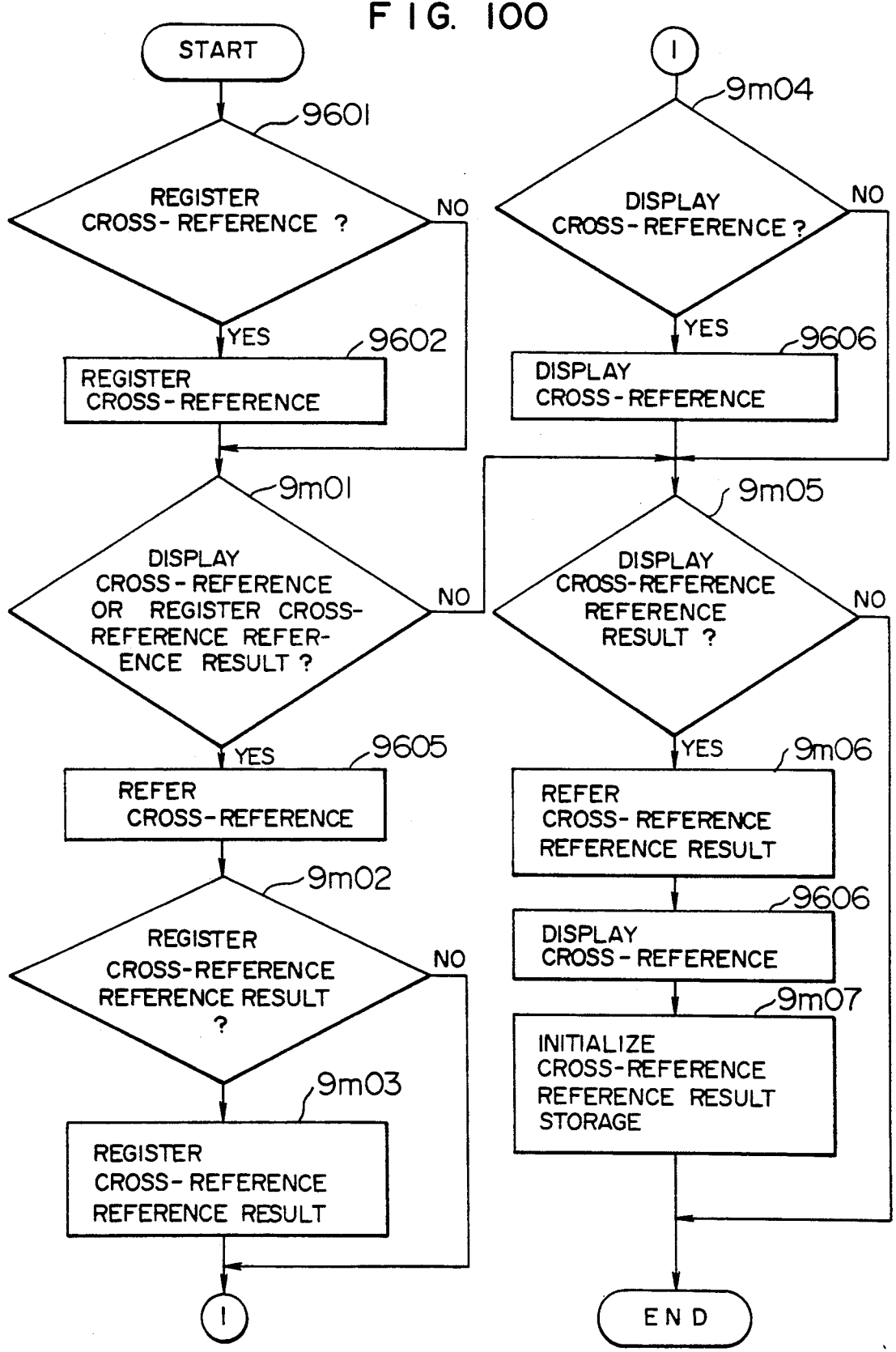
F I G. 100

FIG. 103

| EDIT OPERATION ITEM | DISPLAY CROSS-REFERENCE INFORMATION | REGISTER CROSS-REFERENCE INFORMATION | REGISTER RELATED CROSS-REFERENCE REFERENCE RESULT 9p01 | DISPLAY RELATED CROSS-REFERENCE REFERENCE RESULT 9p02 |
|---|---|---|---|---|
| ADD | × | ○ | ○ | × |
| DELETE | × | ○ | ○ | × |
| STORT | — | — | × | × |
| END | — | — | × | ○ |
| (START) | — | — | × | ○ |

9p03

F I G. 104

| MODULE NAME | EDIT OPERATION | SPECIFICATION OPERATED | NAME OF SPECIFICATION USED | | |
|---|---|---|---|---|---|
| | | | 1 | 2 | n |
| TEST-DATA | ADD | MAIN CONTROL | DISPLAY INITIAL SCREEN | OUTPUT TEST RESULT | — |
| COMPARE-DATA | ADD | MAIN CONTROL | TESTER | OUTPUT TEST RESULT | — |
| OUTPUT-DATA | ADD | MAIN CONTROL | DISPLAY INITIAL SCREEN | TESTER | — |
| INPUT-DATA | ADD | MAIN CONTROL | INPUT TEST DATA | DISPLAY INITIAL SCREEN | TESTER |
| TEST-MODE | DELETE | MAIN CONTROL | CHANGE MODE | DISPLAY INITIAL SCREEN | TESTER |

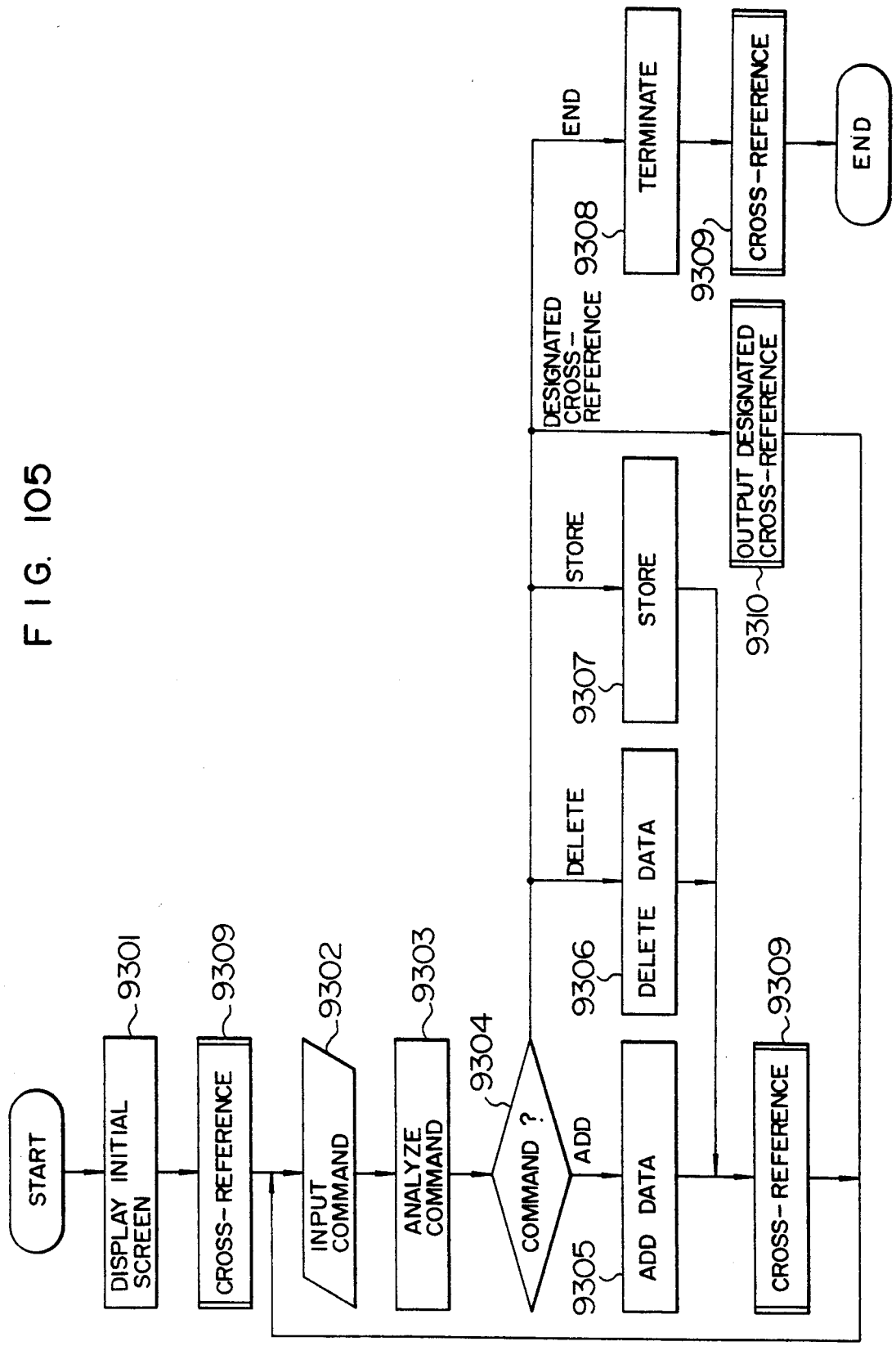

FIG. 108B

| TYPE OF SPECIFICATION | MODULE SPECIFICATION | | NAME OF SPECIFICATION | TEST-DATA |
|---|---|---|---|---|
| FUNCTION | | CONTENT | CROSS-REFERENCE INFORMATION | |
| REFERENCE MODULE | MODULE NAME | | FOLLOWING DATA HAS BEEN EDITED IN OTHER SPECIFICATION | |
| | INPUT-DATA | | | |
| | COMPARE-DATA | | | |
| | TEST-DATA | | | |
| EXTERNAL INFORMATION | | | | |
| REMARK | | | | |

Inner table (9u03):

| MODULE NAME | OPERATION | EDITED IN | |
|---|---|---|---|
| | | TYPE | NAME |
| TEST-MODE | DELETE | CALL RELATION DIAGRAM | MAIN CONTROL |
| OUTPUT-DATA | ADD | CALL RELATION DIAGRAM | MAIN CONTROL |

| No. | MODIFIED SPECIFI-CATION (ICO1) | MODIFI-CATION OPERATION (ICO2) | OBJECT OF MODIFICATION (ICO3) FIELD | OBJECT OF MODIFICATION (ICO3) ITEM | AFFECTED SPECIFI-CATION (ICO4) | RELATION (ICO5) OBJECT | RELATION (ICO5) TYPE OF RELATION | AFFECTED PORTION (ICO6) | SEQUENCE (7401) |
|---|---|---|---|---|---|---|---|---|---|
| 1 | MODULE RELATION DIAGRAM | ADD/DEL | MODULE | MODULE | MODULE SPECIFI-CATION | ITEM TO BE MODIFIED | HIGHER LEVEL | DEPENDENT MODULE | CORRECT |
| 2 | MODULE RELATION DIAGRAM | ADD/DEL | MODULE | MODULE | MODULE SPECIFI-CATION | ITEM TO BE MODIFIED | HIGHER LEVEL | CONTENT OF PROCER | CORRECT |
| 3 | MODULE SPECIFI-CATION | ADD/DEL | DE-PENDENT MODULE | MODULE | MODULE RELATION DIAGRAM | MODIFIED SPECIFICATION | INCLUSIVE | — | REVERSE |
| 4 | MODULE SPECIFI-CATION | ADD/DEL | AR-GUMENT INFOR-MATION | AR-GUMENT | MODULE SPECIFI-CATION | MODIFIED SPECIFICATION | HIGHER LEVEL | CONTENT OF PROCER | CORRECT |
| 5 | MODULE SPECIFI-CATION | ADD/DEL | EX-TERNAL INFOR-MATION | TABLE | MODULE SPECIFI-CATION | MODIFIED SPECIFICATION | INCLUSIVE | CONTENT OF PROCER | CORRECT |
| 6 | MODULE SPECIFI-CATION | ADD/DEL | TABLE | ELEMENT | MODULE SPECIFI-CATION | MODIFIED SPECIFICATION | INCLUSIVE | CONTENT OF PROCER | REVERSE |

| No. | DESIGN SPECIFICATION | BASE SPECIFICATION | RELATION |
|---|---|---|---|
| 1 | MODULE SPECIFICATION | MODULE RELATION DIAGRAM | INCLUSIVE |
| 2 | PAD | MODULE SPECIFICATION | SAME |

FIG. 115

| No. | TYPE OF SPECIFICATION | | | KEY WORD | CHECK ITEM |
|---|---|---|---|---|---|
| | MODULE RELATION DIAGRAM | MODULE SPECIFICATION | TABLE SPECIFICATION | | |
| 1 | O | | | INPUT | ARE INPUTS OF DIFFERENT DATA COLLECTED IN ONE MODULE ? |
| 2 | | O | | INITIALIZE | IS INITIAL VALUE INDICATED ? |
| 3 | | O | | FLAG | ARE SET AND RESET OF FLAG PAIRED ? |
| 4 | | | O | FLAG | ARE VALUES AND MEANING OF ON/OFF INDICATED? |
| 5 | | O | O | FLAG | ARE A PLURALITY OF FLAGS HAVING SAME FUNCTION INCLUDED ? |
| 6 | | O | | INPUT | IS ERROR CHECK OF INPUT DATA CONDUCTED ? |

FIG. 119

| No. | TYPE OF SPECIFICATION | | | KEY WORD | CHECK ITEM | LEVEL |
|---|---|---|---|---|---|---|
| | MODULE RELATION DIAGRAM | MODULE SPECIFICATION | TABLE SPECIFICATION | | | |
| 1 | ○ | | | INPUT | ARE INPUTS OF DIFFERENT DATA COLLECTED IN ONE MODULE ? | 2 |
| 2 | | ○ | | INITIALIZE | IS INITIAL VALUE INDICATED ? | 3 |
| 3 | | ○ | | FLAG | ARE SET AND RESET OF FLAG PAIRED ? | 1 |
| 4 | | | ○ | FLAG | ARE VALUES AND MEANING OF ON/OFF INDICATED ? | 3 |
| 5 | | ○ | ○ | FLAG | ARE A PLURALITY OF FLAGS HAVING SAME FUNCTION INCLUDED ? | 2 |
| 6 | | ○ | | INPUT | IS ERROR CHECK FOR INPUT DATA CONDUCTED ? | 1 |

SOFTWARE DESIGN SUPPORTING METHOD FOR CLASSIFYING PORTIONS POSSIBLY AFFECTED BY A MODIFICATION INTO THOSE PORTIONS THAT CAN AND CANNOT BE AUTOMATICALLY MODIFIED

BACKGROUND OF THE INVENTION

1. Field of the Invention

The present invention relates to a method for supporting computer software design in an information processing system having a computer and an interactive terminal, and more particularly to a design supporting method for guiding design and checking resulting design and design course.

2. Description of the Prior Art

As disclosed in JP-A-60-224021, it has been known in the prior art to automatically detect a portion which clearly need be modified due to affect of modification of a specification and retain information of the affected portion until any contradiction in the specification has been removed as the affected portion is modified.

In the prior art, the affected portion which clearly need be modified is automatically detected. When the specification is modified, the affected portions are not limited to the automatically detectable portions but there may exist ambiguous affected portions which might be affected depending on the intention of modification. As a result, a range of prevention for failure of modification is limited. Where design of large scale software is shared by a plurality of designers, one modification may affect to the portions assigned to other designers. In such a case, because of lack of means for communicating the modification, the failure of modification of the affected portions is likely to occur.

SUMMARY OF THE INVENTION

It is a first object of the present invention to provide a design supporting method which can prevent the failure of modification of the affected portion which cannot be automatically detected, and the failure of modification of the modification affected portion where one modification affects to the portions assigned to other designers.

It is a second object of the present invention to provide a design supporting method which can guide error-free design by following a design procedure or modification procedure of specification when the specification is designed or modified.

It is a third object of the present invention to provide a design supporting method which can support high quality design by storing knowhow of the software design so that a beginner can make use of knowledge of an extert.

In order to achieve the above objects, it is a first feature of the present invention to relate the items of the specification to the affect of modification including ambiguous affect portions to which the modification may possibly affect, and analyze, store and display candidates of the modification affected portions including the ambiguous modification affected portions when the specification is modified. The methods of storing and displaying may include a method of grouping the candidates of the analyzed affected portions into those which are undeterminable as to whether the modification is needed or not, those which clearly need the modification, and those which can be automatically modified, and displaying those groups, and a method of storing the affected portions together with responses to the necessity of the modification and the completion/incompletion of the modification, which a user conducts for the displayed affected portions. By those methods, the failure of modification of the possibly affected portions is prevented. Further, whether the modification has been done for the modification affected portion is evaluated by the levels of "surely done", "likely done" and "not done" based on user's response and the presence or absence of the modification of the specification. When there is modification which affects to the specification displayed, it is displayed or the presence of the modification affect is automatically communicated to the designer who is in charge of the modification affect portion, by a mail so that the failure of modification of the affected portion for the modification which affects to other designer is prevented.

In order to achieve the second object, it is a second feature of the present invention to relate the specification to the design procedure of the specification and relate the items of the specification to the modification procedure so that whether the procedure is correct or not is analyzed based on the related information when the specification is designed or modified, and guide a correct procedure if the procedure is not correct.

In order to achieve the third object, it is a third feature of the present invention to store, in a text form, the know-how of the design related to key words, for each type of specification and each key word used in the specification, and display the text of the corresponding know-how when the specification is designed so that the design in accordance with the know-how is guided.

In accordance with the first feature of the present invention, the items of the specification is related to the modification affect including the ambiguous portions to which the modification may possibly affect, and when the specification is modified, the candidates of the modification affected portions including the ambiguous affected portions are analyzed, stored and displayed. Thus, the failure of modification more unlikely takes place than a case where the ambiguous affected portions are not modificed, because all candidates of the affected portions are displayed. According to the method of storing the affected portions together with the responses to the necessity of modification and the completion/incompletion of the modification which the user conducts for the displayed candidates of the affected portions, and the method of evaluating the execution of modification for the modification affected portions by "surely done", "likely done" or "not done" based on the response of the user and the presence or absence of the modification of the specification, it is possible to make sure the designer of the modification of the unmodified affected portions. Where the modification which affects to the specification is included in the displayed specification, it is displayed or the presence of the modification affect is automatically communicated by a mail to the designer who is in charge of the modification affected portion so that the communication of the modification is effected for any modification which affects to other designer and the failure of modification can be prevented.

In accordance with the second feature of the present invention, the specification is related to the design procedure of the specification and the items of the specification are related to the modification procedure. When the specification is designed or modified, whether the procedure is correct or not is analyzed based on the related information, and if it is not correct, the correct procedure is guided. In this method, since the designer follows the procedure as guided to design or modify the specification, the error of design due to improper procedure is prevented.

In accordance with the third feature of the present invention, the know-how of the design related to the key words is stored in the text form for each type of specification and each key word used in the specification, and when the specification is designed, the text of the related know-how is displayed. In this method, the designer is informed of the knowledge he/she is unaware of or has forgotten so that the error is reduced and better design may be attained.

BRIEF DESCRIPTION OF THE DRAWINGS

FIG. 2 shows a hardware configuration of the present invention, FIGS. 3A, 3B, 3C show a type of specification and a content of specification, FIG. 4 shows an example of displayed message, FIG. 6 shows an example of input of modification, FIG. 7 shows a table of relation of modification affect, FIG. 10 shows a content of cross-reference information, FIG. 13 shows a table of a content of modification rule, FIG. 16 shows a hardware configuration, FIGS. 17A, 17B, 17C, 17D show tables which store message history, FIG. 18 shows a table which stores affected portions by the modification and levels thereof, FIG. 19 shows an example of message used in the embodiment, FIG. 20 shows an example of displayed message, FIG. 24 shows an example of message used in the embodiment, FIG. 25 shows a table which stores a content of message, FIG. 30 shows a functional configuration of an embodiment, FIG. 32 shows an example of table which stores message history, FIG. 34 shows a functional configuration of an embodiment, FIG. 36 shows an example of table which stores a content of message, FIGS. 45A, 45B and 45C show examples of table which stores message history, table which stores accomplishment criteria and table which stores evaluation result, FIGS. 49A, 49B and 49C show two tables which store work history and a table which stores accomplishment criteria, FIG. 54 shows an example of table which stores accomplishment criteria, FIG. 57 shows an example of display of affect message, FIG. 58 shows a table of content of message history, FIG. 65 shows a content of modification history table of modification affection history, FIG. 66 shows a content of modification affection table of modfiication affection history, FIGS. 70A and 70B show a flow chart for displaying a content of a designated portion to which the modification affects and an example of display in which secondary affect is also traced, FIG. 71 illustrates an ON/OFF switching method for message display, FIGS. 72A and 72B show a table of levels assigned to a designer and a table of display content of message in accordance with the level, FIG. 75 shows a table which defines a relation between a designer and an assigned specification, FIG. 77 shows a method of setting a degree of completion of the specification, FIG. 78 shows a table which retains the degree of completion of the specification, FIG. 83 illustrates display timing of cross-reference information in the embodiment and an example of display, FIG. 85 shows a decision table used in the embodiment, FIG. 87 shows a table of a cross-reference memory of the present invention, FIGS. 90A, 90B and 90C show operation and an example of display for displaying a list of cross-reference information when the user requests it, FIG. 93 shows a decision table used in the embodiment, FIG. 94 shows a table of an edit operation memory used in the embodiment, FIG. 98 shows a decision table used in the embodiment, FIG. 99 shows a table which stores result of cross-reference used in the embodiment, FIG. 100 shows a detailed flow chart of a cross-reference processing step of the embodiment, FIG. 103 shows a decision table used in the embodiment, FIG. 104 shows a table which stores related cross-reference information used in the embodiment, FIG. 105 shows a flow chart of the embodiment, FIGS. 108A and 108B show implementation of the embodiment, FIG. 109 shows a table of content of a modification rule, FIG. 115 shows a table of content of check items for each type of specification, FIG. 119 shows a table of content of check items for each type of specification.

DETAILED DESCRIPTION OF THE PREFERRED EMBODIMENTS

The embodiments of the present invention are now explained in detail with reference to the drawings. FIG. 2 shows a hardware configuration of one embodiment of the present invention. It comprises an input device 11 including a keyboard and a mouse for a user to enter a command or the like, a memory 27 used for processing in a computer and storing data, a CPU 28, an external storage 29, and a display screen 20 for displaying data stored after the execution of the command and a message to the user. In the present embodiment, modification of a specification in a system for supporting the design of the software specification is related to the affection to other portion of the specification, and the affected portion is pointed out when the specification is modified.

Figure 1:
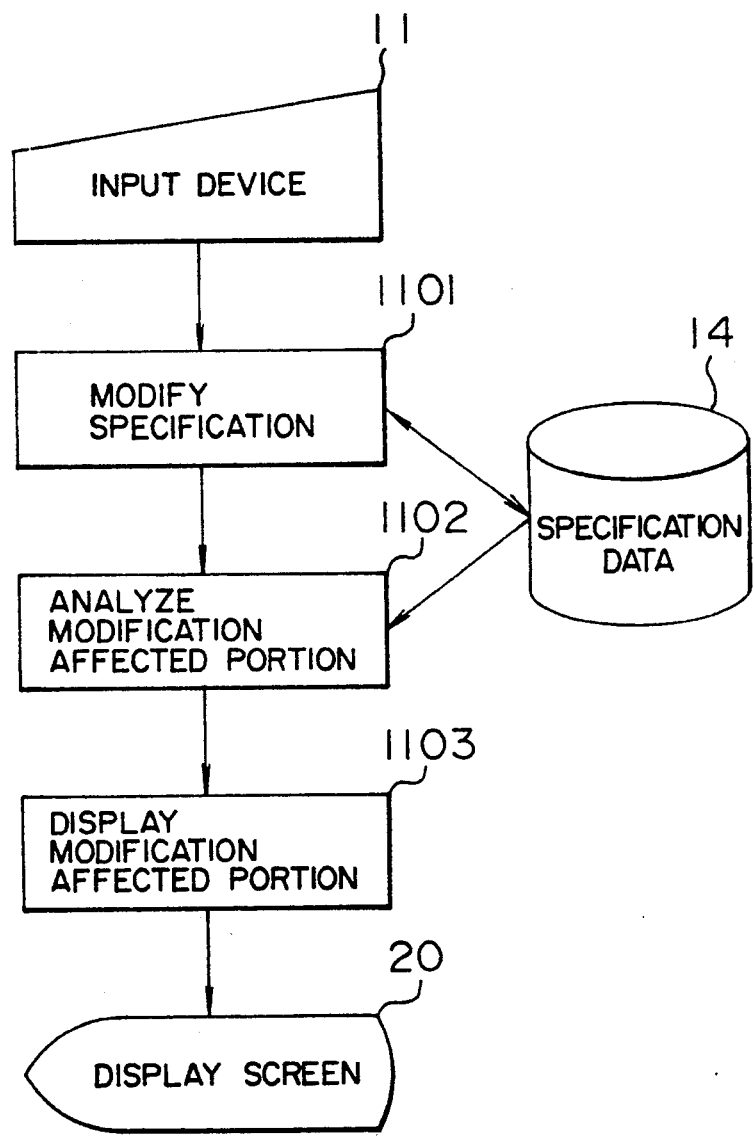
FIG. 1 shows a functional configuration of one embodiment of the present invention.
Figure 3B:
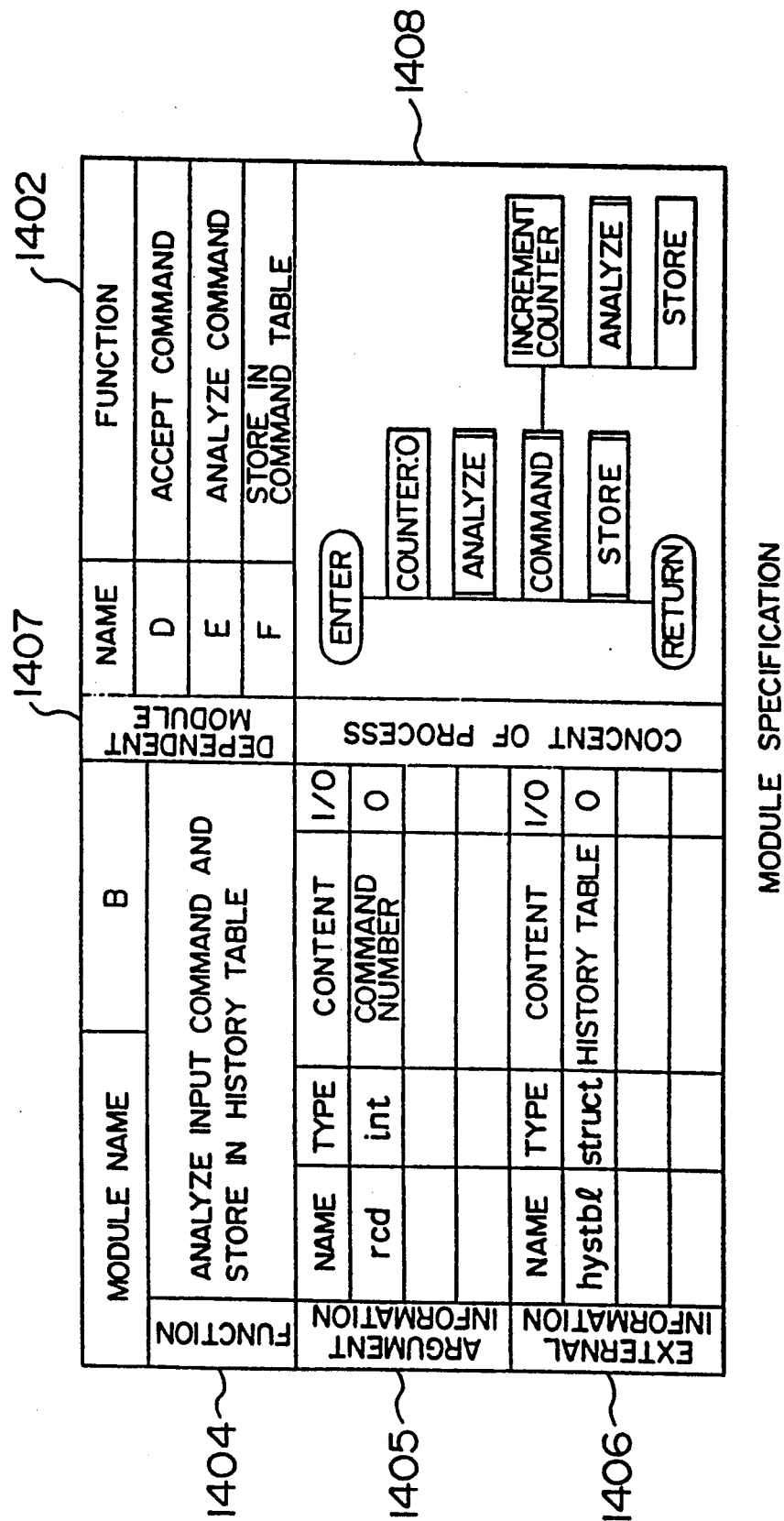
Figure 3C:
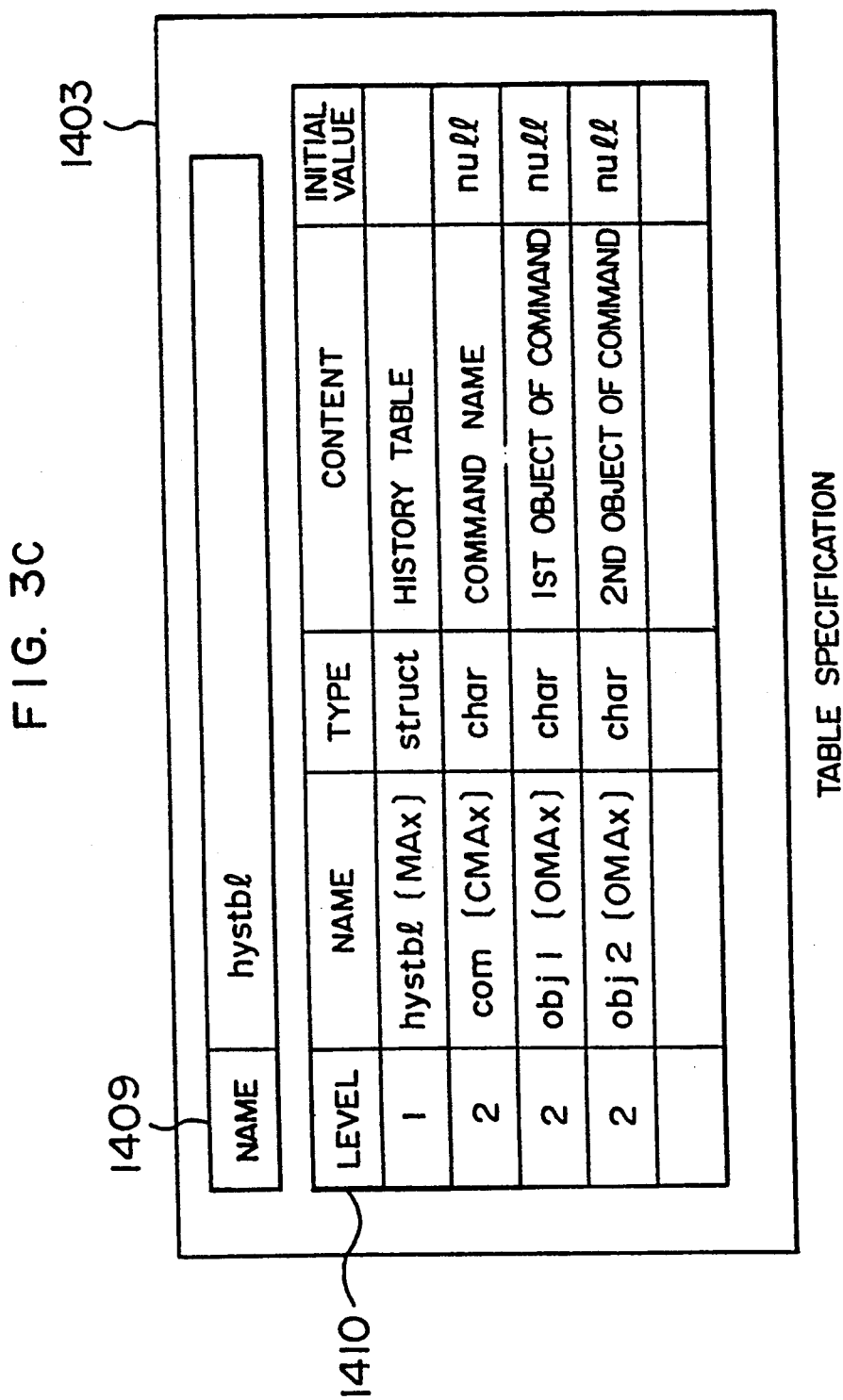
Figure 5A:
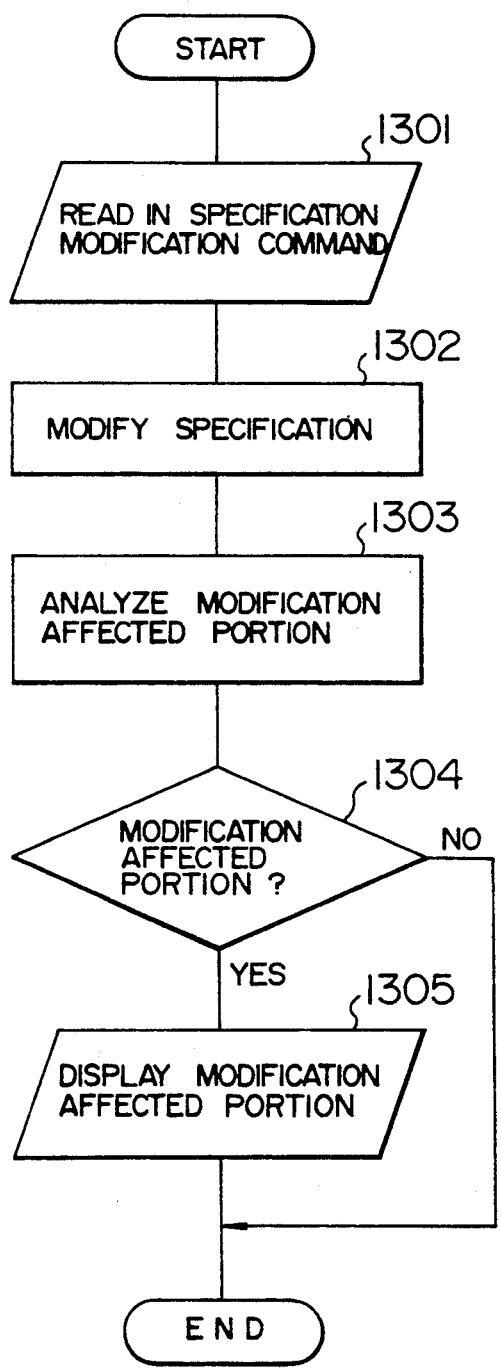
FIGS. 5A and 5B show flow charts of the present invention.
Figure 5B:
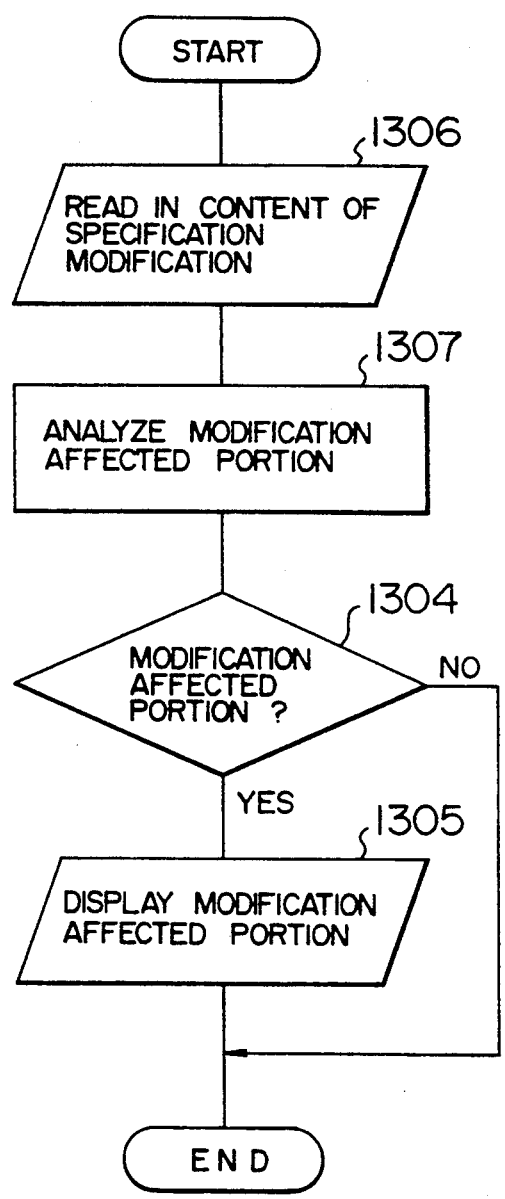
Figure 8:
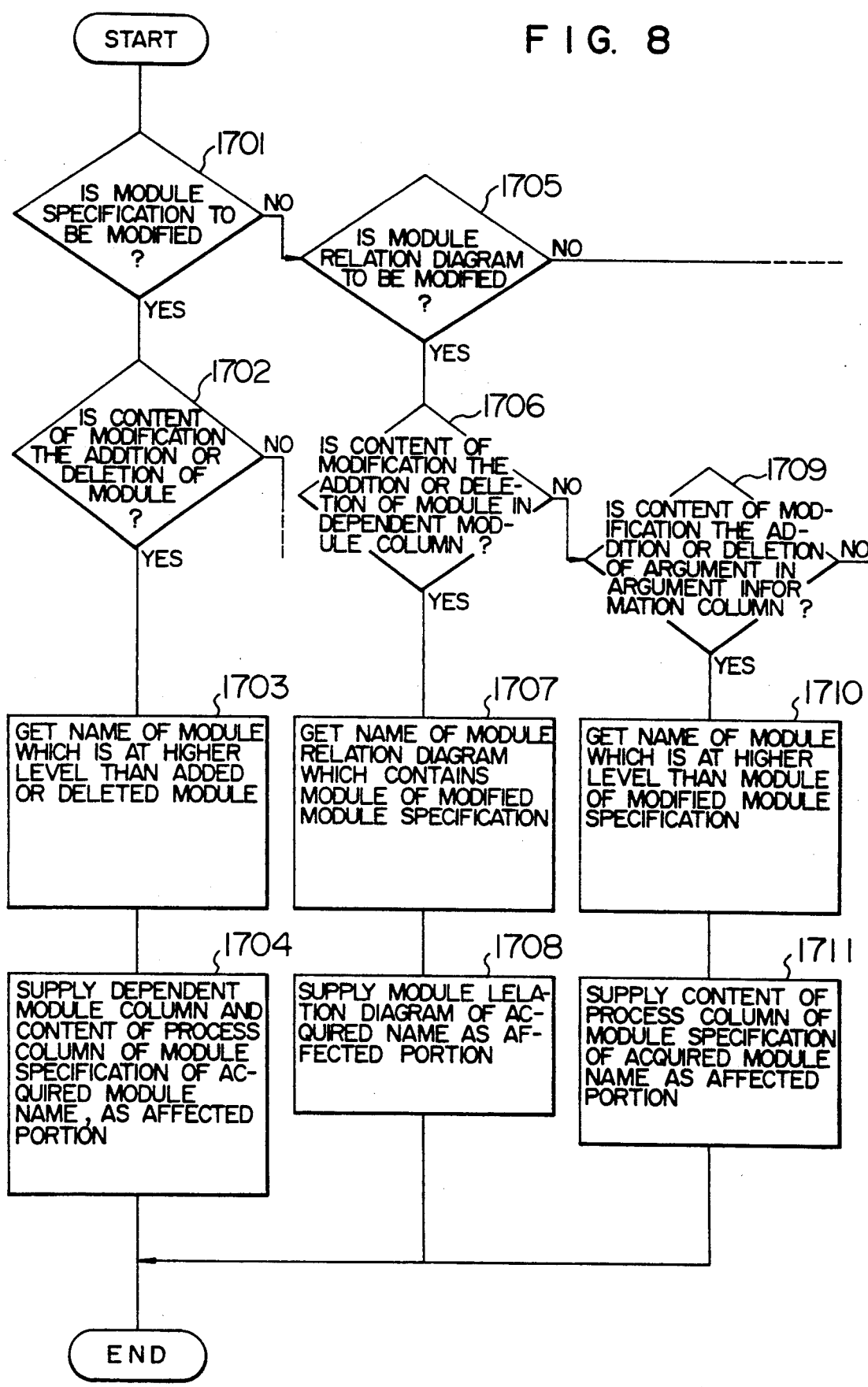
FIG. 8 shows a flow chart which shows further detail of the flow chart of FIG. 5.

FIG. 1 shows a functional specification of the present embodiment. In a specification modification process 1101, the data of the specification stored in specification data 14 is modified by a specification modification command entered from the input device 11. The specification data 14 is data of a specification to be designed, which is stored in the memory 27 of FIG. 2 or the external storage 29. In a modification affected portion analysis process 1102, the modification affected portion is analyzed based on the modified portion and the content of modification in the specification modification process 1101 and the content of the specification data 14. In a modification affected portion display process 1103, the modification affected portion analyzed by the modification affected portion analysis process 1102 is displayed on the display screen 20. An example of specification to be designed by the present system is shown in FIGS. 3A-3C. In the present embodiment, three types of specification, module relation diagram, module specification and table specification are explained as examples. 1401 shows an example of module relation diagram The module relation diagram shows, in a tree structure, a dependent relation of modules used in a software system to be designed. Each module is represented by a box having a module name described therein, and the boxes are connected by a line to represent a relation that a module above the line depends on a module below the line between the two modules interconnected by the line. 1402 shows an example of module specification. One module specification is prepared for each module. The module specification comprises fields for a module name of the module, a function 1404, argument information 1405, external information 1406, a dependent module 1407 and content of process 1408. In the function 1404, the function of the module is described in a text form. In the argument information 1405, names, types and contents of all arguments of the module are described in a table form. In the external information 1406, names, types and contents of all external variables to be accessed by the module are described in a table form. In the dependent module 1407, module names and functions of all modules to which the module in question depends are described in a table form. In the content of process 1408, the content of process to be executed by the module is described by text and charts. 1403 shows an example of table specification. One table specification is prepared for each external variable used in the software system to be designed. The table specification contains a name 1409 of the external variable and a definition 1410. In the definition 1410, type, content and initial value of the external variable are described, and when the external variable has a structure, the type, content and initial value for each element of the external variable are described. The specification data 14 stores the data of the prepared specifications of the three types, together with the corresponding specification names. The specification name of the specification is the module name of the highest rank module in the case of the module relation diagram, the module name described in the specification in the case of the module specification, and the name of external variable described in the specification in the case of the table specification. The specification names of the specifications 1401, 1402 and 1403 of FIG. 3 are "A", "B" and "hystb 1", respectively. FIG. 4 shows an example of input for a specification modification command inputted by the input device 1 and an example of display of a modification affected portion displayed on the display screen 20. In FIG. 4(a), a modified portion 1201 is picked up by a mouse on a screen which displays the specification, and "delete" is selected by the mouse from a command menu (a list of modification commands). FIG. 4(b) shows a screen displayed as a result of inputting FIG. 4(a). 1203 indicates a content of modification. 1204, 1205 and 1206 indicate the modification affected portion for the content of modification 1203. 1204 indicates a type of specification to which the modification affect, 1205 indicates a name of the specification, and 1206 indicates the modification affected portion in the specification. FIGS. 5A and 5B show flow charts of the process of the present embodiment. In FIG. 5A, the modification affected portion is displayed after the modification has been done for the specification. In a step 1301, a specification modification command is read in through the input device 11. In a step 1302, the specification data 14 is modified in the specification modification process 1101 in accordance with the read-in modification command. In a step 1303, the affected portion of the modification done in the step 1302 is analyzed by the modification affected portion analysis process 1102. In a step 1304, whether the affected portion is detected by the analysis or not is determined, and if it is detected, a step 1305 is executed, and if it is not detected, the process is terminated. In the step 1305, the modification affected portion analyzed in the step 1303 is displayed on the display screen 20 in the modification affected portion display process 1103. In FIG. 5B, after the content of modification has been inputted, the modification affected portion is displayed before the specification is modified. In a step 1306, the content of modification for the specification is read in through the input device 11. In a step 1307, the affected portion of the modification indicated by the read-in content of modification is analyzed by the modification affected portion analysis process 1102. The steps 1304 et seq are same as those of FIG. 5A. In the step 1306, the content of modification may be read in by reading in the specification modification command as shown in FIG. 4A, or reading in the content of modification displayed on a different display screen than the display screen for the specification, as shown in FIG. 6. On a screen 1601, an object of modification and a type of modification are designated. Where the object of modification is "Module Relation Diagram" and the type of modification is "Add", a position of addition (to which module does it belong?) is designated on a screen 1602. Where the type of modification on the screen 1601 is "modify", a character string after the modification is designated on a screen 1603. By analyzing the modification affected portion before the specification is actually modified, the modification which affects to other portion, without knowing the affect, is prevented, or modification plan may be prenoticed to a designer who is in charge of the modification affected portion. FIG. 7 shows an example of relation of the modification affection analyzed in the modification affected portion analysis process 1102. The modification affected portion when the modification indicated by the content of modification 1722 is done for the specification indicated by the specification to be modified 1721 is shown as the affected portion 1723. For example, the relation shown in the line 1 indicate that where a module is added or deleted on the module relation diagram, it affects to a dependent module column and a content of process column of a module specification for a module which is at a higher level than the modified module. According to this relation, it may occur that the module name has not yet been described in the dependent module column of the related module specification when the module is added on the module relation diagram. This means that it is different method than a method of managing names such as module name and external variable name and relating portions having the same name. FIG. 8 shows an example of flow chart for analyzing the modification affected portion in accordance with the relation of FIG. 7 in the modification affected portion analysis process 1102. In FIG. 8, the analysis portions for the relations No. 1 to No. 3 of FIG. 7 are shown. In a step 1701, whether the object to be modified is the module relation diagram or not is determined for the content of modification in the specification modification process 1101. If it is the module relation diagram, a step 1702 is executed. In the step 1702, whether the content of modification is the addition or deletion of the module or not is determined, and if it is, a step 1703 is executed. In the step 1703, the specification data 14 is referred to get a module name of a module which is at a higher level than the added or deleted module on the module relation diagram. In a step 1704, the dependent module column and the content of process column of the module specification of the acquired module name are supplied to the modification affected portion display process 103 as the affected portion. On the other hand, if a decision is made in the step 1701 that it is not the module relation diagram, a step 1705 is executed. In the step 1705, whether the object of modification is the module specification or not is determined. If it is the module specification, a step 1706 is executed. In the step 1706, whether the content of modification is the addition or deletion of module in the dependent module column or not is determined. If it is, a step 1707 is executed. In the step 1707, the specification data 14 is referred to get the name of the module relation diagram which contains the same module name as the name of the modified module specification (that is, the module relation diagram which contains the module which is the object of description of the modified module specification). In a step 1708, the module relation diagram of the acquired name is supplied to the modification affected portion display process 1103 as the affected portion. If a decision is made in the step 1706 that the content of modification is not the addition or deletion of module in the dependent module column, a step 1709 is executed. In the step 1709, whether the content of modification is the addition or deletion of the argument in the argument information column or not is determined, and if it is, a step 1710 is executed. In the step 1710, the specification data is referred to get the module name of the module which is at a higher level than the modified module on the module relation diagram which contains the same module name as the name of the modified module specification (that is, the module relation diagram which contains the module which is the object of description of the modified module specification). In a step 1711, the content of process column of the module specification of the acquired module name is supplied to the modification affected portion display process 1103 as the affected portion.

Figure 9:
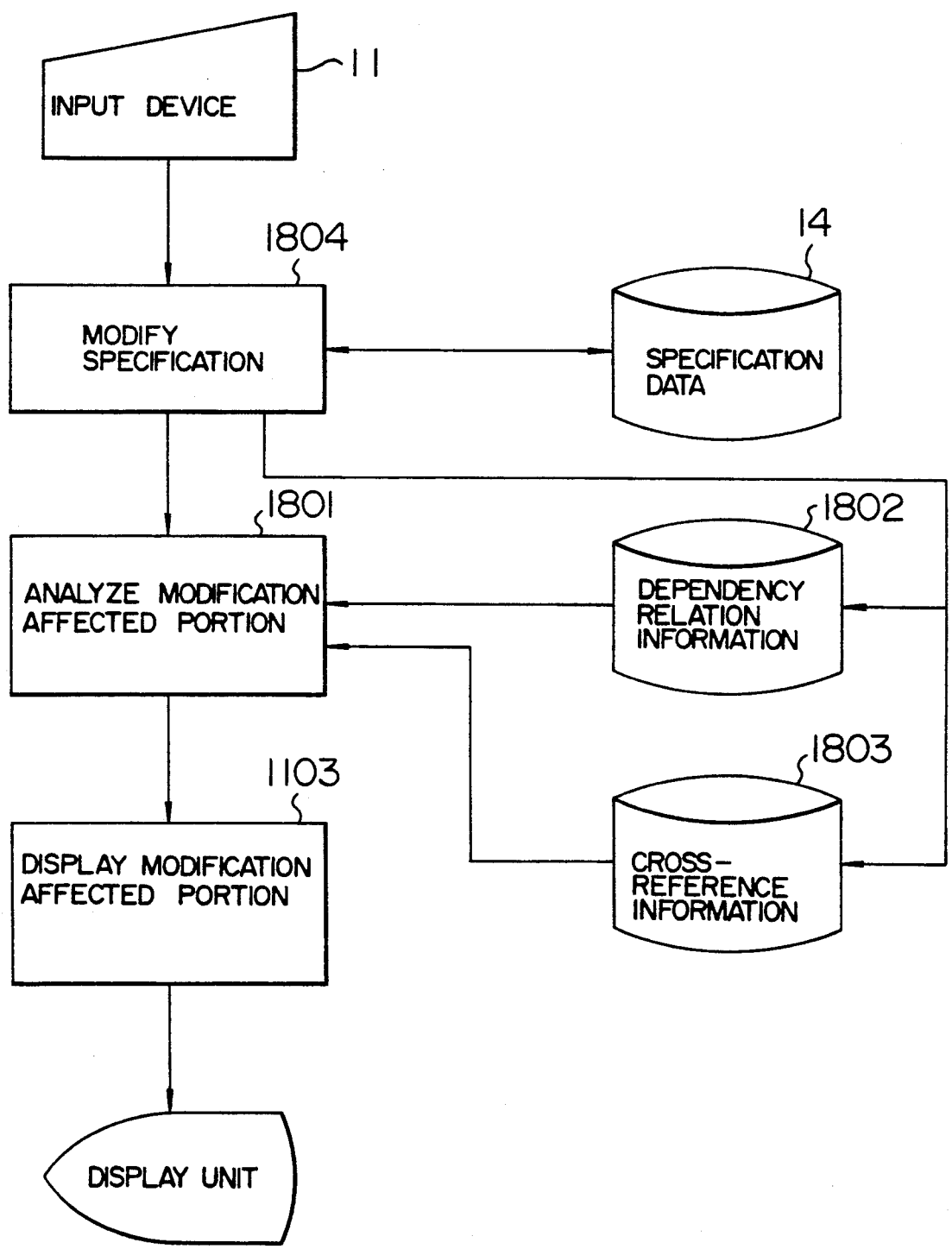
FIG. 9 shows a functional configuration of an embodiment of the present invention.
Figure 11:
FIG. 11 shows a content of depending information.
Figure 12:
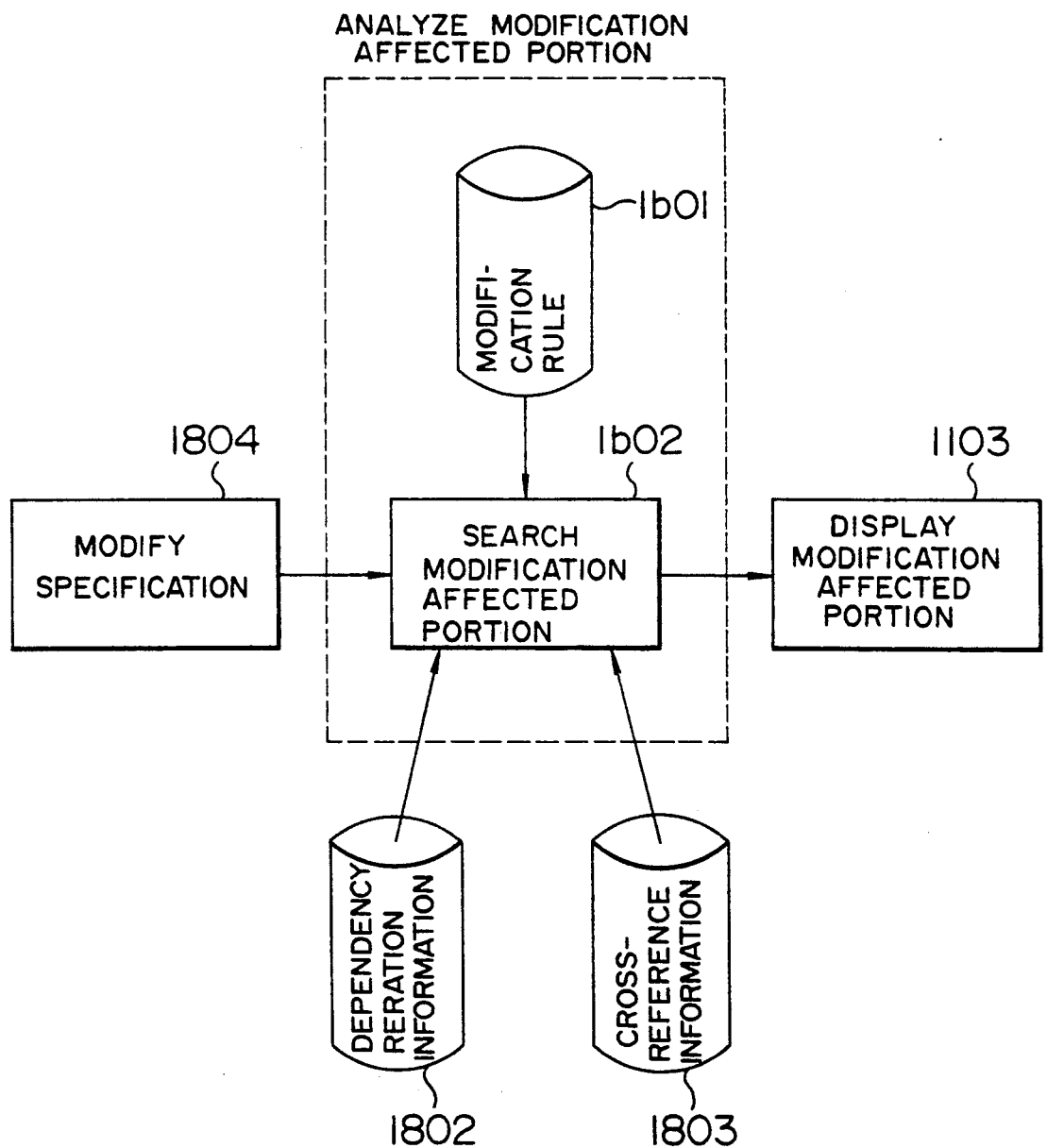
FIG. 12 shows a functional configuration which shows in detail a modification affected portion analysis unit of FIG. 9.
Figure 14:
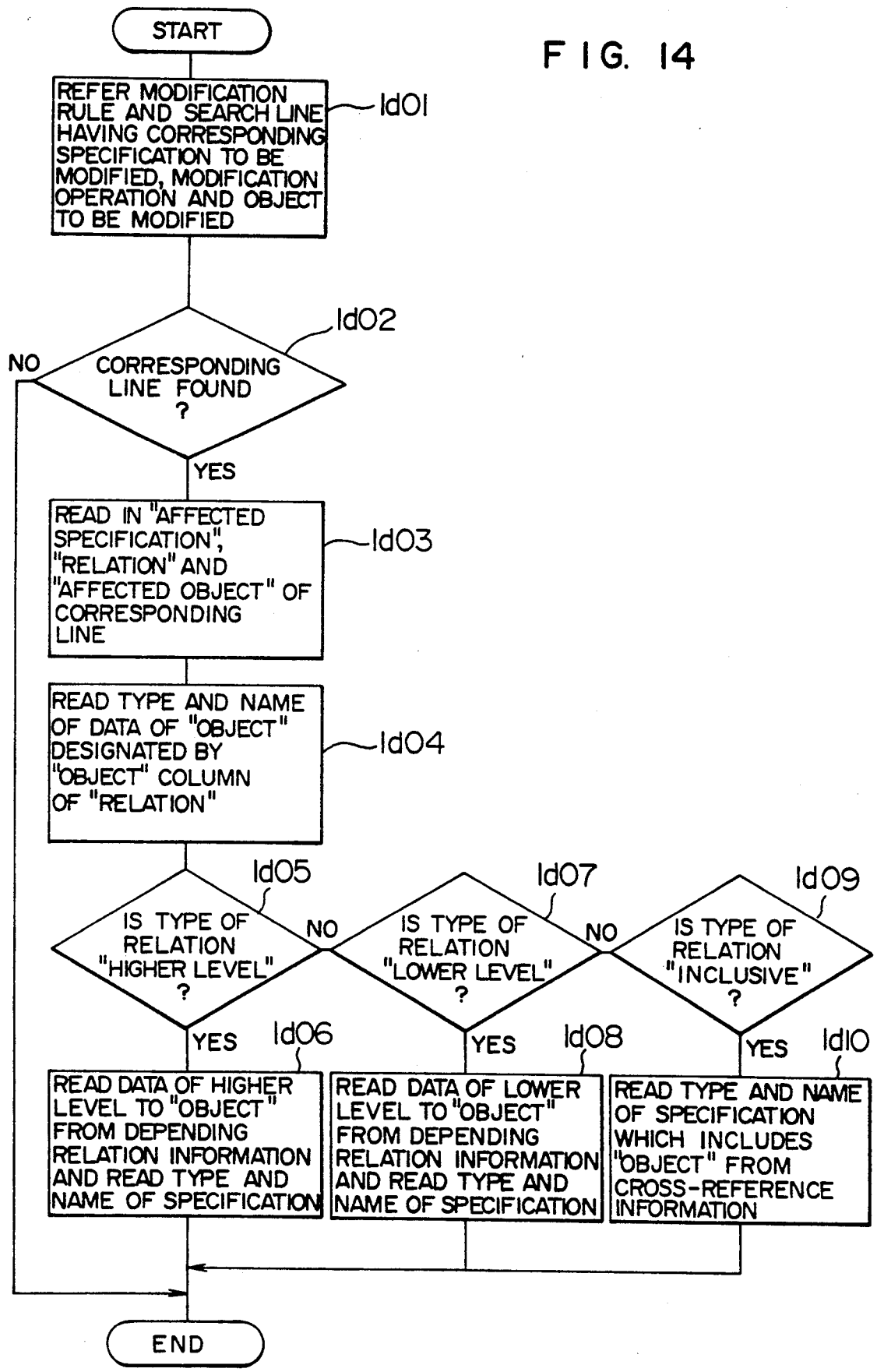
FIG. 14 shows a detailed flow chart of a modification affected portion search unit.

In the above method, since the specification data 14 is referred as it is in the analysis of the modification affected portion, it is necessary to search the data of the specification page by page in order to determine in which specification a particular name is contained, or search the module relation diagram which contains the modified module in order to determine to which module the modification of the module specification affects and refer the retrieved module relation diagram. Accordingly, a long time is required to analyze the affected portion. In order to solve the above problem, a dependency relation of specification among the modules and cross-reference information which represents a relation as to the inclusion of module name and external variable name in specific specification, of the data content of the specification data 14 may be retained separately from the specification data 14. One embodiment of this method is described below. FIG. 9 shows a functional configuration of the present embodiment. The input device 11, specification data 14, display screen 20 and modification affected portion display process 1103 are same as those of FIG. 1. The dependency relation information 1802 stores information which represents dependency relation among specifications as to which specification a specification of a particular module or table depends on. The cross-reference information 1803 stores the cross-reference information as to which specification a particular module name or table name is described in. Those information are derived from the specification data and they must be consistent with the specification data. The specification modification 1804 modifies the data of the specification stored in the specification data 14 in accordance with a command of specification modification inputted through the input device 11, and if the modification affects to the dependency relation information or the cross-reference information, it also modifies those data in accordance with the content of modification. In the modification affected portion analysis process 1801, the content of modification is received from the specification modification process 1804, the affected portion of the modification is searched from the dependency relation information 1802 and the cross-reference information 1803, and the content of modification and the affected portion are supplied to the modification affected portion display process 1103. In the present embodiment, the cross-reference information 1803 stores the information as to which specification the module name or table name is described in, for each name used in the specification, and the dependency relation information 1802 stores the dependency relation of the specification among the modules. FIG. 10 shows an example of content of the cross-reference information 1803. A data name 1e01 indicates a type of name such as module name or table name. A data name 1e02 indicates a name of module or table. A type of specification 1e03 and a name of specification 1e04 indicate which specification of which type of specification the data name 1e02 in the data type 1e01 is described in. FIG. 11 shows an example of content of the dependency relation information 1802. In this example, since the dependency relation among the modules coincides with the hierachy relation of the modules represented by the module relation diagram, the module which depends on the module in the module 1a01 is stored in the higher level module 1a02 in FIG. 11. The higher level module 1a02 means the module which is at a higher level in the module relation diagram. FIG. 11 shows the content of the dependency relation information 1802 for the module relation diagram 1401 shown in FIG. 3. FIG. 12 shows a functional configuration which shows a detail of the modification affected portion analysis process 1801. In the present embodiment, the relation of the modification affection shown in FIG. 7 is converted into data and stored as a modification rule 1b01. In the modification affected portion search process 1b02, the modification rule 1b01, the dependency relation information 1802 and the cross-reference information 1803 are referred to search the modification affected portion. An example of the modification rule 1b01 is shown in FIG. 13. It shows the content of FIG. 7 in a data form. Each line of the data in a table form represents a relation of one modification affection. A specification to be modified 1c01 indicates a type of specification, and a modification operation 1c02 indicates a type of modification done to an object of modification 1c03. The object of modification 1c03 comprises a field column and an item column. The field column contains a type of field in the specification, and the item column contains a type of item in the field described in the field column. The information on the modification affected portion when the modification operation 1c02 is done for the object of modification 1c03 in the specification to be modified 1c01 is represented by an affected specification 1c04, a relation 1c05 and an object affected 1c06. The affected specification 1c04 indicates a type of specification to which the modification affects, and the relation 1c05 indicates a relation between the object of modification and those specifications of the type in the affected specification 1c04 which are affected by the modification. The relation 1c05 comprises an object column which indicates which the relation relates to, and a type of relation column which indicates the type of relation. In the present example, the object column indicates which one of "specification to be modified" and "item to be modified" the relation relates to. The type of relation column indicates one of "higher level", "lower level" and "inclusive". The "higher level" means the module which is at a higher level on the module relation diagram, and "lower level" means the module which is at a lower level on the module relation diagram. "Inclusive" means a specification in which the module or table to be modified is described. The affected object 1c06 indicates a field to be modified in the specification designated by the affected specification 1c04 and the relation 1c05. The data indicates the relation of modification affection among the fields of the specification. FIG. 14 shows a flow chart of a process flow of the modification affected portion analysis process 1801. In a step 1d01, the modification rule 1601 is referred and compared with the content of modification received from the specification modification 1804 to search a line having the corresponding specification to be modified 1c01, modification operation 1c02 and the object to be modified 1c03. The content of modification received from the specification modification process 1804 includes the type and name of the specification to be modified, the modified field name in the specification to be modified, the modified item and the data name in the field, and the modification operation. The data name is the module name or the table name. In a step 1d02, whether the corresponding line was found in the step 1d01 or not is determined. If it was found, a step 1d03 is executed, and if it was not found, the modification affected portion analysis process is terminated. In the step 1d03, the affected specification 1c04, the relation 1c05 and the object to be affected 1c06 of the corresponding line found are read in. In a step 1d04, the type of data and the data name of the "object" designated by the object column of the read-in relation 1c05 are read. If the content of the object column is "specification to be modified", the type of data ("module" or "table") and the data name of the data (module or table) which is the subject of description by the specification to be modified received from the specification modification process 1804 are read. The data name can be easily read if the module specification name and the module name, and the table specification name and the table name are equal in the specification data 14. If the content of the object column read in the step 1d03 is "item to be modified", the type and name of the modified item in the specification to be modified received from the specification modification process 1804 are read. In a step 1d05, whether the content of the type of relation column read in the step 1d03 is "higher level" or not is determined, and if it is "higher level", a step 1d06 is executed, and if it is not "higher level", a step 1d07 is executed. In the step 1d06, the dependency relation information 1802 is referred, the data of a higher level to the "object" read in the step 1d04 is read, and the type and name of the specification which describes the specification of the data are read. In the present example, where the data is module, the specification which describes the specification is the module specification, and where the data is table, the specification which describes the specification is the table specification. In a step 1d07, whether the content in the type of relation column read in the step 1d03 is "lower level" or not is determined, and if it is "lower level", a step 1d08 is executed, and if it is not "lower level", a step 1d09 is executed. In the step 1d08, the dependency relation information 1802 a referred, the data of the lower level to the "object" read in the step 1d04 is read, and the type and name of the specification which describes the specification of the data are read. In a step 1d09, whether the content of the type of relation column read in the step 1d03 is "inclusive" or not is determined, and if it is "inclusive", a step 1d10 is executed. In the step 1d10, the cross-reference information 1803 is referred and the type and name of the specification which includes the "object" read in the step 1d04 are read. Through the process shown in FIG. 14, the type of specification of the affected portion for the modification, the name of specification and the affected portion in the specification are read. By retaining the relation described in the present embodiment as the data of modification rule, the modification of the relation may be simply done by merely modifying the content of the modification rule 1b01 without modifying the algorithm.

Figure 15:
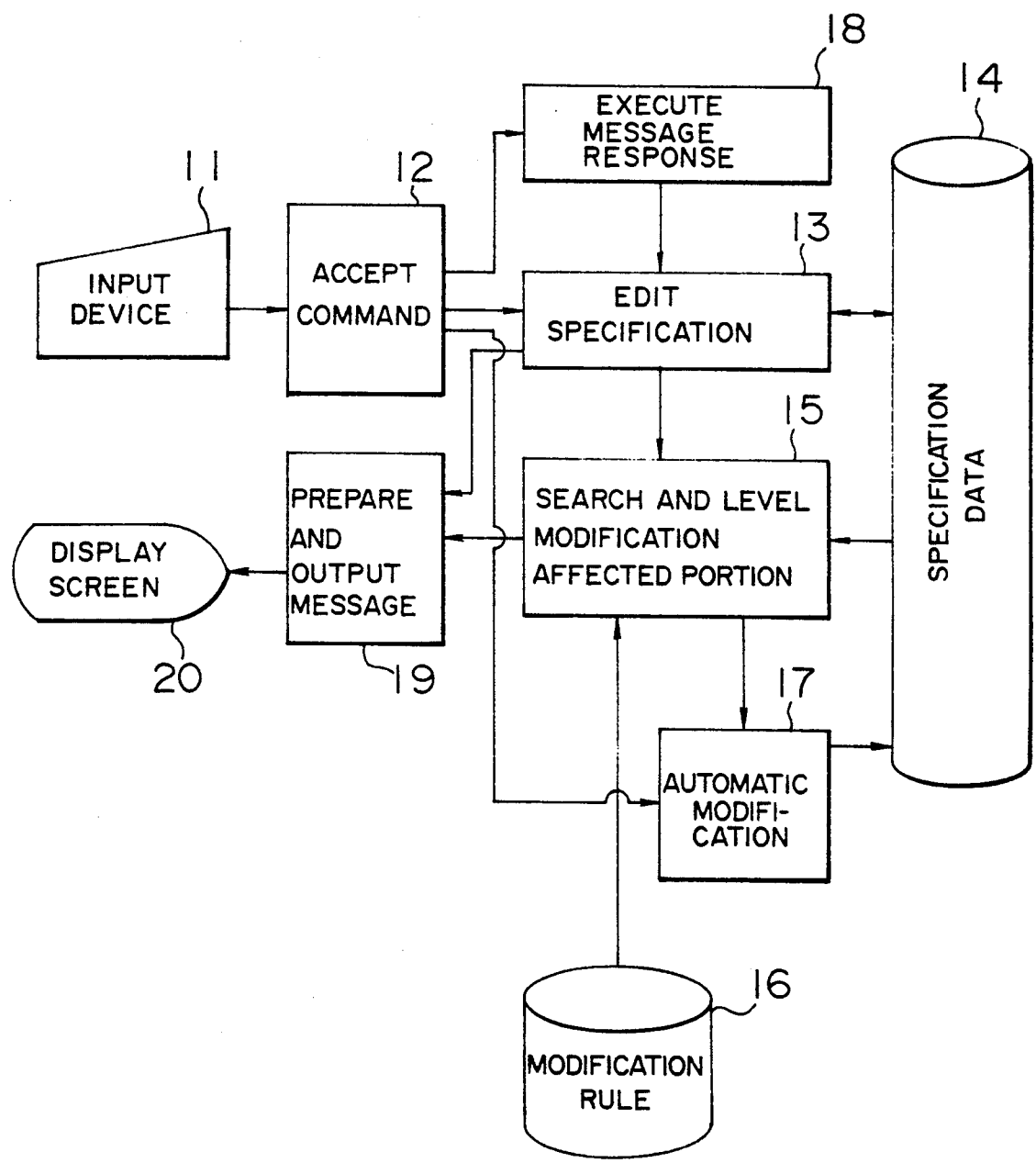
FIG. 15 shows a functional configuration of an embodiment of the present invention.
Figure 17A:
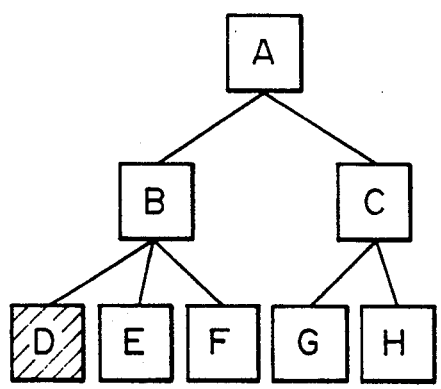
Figure 17B:
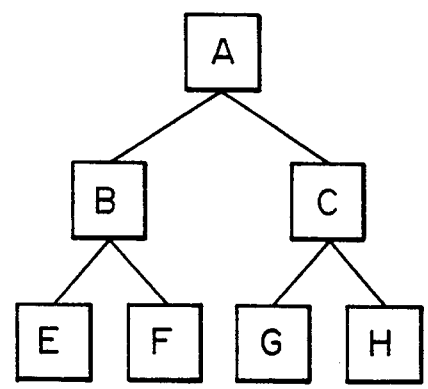

A method of displaying the modification affected portion by leveling it to a portion to be modified, a portion possibly to be modified and a portion which is automatically modified is now explained. FIG. 15 shows a functional configuration of one embodiment of the present invention. It comprises an input device 11, a command accept process 12, a specification edit process 13, specification data 14, a modification affected portion search and leveling process 15, a modification rule 16, an automatic modification process 17, a message response execution process 18, a message preparation and output process 19 and a display screen 20. FIG. 16 shows a hardware configuration of the present embodiment. It comprises the input device 11 including a keyboard and a mouse for inputting a command of a user, a memory 27 which is used for the processing in a computer and storing data, a CPU 28, an external storage 29 and a display screen which displays content of stored data or message to the user after the execution of the command. Referring to FIG. 15, an embodiment of the present invention in which the present invention is applied to a design supporting system comprising tools for interactively preparing a specification of software is now explained. The command accept process 12 accepts a command inputted by the input device 11. The specification edit process 13 inputs the data of specification from the specification data 14, starts the display of the specification, newly prepares the specification, modifies and prepares the specification and registers the modified specification data into the specification data 14. The specification data 14 is a file which stores the data of specification. The data of module relation diagram which is a portion of the content of the specification data 14 is shown in FIGS. 17A, 17B, 17C and 17D. The specification data 14 stores the information of the module relation diagram shown in FIG. 17A in a memory table form shown in FIG. 17B. The memory table stores a module number 101, a use status of the module 102, and a module name 103. The module number identifies the module, and the system control the module by the module number. The use status column 102 indicates whether the corresponding line of the table is in use, unused or non-used. In the table, they are shown by "use", "unuse" and "non-use", respectively. The use status is initially "unused", and when a module is prepared, the line is made in "use" and the module name and the module number are recorded to indicate that the module corresponding to that module number is present on the module relation diagram. When the module D (120) is deleted from the module relation diagram shown in FIG. 17A to create a relation shown in FIG. 17B, the use status is changed to "non-use" (121) as shown in the fourth line of the table of FIG. 17D. The module number of the lower level module is stored in the lower level module column 104.

In the modification affected portion searching and leveling 15 of FIG. 15, when the specification data is modified in the specification editing 13, the modification affected portion is searched in accordance with a rule of the modification rule 16 and it is classified to one of three levels (modification levels), that is, a portion which can be automatically modified (level 1), a portion which is clearly to be modified (level 2) and a portion which is possibly to be modified (level 3). A portion of content of the modification rule 16 is shown in FIG. 18. FIG. 18 shows a portion of content of the modification rule 16 shown in FIG. 15. It shows a module name, argument information, a dependent module and a relation between a module specification having a column PAD and a module relation diagram. A type of specification to be modified is stored in a specification column 105 of this table. A modification operation column 106 contains a type of modification (add, modify, delete). An object of modification column 107 contains a portion of specification to be modified. For example, it is a module name of a module relation diagram in line No. 1 of FIG. 18, and a module name of a dependent module column of a module specification in line No. 4. An affected specification column 108 contains a specification which is affected by the modification. A relation column 109 contains a relation between a module to be modified and a module which is affected by the modification. It indicates same, higher level or lower level which represents the same, higher level or lower level module which relates to the actual modification. A level column 110 contains a level of affection by the modification. A level 1 represents that the affected portion of the affected specification is the portion which can be automatically modified, a level 2 represents that it is the portion which is clearly to be modified, and a level 3 represents that it is the portion which is possibly to be modified. An affected portion column 111 contains an affected portion in the affected specification. When the specification is modified, the affected portion is searched in accordance with the modification rule in the table of FIG. 18, and a message is prepared in a message preparation and output process 19.

In the message preparation and output process 19, the <message 1> is prepared for the portion which can be automatically modified (level 1), the <message 2> is prepared for the portion which is clearly to be modified (level 2), and the <message 3> is prepared for the portion which is possibly to be modified (level 3). FIG. 20 shows an example of display. For example, when the module name of the module C (122) in the module relation diagram of FIG. 20(a) is to be changed to F, the modification affected portion search and leveling process 15 refers the modification rule 16. Since the specification column 105 of FIG. 18 is the module relation diagram, the modification operation column 106 is the modification and the object to be modified column 107 is the module name, the No. 1-3 in FIG. 18 are determined as the affected portions. Whether it is the portion which can be automatically modified, the portion which is clearly to be modified or the portion which is possibly to be modified is determined based on the level column 110, and a message is displayed in a form shown in FIG. 20(b). When a command inputted for the accept command 12 is a response command ("Yes" 123 in FIG. 19) which accepts the automatic modification for an automatic modification confirmation message as shown by the <message 1> in FIG. 19, the automatic modification process 17 of FIG. 15 receives the information on the automatic modification from the modification affected portion search and leveling process 15 to conduct the automatic modification, and erases the display of that message. When the input command is a response command (124, 125, 126) for a message other than the automatic modification accept command, the message execution process 18 executes the response message and erases the display of the message.

Figure 21:
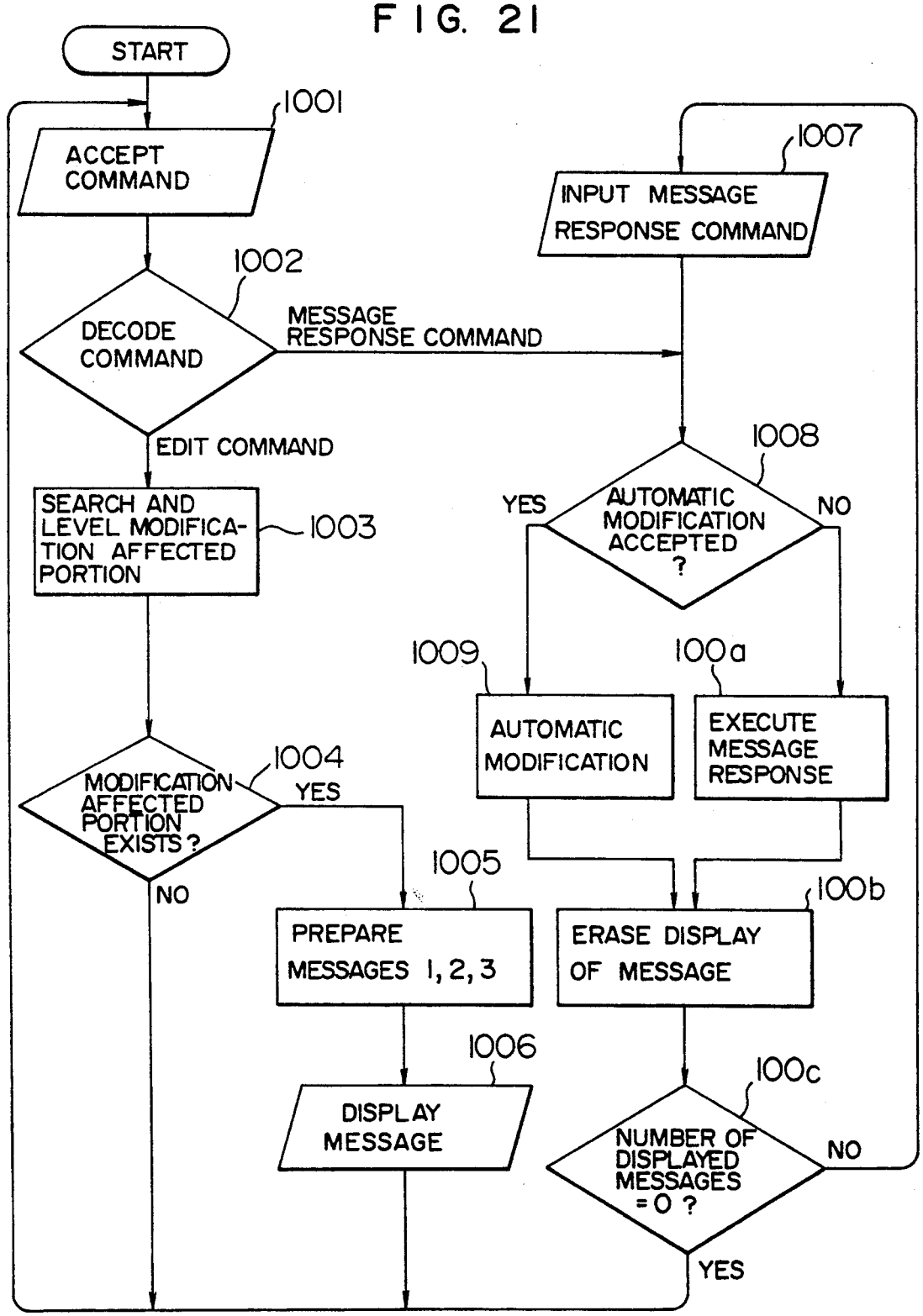
FIG. 21 shows a flow chart of the embodiment.

FIG. 21 shows a flow chart of the process of the present embodiment. In a step 1001, the accept command step 12 reads in the command which the user inputs from the input device 11. In a step 1002, whether the command is an edit command or a message response command is determined. In a step 1003, the modification affected portion search and leveling process 15 searches and levels the modification affected portion. In a step 1004, whether there exists the modification affected portion or not is determined. In a step 1005, the message preparation and output process 19 prepares the message in accordance with the modification level of the modification affected portion. In a step 1006, the message is displayed on the display screen 20. In a step 1007, the response of the displayed message is accepted by the command accept process 12. In a step 1008, whether the response to the message accepted in the command accept process 12 is a command which accepts the automatic modification for the <message 1> or not is determined. In a step 1009, the automatic modification process 17 automatically modifies the specification. In a step 100a, the modification is cancelled if the cancellation has been indicated to the <message 1> as a result of analysis of the response to the message accepted in the command accept process 12. In a step 100b, the display of the message for which the message response command has been issued is erased. In a step 100c, whether the number of messages displayed on the display screen 20 is zero or not is determined.

Figure 22:
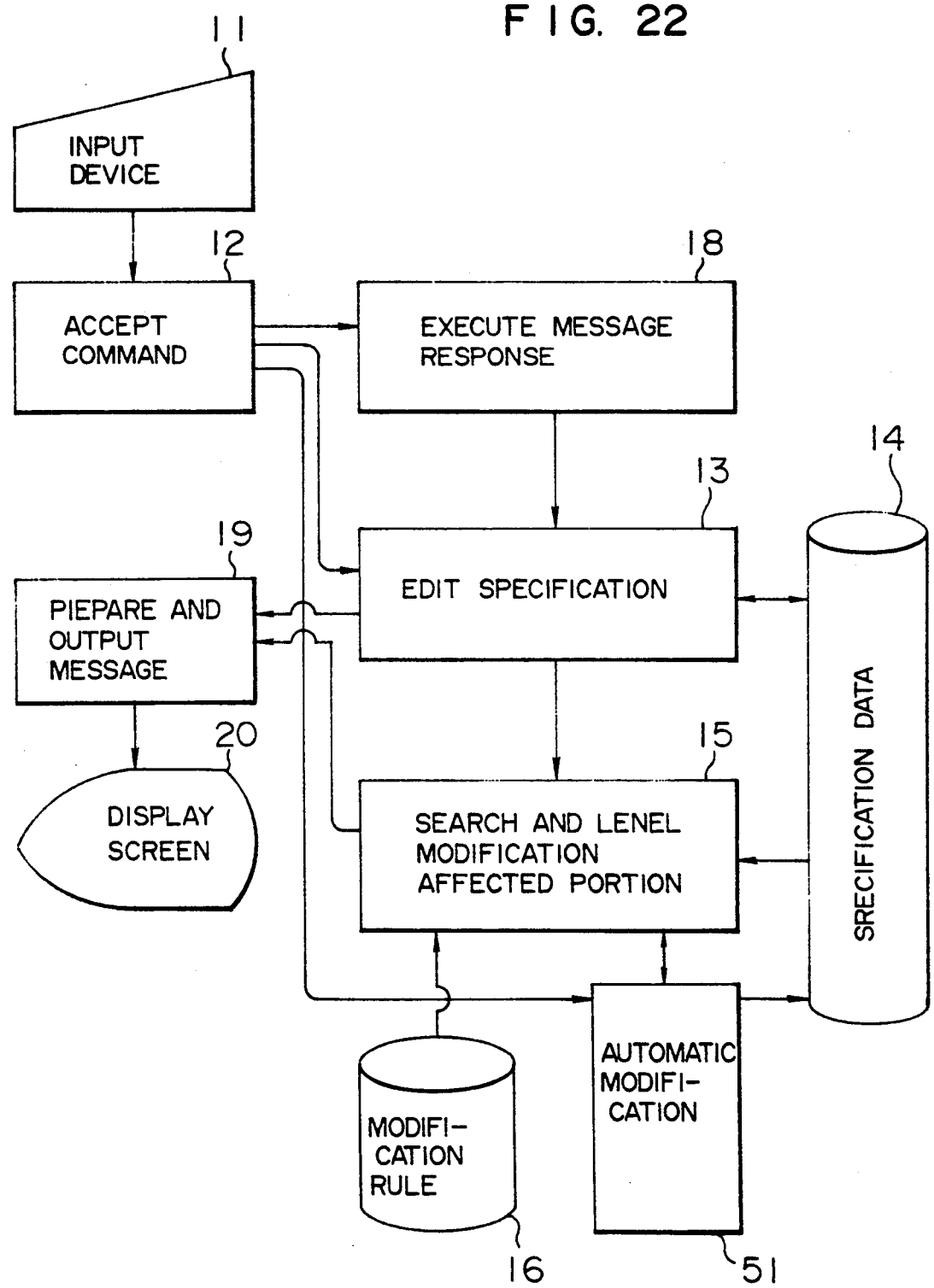
FIG. 22 shows a functional configuration of an embodiment.

In the present embodiment, only the portion which is directly affected by the modification is searched and modified, and a secondary affected portion is not automatically searched or modified. An embodiment in which the affected portion is searched for even the secondary affected portion due to the automatic modification and it is classified to the portion which can be automatically modified, the portion which is clearly to be modified or the portion which is possibly to be modified is now explained. FIG. 22 shows a functional configuration thereof. FIG. 22 is substantially same as the embodiment of FIG. 15 except that an automatic modification process 51 restarts the modification affected portion search and leveling process 15 to search the affected portion due to the automatic modification, in addition to the function of the automatic modification 17 of FIG. 15. In this manner, the secondary affected portion due to the automatic modification can be searched.

In the above embodiments, when certain modification is done, the modification affected portion is leveled and the message is displayed only at that timing.

Figure 23:
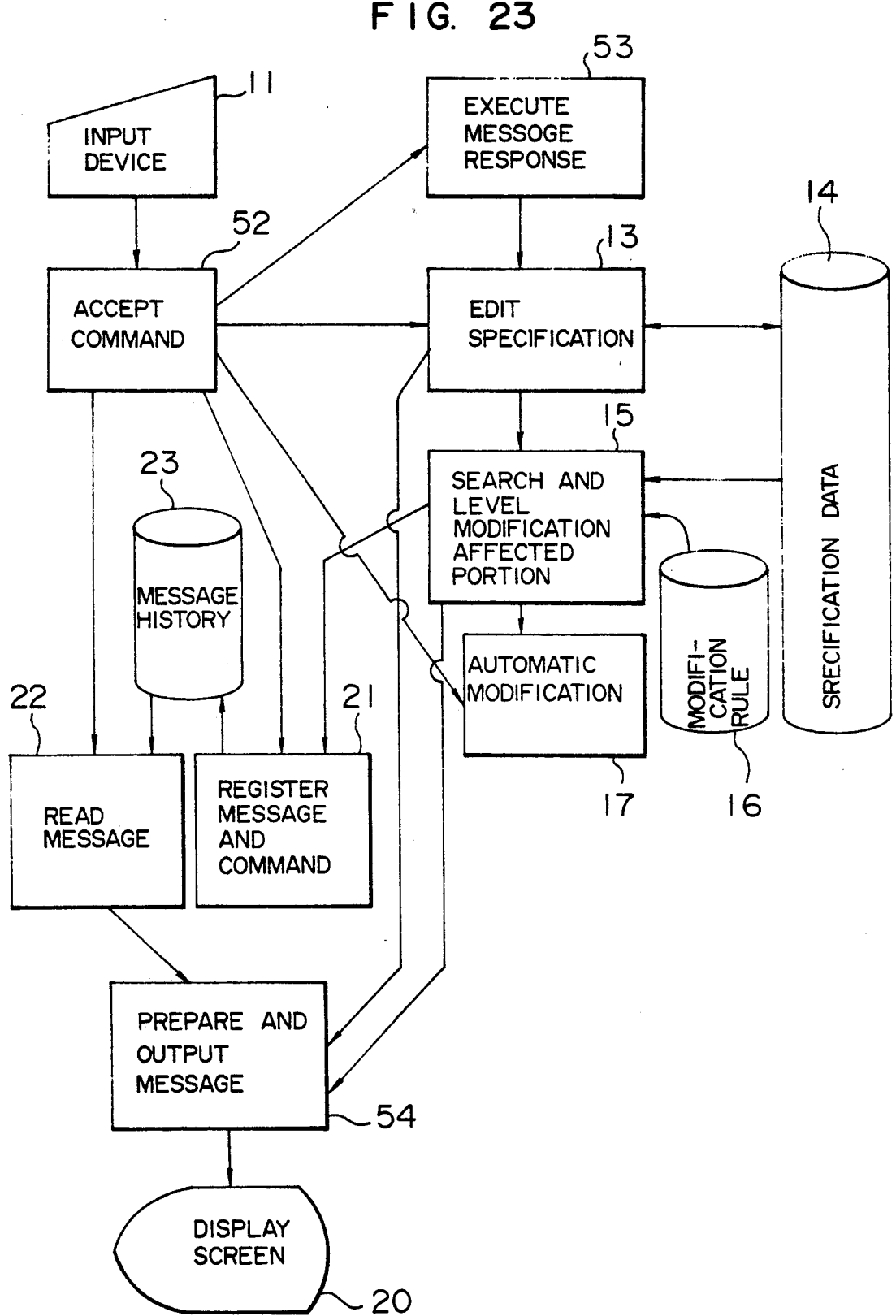
FIG. 23 shows a functional configuration of an embodiment.

An embodiment in which a history function of the message is added to the above embodiment and a request message to the specification is displayed each time the specification is opened is now explained. FIG. 23 shows a functional configuration of the present embodiment. An example of message used in the present embodiment is shown in FIG. 24. In the <message 3>, the module relation diagram is represented by mod rel, and the module specification is represented by mod spec. The responses of the <message 2> in FIG. 24 include "modify" (130) and "reserve" (131), and the responses of the <message 3> includes "modify" (132), "not modify" (133) and "reserve" (134). The <message 2> is identical to that of FIG. 19.

In FIG. 23, a message and command registration process 21, a message read process 22 and a message history 23 are provided in addition to the processes of FIG. 15. The message and command registration process 21 registers the message prepared in the message preparation and output process 54 into the message history 23 in accordance with the command acceptance. The message read process 22 reads the message for the specification from the message history file when the specification editor is started, and the message preparation and output process 54 displays the message.

FIG. 25 shows a portion of the content of the message history 23 of FIG. 23. The store table contains an object operation column 112, a module number column 113, a level column 114, an object column 115, an object data column 116 and a modification status column 117. The object of operation column 112 stores a specification which is the object of operation. The module number column 113 contains a module number of a module specification of a module when the object of operation column is the module specification. The level column 114 contains the modification level when the history of the message is recorded. The object column 115 contains the portion which is the subject of the modification request. When there are a plurality of such portions such as the function of the dependent module of the module specification, data representing the position related to the specification data 14 of FIG. 23 is stored in the object data column 116. The modification status column 117 stores the modification status by the distinction based on the history by designating modified ("mod" in FIG. 25), not modify ("not" in FIG. 25) or reserve ("res" in FIG. 25). When the user starts the specification editor, the message preparation and output process of FIG. 23 searches the specification from the object of operation column 112 and the module number column 113 of FIG. 25, reads the message of the modification status 117 and displays it on the display screen 20 of FIG. 23.

In FIG. 24, when the "modify" (130) is selected as the response to the message, the specification editor for the object to be affected is started so that the user may modify the specification. When an end of modification command is entered, the message and command registration process 21 of FIG. 23 sets "modified" in the modification status column 117 of FIG. 25, and registers the message into the message history 23. When the "reserve" (131) is selected, the "reserve" is set in the modification status column 117 and it is registered into the message history 23. When the "modify" (132) is selected, the specification editor is started so that the user may modify the specification. When the end of modification command is entered, the modification level is changed to the portion which is necessary to be modified (level 2), and the "modified" is set in the modification status 117 and it is registered into the message history 23. When "not modify" (133) is selected, the "not modify" is set in the modification status 117 and it is registered. When the "reserve" (134) is selected, the "reserve" is set in the modification status 117 and it is registered. When the user starts the specification editor, the message for the specification can be read from the history and displayed.

In the command accept process 52 of FIG. 23, when the start command for the specification editor is entered in addition to the command accept process 12 of FIG. 15, the message read process 22 is started. In the message response execution process 53, when the "cancel" is selected for the <message 1> of FIG. 24, the modification which is the cause for affection is cancelled. In the message preparation and output process 54, when the specification editor is started in addition to the message preparation and output process 19 of FIG. 15, the message read by the message read process 22 is also displayed.

Figure 26:
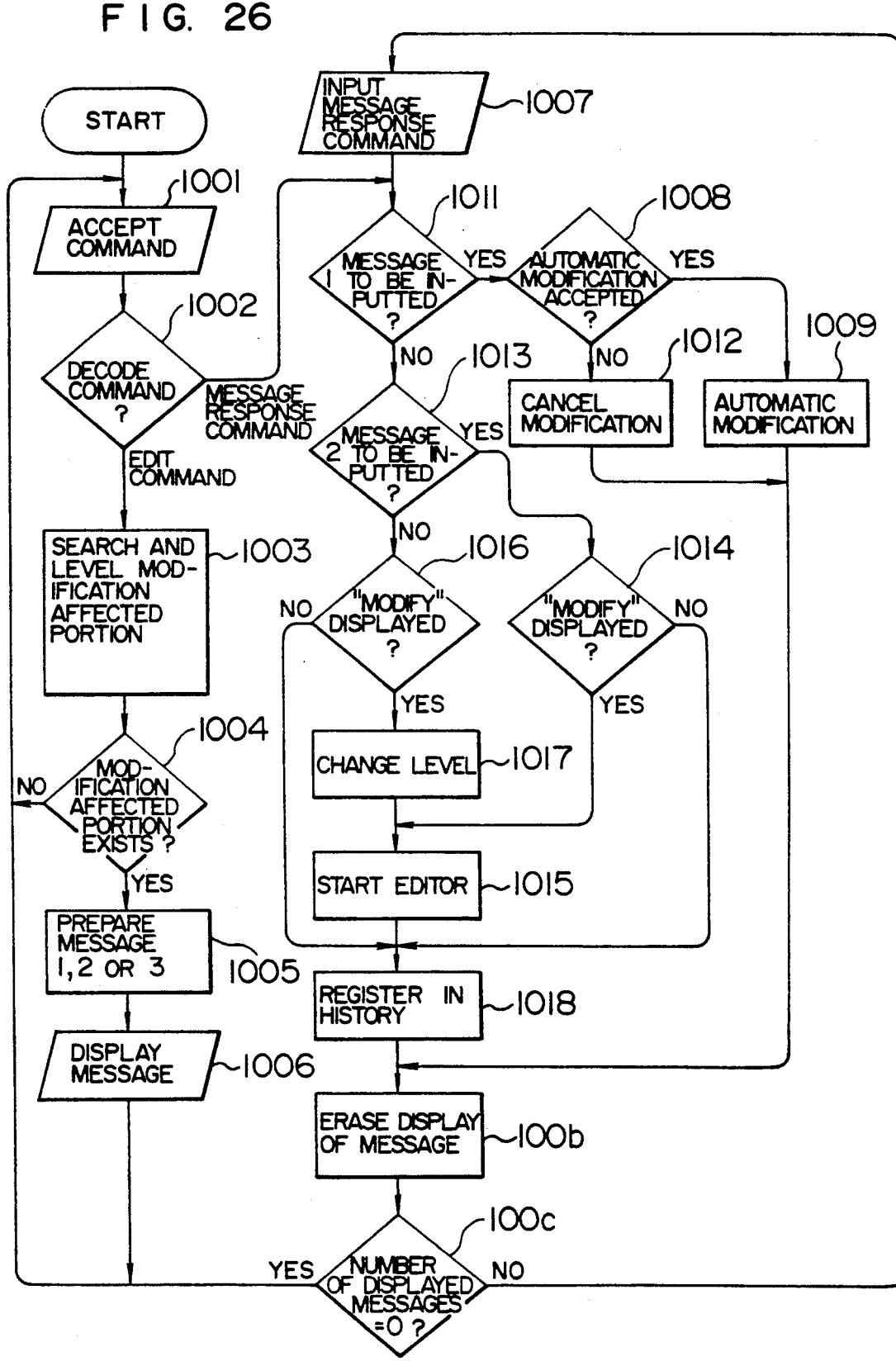
FIG. 26 shows a flow chart of the embodiment.

FIG. 26 shows a flow chart of the present embodiment. In a step 1011, whether the message response has been done to the <message 1> by the command accept process 52 or not is determined. In a step 1012, if the "cancel" is selected for the message (for example, the <message 1> in FIG. 24) because of the existence of the portion which can be automatically modified as detected by the search in the modification affected portion search and leveling process 15, the message response process 53 cancels the modification which is the cause of modification. In a step 1013, whether the message response has been done for the <message 2> or not by the command accept process 52 is determined. In a step 1014, whether the message response command accepted by the command accept process 52 of FIG. 23 commands "modify xx" to the <message 2> or not is determined. In a step 1015, the specification edit process 13 of FIG. 23 reads the data of the specification to be modified from the specification data 14 and starts the editor for the specification. In a step 1016, whether the "modify" has been commanded for the <message 3> or not is determined. In a step 1017, the level is changed from the level 3 in which the "modify" has been commanded for the <message 3> to the level 2 so that the message is handled hereafter as the portion which is clearly to be modified (level 2). In a step 1018, the command and message registration process 21 registers the content of message and the response command for the message (the modification status 117 of FIG. 25) into the message history 23 of FIG. 23.

Figure 27:
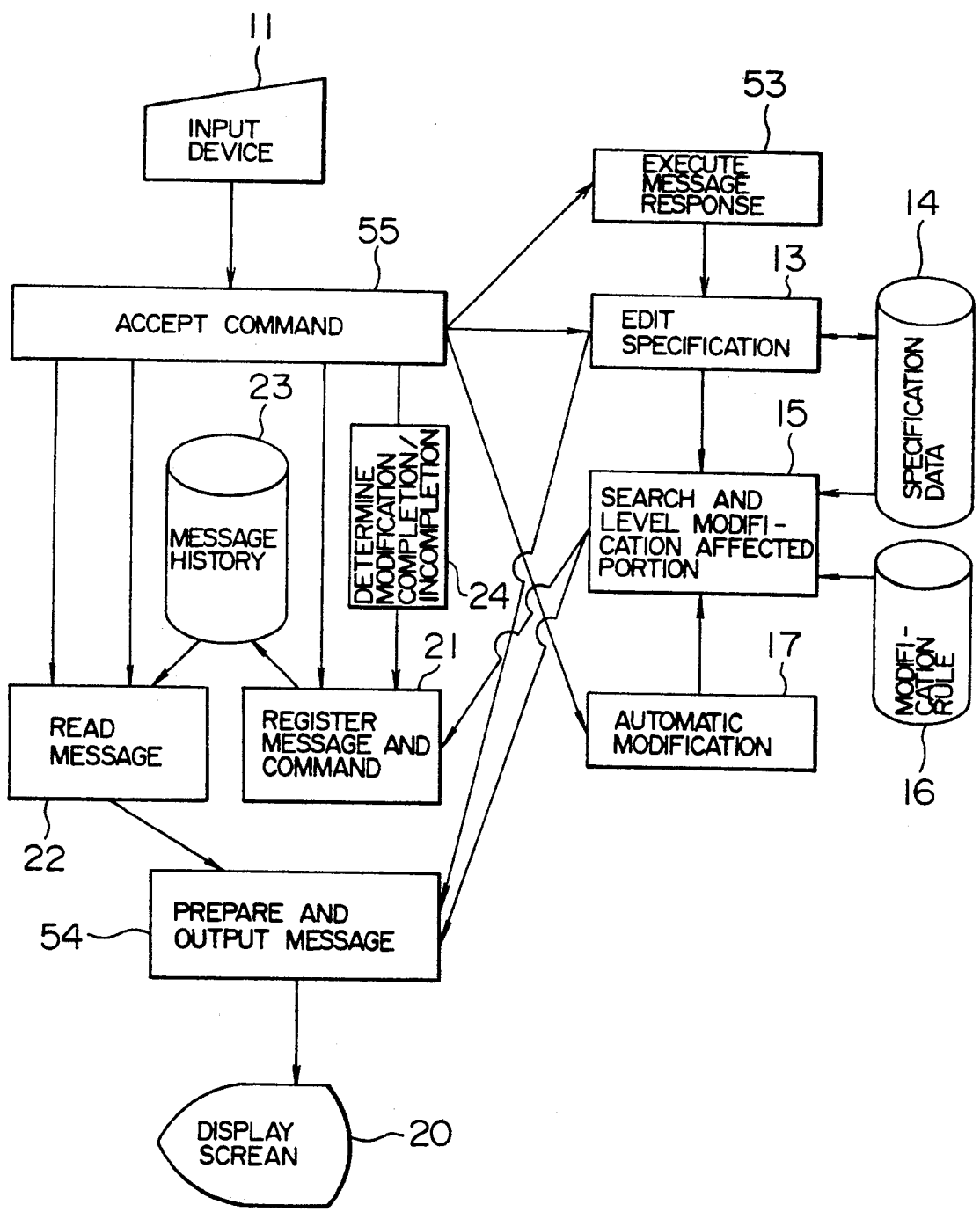
FIG. 27 shows a functional configuration of an embodiment of the present invention.

In the above embodiment, when the editor for the affected specification is started by the message response, it is handled as the completion of modification. An embodiment in which the completion of modification is not recognized until the user enters a command of completion of modification is now explained. FIG. 27 shows a functional configuration thereof. In FIG. 27, a modification completion/incompletion determination process 24 is added to FIG. 23 which shows the functional configuration of the third embodiment. The command accept process 55 starts the modification completion/incompletion determination process 24 when a command to close the editor is entered for the specification editor started by the response message for the modification request message of the <message 2> or <message 3>, in addition to the function of the command accept process 52 of FIG. 23. The command to close the editor includes the completion of modification and the interruption of modification. In the modification completion/incompletion determination process 24, when the command to close the editor is the completion of modification command, the message and command registration process 21 is started, and "modified" is registered in the modification status column 117 of FIG. 25. When the command is the interruption command, "unmod" which represents the unmodified status is registered in the modification status column 117 of FIG. 25. When the specification editor is started, the modification status column 117 is referred and the message is displayed again for the lines of unmodified status and reserve. In the present embodiment, when the modification request message of the <message 2> or <message 3> is displayed, it is the user's judgement to determine whether the modification for the message has been completed or not. If a function to check the integrity of the content of data of specification is added to determine whether the modification has been correctly done or not in place of the modification completion/incompletion determination process 24, a higher precision may be attained.

Figure 28:
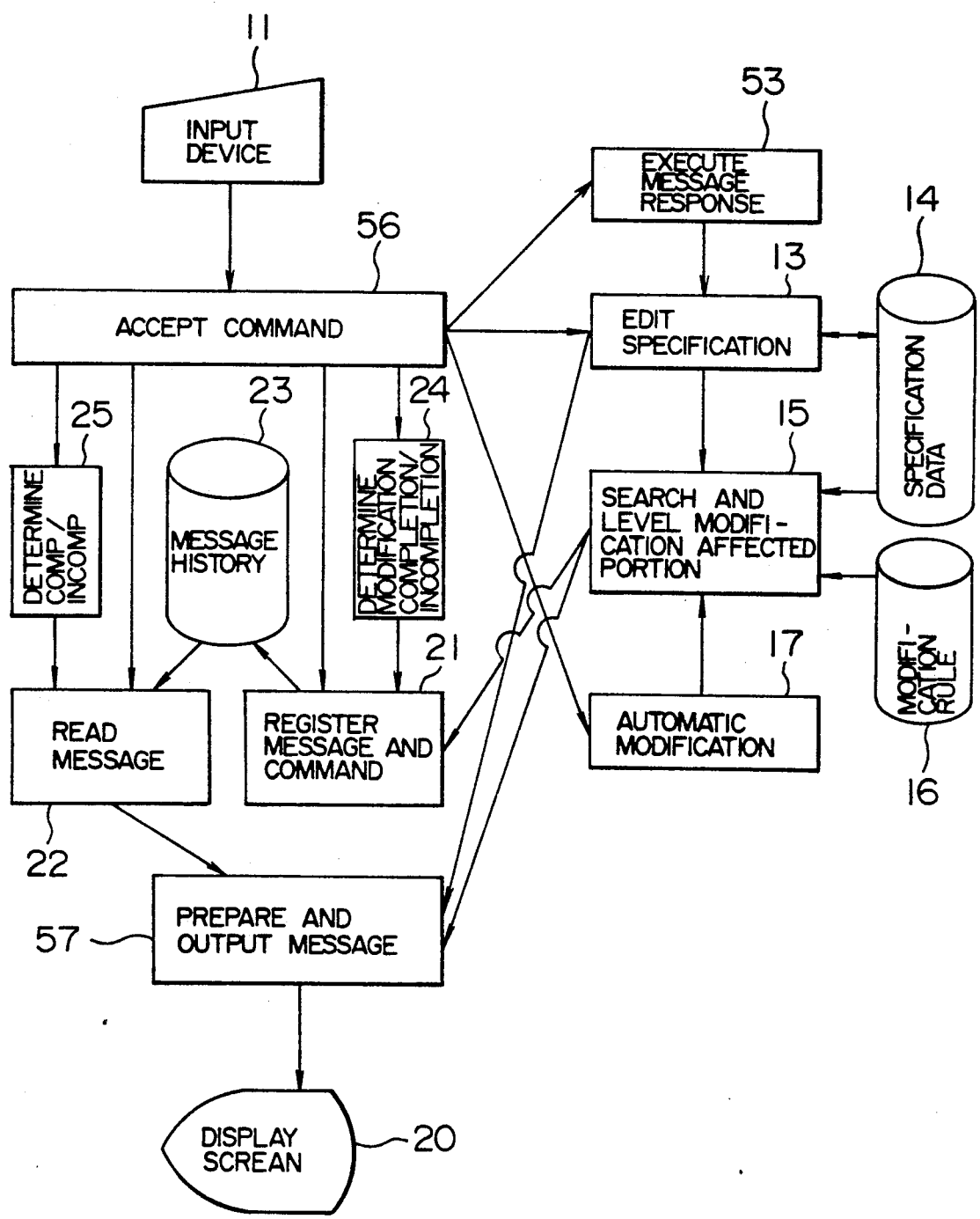
FIG. 28 shows a functional configuration of an embodiment of the present invention.
Figure 29:
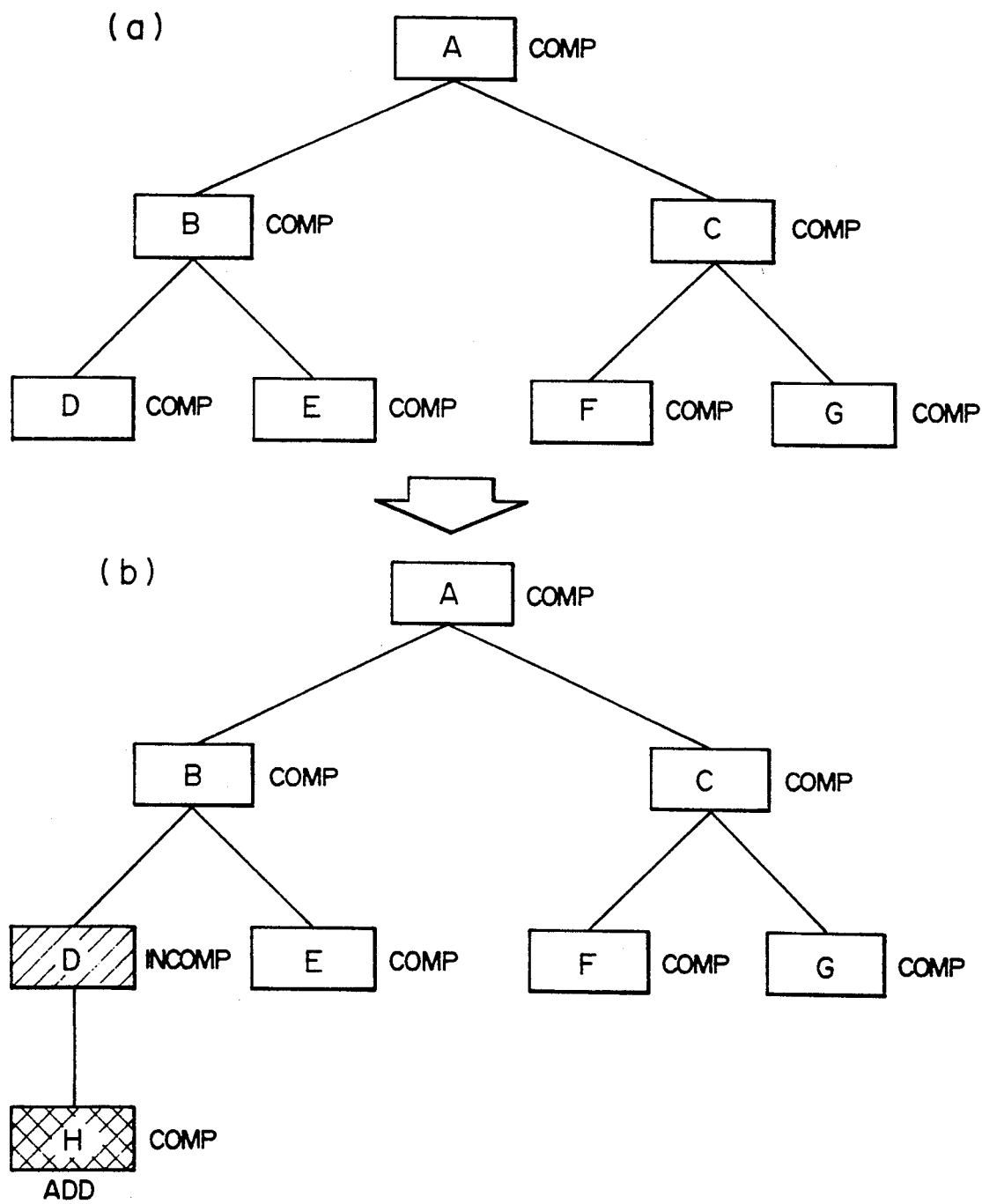
FIG. 29 shows an example of display of module completion/incompletion state.

An embodiment which has information on completion/incompletion status of the system for each module specification, in addition to the functions of the above embodiment is now explained. FIG. 28 shows a functional configuration thereof. In FIG. 28, a completion/incompletion determination process 25 is added to FIG. 27 which shows the functional configuration of the fourth embodiment. In the command accept process 56, in addition to the function of the command accept process 55 of FIG. 27, the completion/incompletion determination process 25 is started when the command to display the completion status is inputted by the user. In the completion/incompletion determination process 25, the use status 102 of the specification data shown in FIG. 17 is referred, and the message relating to the module specification of the module corresponding to the module number whose use status is "use", is read from the content of the message history shown in FIG. 25. If there is other than "modified" in the modification status column 117, the module specification is handled as incompleted, and if all are "modified", the module specification is handled as completed. In the message preparation and output process 57, in addition to the function of the message preparation and output process 54 of FIG. 27, when the information is received from the completion/incompletion determination process 25, the information with "completion" or "incompletion" is displayed for each module of the module relation diagram. FIG. 29 shows an example of display. A completed status of the module relation diagram having the modules A-G which are in the completed status is displayed by a display command as shown in FIG. 29(a). When the module D is affected by the addition of the module F which is in the completed status below the module D in the module relation diagram, and if the user enters a command to display the completed status, it is displayed as shown in FIG. 29(b). In the present embodiment, the failure of modification of the module specification by the user can be prevented because the system manages the completion/incompletion status of each module specification.

Figure 31:
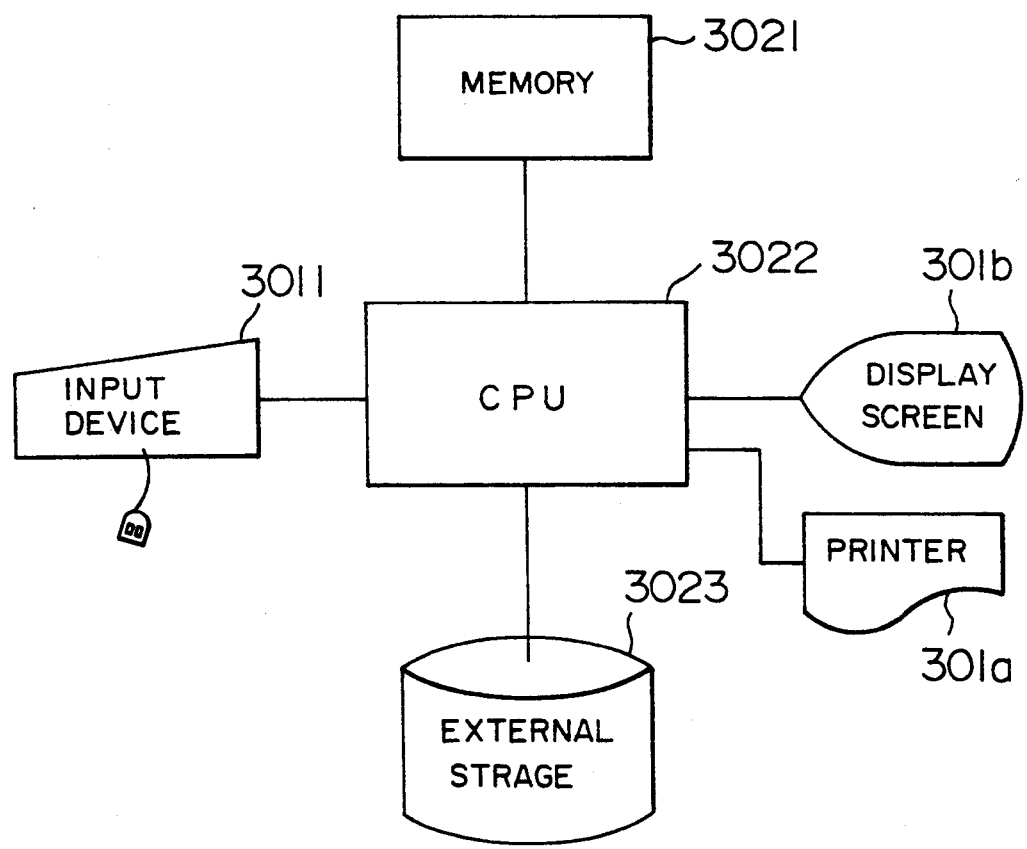
FIG. 31 shows a hardware configuration.

A method for storing history of messages displayed during the interaction such as message of modification affection is now explained. FIG. 31 shows a hardware configuration of one embodiment of the present invention. It comprises an input device 3011 including a keyboard and a mouse for entering a user command, a memory 3021 used for processing in a computer and storing data, a CPU 3022, an external storage 3023, a display screen 301b for displaying execution result of a command, a content of stored data and a message to the user, and a printer 301a for printing the message. An example in which the present invention is applied to a design supporting system which comprises tools for interactively preparing a software specification is now explained. FIG. 30 shows a functional configuration of the present embodiment. In a command accept process 3012, a command inputted by the input device 3011 is read and analyzed. In a command execution process 3013, the command analyzed in the command accept process 3012 is executed and the result is displayed on the display screen 301b. The specification data 301c may be referred or edited depending on the command. When a factor to output the message is detected during the execution of the command, a message display process 3014 is started. In the message display process 3014, the display content of the message which represents warning or request to the user is determined and it is displayed on the display screen 301b. In the message display process 3014, whether the message should be issued or not is determined when the command is accepted by the command accept process 3012 and the message is displayed when the issuance of the message is necessary. In displaying the message, the specification data may be searched to determine the display content. In a message registration process 3017, the information on the message displayed by the message display process 3014 is registered into a message history 3018. An example of data stored in the message history 3018 is shown in FIG. 32. As for the operation which has triggered the display of the message, a tool which was then in operation, the operation and the object of operation are stored, and as for the display content of the message, a specification (object specification) which is the subject of warning or request by a message statement or message is stored. When a user response to the message is acceptable, the response to the message may also been stored, or an operator (user) operating at the time of issuance of the message and data and time at which the message is issued may be stored. The history of the messages thus stored is useful for checking the design course in reviewing the design and the redesign in debugging.

Figure 33A:
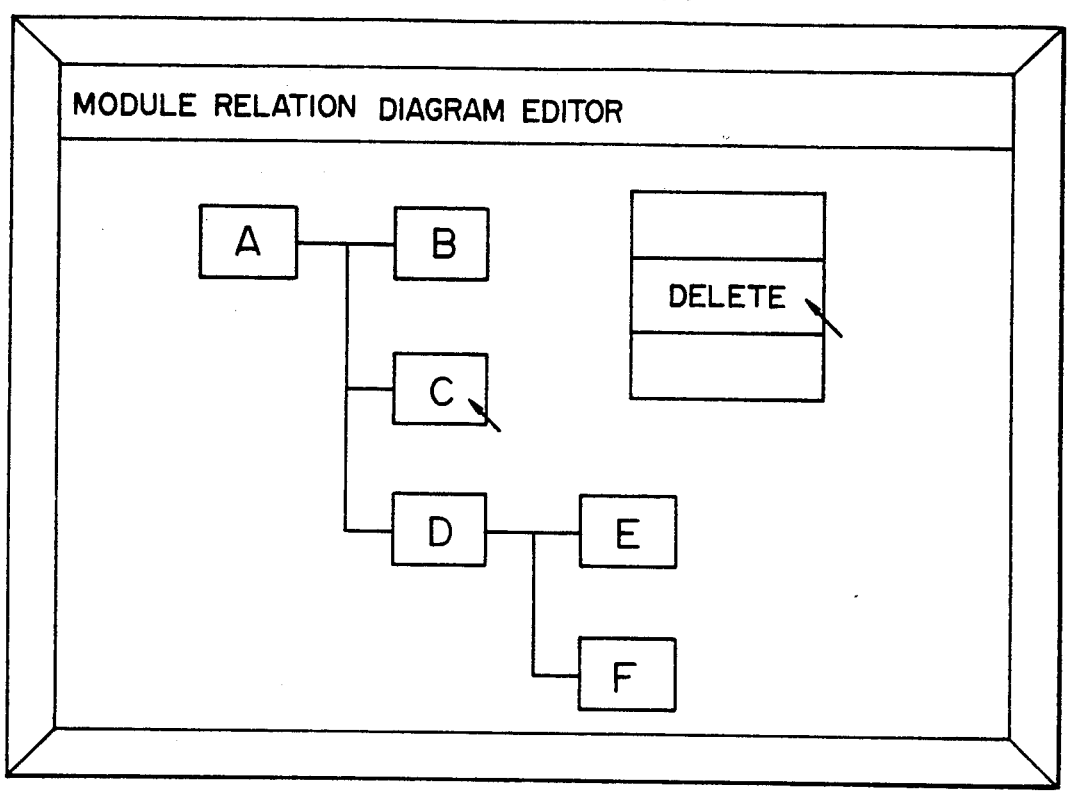
FIGS. 33A and 33B show examples of display of message.
Figure 33B:
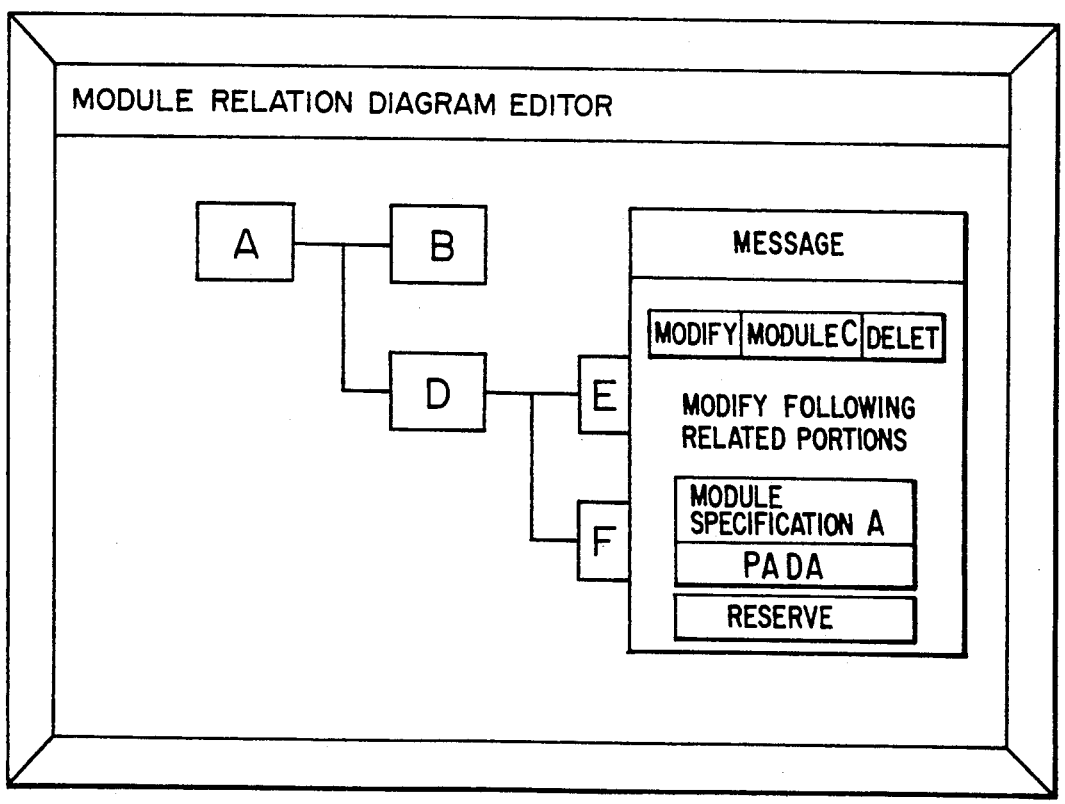

The messages displayed may include those which need not be retained as the history once they are processed when they are displayed. An embodiment in which the user response to the displayed message is accepted and the determination is made as to whether the information of the message is to be retained as the history or not depending on the content of the response is now explained. FIGS. 33A and 33B show examples of screen when the command is inputted and the message is displayed, respectively. FIG. 33A shows a screen when the user is inputting the command. In the present example, a command which represent "delete module c" is being entered in the editor of the module relation diagram which is one of the software specification. A screen after the command has been entered is shown in FIG. 33B. The command has been executed, the module c has been deleted and a message which requests the modification of a related portion is displayed. In the present example, the name of specification to be modified and the item "reserve" are displayed in a form of menu as the response to the message, and the user selects the "reserve". The selection of the "reserve" means to declare to the system that what is commanded by the message is not effected at that time but will be effected later, and the selection of the specification name means to declare to the system that the selected specification is modified at that time. Accordingly, when the "reserve" is selected, the information of the displayed message is retained as the history, and when the specification name is selected, no history is retained. Thus, what is commanded by the message need not be carried out at the time of display of the message but it may be carried out at any time convenient to the user. Further, when the "reserve" is selected, the information is retained in the history. Thus, the failure to do can be prevented. In this manner, the user operation is not impeded by the user and the command of the message is surely carried out.

Figure 35:
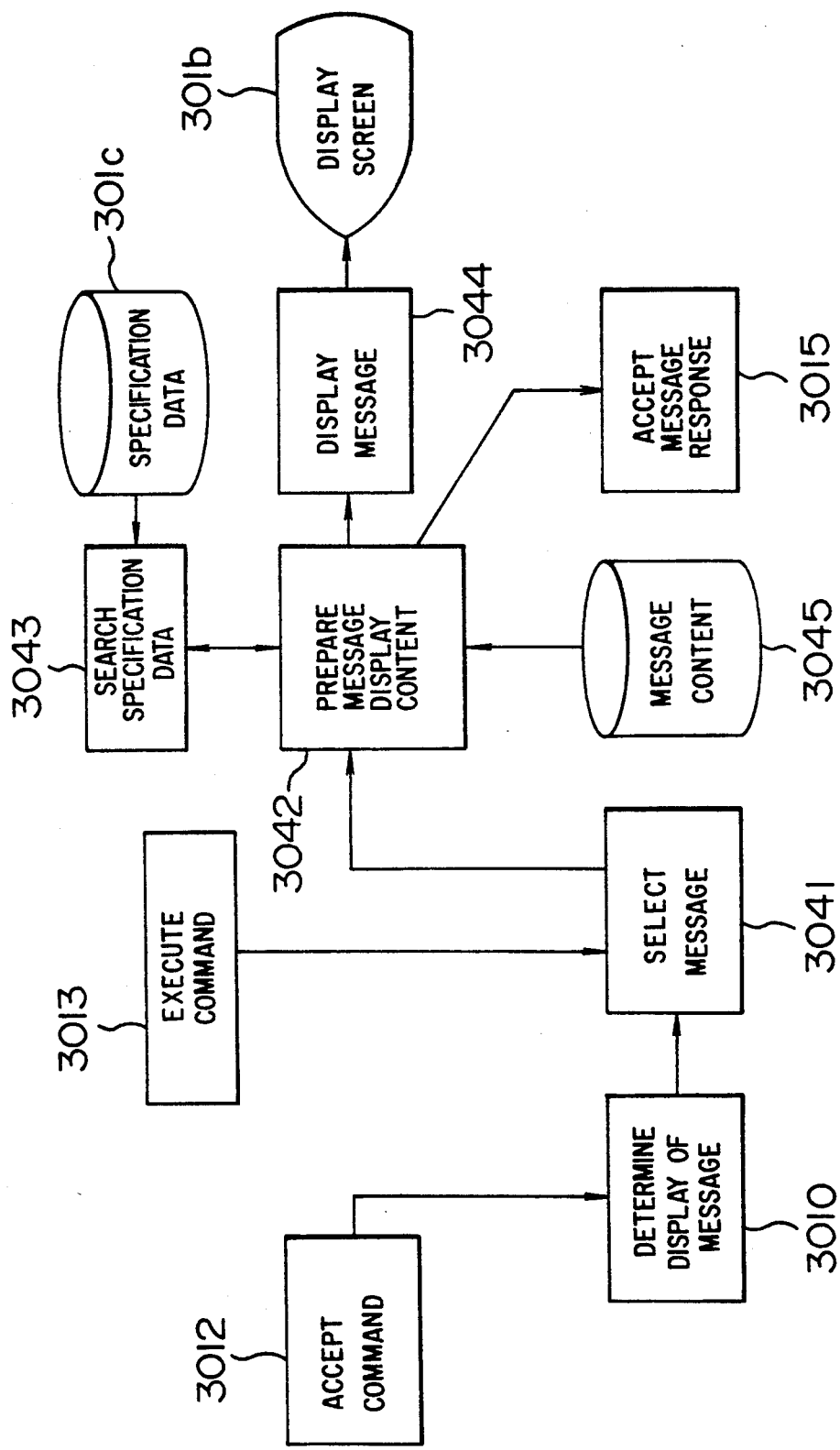
FIG. 35 shows a functional configuration which illustrates detail of message display processing.
Figure 37:
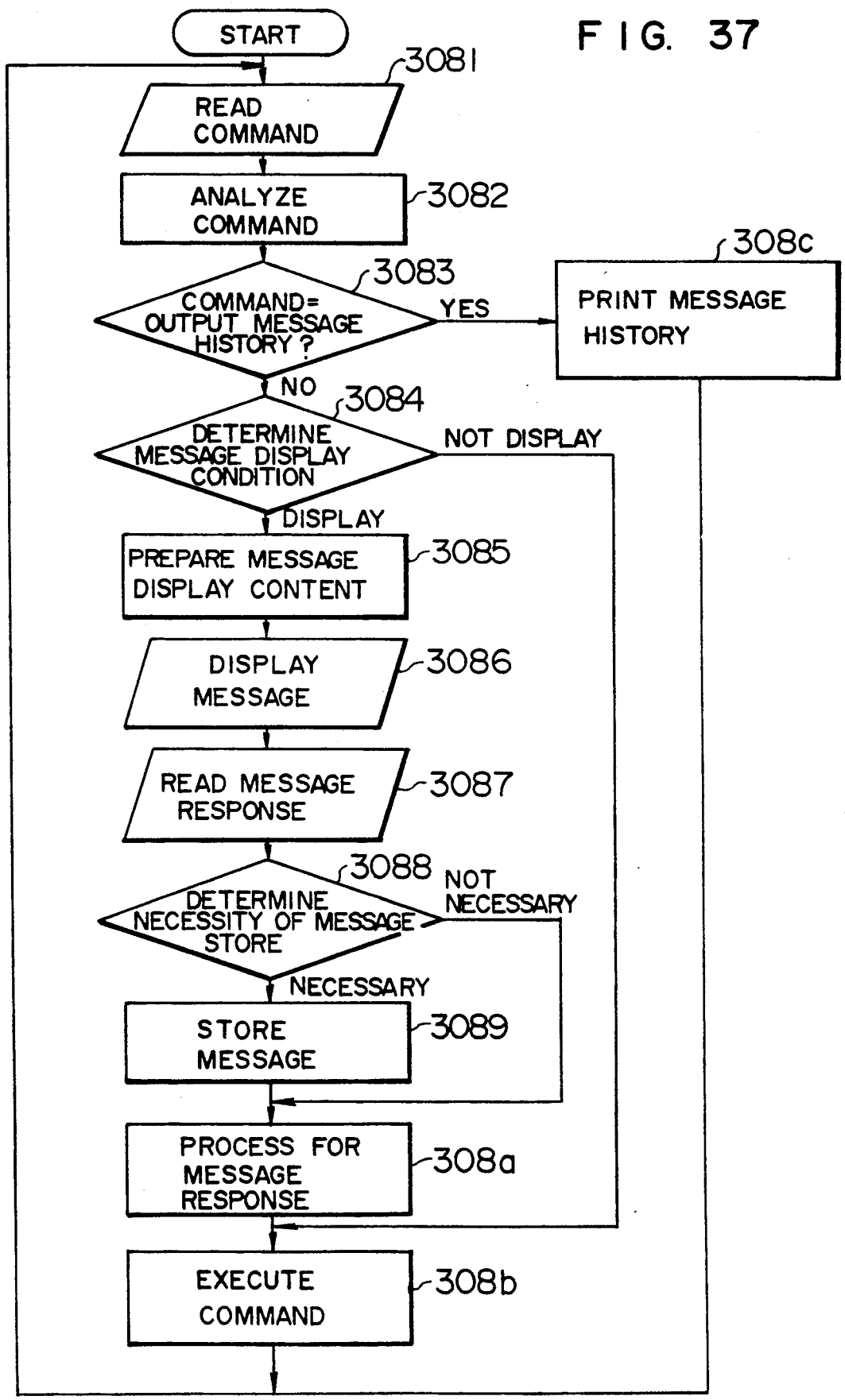
FIG. 37 shows a flow chart of the embodiment.

FIG. 34 shows a functional configuration of the present embodiment. In a message response accept process 3015, a response to the message received from a command accept process 3012 is analyzed. In a message store decision process 3016, the necessity of storing the message is determined based on the analyzed user response to the message. There may be various criteria for determination (message store criteria). For example, as shown in FIG. 33, the decision may be made in accordance with the item selected from the selection menu. For example, the message may be stored when the "reserve" is selected from the selection menu for response, or when the "cannot answer" is selected from "yes", "no" and "cannot answer" in the selection menu for response to the query type message. Or, the menu for response is not prepared and the message is stored when the operation which has triggered the message is forced in spite of the warning message or other operation is performed without following the direction of the message. Further alternatively, a degree of risk for selecting each one of the user responses to the message has been preset and the message is stored when the degree of risk preset to the response accepted in the message response accept process 3015 exceeds a predetermined level. It is also effective to provide a function to identify the operating user and a function to identify position and capability of the user so that the position and capability of the operating user are considered as factors of the message store criteria. In a message registration process 3017, the message is registered into a message history 3018 when the necessity to store the message is determined in the message store determination process 3016. In a message history output process 3019, the history of messages stored in the message history 3018 is outputted to a printer 301a. The message history may be outputted in the form of a list of messages for each specification, a list of messages for each module or sub-system which is the object of the message, an output of messages, in the sequence of display, displayed after a designated data and time, or a list of messages displayed to a designated user. FIG. 35 shows a detail of the message display process 3014 of FIG. 34. When a command is accepted by the command accept process 3012, the command is supplied to a message display determination process 3040 to determine whether the message is to be displayed or not. If the decision is to display, a message selection process 3041 is executed to select the message to be displayed. When a message display status occur during the execution of the command in the command execution process 3013, the information representing the status is supplied by an error code, for example, to the message selection process 3041, which selects the message to be displayed. In a message display content preparation process 3042, the identification information of the message selected in the message selection process 3041 is received in the form of message code, a fixed portion of the message display content is read from a message content 3045, and a variable portion of the display content (in the example of FIG. 33B, "module c", "delete", "module specification A" and "PADA") is prepared based on the status and command which triggered the display of the message and which are supplied from the message selection process 3041, and the information of the specification data searched in a specification data search process 3043. The prepared display content is outputted to the display screen 301b by a message display process 3044. In the specification data search process 3043, when the input command is one which requests to modify a portion of the specification, a modification affected portion is searched. FIG. 36 shows an example of data stored in a message content 3045. The text of message and the information on the response menu are stored for each message together with the identification code (message code). The information on the response menu includes the display content and the system operation after the selection of the item, for each item displayed on the menu. In the message text and the display content, ( ) and < > indicate the variable portions. The ( ) pattern includes the input command or the information on the status which triggered the display of the message, and the < > portion includes the information searched in the specification data search process 3043. FIG. 37 shows a flow chart of a process of the present embodiment. In a step 3081, the command inputted from the input device 3011 is read. In a step 3082, the command is analyzed. In a step 3083, whether the analyzed command requests the output of the message history or not is determined, and if it is the command which requests the message history output, the message history stored in the message history 3018 is outputted to the printer 301a in a step 308c. In other cases, whether a message is to be displayed to the command or not and what message, if any, is to be displayed are determined in a step 3084. If the decision is not to display the message, the process proceeds to a step 308b. On the other hand, if the decision in the step 3084 is to display the message, the display content of the message to be displayed is read from the message content 3045 in a step 3085, and the data of the specification data 301c is searched as required in the specification data search process 3043 to prepare the display content of the message. In a step 3086, the prepared display content of the message is displayed on the display screen 301b. In a step 3087, the user response to the displayed message is read. In a step 3088, whether the information of the displayed message is to be stored in the message history 3018 or not is determined based on the message store criteria in the message store determination process 3016. If the decision is to store, the message information is registered in the message history 3018 in a step 3089. In a step 308a, processing for the user response to the message, read in the step 3087 is carried out. After the command analyzed in the step 3082 has been executed in a step 308b, the process returns to the step 3081 and next command input is monitored. The step 308b may not be executed when the processing to the message response is "cancel operation". The step 308b may be executed before the display processing of the message in the step 308a which follows to the step 3084. In the step 308a, the operation described in the column "operation after response" in FIG. 36 is carried out if the data of the message content 3045 is one shown in FIG. 36. By storing the history for the necessary messages, it is possible to perform what the message requests during the interactive operation, not at that time but later. Accordingly, the user work is not impeded by the message. By retaining the history of messages only when the response to the message is not clear or possibly in error, it may be used as more powerful reference data in reviewing the design or debugging.

Figure 38:
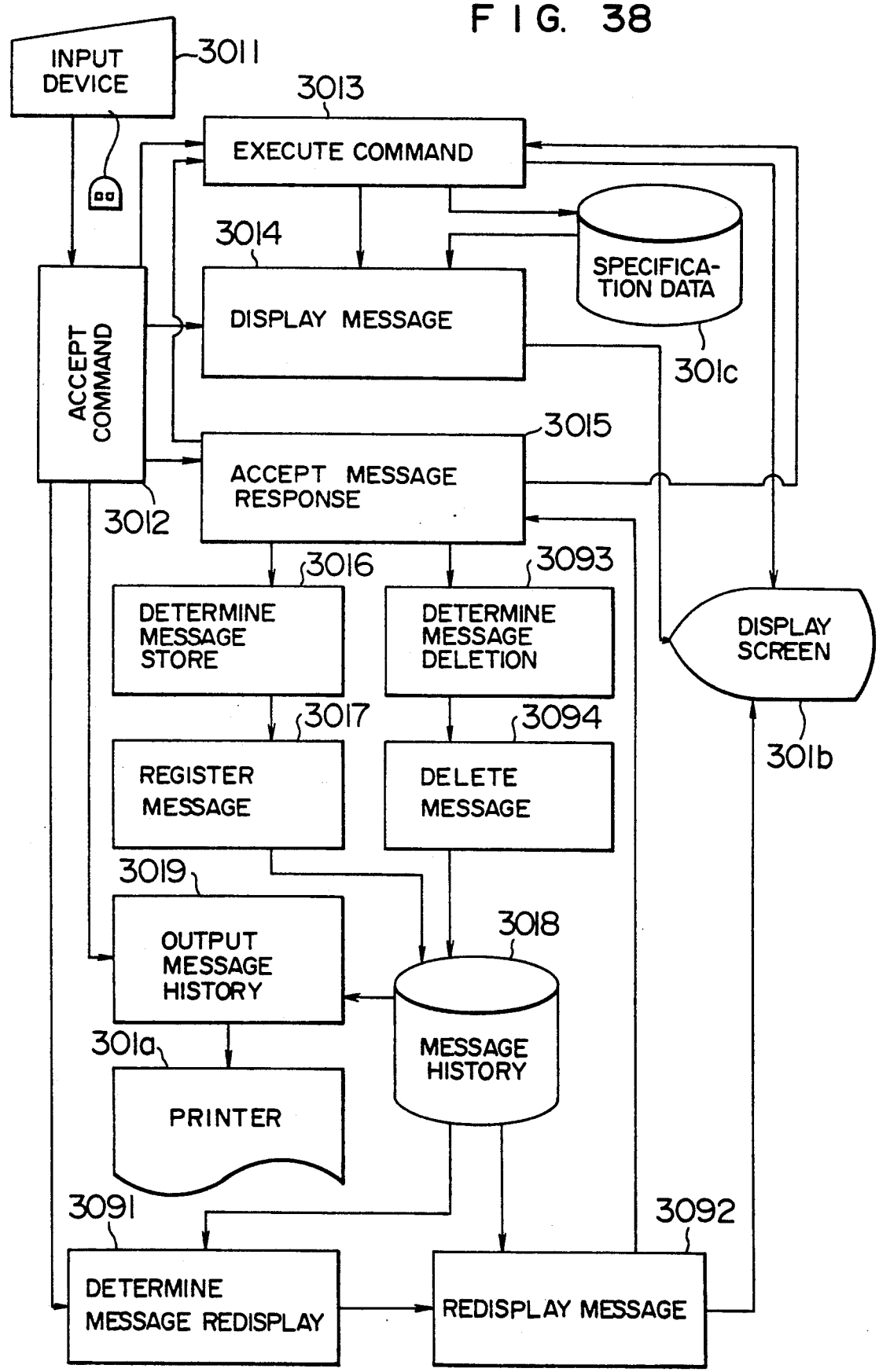
FIG. 38 shows a functional configuration of an embodiment.
Figure 39A:
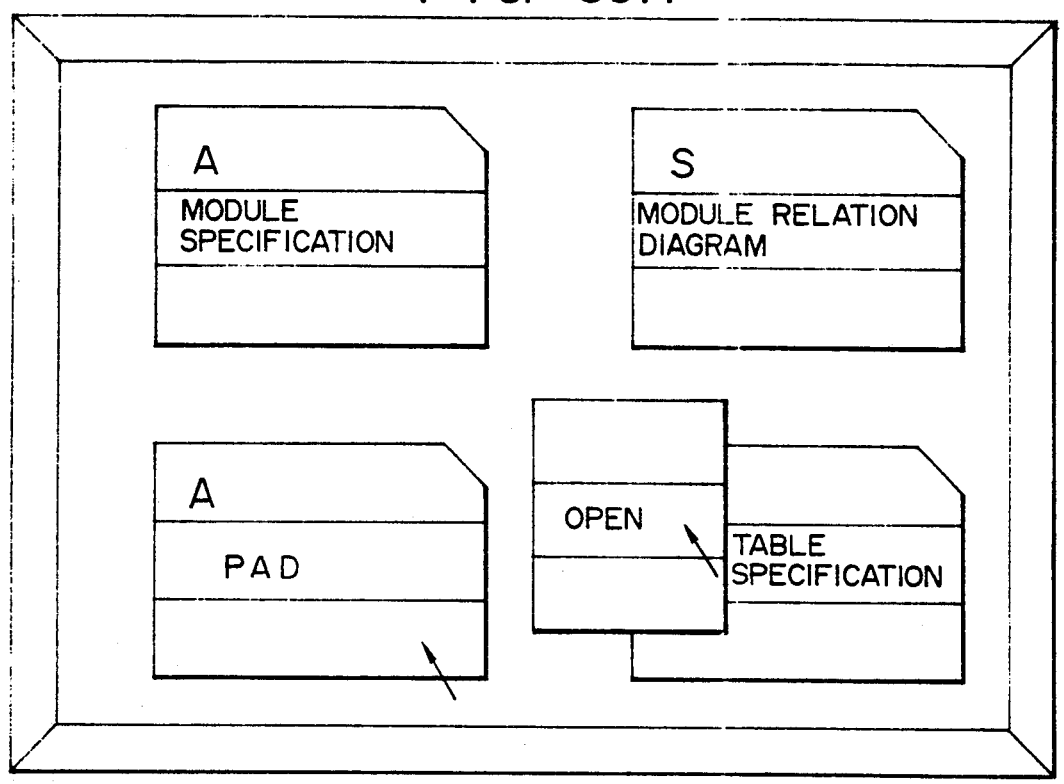
FIGS. 39A and 39B show examples of display of message.
Figure 39B:
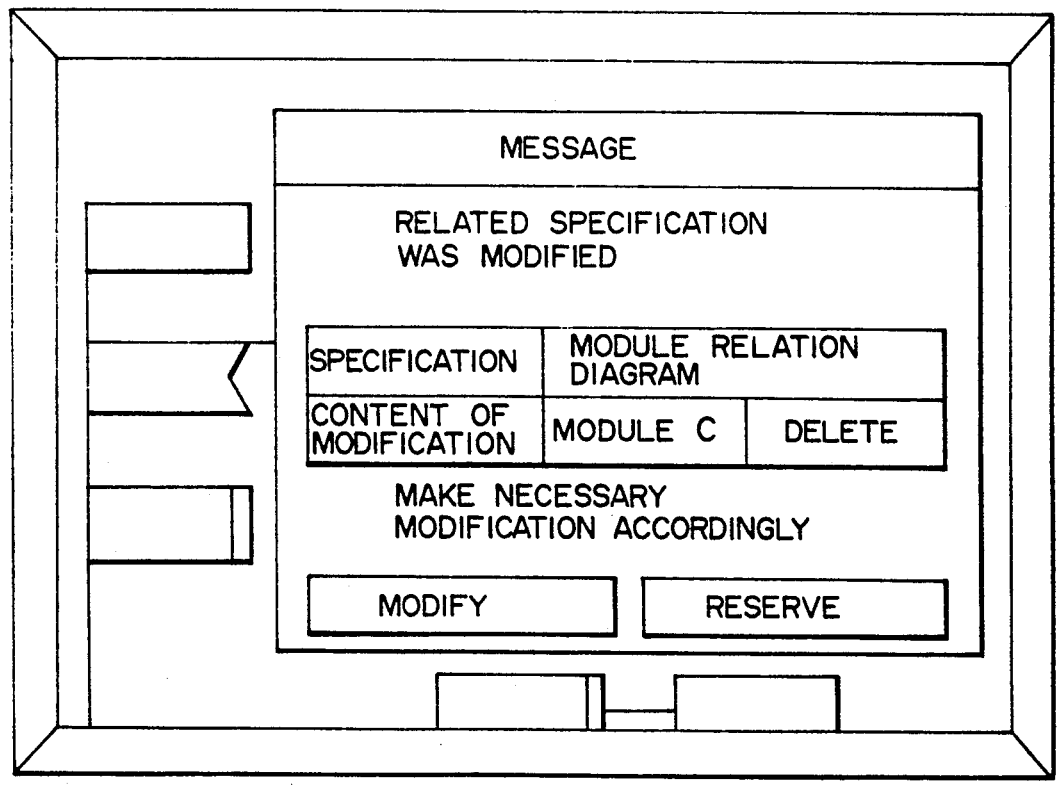
Figure 40:
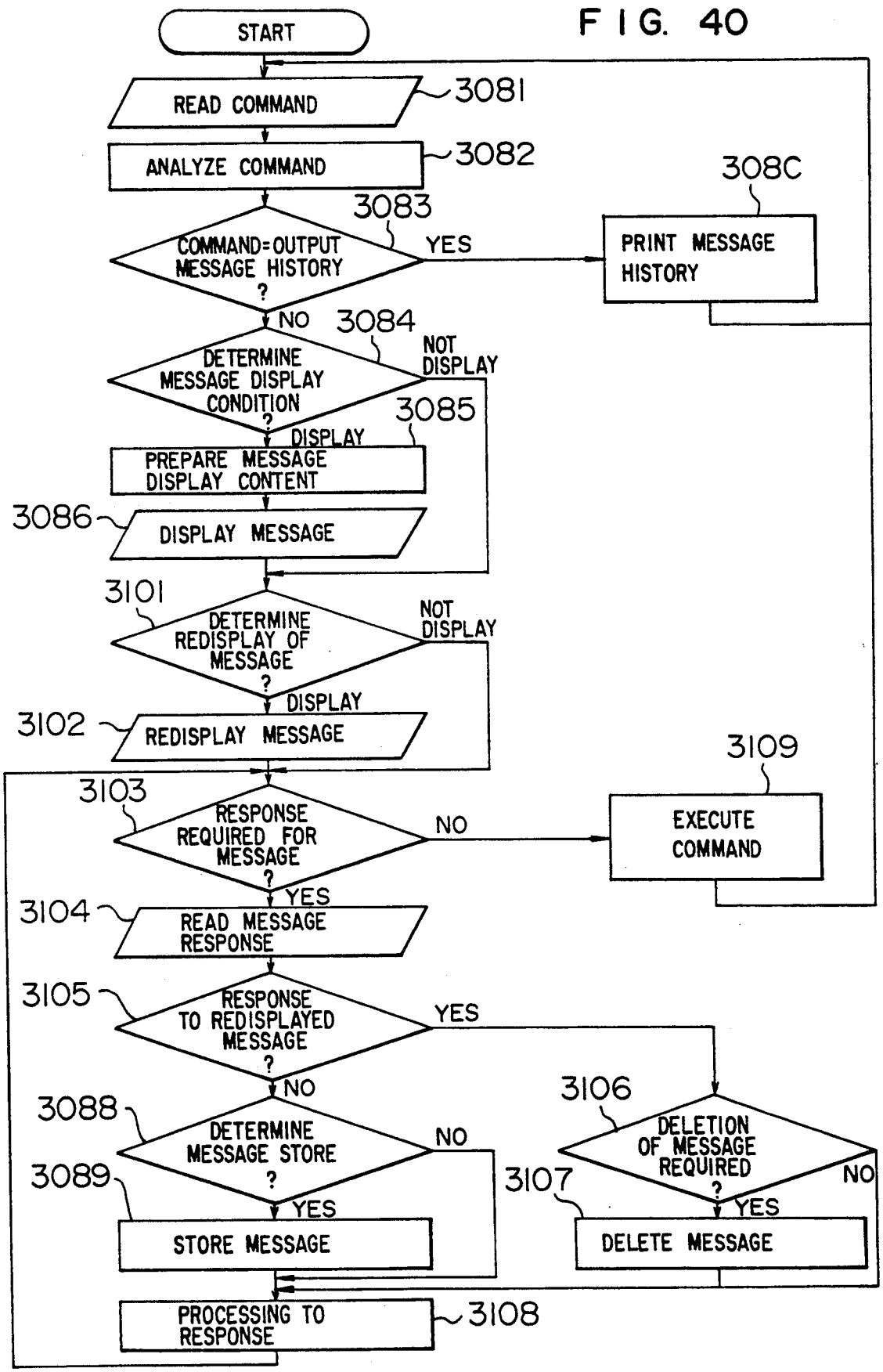
FIG. 40 shows a flow chart of the embodiment.

In the above embodiment, the history of messages is only stored. An embodiment which has a function to erase the message from the message history when the stored message is no longer necessary is now explained. FIG. 38 shows a functional configuration which adds to the functional specification of FIG. 34 a function to display the messages in the message history and delete the message from the history in accordance with the response of the user. In a message redisplay determination process 3091, whether the message is to be redisplayed or not is determined based on the command accepted in the command accept process 3012, the message to be redisplayed is selected from the message history 3018, and if the message to be redisplayed is found, the identification information of the message (number in the message history) is supplied to a message redisplay process 3092. In the message redisplay process 3092, the content of the message selected from the message history 3018 in the message redisplay determination process 3091 is read, it is displayed on the display screen 301b, and the display content, the information representing the redisplayed message and the identification information of the message are supplied to the message response accept process 3015. It may be better for better understanding to modify the display content of the message displayed in the message redisplay process 3092, instead of displaying the message stored in the message history 3018 as it is. In such a case, in order for the message redisplay process 3092 to determine the situation, it is necessary for the message redisplay determination process 3091 to supply the information of the command accepted by the command accept process 3012 as well to the message redisplay process 3092. In a message response accept process 3015, when the message whose response has been accepted is the redisplay message, the identification information of the message and the information on the accepted response are supplied to a message delete determination process 3093. If it is not the redisplay message, a process similar to that shown in FIG. 34 is executed. In the message delete determination process 3093, whether the message is to be deleted from the history or not is determined based on the response to the message supplied from the message response accept process 3015, and if the decision is to delete, the identification information of the message to be deleted is supplied to a message delete process 3094. The criteria for determining the deletion in the message delete determination process 3093 are similar to the criteria in the message store determination process 3016 but the decision is opposite. Namely, the message determined as "yes" in the message store determination process 3016 is now determined as "no", and the message determined as "no" in the message store determination process 3016 is now determined as "yes". In the message delete process 3094, the message is deleted from the message history 3018. The conditions of redisplay determined in the message redisplay determination process 3091 may be the accessing to the specification which is the object of the message in the message history (the specification in the object specification column of the table of the message history shown in FIG. 32), the printing of the specification, the termination/start of the system, or the redisplay for each delimination of the design process delimited by inputting a particular command FIGS. 39A and 39B show examples of screens redisplayed when the specification which is the object of the message in the message history is accessed. When the message shown in FIG. 33 is displayed and the information of the message displayed as shown in FIG. 32 is contained in the message history 3018, the operation shown in FIG. 39A is performed, an the result thereof is shown in FIG. 39B. In FIG. 39A, the PAD "A" is picked up by a mouse and the command "open" is entered. In FIG. 39B, the command is executed and the data of the PAD "A" is displayed on the screen and the message is also displayed. For the input command of FIG. 39A, the message redisplay determination process 3091 searches the message which has the "PAD A" in the object specification of the message, from the message history 3018 shown in FIG. 32, and the message redisplay process 3092 modifies the display content of the message and displays it. For this message, if the "modify" is selected as shown in FIG. 39B, the message delete determination process 3093 decide to delete it, and the message is deleted from the message history 3018. On the other hand, if the "reserve" is selected for the redisplayed message, the message delete determination process 3093 decides not to delete, and the message history 3018 is not changed. By retaining only those message which are in the reserve state in the history, it is possible to indicate to the user what should be solved and that the problem remains unresolved and unclear. FIG. 40 shows a flow chart of a process of the present embodiment. Steps 3081 to 3086, steps 3088 to 3089 and a step 308c are identical to those of FIG. 37. In a step 3101, the message redisplay determination process 3091 determines whether there is a command to be redisplayed based on the command analyzed in the step 3082 and the content of the message history 3018, and if there is a message to be redisplayed, the message redisplay process 3092 redisplays the message in a step 3102. In a step 3103, whether a user response to the message is required or not is determined. When no message is displayed, when all responses to the message have been completed or when the message is displayed but the message does not require response, the decision is "No". In a step 3019, the command analyzed in the step 3082 is executed by the command execution process 3013, and next command input is monitored. If the decision in the step 3103 is the require the user response, the response to the message is read by the command accept process 3012 and the message response accept process 3015 in a step 3104. In a step 3105, whether the read-in response is one to the redisplayed message or not is determined. If the decision is the response to the redisplayed message, whether the message is to be deleted from the message history or not is determined by the message delete determination process 3093 in a step 3106, and if it is to be deleted, the message is deleted from the message history 3018 by the message delete process 3094 in a step 3107. If the decision in the step 3105 is not the response to the redisplayed message, it means that it is the response to the message displayed in the step 3086. Thus, the steps 3088 and 3089 and executed as they are in FIG. 37. In a step 3108, those processings to the response read in the step 3104 which are other than storing and deleting the message are carried out. Where the message content 3045 is one shown in FIG. 36, those processings stored as "operation after response" which are other than "store history" are carried out for the read-in response. After the execution of the step 3108, the process returns to the step 3103.

The message may be deleted from the message history 3018 by, in addition to the above method, automatically checking whether the request by the message has been executed and deleting the message if it has been executed, or designating a message to be deleted by the user and deleting the designated message. The method for deleting by the user designation includes a method for designating a module name or sub-system name and deleting the message whose object is the designated module or sub-system, a method for designating a specification and deleting the message whose object is the designated specification, a method for designating a user and deleting the message displayed for the designated user, a method for designating date and time and deleting the messages displayed before the designated data and time, and a method for directly designating a message in the message history and deleting the designated message. The user may watch the output message history and checks or review it, and those messages which user decides not necessary to retain may be deleted.

Figure 41:
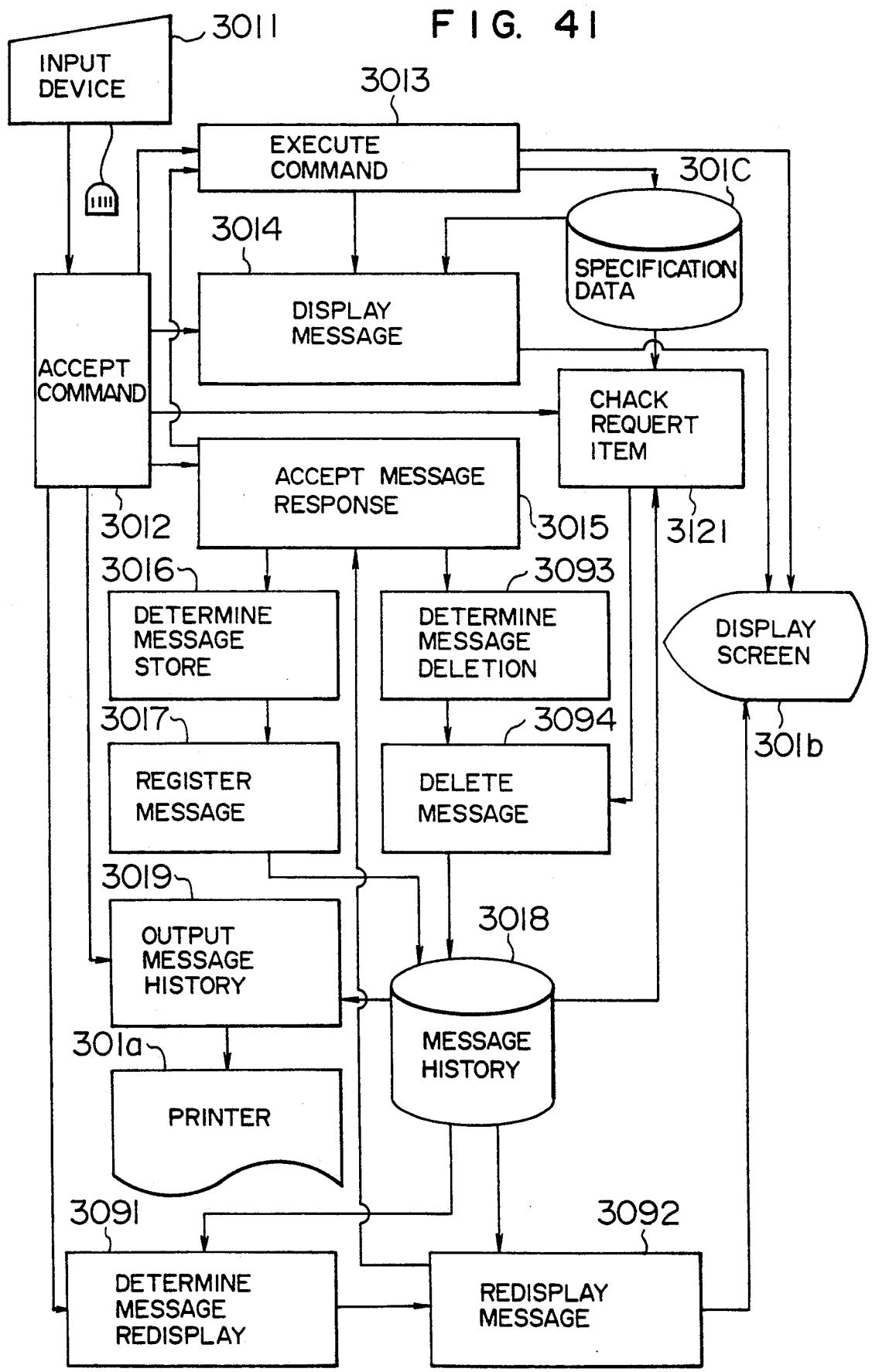
FIG. 41 shows a functional configuration of an embodiment.

FIG. 41 shows a functional configuration of one embodiment in which whether the request by the message has been executed or not is automatically checked and the message is deleted if it has been executed. It adds a request item check process 3121 to the functional configuration of FIG. 38. In the request item check process 3121, the messages stored in the message history 3018 are sequentially read, and if the content requested by the message is automatically checkable, the data stored in the specification data 301c is checked. If the content requested by the message has been executed, the message is deleted from the message history 3018 by the message delete process 3094. Specific methods of checking include checking of matching of type and number between a real argument and a virtual argument of the module, and checking as to whether the number of steps for each module exceeds a reference value. For a message "The number of arguments of module a does not conform to the definition. Correct a calling unit or definition", the matching of the numbers between the real argument and the virtual argument of the module a is checked, and if they match, the message is deleted from the message history. For a message "This module includes over 100 steps. Divide the module so that each module includes no more than 100 steps", whether the number of steps for each module exceeds the reference number 100 or not is checked, and if it does not exceed, the message is deleted from the message history. The timing of check and the message to be checked may be, in addition to those described above, such that the messages in the designated range are checked when the user requests to check the messages in the message history, the message to be redisplayed is checked when the message is redisplayed (in this case, the message is not redisplayed if the deletion from the message history is decided as the result of check), or a message in the message history corresponding to an item which caused a good result in the check for the designated items is searched, and if it is found, the message is deleted from the message history.

Figure 42:
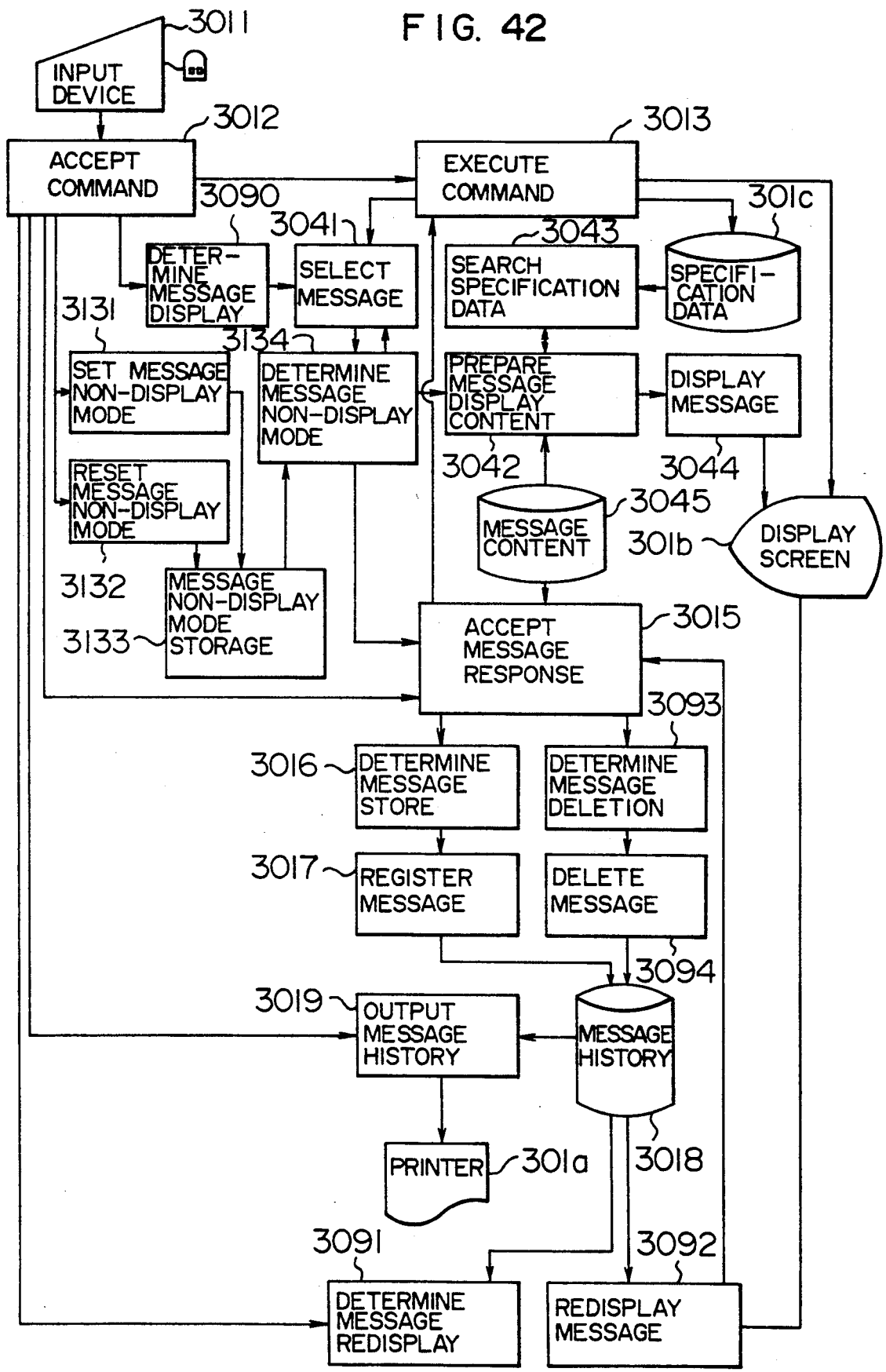
FIG. 42 shows a functional embodiment of an embodiment.

As seen from the above embodiment, in a system which displays the message during the interactive operation, the job may be interrupted by the display of the message if the frequency of display of the message is high, and the efficiency of job may be lowered. One embodiment for solving this problem is now explained. FIG. 42 shows a functional configuration of an embodiment which has a function to set a mode of non-display of message vapor request by the user. It adds a message non-display mode setting process 3131, a message non-display mode release process 3132, a message non-display mode storage 3133 and a message non-display mode determination process 3134 to the functional configurations shown in FIGS. 38 and 35. In the message non-display mode setting process 3131, when a command which requests the setting of the message non-display mode is accepted by the command accept process 3012, the message non-display mode stored in the message non-display mode storage 3133 is set. In the message non-display mode release process 3132, when a command which requests to release the message non-display mode is accepted by the command accept process 3012, the message non-display mode stored in the message non-display mode storage 3133 is reset. The message non-display mode determination process 3134 is started by the message selection process 3041 when a decision to display the message is made in the message display determination process 3040 or the command execution process 3013. In the message non-display mode determination process 3134, the message non-display mode stored in the message non-display mode storage 3133 is referred to determine whether it is in a set state or not, and if it is in the set state, the non-display of the message is instructed to the message selection process 3041, and the non-display of the message is informed to the message response accept process 3015. If it is not in the set state, no action is taken. In the message selection process 3041, message display content preparation process 3042, message display process 3044 and specification data search process 3043, the same processes as those of FIG. 38 are carried out if nothing is instructed by the message non-display mode determination process 3134. On the other hand, when the message non-display mode determination process 3134 instructs not to display the message, the message selection process 3041 does not execute the message selection, and the message display content preparation process 3042, the message display process 3044 and the specification data search process 3043 are not executed. In the message response accept process 3015, when the non-display of the message is informed by the message non-display mode determination process 3134, the same process as that for the "reserve" accepted as the response to the message is executed. In this manner, in the state in which the message is to be displayed, the message is not displayed while the message non-display mode is set, and the message to be displayed is stored in the message history as the "reverse" state. Thus, the interruption of job by the display of the message during the interactive operation is prevented and means for referring the message later is retained. The user may effectively utilize the message non-display mode at his/her will to attain high efficiency job.

An embodiment in which evaluation in multi-state level (multi-stage evaluation) is made to determine to what extent the user executed the request message is now explained. In the multi-stage evaluation, the degree of execution by the user for the request message is evaluated not only by "done perfectly" or "not yet done" but also by several levels for intermediate vogue stages. In the present embodiment, four levels "done perfectly", "said to do", "likely to have done" and "not yet done".

Figure 43:
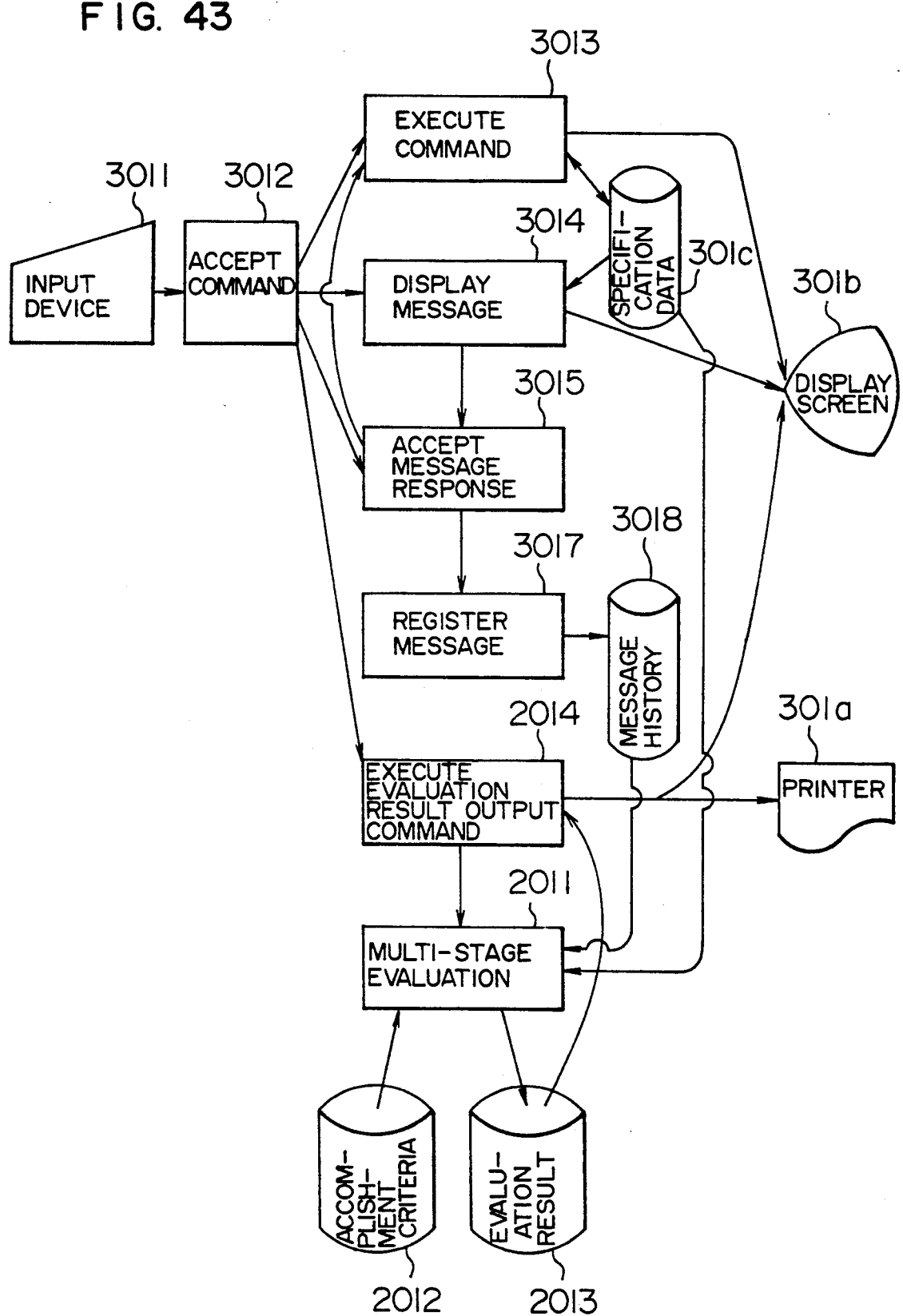
FIG. 43 shows a functional embodiment of an embodiment of the present invention.

FIG. 43 shows a functional configuration of the present embodiment.

In a multi-stage evaluation process 3011, the multi-stage evaluation is made for the request message displayed in the past and stored in the message history 3018 when the user enters a command to output an evaluation result.

In the multi-stage evaluation process 2011, the degree of accomplishment of the user for the request message is determined in accordance with predetermined criteria of accomplishment criteria 2012 by referring the information in the specification data 301c corresponding to the requested content and the information in the message history 3018 which stores the content of the displayed message and the content of the user response thereto. The result of determination is stored in an evaluation result 2013 together with the content of the request message.

In the multi-stage evaluation process 2011, the decision is made not only based on the specification data 301c and the message history 3018 but also by referring the evaluation result of the past multi-stage evaluation mode for the same message. It is stored in the accomplishment criteria 2012, which is referred to.

In the multi-stage evaluation process 2011, after the above evaluation, the post-evaluation process determined by the accomplishment criteria 2012 is accordance with the evaluation result is executed. Depending on the evaluation result, another message may be displayed or another command may be executed.

In the evaluation result output command execution process 2014, when the user enters the command to output the evaluation result, it is executed. In the evaluation result output command execution process 2014, the multi-stage evaluation process 2011 is started to make the multi-stage evaluation for the request message stored in the message history 3018. The result of the multi-stage evaluation outputted to the evaluation result 2013 through the execution of the multi-stage evaluation process 2011 is read and edited, and it is outputted to the display screen 301b or the printer 301a.

A process from the display of the request message to the multi-level evaluation in the present embodiment is now explained.

Figures 44A, 44B:
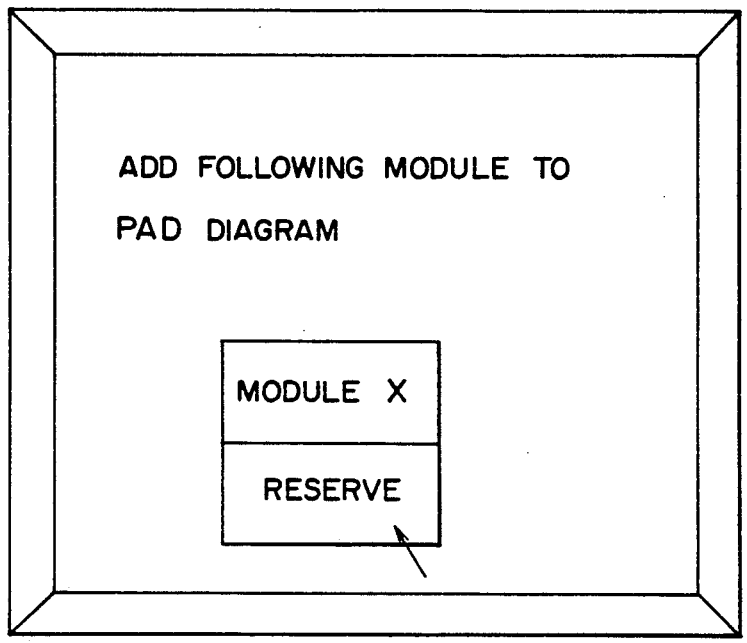
FIGS. 44A and 44B show examples of display of message and table which stores a content of message.

FIG. 44A shows a status in which the request message is displayed on the display screen 301b by the message display process 3014 and a response menu for the request message ([module x]and [reserve]in FIG. 44A) is selected by the user. The content of the request message can be referred from the message content 3045 shown in FIG. 44B. When the user select one from the response menu, the content selected by the message response accept process 3015 (response to the message) is accepted, the message text and the content of the user response are stored in the message history 3018 by the message history registration process 3017, and the item defined by the post-response operation 2022 in FIG. 44B is executed by the command execution process 3013. The content of the message history 3018 is shown in FIG. 45A. The history of the request message shown in FIG. 44A is shown in a line 2031. In the present embodiment, the user selects the "reserve" in FIG. 44A. When the "reserve" is selected, no action is taken because no item to execute is defined in the post-response operation 2022.

A process of inputting the command to output the evaluation result by the user and executing the multi-stage evaluation for the request message is now explained with reference to FIGS. 45B and 45C. FIG. 45B shows the content of the accomplishment criteria 2012, and FIG. 45C shows the content of the evaluation result 2013. When the command to output the evaluation result is inputted, the message is read from the message history, and the same accomplishment criteria as corresponding to the message code of the message are read from the accomplishment criteria 2012. (For example, for the message code 3 in the line 2031 of FIG. 45A, the accomplishment criteria for the message code in 2032 of FIG. 45B are read.) The accomplishment criteria 2012 set multi-stage accomplishment criteria (four criteria in FIG. 45B) for one message. The accomplishment criteria means condition texts which define the user's accomplishment to the request message. The condition texts are analyzed and the level which meets the condition is searched, and the evaluation column corresponding to the level which meets the condition is set as the evaluation result.

The accomplishment criteria method is now explained for the accomplishment criteria of the message code 3 of FIG. 45B. The time relationship of the (PAD registration data and time) and the (message history registration date and time), and the accomplishment criteria for the (message history response content) are shown. For the (PAD registration date and time), the registration date and time of the PAD in the specification data 1c is examined, and for the (message history registration date and time), the registration data and time of the previous multi-stage evaluation for the same message in the message history 3018 is examined. For the (message history response content), the content of the user response for the same message in the message history 3018 is examined. It is assumed that the condition that the (PAD registration date and time) is later than the (message history registration date and time) and the (message history response content) is "reserve" is met. This means that the specification data has been updated in spite of the user's selection of "reserve" for the request done at the time of display of the message. Accordingly, it is guessed that the user has executed the request, and the evaluation result is "likely to have done". In order to make exact decision to the request message, another message for confirming "done/not done" is displayed. By setting the post-evaluation process based on the evaluation result, more exact accomplishment for the request message is attained. The evaluation result is stored in the evaluation result 2013 as shown by 2033 in FIG. 45C.

Figure 46:
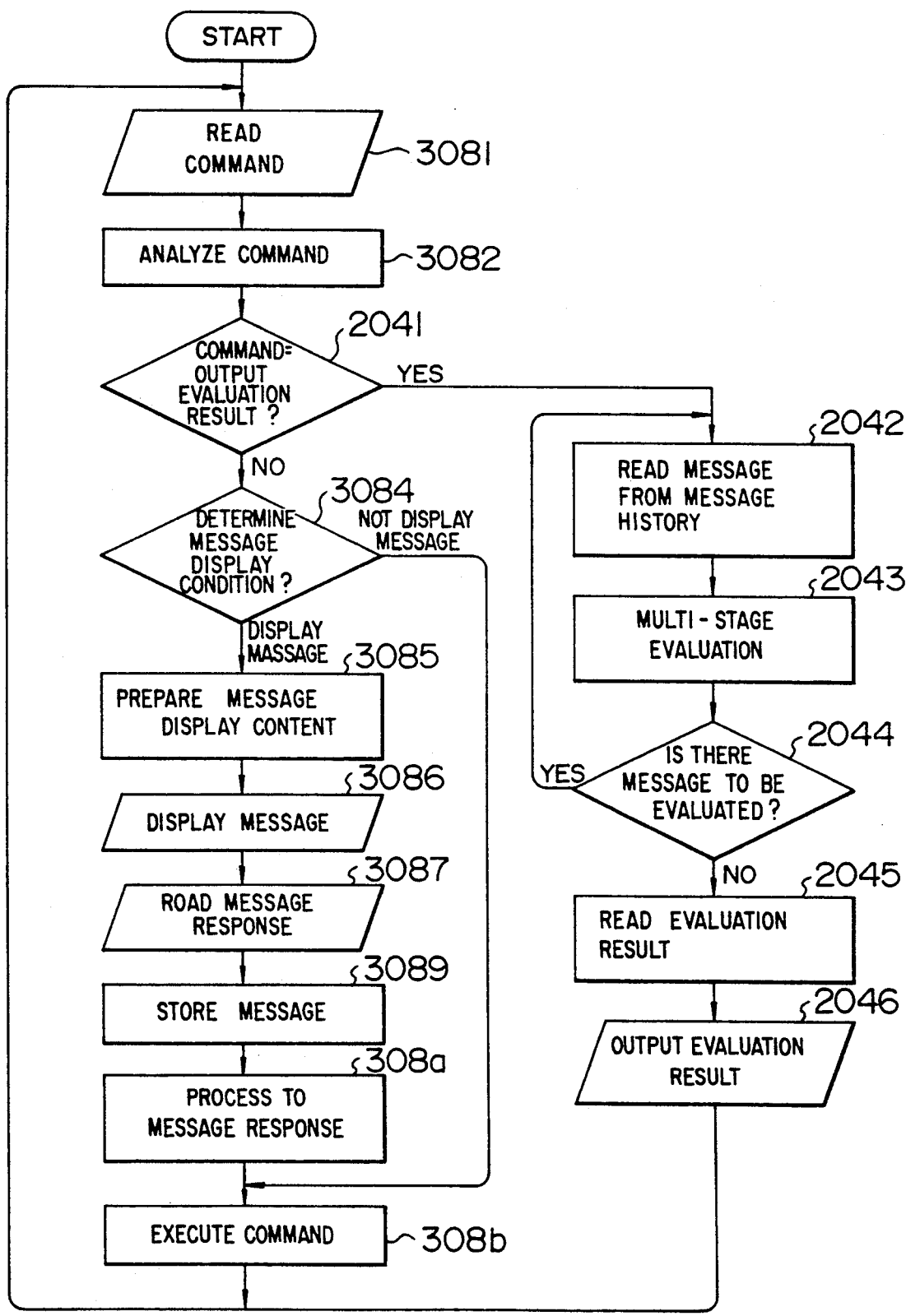
FIG. 46 shows a flow chart of the embodiment.

A process flow of the multi-stage evaluation done in the present embodiment is explained with reference to FIG. 46. FIG. 46 shows a flow chart of the multi-stage evaluation. In a step 3081, a command from the user is read. In a step 3082, the content of the command is analyzed. If the command is to output the evaluation result, a step 2041 executes a step 2042, and otherwise executes a step 3084. In the step 3084, whether a message is to be displayed or not is determined. In a step 3085, the content of the message to be displayed is prepared, and the message is displayed in a step 3086. In a step 3087, a response from the user to the displayed request message is accepted. In a step 3089, the content of the displayed message and the content of the user response to the message are stored in the message history 3018. In a step 308a, a process after the display of the message, based on the user response to the message is executed. In a step 308b, the command read in the step 3081 and analyzed in the step 3082 is executed. In a step 2042, the message displayed in the past is read from the message history. In a step 2043, the multi-stage evaluation is made to the message read in the step 2042. (Detailed will be explained in FIG. 47). In a step 2044, whether there is any message in the message history which has not yet been multi-stage-evaluated is determined. If there is, the process returns to the step 2042, and if there is not, the process proceeds to a step 2045. In the step 2045, the evaluation result is read from the evaluation result 2013 which stores the result of the multi-stage evaluation done in the step 2043. In a step 2046, the evaluation result is outputted to the display screen 301b or the printer 301a.

Figure 47:
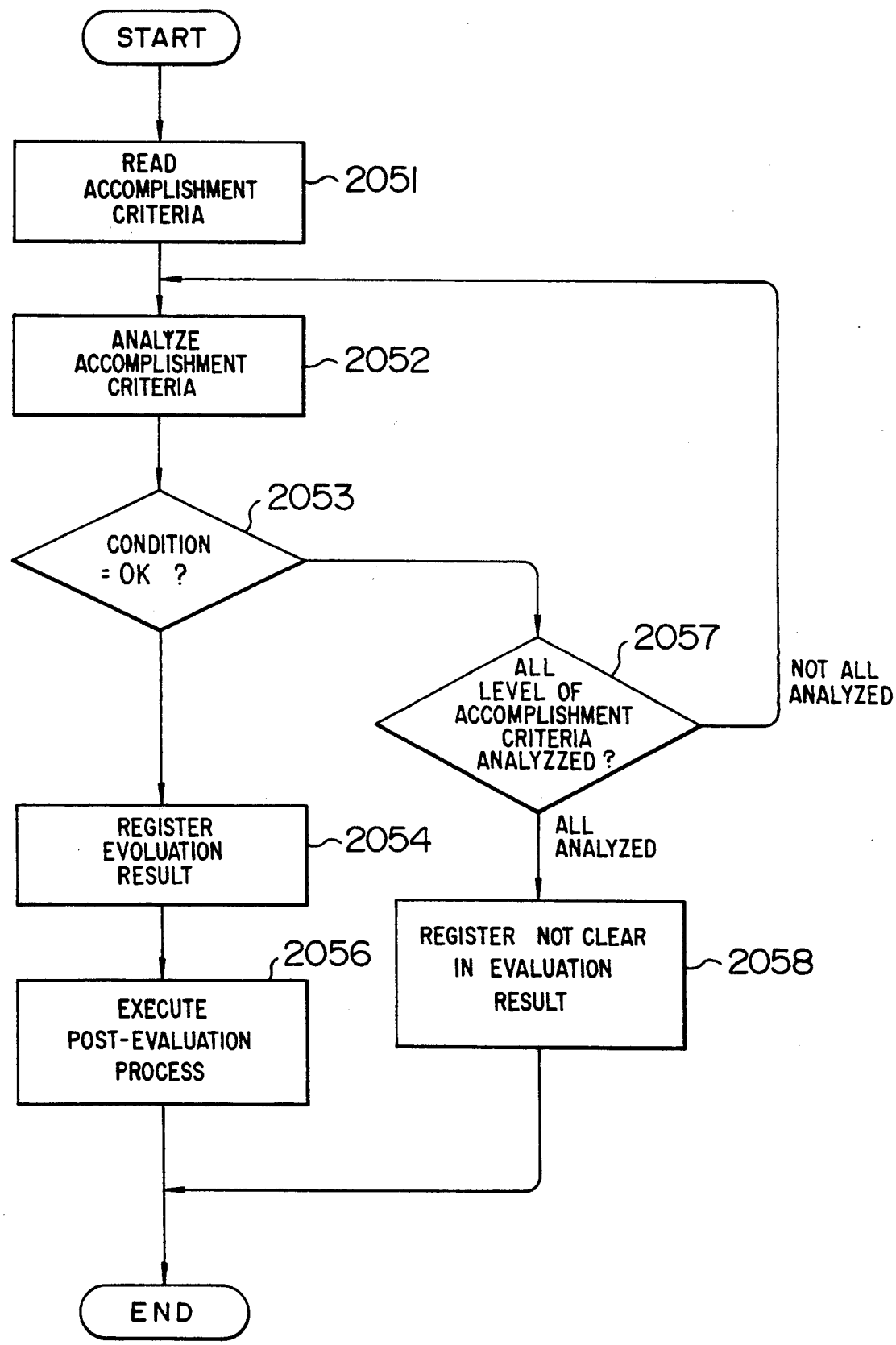
FIG. 47 shows a detailed flow chart of multilevel evaluation.

FIG. 47 shows a detailed flow chart of the multi-stage evaluation process 2043 of FIG. 46. When the multi-stage evaluation process 2043 is executed, a message code of the message to be evaluated is available. In a step 2051, the same accomplishment criteria as that of the message code are read from the accomplishment criteria 2012. In a step 2052, one level is selected from the multi-stage accomplishment criteria levels and it is analyzed. In a step 2053, whether the accomplishment of the level is met or not as the result of the analysis in the step 2052 is determined. If the condition is met, the level ("said to do", "likely to have done", etc.) and the message are stored in the evaluation result 2013 in a step 2054. In a step 2056, the process after the evaluation based on the evaluation result is executed. If the condition is not met in the step 2053, whether all levels of the read-in accomplishment criteria have been analyzed or not is determined in a step 2057. If there is a level which has not yet been analyzed, the process returns to the step 2052 and the accomplishment criteria of the remaining level are analyzed and determined. When all levels of the accomplishment criteria have been analyzed, it is indicated that there is no level which meets the corresponding accomplishment criteria. In a step 2058, "not clear" is stored in the evaluation result 2013 to represent that the accomplishment of the message is not clear. Such a case may be avoided by setting the accomplishment criteria so that "not clear" decision of the accomplishment will not be made.

Figure 48:
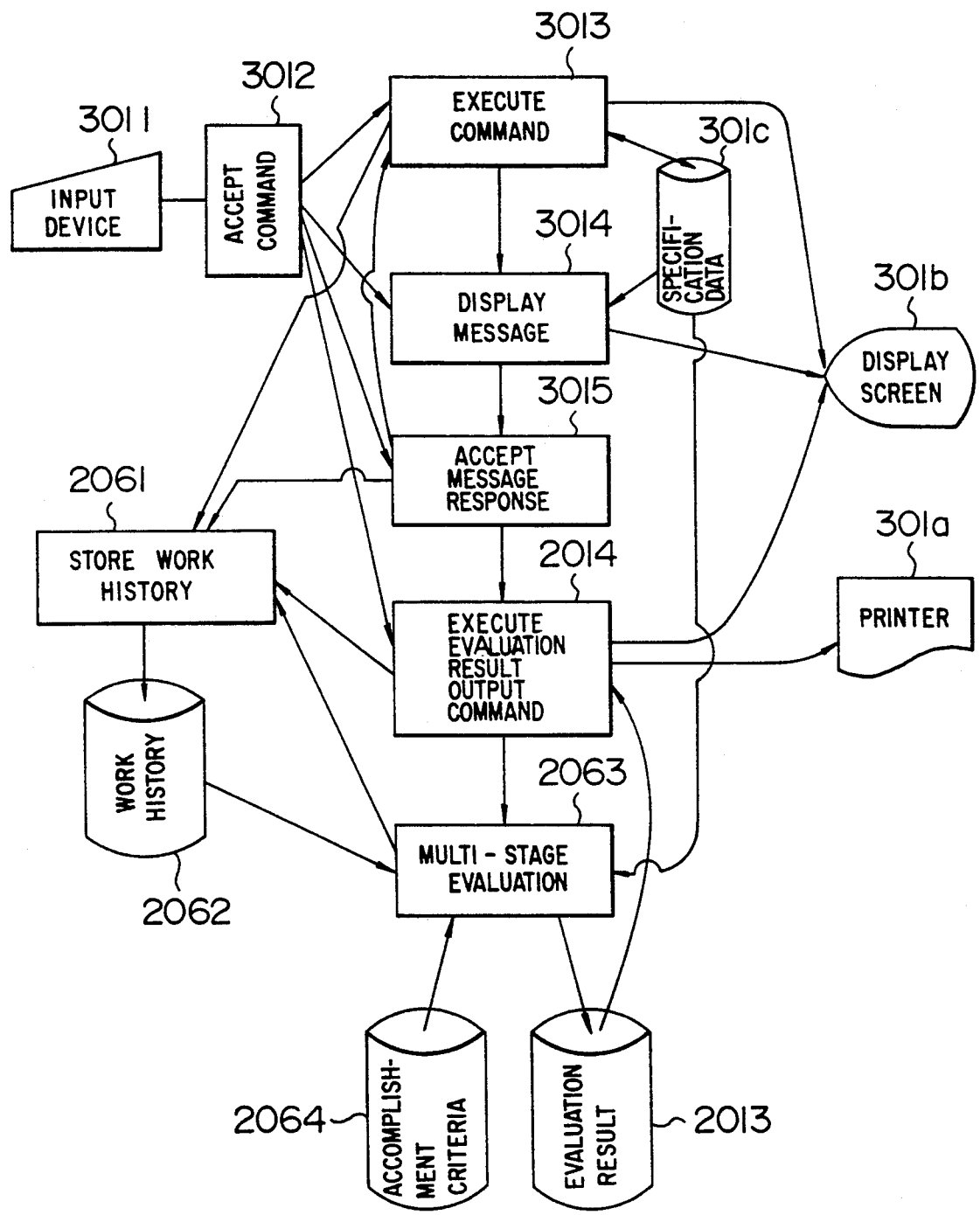
FIG. 48 shows a functional configuration of an embodiment.

An embodiment in which work history is used instead of the multi-stage evaluation by the message history 3018 is now explained. The work history stores operations which the user carried out to the system. FIG. 48 shows a functional configuration of the embodiment in which the multi-stage evaluation is made by using the work history.

In a multi-stage evaluation process 2063, when the user inputs a command to output the evaluation result, it is executed by an evaluation result output command execution process 2014. In the multi-stage evaluation process 2063, when the accomplishment to the request message is determined, not only the specification data 301c corresponding to the request message and the evaluation result 2013 which stores the evaluation result of the same message which was previously evaluated are referred, but also the work history 2062 which stores the user operations to the system is referred.

A work history store process 2061 stores the command which the user inputs (including the command to output the evaluation result) in the work history 2062, and also stores the content of the user response to the message when the message is displayed.

The content of the work history 2062 is explained with reference to FIGS. 49A and 49B. The work history 2062 comprises a work history table (FIG. 49A) and a work history command format table (FIG. 49B). The work history table comprises an object specification column, a command column, a command data item column and a registration data and time column. The object specification column stores a specification by which the user inputted a command. The command column stores a content of the command which the user inputted. The command data item column stores a content of a data item to the command. Because the number of data items and the type of data vary from command to command, the number of data items and the type of data item content are stored in the work history command format (FIG. 49B). When the content of the data item of the work history 2062 is to be checked, this table is referred. FIG. 49C shows the content of the accomplishment criteria 2064 which sets the accomplisment criteria to make the multi-stage evaluation by using the work history 2062.

Figure 50:
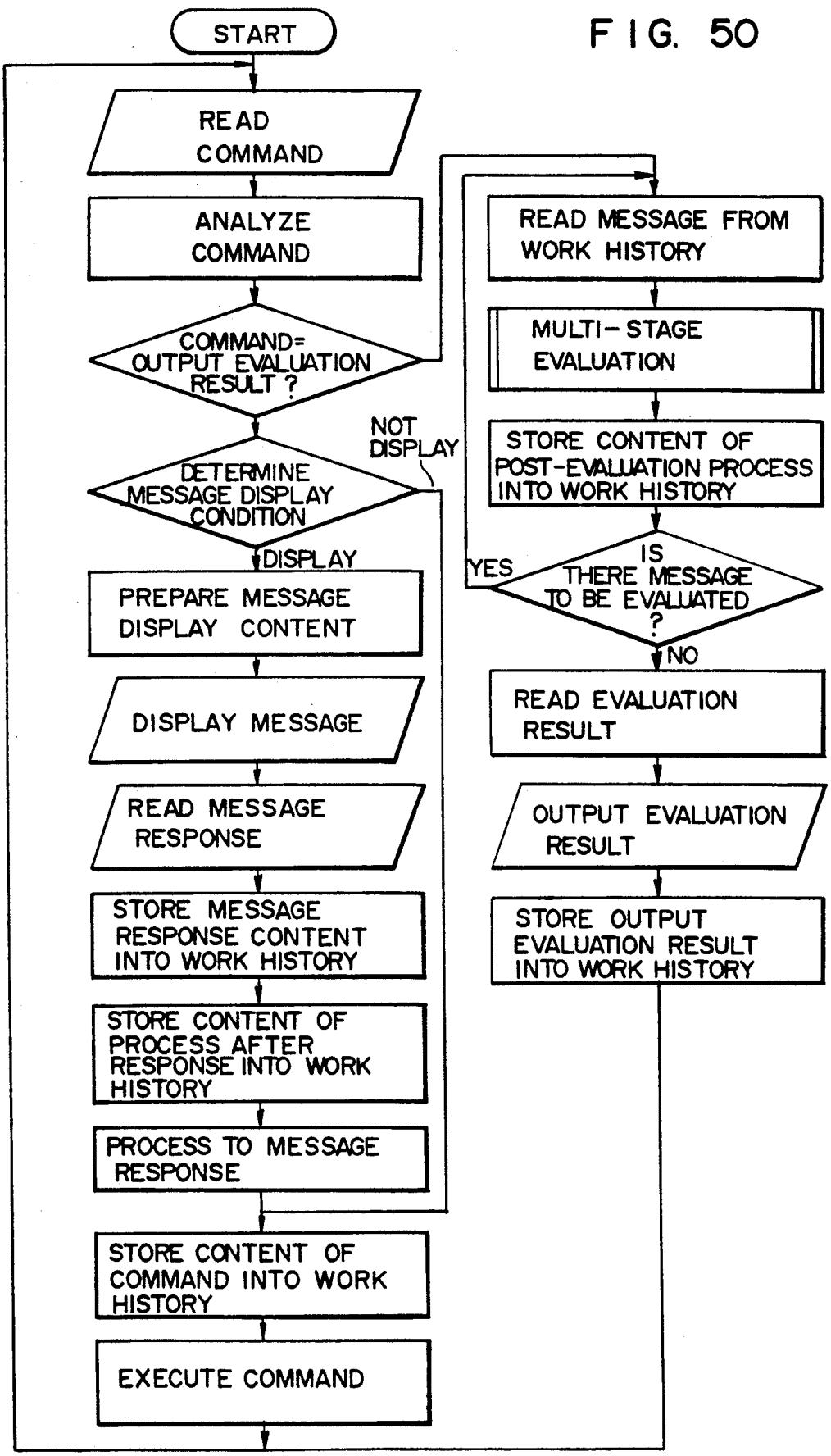
FIG. 50 shows a flow chart of the embodiment.

FIG. 50 shows a flow chart of a process to execute the multi-stage evaluation process 2063 by using the work history 2062. It is different from the process flow of the multi-stage evaluation which uses the message history 3018 of FIG. 46 in that a step 2081 for storing the content of the message response in the work history 2062, a step 2082 for storing the content of the process after the execution which is executed in accordance with the content of the message response into the work history 2062, a step 2083 for storing the content of the command read in the step 3081 into the work history 2062, a step 2086 for reading the message to be multi-stage-evaluated from the work history 2062, a step 2084 for storing the content of the post-evaluation process executed in accordance with the evaluation result after the multi-stage evaluation into the work history 2062, and a step 2085 for storing the information of the execution of the evaluation result output command into the work history 2062 are added after the message response read process 3017, and the process relating to the message history 18 is deleted instead. In the present embodiment, the work history 2062 stores the information relating to the commands which the user inputted as well as the content of the message stored in the message history 3018 and the content of the user response thereto. Thus, the work history 2062 stores more information than that stored in the message history 3018 so that more exact multi-state evaluation is attained.

An embodiment which has a function to not only execute the multi-stage evaluation process 2011 when the user inputs the evaluation result output command but also determine the necessity of evaluation in order to execute the multi-stage evaluation process 2011 as required is now explained.

Figure 51:
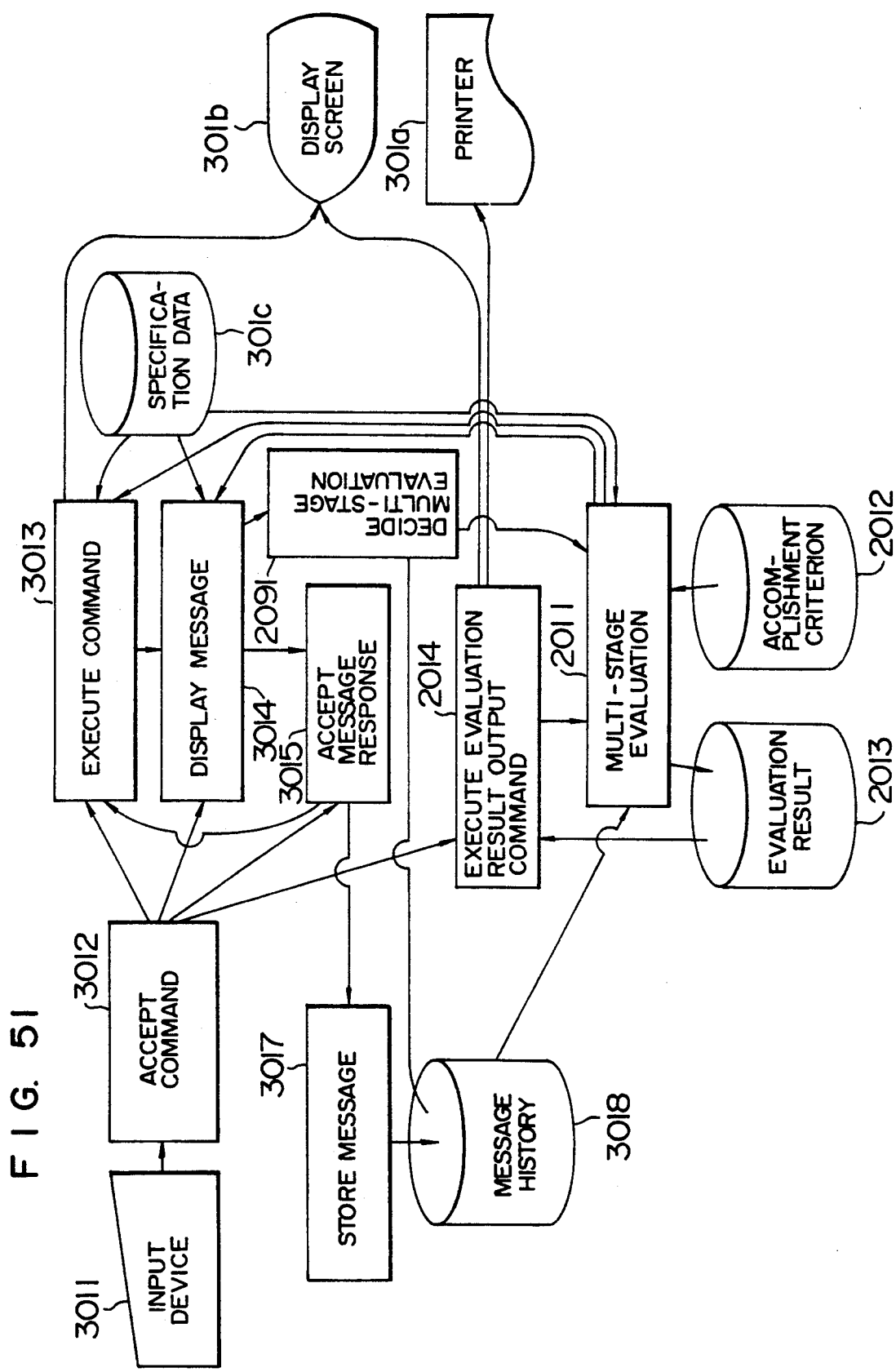
FIG. 51 shows a functional configuration of an embodiment.

A functional configuration of the present embodiment is shown in FIG. 51. In the present embodiment, a multi-stage evaluation decision step 2091 is added to the embodiment shown by the functional configuration of FIG. 43.

In the multi-stage evaluation decision process 2091, whether the multi-stage evaluation is necessary or not for the message to be displayed in the message display process 3014 is determined. In the multi-stage evaluation decision step 2091, whether the message to be displayed has been displayed in the past or not is examined by the message history 3018. If it is the message which has been displayed in the past, the multi-stage evaluation is executed at this time. If the message has not been displayed in the past, there is no necessity to evaluate the message, and the message is displayed by the message display process 3014.

Figure 52:
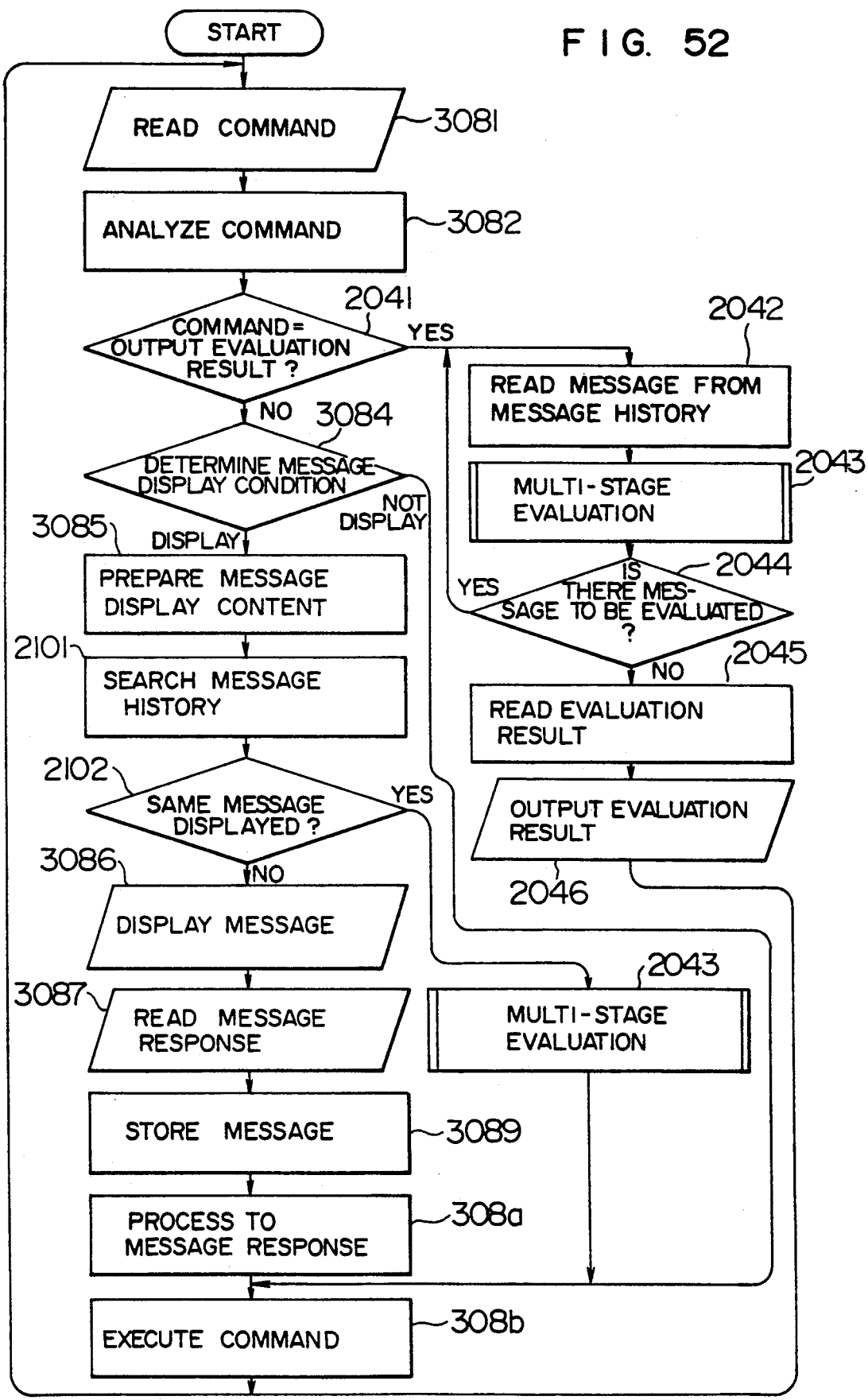
FIG. 52 shows a flow chart of the embodiment.

FIG. 52 shows a process flow of the multi-stage evaluation process 2011 in the present embodiment. In the process flow chart of the present embodiment, a message history search step 2101, and a step 2102 for determining whether the same message has been displayed in the past or not are added to the process flow chart of the embodiment shown in FIG. 46. In the step 2102, whether the message of the same content has been displayed in the past or not is determined by the message history 3018. In the step 2102, if the decision in the step 2101 indicates that the message has been displayed in the past, the multi-stage evaluation process 2043 is executed, and if the message has not been displayed, the message is displayed in a step 3086.

In the process flow chart shown in FIG. 52, the message which was previously displayed and multi-stage-evaluated is also multi-stage-evaluated a function to delete from the message history 3018 the message which need not be multi-stage-evaluated in duplicate (for example, the request message which has been multi-stage-evaluated to have the request surely executed need not be multi-stage-evaluated again), or a function to inhibit the multi-stage evaluation for other than those message whose past multi-stage evaluations in the evaluation result 2013 are "have not done" may be added.

In the present embodiment, the message history 3018 is used. Alternatively, the work history 2062 may be used to attain the same function of the present embodiment.

Figure 53:
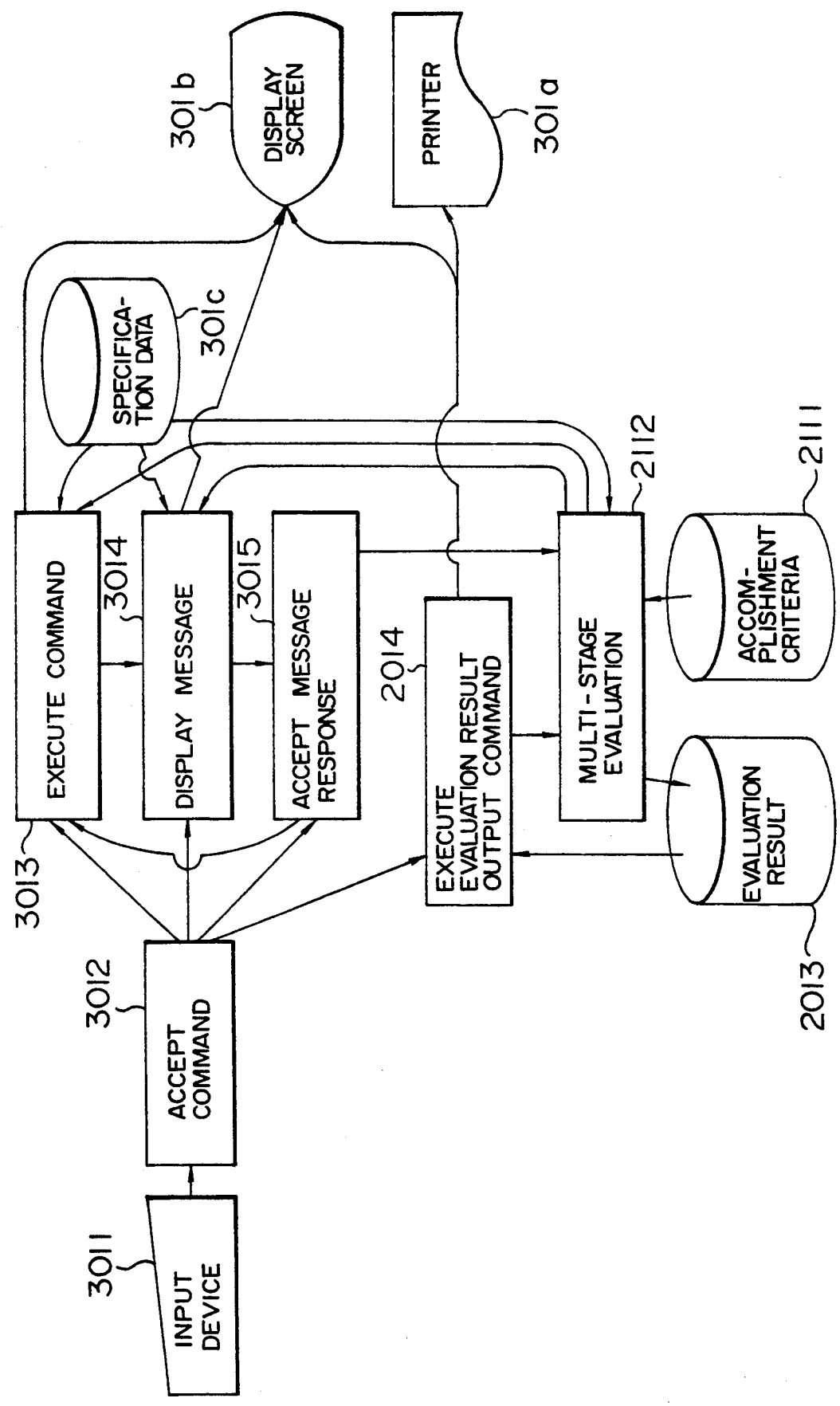
FIG. 53 shows a functional configuration of an embodiment.

An embodiment which makes the multi-stage evaluation without using the message history 3018 or the work history 2062 is shown in FIG. 53. FIG. 53 shows a functional configuration of the present embodiment.

In the functional configuration of the present embodiment, the message registration process 3017 and the message history 3018 are deleted from the functional configuration of the embodiment shown in FIG. 43, and a function to execute the multi-stage evaluation process 2112 from the message response accept process 3015 is added instead. The content of the accomplishment cirteria 2012 has been edited into accomplishment criteria 2111 in accordance with the present embodiment.

In the present embodiment, the multi-stage evaluation is made not only when the user inputs the evaluation result output command but also for the content of response to the message immediately after the user has responded to the displayed request message. Accordingly, the multi-stage evaluation is made twice per message. The content of the accomplishment criteria of the multi-stage evaluation executed when the evaluation result output command is inputted is different from the content of the accomplishment criteria of the multi-stage evaluation executed immediately after the message response has been accepted. The accomplishment criteria 2111 stores the accomplishment criteria for each type of execution of the multi-stage evaluation (namely, for the execution when the evaluation result output command is inputted, and for the execution immediately after the message response has been accepted). FIG. 54 shows a content of the accomplishment criteria 2111 in the present embodiment.

In the accomplishment criteria 2111 of the present embodiment, a type of execution column 2121 for setting the type of multi-stage evaluation based on the accomplishment criteria shown in FIG. 45B is added. In FIG. 54, the accomplishment criteria (a) are used when the multi-stage evaluation is made immediately after the message response has been accepted. The accomplishment criteria (b) in FIG. 54 are used when the multi-stage evaluation is made when the evaluation result output command is inputted. Accordingly, the accomplishment criteria having two types of execution are used for one message (message code 3).

Figure 55:
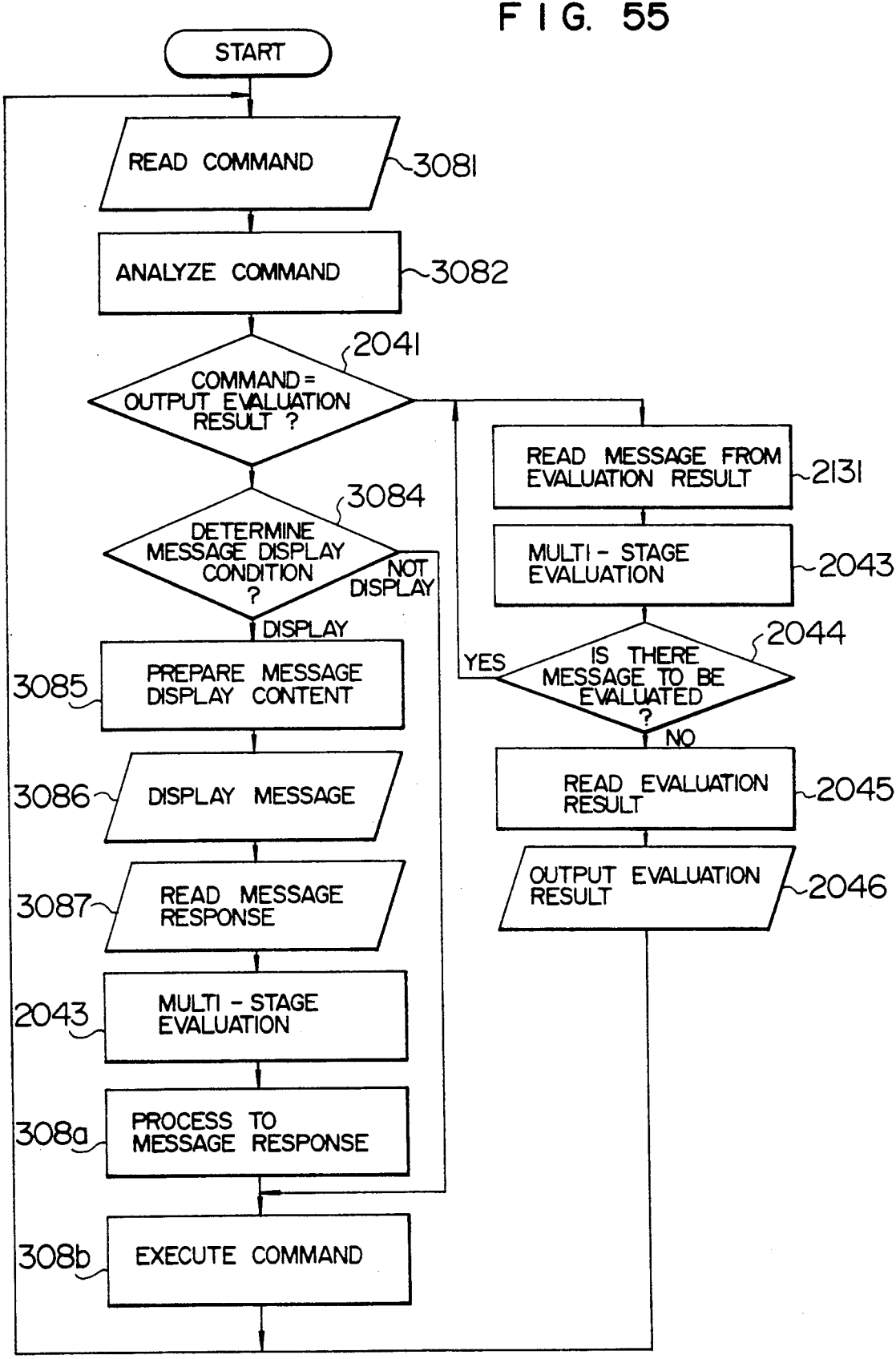
FIG. 55 shows a flow chart of the embodiment.

A process flow of the multi-stage evaluation in the present embodiment is explained with reference to FIG. 55. After the user response to the request message displayed in the step 3086 has been accepted in the step 3087, the multi-stage evaluation process 2043 is started in accordance with the content of the user response. When the user inputs the evaluation result output command, the evaluation result read step 2131 is executed by the step 2041. In the step 2131, the request message which was previously multi-stage-evaluated is read from the evaluation result 2013. The multi-stage evaluation process 2043 is executed for the message read in the step 2131.

According to the process flow of the present embodiment, the multi-stage evaluation is made in duplicate to the request message which has been decided as "have done" in the past. If it is not necessary to make the multi-stage evaluation in duplicate, a function to delete the message which need not be multi-stage-evaluated from the evaluation result 2013 may be added.

By adding the multi-stage evaluation condition decision process 2091 shown in the functional configuration of FIG. 51, a function to make the multi-stage evaluation as required is attained.

By providing to the command accept process 12 a function to limit the command which the user may input or the data which the user may refer or store, in accordance with the content of the evaluation result, it is possible to limit the work content of the user so that the user carries out the content of the request message as much as possible.

Figure 56:
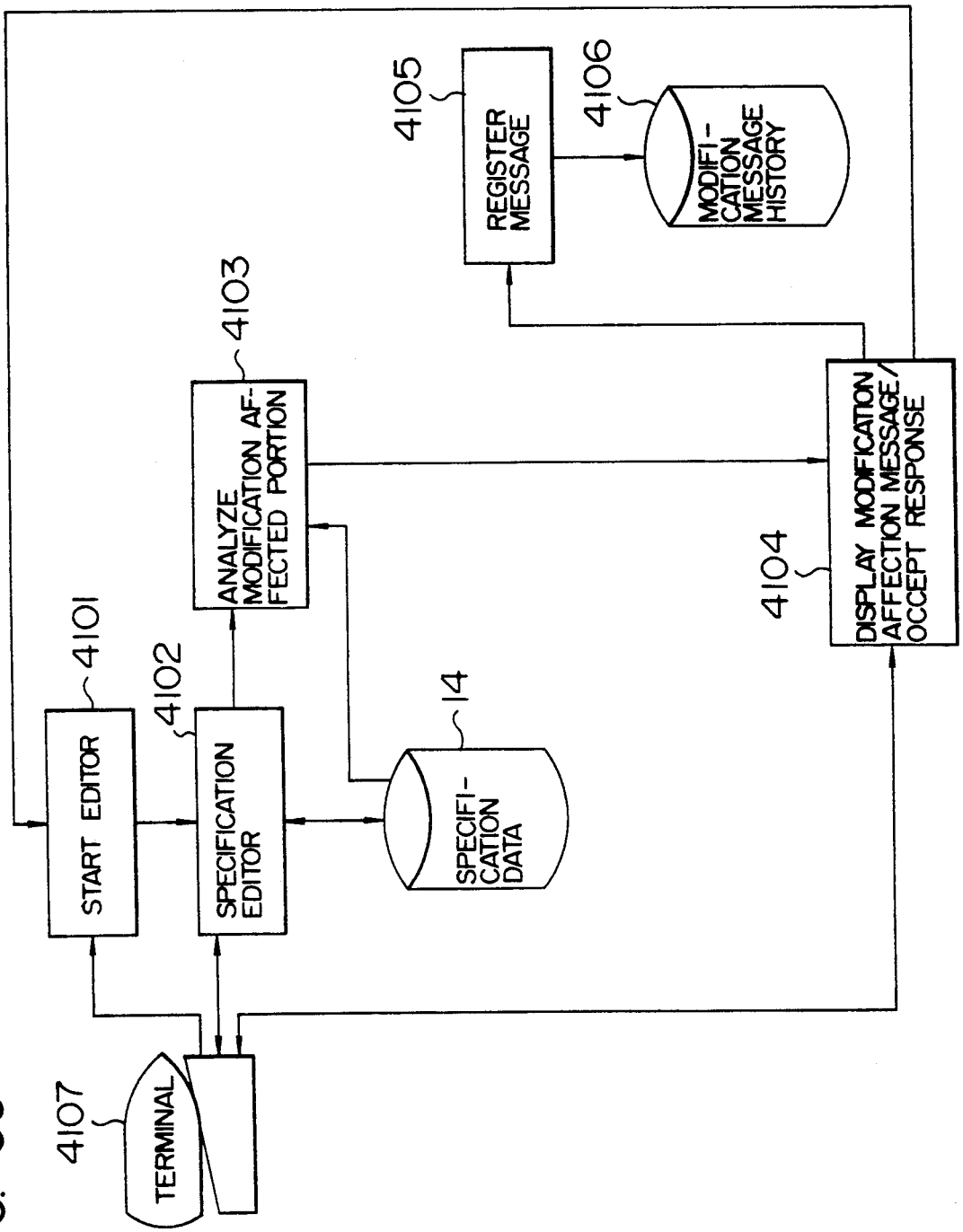
FIG. 56 shows a functional configuration of an embodiment of the present invention.
Figure 59:
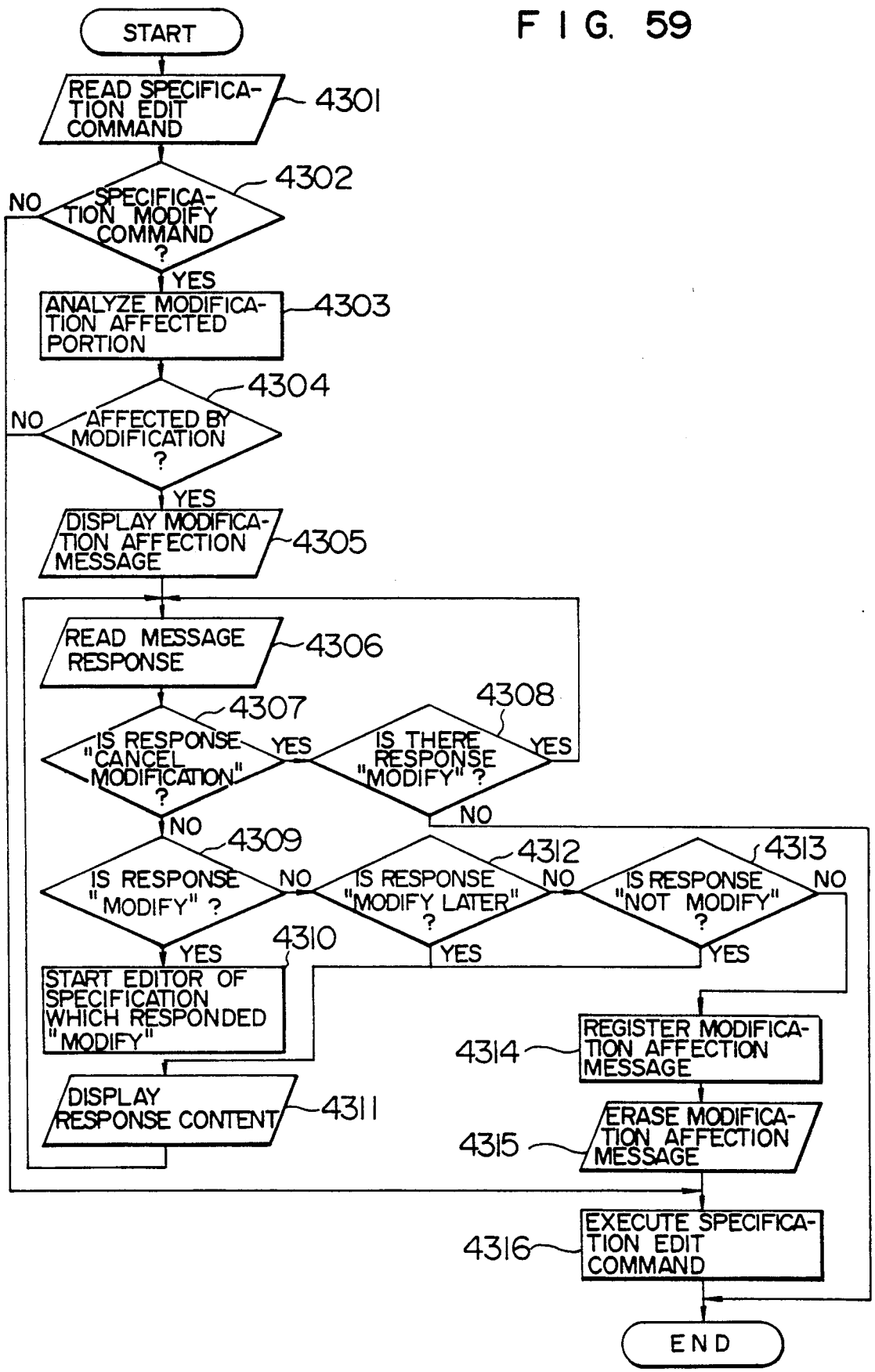
FIG. 59 shows a flow chart of the embodiment.

One embodiment in which the present invention is applied to a system having an editor for editing a specification is now explained. In the present embodiment, a function to display a modification affected portion for the modification as a message and store the content of the displayed message as the history is provided so that the affected portion may be modified later or whether the affected portion has been modified or not may be checked. FIG. 56 shows a functional configuration of the present embodiment. A terminal 4107 has the input device shown in FIG. 2 and a display screen. In an editor start process 4101, a specification editor 4102 is started. The specification editor 4102 interactively edits a specification stored in specification data 14 or a specification shown in FIG. 3 which is newly prepared, in accordance with a user command inputted from the terminal 41, and the edited specification data is stored in the specification data 14. If modification is commanded, the commanded modification content is supplied to a modification affected portion analysis process 4103. In the modification affected portion analysis process 4103, the modification content to the specification is received from the specification editor, the modification affected portion for the modification is analyzed, and the analysis result is supplied to a modification affection message display/response accept process 4104. The method for analyzing the modification affected portion is same as the "modification affected portion analysis" function of FIG. 1 or FIG. 9. In the modification affection message display/response accept process, the modification affected portion is received from the modification affected portion analysis process 4103, it is displayed on the terminal 4107 as the message, and a user response to the displayed message is accepted by the terminal 4107. Depending on the user response, a command to start the specification editor is sent to the editor start process 4101. In the message registration process 4105, the content of the message displayed by the modification affection message display/response accept process 4104, and the response to the message are received and they are registered in the modification affection message history 4106. The modification affection message history 4106 stores the modification affection messages and the corresponding responses. FIG. 57 shows an example of display of the modification affection message displayed by the modification affection message display/response accept process 4104. The content of modification indicated by the specification editor 4102 is displayed at 4201, and information of portions which are possibly affected by the modification is displayed in columns 4202 to 4204. The column 4202 contains a type of specification of the modification affected portion, the column 4203 contains a name of specification of the modification affected portion, and the column 4204 contains a name of item of the modification affected portion. The line 4210 indicates that the item "content of process" of the module specification "B" is possibly affected. Columns 4205 to 4207 are used to input and display the user response for the possibly affected portion displayed in the columns 4202 to 4204 of the same line. When the displayed possibly affected portion is to be modified instantly, the user selects "modify", when the modification of the affected portion is necessary but the modification is to be done later, the user selects "modify later", and when the user decides that modification is not necessary because of no affection, the user selects "not modify". In the modification affection message display/response accept process 4104, if the column 4205 is picked up by a mouse, it is determined that the "modify" has been selected, if the column 4206 is picked up by the mouse, it is determined that the "modify later" has been selected, and if the column 4207 is selected by the mouse, it is determined that the "not modify" has been selected. 4208 and 4209 are menu to erase the display of the message and start the edition of the specification by the specification editor 4102. When the modification displayed at 4201 is to be cancelled, the user selects "cancel modification" and when the display of the message is to be erased after the modification, the user selects "terminate". In the modification affection message display/response accept process 4104, when the menu 4208 is picked up by the mouse, it is determined that the "cancel modification" has been selected, and when the menu 4209 is picked up by the mouse, it is determined that the "terminate" has been selected. FIG. 58 shows an example of content of the modification affection message history 4106. A content of modification, a portion possibly affected by the modification (a candidate of affected portion) and a content of response for the set are stored in each line. Where there are a plurality of candidates of affected portions, there are as many lines having the same content of modification and different candidates of afflected portions as the number of candidates of afflected portions. The content of modification comprises a type of specification 4401 of the modified specification, a name of specification 4402, a type of object to be modified ("module", "external vairable", etc.), a name of object 4404, and modification operation to the object of modification ("add", "delete", "modify" etc.). The type of object 4403, the name of object 4403 and the operation 4405 contain the same ones as those of 4201 on the modification affection message. The candidate of the modification affected portion comprises a type of specification 4406 of the specification which includes the possibly affected portion, a name of specification 4407, and an item in the specification ("content of process", "definition of function", etc.) which is possibly affected. The content of response designated on the display screen of the modification affection message (one of "modify", "modify later" and "not modify") is stored in 4409. FIG. 59 shows a flow chart of a process in the present embodiment. It shows a process flow for one specification edit command by the user. In a step 4301, a specification edit command inputted from the terminal 4107 by the specification editor 4102 is read. In a step 4302, whether the read-in command commands the modification of the specification or not is determined, and if it commands the modification of the specification, a step 4303 is executed, and if it does not, the command is executed in a step 4316 and the process is terminated. In a step 4303, the candidate of the modification affected portion is analyzed by the modification affected portion analysis process 4103. In a step 4304, whether the candidate of the modification affected portion has been found or not by the analysis is determined. It it has been found, a step 3405 is executed, and otherwise the specification edit command read in the step 4301 is executed in a step 4316 and the process is terminated. In the step 4305, the modification affection message is prepared by the modification affection message display/response accept process 4104 based on the result of analysis in the step 4303, and it is displayed on the terminal 4107. In a step 4306, the user response to the message displayed in the step 4305 is read by the modification affection message display/response accept process 4104. In a step 4307, whether the read-in response is "cancel modification" or not is determined, and if it is "cancel modification", whether there is a candidate of modification affection whose response to the message is "modify" is determined, and if there is such candidate, the response "cancel modification" is invalidated and the process returns to the step

4306. If there is no candidate whose response is "modify", no action is taken and the process is terminated. A purpose of a step 4308 is to prevent the cancellation of the original modification and the modification of only the affected portion when the "cancel modification" is responded after the response of "modify" and after the modification of the affected portion by the started specification editor. If the decision in a step 4307 is that the response is not the "cancel modification", a step 4309 is executed. In the step 4309, whether the response read in the step 4306 is "modify" or not is determined. If it is "modify", a step 4310 starts the specification editor to the specification of the candidate of the modification affected portion whose response is "modify", and a step 4311 color-displays the response read in the step 4306 at a corresponding position (4205, 4206 or 4207) on the display screen of the modification affection message. Then, the process returns to the step 4306 to read the response for the remaining candidate of modification affection. If the decision in the step 4309 is not the "modify", a step 4312 is executed. In the step 4312, whether the response read in the step 4306 is "modify later" or not is determined. If it is the "modify later", the content of response is displayed in a step 4311 and the process returns to the step 4306 to read the response for the remaining candidate of modification affection. If the decision in the step 4312 is not the "modify later", a step 4313 is executed. In the step 4313, whether the response read in the step 4306 is "not modify" or not is determined. If it is the "not modify", the content of response is displayed in a step 4311, and the process returns to the step 4306 to read the response for the remaining candidate of modification affection. If the decision in the step 4313 is not the "not modify", it means that the response is "terminate". In this case, a step 4314 registers the modification affection message displayed by the message registration process 4105 in the step 4305 and the responses to each of the candidates of the modification affected portions in the message read in the step 4306, into the modification affection message history 4106, and a step 4315 erases the displayed modification affection message. Finally, a step 4316 executes the specification edit command read by the specification editor 4102 in the step 4301. In the present embodiment, the specification editor is operated under the multi-task environment so that the editor of the specification which responded "modify" can be started in another task. Thus, the started editor can be processed in parallel with the reading of the response to the message in the step 4306 and the user may respond to the remaining candidate of the modification affected portion after he/she has modified the specification which responded "modify", or may respond to the modification affection messages for all candidates and collectively modify the affected portion after the editors of all specifications which responded "modify" have been started, or may select any procedure of process. In the present embodiment, the candidate of the modification affected portion which responded "not modify" is also stored in the modification affection message history 4106. If the data amount in the modification affection message history 4106 is too large, the candidate of the modification affected portion which responded "not modify" may not be retained. In this case, however, when it is desired to check later what decision the user has made to the modification affection message, those which responded "not modify" are not retained in the history and no check can be made for such responses.

Figure 60:
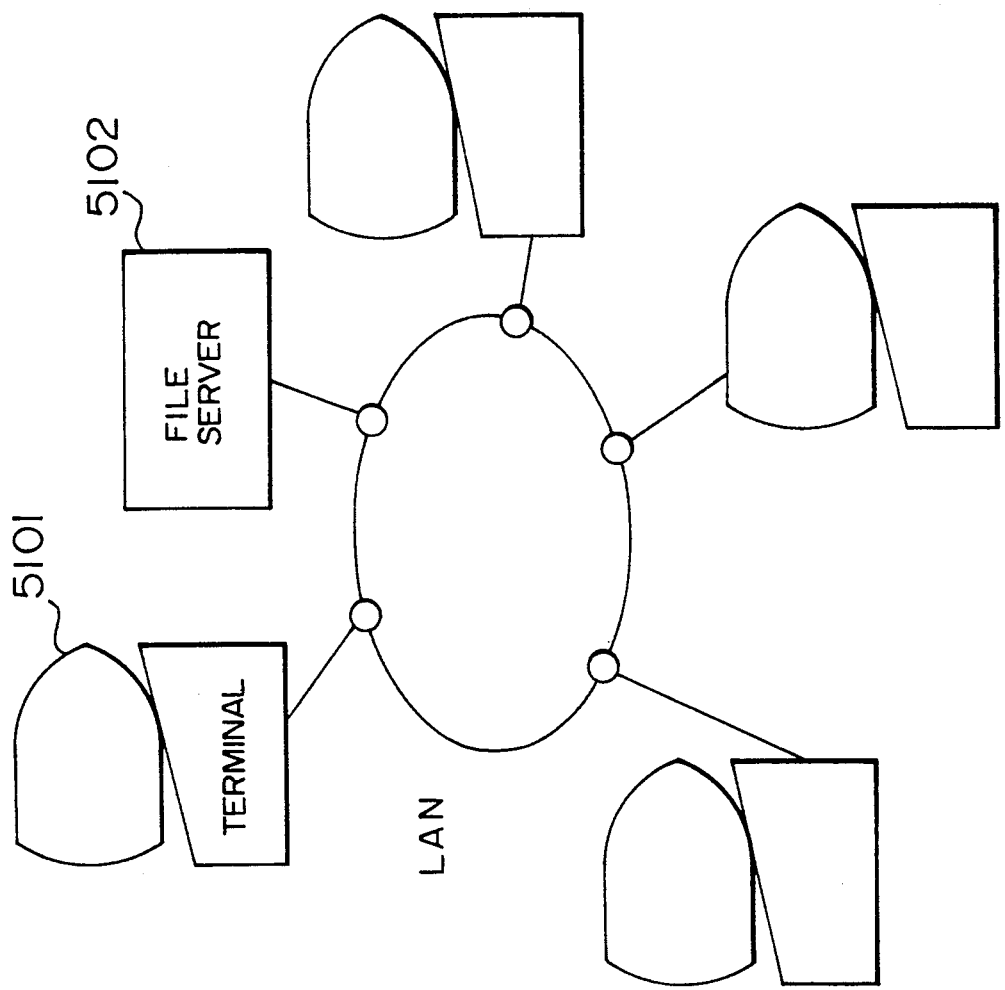
FIG. 60 shows a plurality of terminals interconnected by a LAN.

In the above embodiments, the present invention is implemented in an environment in which one person develops one system. An embodiment which implements the present invention in an environment in which one system is developed by a plurality of persons is now explained. FIG. 60 shows a hardware configuration which illustrates an environment in which a plurality of terminals are used by a plurality of persons. Numeral 5101 denotes one of terminals connected by a LAN. Numeral 5102 denotes a file server which has an editor started on the plurality of terminals and holds data which are shared in the present invention.

Figure 61:
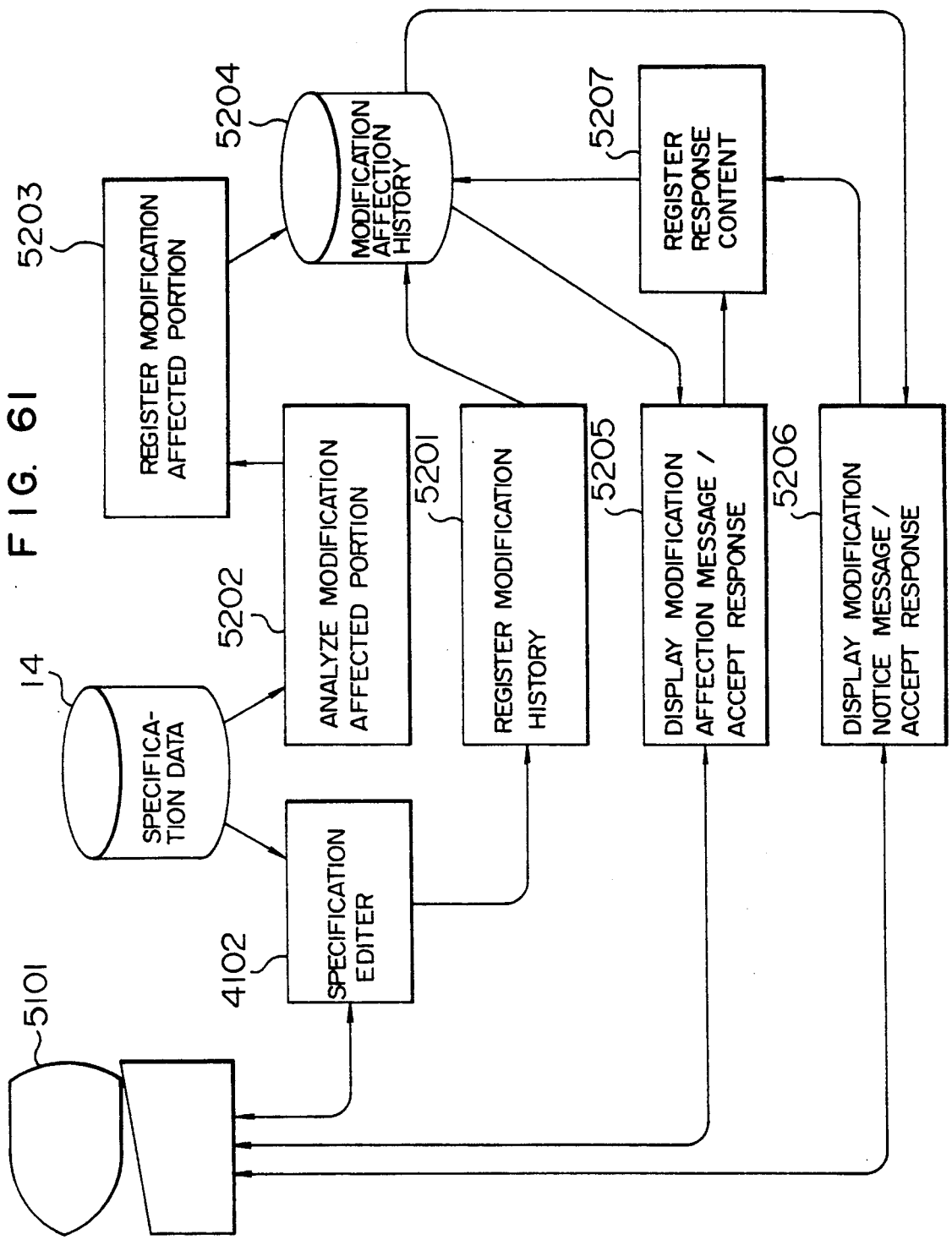
FIG. 61 shows a functional configuration of an embodiment.

FIG. 61 shows a functional configuration of the present embodiment.

In the present embodiment, a modification affection message which indicates what other specification is affected by the modification of one specification, and a modification notice message which indicates the affection by the modification of other specification. The modification affection message displays the modification affected portion to the content of modification made from the start to the end of the operation of the specification editor, at the time when the edition of the specification is completed. The modification notice message displays the modification of other specification at the start and end times of the operation of the specification editor. The purpose for displaying at the end time of the operation of the specification editor is to make the user confirm whether the portion affected by the modification of other specification has been modified by the end time.

The terminal 5101 is one of a plurality of terminals connected by the LAN. In a modification history registration process 5201, the specification data 14 modified by the specification editor 4102 is registered into a modification affection history 5204 (to be described later) as the modification history. In a modification affected portion analysis process 5202, the portion affected by the modification is analyzed based on the modification history stored in the modification affection history 5204 and the content of the specification data 14. In a modification affected portion registration process 5203, the affected portion analyzed in the modification affected portion analysis process 5202 is registered into the modification affection history 5204. The modification affection history 5204 stores the modification history registered by the modification history registration process 5201. The modification affection history 5204 further stores and holds the analysis result of the modification affected portion analysis process 5202 as the modification affected portion. In a modification affection message display/response accept process 5205, the modification affected portion stored in the modification affection history 5204 is displayed as the modification affection message at the end time of operation of the specification editor in order to inform to the user which specification is affected by the modification of the specification data 14 by the specification editor 4102. The user selects one of three messages, "notify", "not notify yet" and "not necessary to notify" to determine the notice of modification to the displayed modification affected portion. In a modification affection message display/response accept process 5205, the response selected by the user among "notify", "not notify yet" and "not necessary to notify" the modification affection message is received. In a response content registration process 5207, the content of response from the user accepted in the modification affection message display/response accept process 5205 is registered into the modification affection history 5204. Those processes are executed when the operation of the specification editor for the modified specification is terminated. The start of the specification editor 4102 for the specification affected by the modification of other specification is now described. In a modification notice message display/response accept process 5206, when the specification editor 4102 is started, the modification affected portion stored in the modification affection history 5204 to which the user responded to "notify" in the modification affection message display/response accept process 5205 is referred. If the specification which is the object of the started specification editor 4102 is included in the modification affected portion to which the user responded to "notify", the modification affected portion is displayed as the modification notice message to notify the affection by the modification. After the display of the modification notice message, the modification notice message display/response accept process 5206 accepts from the user a response as to whether the user has modified the displayed modification affected portion, or will modify later, or no modification is necessary. In a response content registration process 5207, the response content from the user accepted in the modification notice message display/response accept process 5206 is registered into the modification affection history 5204. When the operation of the specification editor 4102 for the specification affected by the modification is terminated, the modification notice message display/response accept process 5206 is again executed. Whether the user has actually taken action of modifying the modification affected portion or not is again accepted from the user. This is to prevent the failure of action to the modification affected portion caused by other modification. The response content is registered into the modification affection history 5204 in the response content register process 5207.

Figure 62:
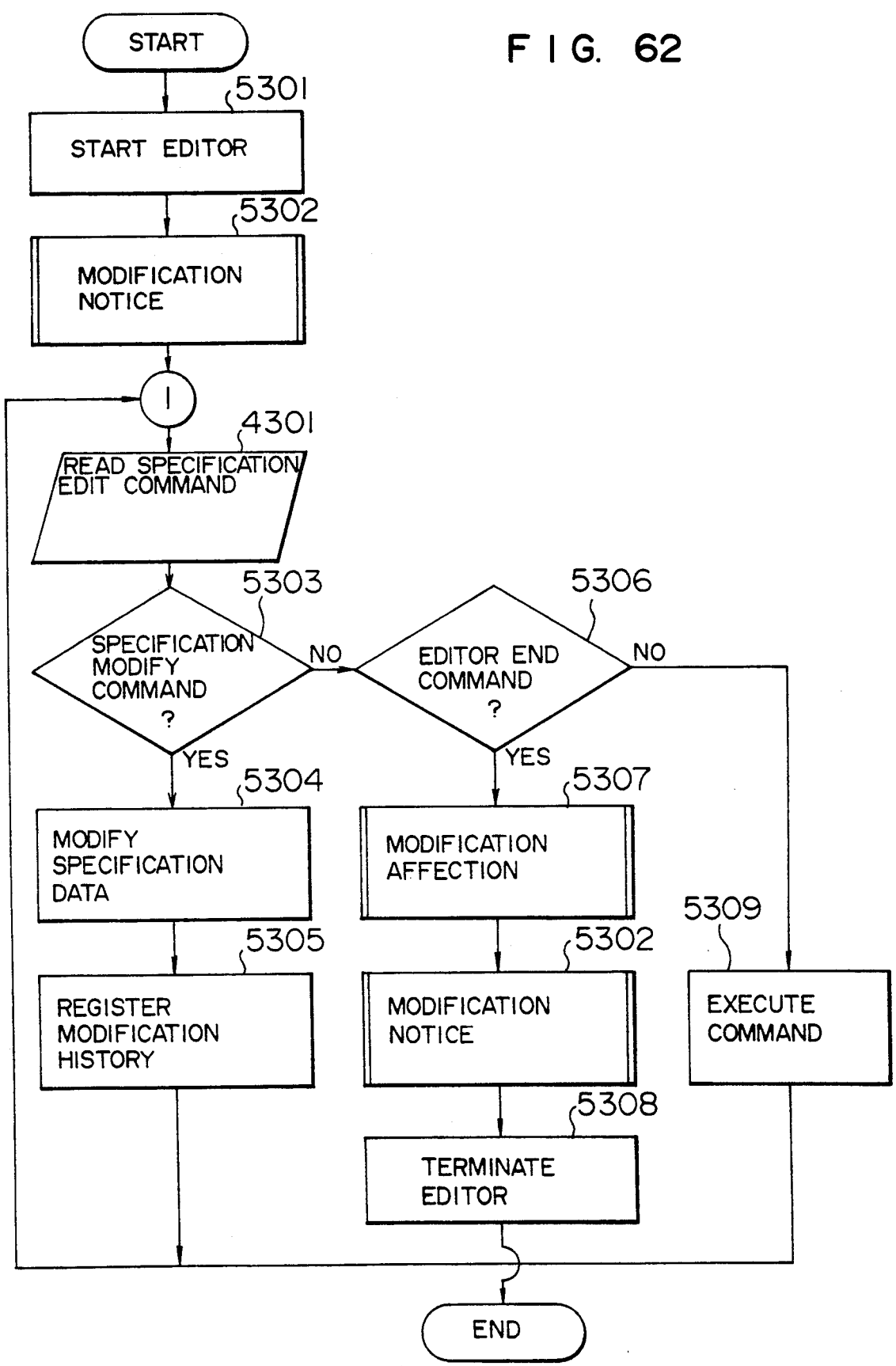
FIG. 62 shows a flow chart of the embodiment.

FIG. 62 shows a flow chart of the present embodiment.

Figure 63A:
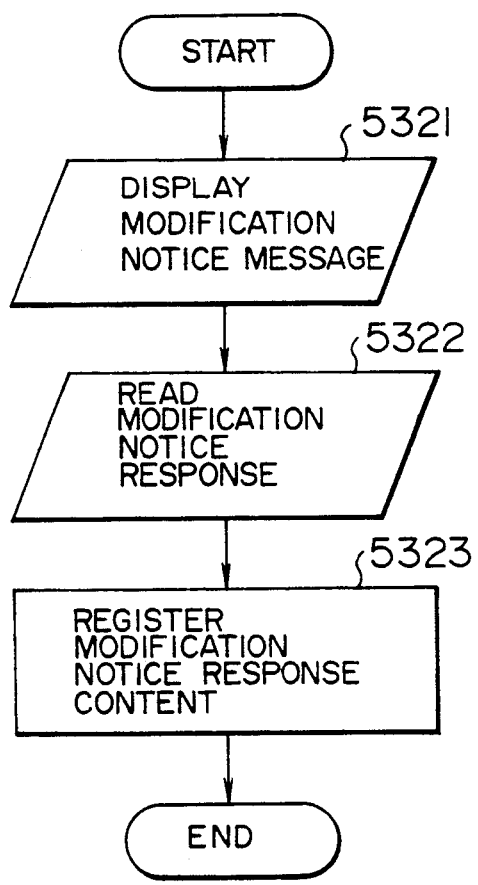
FIGS. 63A and 63B show flow charts which show further detail of the flow chart of FIG. 62, FIGS. 64A and 64B show examples of display of modification affected message and modification notice message.
Figure 63B:
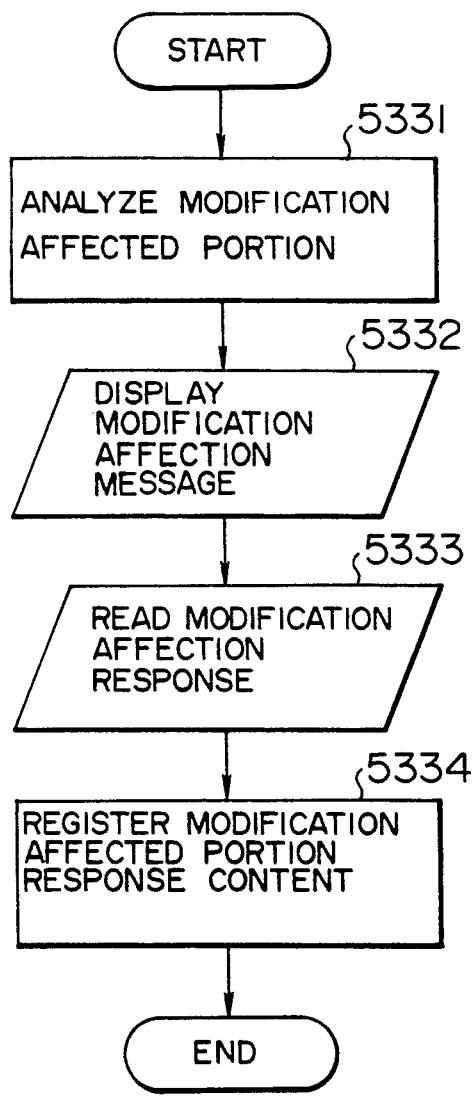

In a step 5301, when the specification data is started, the specification data 14 is read and it is outputted to the terminal 5101 in an initialization step. In a step 5302, if the specification started is affected by the modification of other specification, the modification notice message is displayed. A detailed flow chart is shown in FIG. 63A. In a step 4301, a specification edit command provided by the specification editor is read from the terminal 5101. In a step 5303, whether the specification edit command read in the step 4301 is a specification modify command or not is determined, and if it is the specification modify command, a step 5304 is executed. In a step 5304, the specification data 14 is modified in accordance with the specification modify command. In a step 5305, the modification content of the specification data 14 is registered into the modification affection history 5204 as the modification history. If the decision in the step 5303 is that the specification edit command read in the step 4301 is not the specification modify command, a step 5306 is executed. In the step 5306, whether the specification edit command is an edit end command or not is determined, and if it is the end command, a step 5307 is executed. In the step 5307, whether the modification of the specification data 14 affects to other specification or not is analyzed, and if there is an affected portion, it is displayed as the modification affection message. A detailed flow chart is shown in FIG. 63B. In a step 5308, the displayed specification data is erased from the screen of the terminal, and the operation of the specification editor is terminated. If the decision in the step 5306 is that the command read in the step 4301 is not the end command for the specification editor, a step 5309 is executed. In the step 5309, the specification editor is operated in accordance with the read-in command. After the execution of the step 5309, the process returns to the step 4301 and the input of the next command is monitored.

FIG. 63A shows a flow chart of a process of displaying the affection by the modification of other specification to the specification data which is the object of the started specification editor.

In a step 5321, the affection by the modification is displayed as the modification notice message. In a step 5322, a user response as to whether the affected portion was modified, or will be modified, or not yet modified or is not necessary to be modified, is accepted. In a step 5323, the response content from the user accepted in the step 5322 is registered into the modification affection history 5204.

FIG. 63B shows a flow chart of a process of displaying the affected portion by the modification of the specification. In a step 5331, the modification history registered in the step 5305, that is, the modification content of the specification is referred from the modification affection history 5204, and the affected portion by the modification content is analyzed. In a step 5332, the modification affected portion analyzed in the step 5331 is displayed as the modification affection message. The user responses whether the modification of the specification is notified, or will be notified later, or is not necessary to be notified to the modification affected portion, and the response content is accepted. In a step 5334, the modification affected portion displayed in the step 5333 and the response content accepted from the user are registered into the modification affection history 5204.

FIG. 64A shows an example of modification affection message displayed in the step 5332. A list of the portions affected by the modification is shown by a table. A modification number column 5401 represents the number which identifies the modification content of the specification data. A modification affected portion column 5402 represents the portion affected by the modification by type and name of the specification and an item in the affected specification. A notice column 5403 is used by the user to select whether the modification is to be notified to the modification affected portion, and it is one of three items "notify", "not notify" and "not necessary". When the "notify" is selected, the modification is notified to the modification affected portion. When "not notify" is selected, the modification is not notified and the content is retained. When the modification affection message is displayed again, the same affected portion is displayed again and the response from the user is accepted. When the "not necessary" is selected, the modification is not notified to the modification affected portion and the content is disposed. The selection item in the notice column 5403 is amendable after the selection so long as the message is displayed. The processing along the selected item is actually done after the user has selected "OK" 5404. The "OK" 5404 is a menu selected by the user when the display message is terminated. When the user selects the "OK" 5404, the display screen of the modification affection message is erased, and the modification is notified to the modification affected portion along the user selected item. The selection item and the "OK" 5404 are designated by a mouse in the present embodiment. The designation may be done by a keyboard instead of the mouse.

FIG. 64B shows an example of modification notice message displayed in a step 5321. A source portion of modification column 5501 comprises a modification number to identify the modification content and type and name of the modified specification. An affected portion column 5502 represents the affected portion in the specification by the item in the specification. A countermeasure confirmation column 5503 is used by the user to indicate whether any countermeasure has been taken to the affected portion column 5502. The countermeasure confirmation column 5503 comprises three items "done", "not yet" and "not necessary". The "done" represents that the affected portion has been modified. The "not yet" represents that the affected portion has not yet been modified. The "not necessary" represents that the affected portion need not be modified. The user selects one countermeasure content from the three items in the countermeasure confirmation column 5503. "OK" 5504 is a menu which is selected by the user when the display of the modification notice message is to be terminated. When the user selects this menu, the display screen of the modification notice message is erased and the item of the countermeasure confirmation column 5503 which the user selected is registered into the modification affection history 5204.

FIGS. 65 and 66 show tables of content of the modification affection history 5204. The modification affection history 5204 comprises a modification history table and a modification affection table. The modification history table stores the content of the specification data 14 modified by the specification editor as the modification history. The modification affection table stores the affected portion to the modification content of the specification data 14 stored in the specification history table.

FIG. 65 shows a modification history table. The modification history table comprises a modification number column 5601, a date and time column 5602, a modifier column 5603, a type of specification column 5604, a name of specification column 5605, a type of object column 5606, a name of object column 5607, an operation column 5608 and a work number column 5609. One line of the modification history table corresponds to one modification content of the specification data. The modification number column 5601 indicates an identification number to the modification content of the specification data 14. Whenever the content of the specification data 14 is modified, the number is incremented. The date and time column 5602 contains the date and time of the modification. The modified by column 5603 retains the name of person who modified the specification data 14. The type of specification column 5604 retains the type of specification modified. The name of specification column 5605 retains the name of specification modified. The type of object column 5606 retains the type of specification data 14 modified. The name of object column 5607 retains the name of specification data 14 modified. The operation column 5608 retains how the specification data 14 has been modified. The work number column 5609 retains an identifier for the modification work. The same work number is applied to the modification contents from the start to the end of the specification editor, and the work number is incremented each time the specification editor is started.

FIG. 66 shows a modification affection table. The modification affection table comprises a modification number column 5611, a type of specification column 5612, a name of specification column 5613, an affection item column 5614, a response column 5615, a work number column 5616, and an end/start column 5617. One line of modification affection table represents the portion affected by the modification. The modification number column 5611 corresponds to the modification number of the modification history table and it is the modification content number stored in the modification history table. When the modification number in the modification affection table is "1", it means that it is the modification affected portion to the modification content of the modification number "1" in the modification history table. There are a plurality of same modification numbers in the modification affection table. This means that there are a plurality of portions affected by the modification content stored in the modification history table. The type of specification column 5612 retains the type of specification affected by the modification. The name of specification column 5613 retains the name of specification affected by the specification. The item of affection column 5614 retains the affected specification item described in the specification specified by the type of specification column 5612 and the name of specification column 5613. The response column 5615 retains the response content from the user which represents as to whether the modification is to be notified to the modification affected portion or not when the modification affection message is displayed. When the user response is "notify", "not countermeasured yet" is registered in the response column 5615, when the user response is "not notify yet", "not notify yet" is registered, and when the user response is "not necessary", "not necessary" is registered. When the user response is "notify", the "not countermeasured yet" is registered instead of "notify" because the registration of the "not countermeasured yet" allows the display of the affected portion whose modification affection message is "not countermeasured yet". If the user response is "not necessary", it is not necessary to register the modification affection data into the modification affection table. The response content to the modification affected area accepted from the user by the modification notice message is also registered in the response column. The item registered is same as the response content accepted from the user.

The work number column 5616 retains the work number in the specification editor 14 when the response content is accepted by the modification affection message. It corresponds to the work number stored in the modification history table. The end/start flag column 5617 retains the timing of registration of the response content of the response column 5615. The modification notice message accepts the response contents displayed at the start and the end of the specification editor. If the timing of the acceptance of the response content is the start time of the specification editor, "start" is registered, and if it is the end time of the specification editor, "end" is registered. When the affected portion can be automatically modified, "countermeasured" is registered in the response column, and "—" is registered in the end/start flag column.

Figure 67:
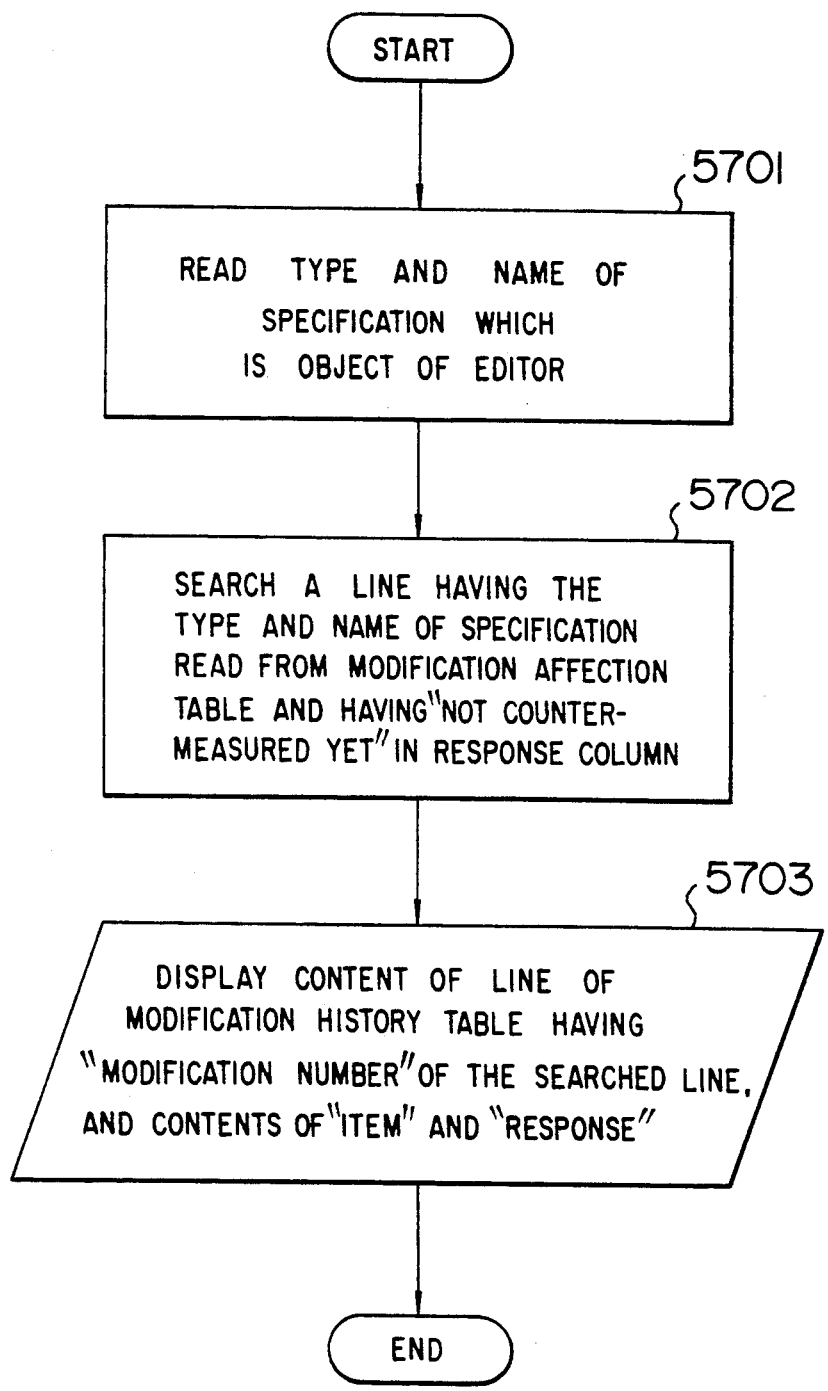
FIG. 67 shows a detailed flow chart of a modification notice message display process.

FIG. 67 shows a detailed flow chart of the modification notice message display. In a step 5701, type and name of the specification which is the object of the specification editor are read. In a step 5702, the affected portion which correspond to the type and name of the specification read in the step 5701 and the response column 5615 of the modification affection table of which is "not countermeasured yet" is searched from the modification affection table. In a step 5703, the content in the modification history table having the same modification number as that of the modification number column of the affected portion searched in the step 5702, and the content of item and response are displayed.

Figure 68:
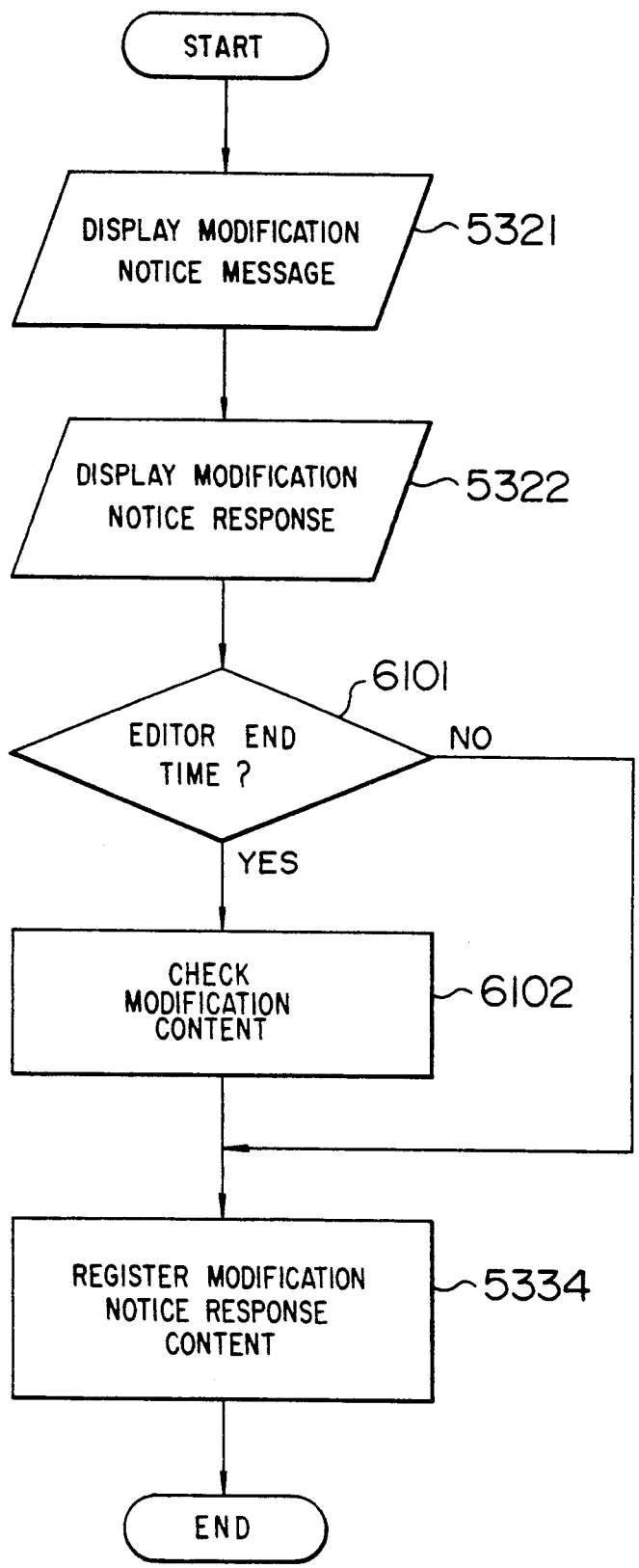
FIG. 68 shows a flow chart of the embodiment.

FIG. 68 shows a flow chart of an embodiment which automatically checks whether the user has actually modified the affected portion or not.

In the above embodiment, whether the user has actually modified the modification affected portion or not can be determined only by the user response accepted when the modification affection message is displayed. In FIG. 68, steps 6101 and 6102 are added to the flow chart of FIG. 63A of the above embodiment. In the step 6101, whether the timing of the display of the modification notice message is the start time or the end time of the specification editor is determined, and if it is the end time, the step 6102 is executed. In the step 6102, whether the user has actually modified the modification affected portion or not is checked based on the content of the modification history table of the modification affection history 5204 and the statement of the specification data 14. If the modified content of the modification affected portion has been stored in the modification history table or if the content of the specification data 14 is the modified one of the modification affected portion, it is determined as "countermeasured". If the modified content of the modification affected portion has not been stored in the modification history table or if the content of the specification data 14 is one before the modification of the modification affected portion, it is determined as "not countermeasured yet". It is possible to make multi-stage evaluation of the user countermeasure for the affected portion by "countermeasured", "said to countermeasure", "likely to have countermeasured" and "not countermeasured yet", by combining the automatically determined countermeasure content and the response content accepted from the user.

Figures 69A, 69B:
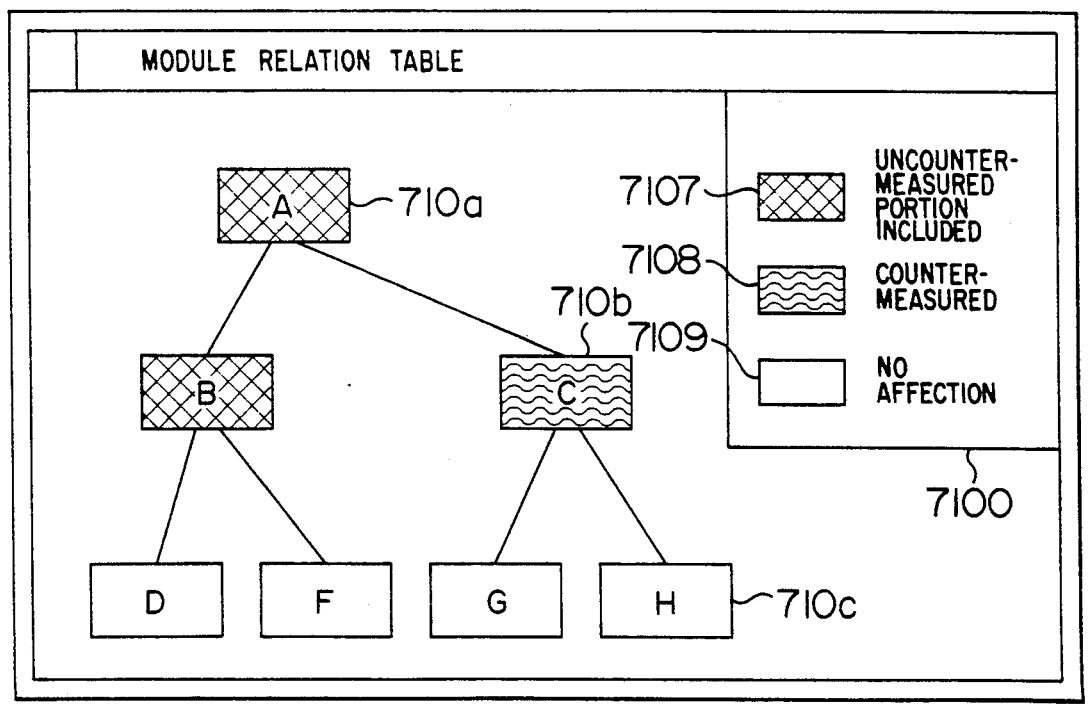
FIGS. 69A and 69B show examples of display of the modification affection on a list and module relation chart on a relation chart.

FIGS. 69A and 69B show a list of status of modification affection and display thereof on a specification. FIG. 69A shows the status of modification affection in the list of module specification. The list comprises a name of specification column 7101, a preparation date column 7102, a prepared by column 7103, a modification date column 7104, a modified by column 7105 and a modification affection status column 7106. The name of specification column 7101 retains a name of module specification in the present embodiment. The preparation date column 7102 retains the date on which the specification is prepared and "completion" is entered in the completion status. The prepared by column 7103 retains the name of person who prepared the specification. The modification date column 7104 retains the last modification date of the "completed" specification. The modified by column 7105 retains the name of person who lastly modified. The modification affection status column 7106 retains any affection by the modification of the specification and any countermeasure taken to the affected portion. The modification affection status column 7106 retains one of "uncountermeasured portion included", "countermeasured", "none" and "—". The modification affection table of the modification affection history 5204 is referred, and if the specification column of the modification affection table includes the specification retained in the name of specification column 7101 and at least one "uncountermeasured" affected portion in the response column of the modification affection table, the "uncountermeasured portion included" is registered into the modification affection status column 7106. The modification affection history 5204 is referred, and if the specification column of the modification affection table includes the specification retained in the name of specification column 7101 and all response columns of the modification affection table include "countermeasured", the "countermeasured" is registered into the modification affection status column 7106. The modification affection table of the modification affection history 5204 is referred, and if the specification column of the modification affection table does not include the specification retained in the name of specification column 7101, the "none" is registered into the modification affection status column 7106. When the module itself is deleted, the "—" is registered into the modification affection status column 7106. Thus, the module which has the "—" in the modification affection status column 7106 means that it is not used in the system under development.

FIG. 69B shows an example of display of the modification status on the module relation diagram. Each box which represents one module is color-displayed in accordance with the modification status. A legend 7100 shows an example of colored modules and the modification status. The legend 7100 show three modification status. A box 7107 shows a module having an uncountermeasured modification affected portion. A box 7108 shows a module whose modification affected portions have all countermeasured. A box 7109 indicates that the module name is "A" and the affection status is "uncountermeasured portion included". A box 710b indicates that the module name is "C" and the affection status is "countermeasured". A box 710c indicates that the module name is "H" and the affection status is "no affection".

By displaying the modification affection status by color on one specification, the current modification affection status of the module can be observed at a look and the uncountermeasured affected portion in the module can be readily recognized. By designating the specification on the module relation diagram, it is possible to display a list of source portions of modification which affected to the designated specification and the affected portions. By selectively displaying only the specification having the "uncountermeasured" or displaying all specifications, it is possible to display the affection status which the user desires, and the failure to the countermeasure to the affected portion is prevented.

An embodiment which displays the modification content of the modification affected portion to the source portion of modification is now explained. It is important to not only display the affection status but also confirm the content of countermeasure for the affected portion, because it is necessary to confirm whether the countermeasure has actually been taken even if the affection status is "countermeasured". This function is necessary in order to prevent miscommunication between different operators for the source portion of modification and the affected portion.

In the above embodiment, only the primary affection by the modification is analyzed and displayed. An embodiment in which secondary affection when the modification affected portion is modified, third-order affection when the secondary affected portion is modified, and nth-order affection are analyzed and displayed is now explained.

Figure 70A:
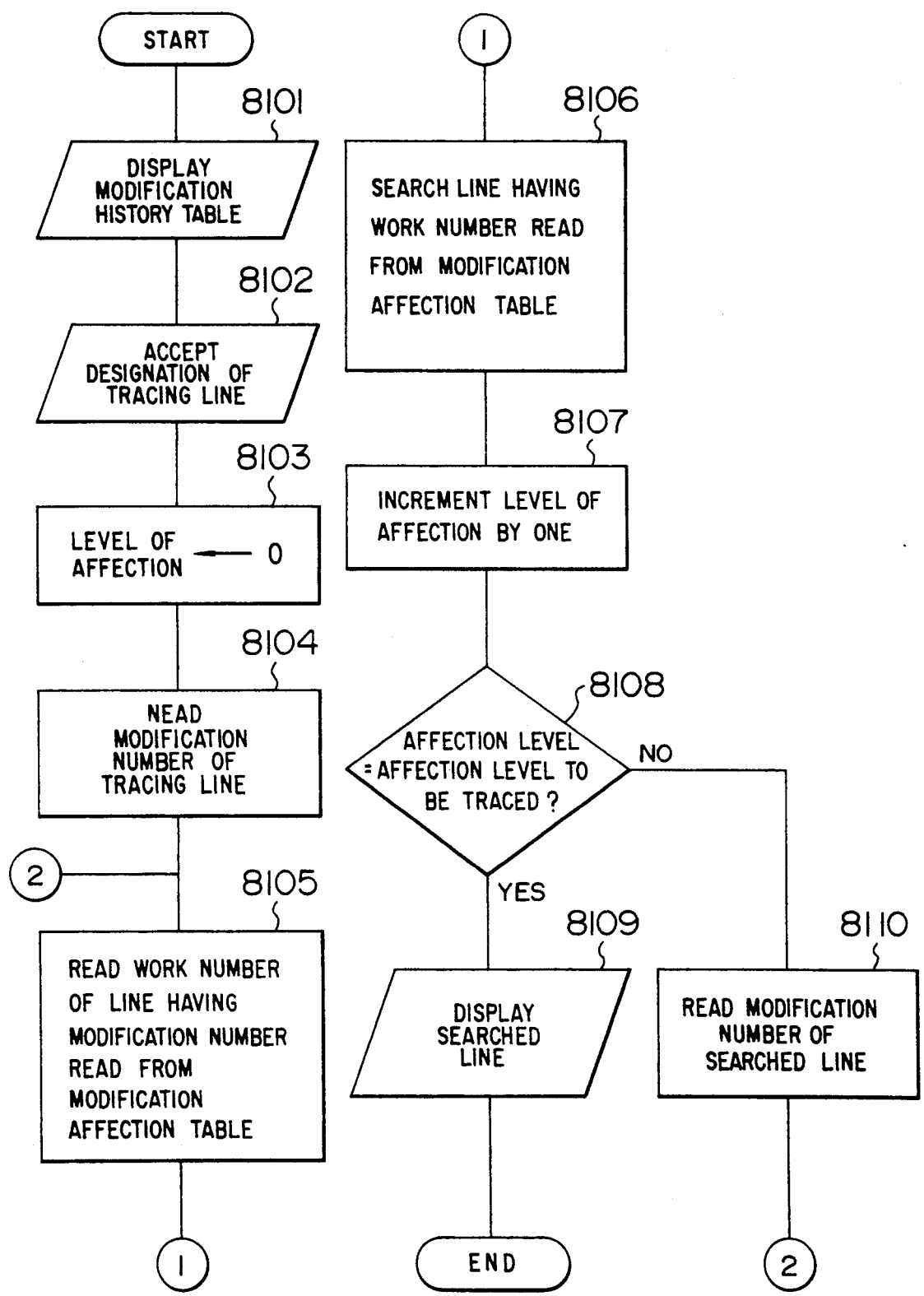

FIG. 70A shows a flow chart of the present embodiment. In the present embodiment, the modification history table of the modification affection history 5204 is displayed and the modification data is selected. An affected portion for the selected modification data is searched and the modification content of the affected portion is displayed. The levels of affection from the modification source, such as primary affection for the portion affected by the modification and secondary affection for the portion affected by the modification of the affected portion are considered. The user may designate the level of affection counted from the modification source and the modification content at the affected portion corresponding to the designated affection level is displayed.

In a step 8101, the modification history table is read from the modification affection history 5204 and it is displayed on the screen. In a step 8102, the user designates one line of modification data for tracing the affected portion based on the displayed modification data and it is accepted. The level of affection of the affected portion to be traced, counted from the modification is also designated. In a step 8103, the level of affection is set to zero. In a step 8104, the modification number of the line of modification data to be traced is read. In a step 8105, the work number of the line of affected portion having the modification number read in the step 8104 is read from the modification affection table of the modification affection history 5204. In a step 8106, the line of modification data having the work number read in the step 8105 is searched from the modification history table. In a step 8107, the level of affection is incremented by one. In a step 8108, whether the level of the portion traced which is designated by the user is equal to the level for which the modification content is actually traced. If they are equal, a step 8109 is executed, and if they are not equal, a step 8110 is executed. In the step 8109, the traced modification data is displayed on the screen. After the execution of the step 8109, the process is terminated. In a step 8110, the modification number of the traced modification data is read. After the execution of the step 8110, the process returns to the step 8105, and the step 8105 is executed with the modification number read in the step 8110.

FIG. 70B shows a table which illustrates display of modification content at the secondary affected portion. The structure of table is identical to the structure of modification history table of FIG. 65.

An embodiment in which display/non-display switch is added to the message which is automatically displayed such as modification notice message or modification affection message is now explained. If the automatically displayed messages are too frequently displayed, the user feels rather troublesome.

FIG. 71 illustrates a method for the user to select the display/non-display in the present embodiment.

FIG. 71(a) shows the display of the specification of the module relation diagram on the screen. On the display screen, the message display switch is ON. When it is ON, the modification affection message and the modification notice message are automatically displayed. When the displayed ON switch is picked up by the mouse, the screen changes to FIG. 71(b). By picking display switch by the mouse, it changes to OFF 6503. When it is OFF, the modification affection message and the modification notice message are not displayed. When the OFF switch 6504 is again picked up by the mouse, the screen changes to FIG. 71(a), that is, the switch is turned ON.

In the present embodiment, the message display switch is set in only the specification on the screen shown in FIG. 71. Accordingly, for other specification, the display switch must be set again. If the set range is not limited to a specific specification but the display switch may be set for a type of specification (for example, only module relation diagram or module specification, or a combination of some), or all specifications or a specific user, the work time for setting again may be saved.

An embodiment in which the display switch is set for each user is now explained leveling is made based on terms of experience of operators. Namely, the message display switch is set "OFF" for higher level operators, and it is set "ON" for lower level operators. Since the higher level operators have enough experience in system development, it is not necessary to display the modification affection message due to the modification or the modification notice message. However, since the lower level operator has little experience in the system development, they may fail to communicate to the portion affected by the modification or may fail to countermeasure the affected portion in spite of the affection to the specification which he/she is in charge of due to other modification. Accordingly, it is necessary to display the modification affection message due to the modification and the modification notice message to notify the affection for the lower level operator.

FIG. 72A shows a table which represents levels of operators. The table comprises a user name column 6601 and a level column 6602. The user name column 6601 registers a user name. The level column 6602 registers a level of the operator registered in the user name column 6601, by numeral. The larger the numeral representing the level is, the more experienced expert in the system development is the operator. The operator having level "1" set in the level column 6602 (Narita in 6603) means that he/she is a beginner with little experience in the system development. The operator having the level "2" (Kinoshita in 6604) means that he/she is a middle level operator although he/she is not an expert. The operator having the level "3" (Satoh in 6605) means that he/she is an expert having high expertness in the system development. In the present embodiment, the expertness is represented by the year of experience. The level "1" means that the year of L experience is less than one year, the level "2" means that the year of experience is one to five years, and the level "3" means that the year of experience is more than five years.

Figure 73:
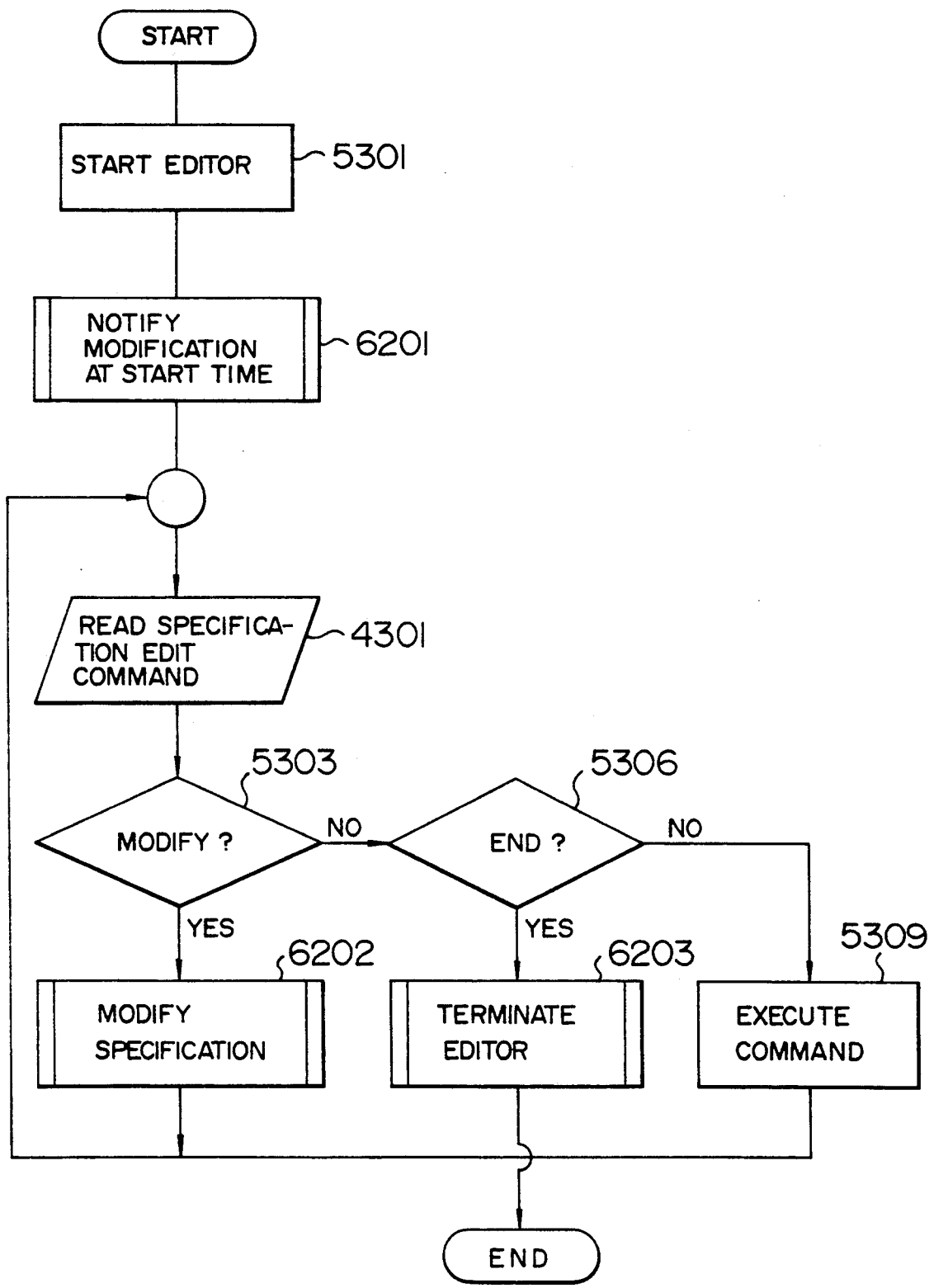
FIG. 73 shows a flow chart for changing message output in accordance with the level of designer.

FIG. 72B shows a table which illustrates the message display contents for the respective level and the display timing. A line 6611 in the table represents a type of message display timing. In the present embodiment, three timings, editor start time, specification data modification time, and editor operation end time are provided. A line 6612 represents a type of message displayed at each timing. At the start time, the modification notice message is displayed. The affect to the specification due to the modification of other specification is notified. When the specification data is to be modified, the modification affection message indicating the affection by the modification is displayed. At this time point, the specification data has not actually been rewritten, but a chance of cancelling the amendment is given by displaying the affected portion by the amendment. This can prevent the affection to other specification by non-well thought modification. This is particularly effective when the operator is a beginner. At the end of the editor operation, the modification notice message and the modification affection message are displayed. In lines 6613 to 6615, whether the message is to be displayed in accordance with the level or not is indicated. In each column, "○" means that the message is to be displayed at the corresponding timing, and "X" means that the message is not to be displayed at the corresponding timing. In the line 6613, the level of the operator is "1", that is, the beginner. In this case, the modification notice message and the modification affection message are displayed at the start time, modification time and end time. In the line 6614, the level of the operator is "2", that is, middle level operator. In this case, only the modification notice message is displayed at the start time and only the modification affection message is displayed at the end time. In the line 6615, the level "3", that is, the expert operator is indicated. In this case, only the modification affection message is displayed at the end time. FIG. 73 shows a flow chart for displaying/non-displaying the modification affection message indicating the affection by the modification, in accordance with the level of the operator. The flow chart shows a flow of process from the start to the end of the editor the message to be displayed, the display timings and the levels of the operators are those shown in FIG. 72B.

Figure 74A:
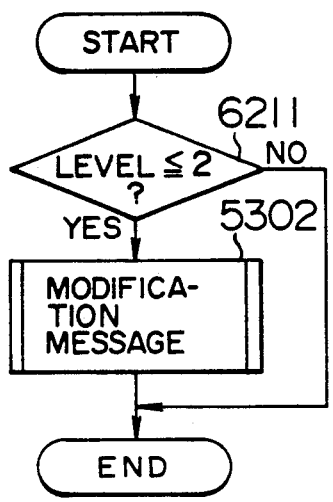
FIGS. 74A, 74B and 74C show detailed flow charts of the flow chart of FIG. 73.
Figure 74B:
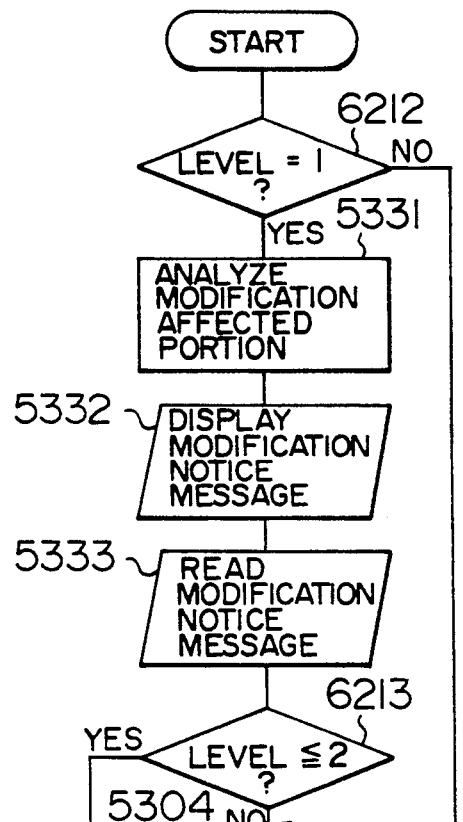

In a step 5301, initialization is performed to start the editor and display the specification on the screen. In a step 6201, immediately after the start of the editor, the modification notice message is displayed in accordance with the level of the operator. A detailed flow chart is shown in FIG. 74A. In a step 4301, a specification edit command is read. In a step 5303, whether the read-in command is the specification modify command or not is determined. If it is the modify command, a step 6202 is executed. In the step 6202, the modification affection message is displayed in accordance with the level of the operator shown in FIG. 72B and the specification is modified. A detailed flow chart is shown in FIG. 74B. In a step 5306, whether the command read in the step 4301 is the editor end command or not is determined. If it is the editor end command, a step 6203 is executed. In the step 6203, the message is displayed and the editor is terminated, and the process is terminated. A detailed flow chart is shown in FIG. 74C.

Figure 74C:
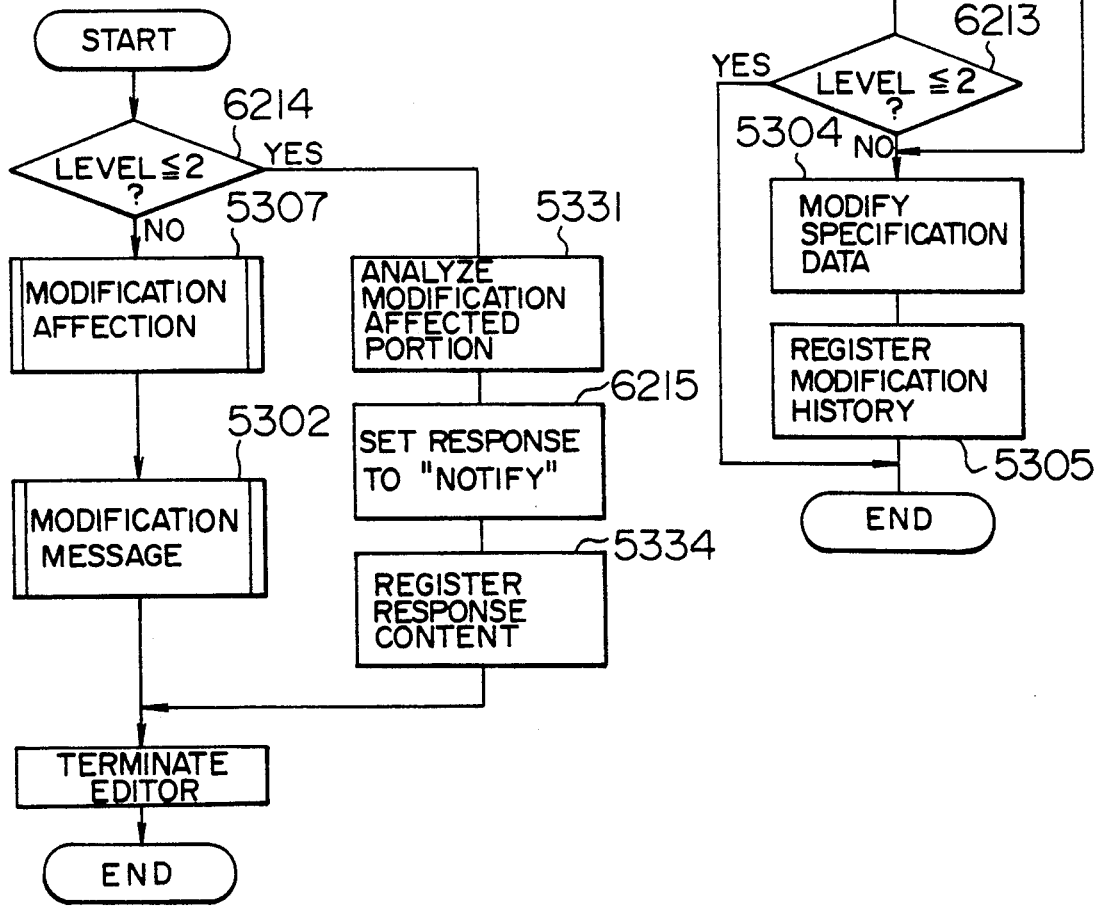

FIGS. 74A, 74B and 74C show detailed flow charts of portions of the flow chart shown in FIG. 73.

FIG. 74A shows a detailed flow chart of the step 6201 in FIG. 73. In a step 6211, whether the level of the operator is not higher than "2" or not is determined. If it is not higher than "2", a step 5302 is executed to display the modification message. If it is higher than "2", no message is displayed.

FIG. 74B shows a detailed flow chart of the step 6202 in FIG. 73. In a step 6212, whether the level of the operator is "1" or not is determined. If it is "1", a step 5531 is executed to analyze the modification affected portion, and the modification affection message is displayed in a step 5332. The response to the displayed message is read in a step 5333. The response content is "modify" or "cancel modification". When the message is displayed, the command to modify the specification data is read but the specification data has not actually been rewritten. A chance of cancelling the modification is given by displaying the modification affected portion. In a step 6213, whether the response content from the user read in the step 5333 is "cancel modification" or not is determined. If it is the "cancel modification", the process is terminated and the modification content is cancelled. If it is not the "cancel modification", that is, if it is "modify", a step 5304 is executed to modify the specification data. The modification content is registered as the modification history in a step 5305.

In the step 6212, if the level of the operator is not "1", the steps 5304 and 5305 are executed in accordance with the read-in modification content.

FIG. 74C shows a detailed flow chart of the step 6203 in FIG. 73. In a step 6214, whether the level of the operator is not lower than "2" or not is determined. If it is not lower than "2", a step 5331 is executed to analyze the modification affected portion. In a normal case, the analyzed modification affected portion would be displayed as the modification affection message and the user would respond to "notify", "not notify" or "not necessary" to notify the modification to the modification affected portion. Since the modification affection message is not displayed in the present case, the response content is automatically set to "notify" the modification to the modification affected portion analyzed in the step 5331, in a step 6215. In a step 5334, the modification affected portion and the response content "notify" which was automatically set in the step 6215 are registered into the modification history, and the editor is terminated.

If the level of the operator is lower than "2" in the step 6214, the modification affection message (step 5307) and the modification notice message (step 5302) are executed, and the editor is terminated.

By the above flow charts, the message is displayed in accordance with the level of the operator as shown in FIG. 72B.

An embodiment in which the affection by the modification of one specification is sent to the operator of the affected specification as a modification notice mail is now explained.

FIG. 75 shows a table which indicates specifications and operators. The table comprises a type of specification column, a name of specification column and an operator name column.

Figure 76:
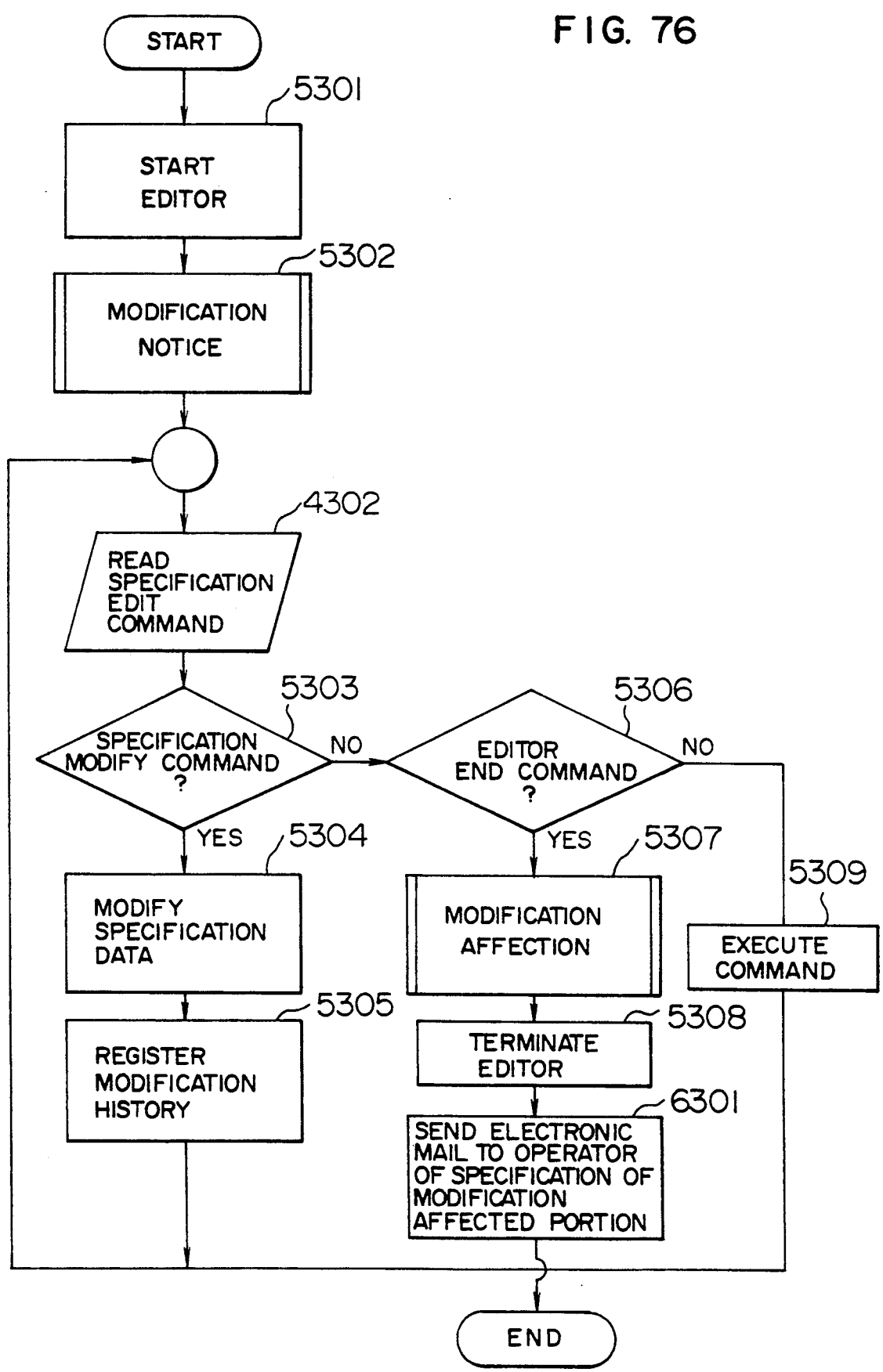
FIG. 76 shows a flow chart of a process for sending an electronic mail to the designer.

FIG. 76 shows a flow chart of the present embodiment. In FIG. 76, a step 6301 for sending an electronic mail to inform the affection to the operator of the specification of the modification affected portion is added to the flow chart shown in FIG. 65. In a step 6301, the operator of the specification of the modification affected portion is searched from the table shown in FIG. 75 at the end of the editor operation, and the electronic mail is sent to the corresponding operator to inform the affection by the modification. The electronic mail is displayed when the operator logs in the system.

An embodiment in which the modification affection message is displayed in accordance with a degree of completion of the specification is now explained.

The modification inherently means that the completed specification is modified by some reason (for example, error in the description of the specification, insufficient description, or error in the specification). It is significant to send the modification affection message to notify the modification to the modification affected portion when uniformity is lost by the modification of one of the specifications having the uniformity in the content.

An embodiment in which the specification bears the information on the degree of completion, and the modification affection message is notified in accordance with the degree of completion of the specification is now explained.

In the present embodiment, three information on the degree of completion of the specification are used. They are "not complete", "complete" and "under modification". The "not complete" means that the specification is under preparation and it has not completed. The "complete" means that the specification has been completed. The "under modification" means that the completed specification is under modification by some reason and the modification has not been completed. The information on the degree of completion of the specification is defined by the report from the user in the present embodiment.

FIG. 77 illustrates a method of setting the information on the degree of completion of the specification by the user. The specification of the module relation diagram is displayed on the screen. In FIG. 77A, a menu for setting the degree of completion of the specification is displayed at the top of the display screen. The menu lists the above three types of degree of completion. Of those, the "not complete" is displayed in a different color than those of others so that it indicates that the degree of completion of the specification under display is "not complete". When the specification content is completed, the "complete" in the menu of the degree of completion is selected by the mouse. Then, the screen changes to FIG. 77B.

In FIG. 77B, the "complete" in the menu of the degree of completion is displayed to indicate that the specification has been completed.

FIG. 78 shows a table which retains the information on the degree of completion of the specification. The table comprises a type of specification column, a name of specification column and a degree of completion column. In 6a01, it is shown that the degree of completion of the specification "module relation diagram", "A" is in the "complete" status.

An example of notifying the modification affected message by using the information on the degree of completion of the specification is now explained.

In a first case, the modification content is notified to the modification affected portion only when the specification was completed but it is amended by some reason. In this case, when the degree of completion of the specification changes from the "under modification" to the "complete", the content modified in the "under modification" status is notified to the affected portion as the modification affection message.

In a second case, the degree of completion of the specification affected by the modification of other specification is taken into consideration. In this case, the modification affection message is notified only to the specification whose degree of completion of the specification of the affected portion is "complete" or "under modification". By automatically changing the degree of completion "complete" of the specification of the affected portion to the "under modification" by the affection, the time and work to set the specification of the "complete" status into the "under modification" status.

An embodiment in which cross-reference information as to which specification contains data of specification item described in other specification, which the user has edited such as deletion or addition, is automatically displayed when the specification is edited by a design specification editor. The entry of the specification item into the specification under edition is automatically stored when the specification item is inputted.

Figure 79:
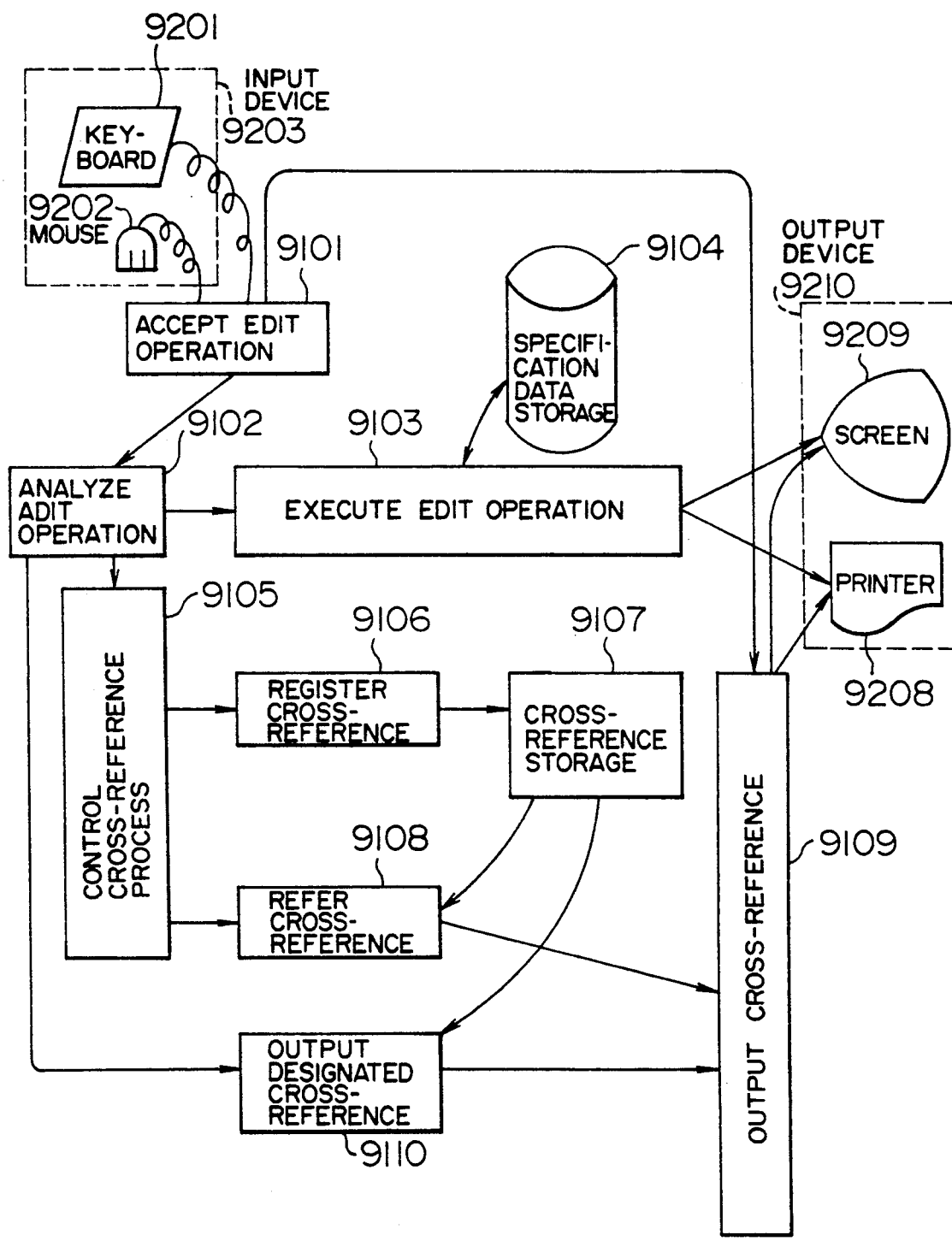
FIG. 79 shows a functional configuration of an embodiment of the present invention.

FIG. 79 shows a functional configuration to implement the present embodiment. Numeral 9201 denotes a keyboard, and numeral 9202 denotes a mouse. Those constitute an input device 9203. Numeral 9209 denotes a screen and numeral 9208 denotes a printer. Those constitute an output device 9210.

Numeral 9101 denotes an edit operation accept process to accept an edit operation (a command or a command and object data) which the user inputs from the input device 9203 such as the keyboard 9201 or the mouse 9202. Numeral 9102 denotes an edit operation analysis process for analyzing the content of the edit operation accepted in the process 9101. Numeral 9103 denotes an edit operation execution process for executing the edit operation analyzed in the process 9102. Numeral 9104 denotes an edition data storage for storing data to be edited.

A cross-reference processing control process 9105 determines whether the cross-reference information is to be displayed or registered, for the edit operation analyzed in the edit operation analysis process 9102. If the necessity to display is determined, a cross-reference process 9108 is executed, and if the necessity of registration is determined, a cross-reference registration process 9106 is executed.

The whole cross-reference information is retained in a cross-reference storage 9107.

In the cross-reference registration process 9106, the cross-reference information such as that data which is the object of the inputted edit operation has been used in the data which is under edition is registered into the cross-reference storage 9107.

In the cross-reference reference process 9108, the cross-reference information as to which other specification will use the data which is the object of the inputted edit operation is referred from the cross-reference storage 9107. The referred result is outputted to the screen 9209 or the printer 9208 in the cross-reference output process 9109.

In the present embodiment, the cross-reference information as to which specification contains the specification item is displayed when the user designates it. When the user inputs a display request for the cross-reference information of one data through the input device 9203, the edit operation analysis process 9102 analyzes the operation content, and a designated cross-reference information reference process 9110 is executed. In the designated cross-reference information reference process 9110, the cross-reference information as to which other data uses the data designated by the user is referred from the cross-reference storage, and the result is outputted by the output device 9208 or 9209 as the cross-reference information in the cross-reference output process 9109.

Figure 80:
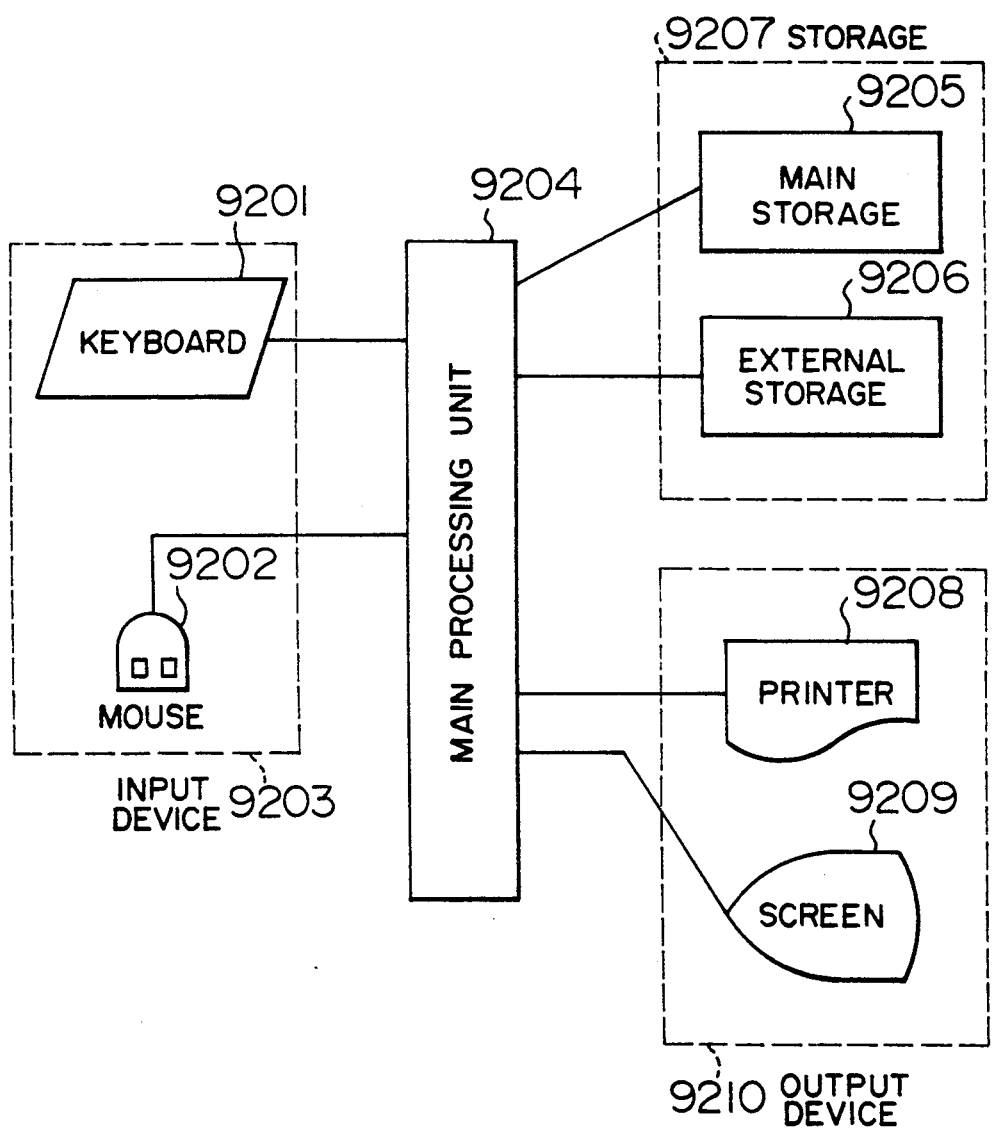
FIG. 80 shows a hardware configuration of the present invention.

FIG. 80 shows a hardware configuration of the present embodiment. Numeral 9201 denotes a keyboard, numeral 9202 denotes a mouse and numeral 9203 denotes an input device comprising 9201 and 9202. Numeral 9204 denotes a main processing unit, numeral 9205 denotes a main storage, numeral 9206 denotes an external storage, and numeral 9207 denotes a storage comprising 9205 and 9206. Numeral 9208 denotes a printer, numeral 9209 denotes a screen and numeral 9210 denotes an output device comprising 9208 and 9209.

Figure 81:
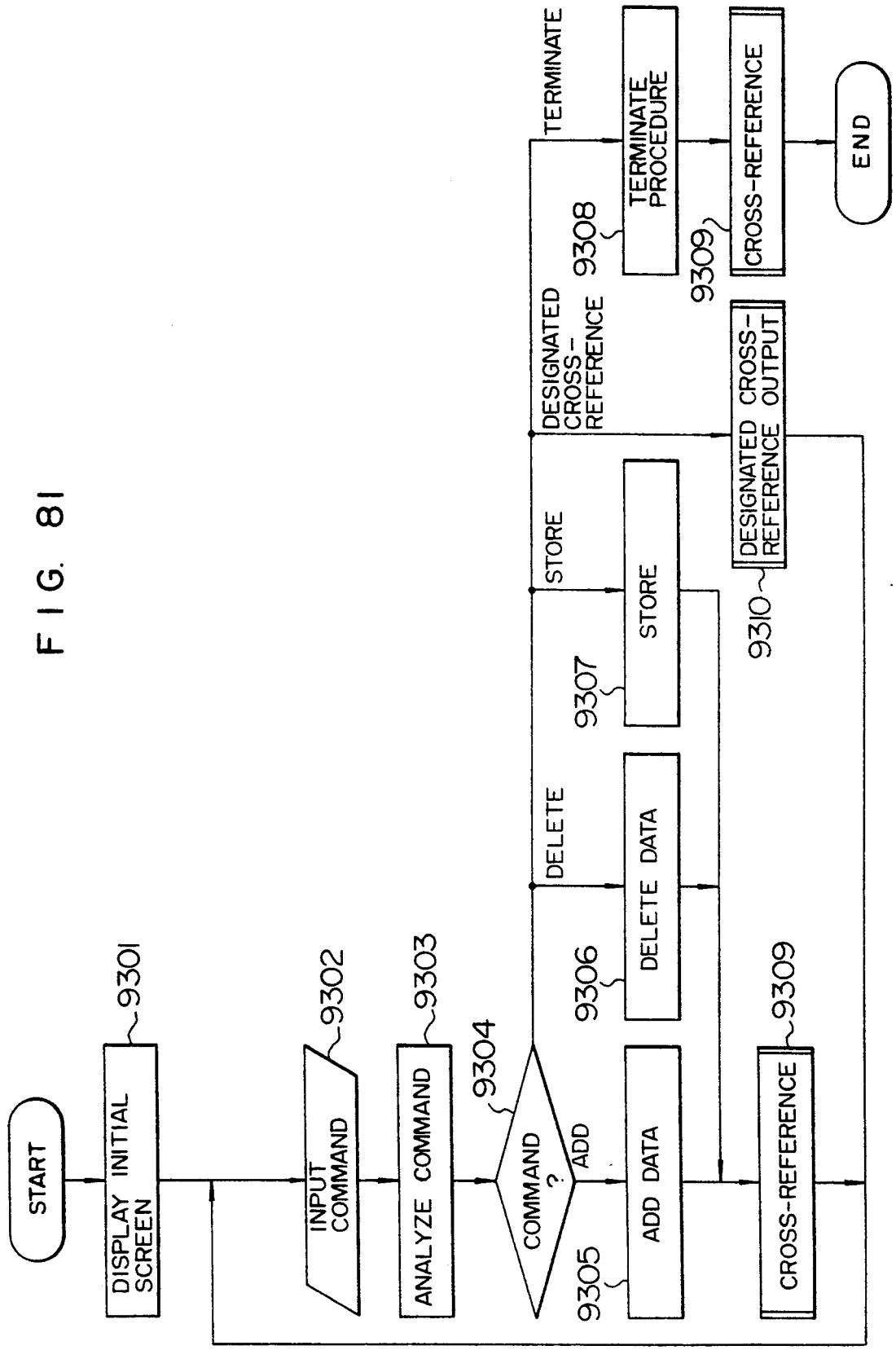
FIG. 81 shows a flow chart of the embodiment of the present invention.

FIG. 81 shows a flow chart of the present embodiment. In a step 9301, the specification designated by the user is displayed when the editor is started.

Figure 89A:
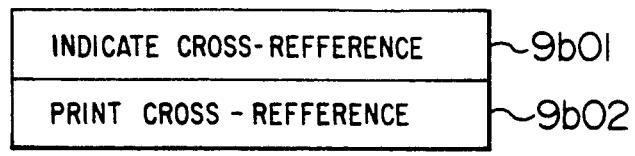
FIGS. 89A, 89B and 89C show operation and example of display of designated cross-reference information for displaying the cross-reference information when a user requests it.
Figure 89B:
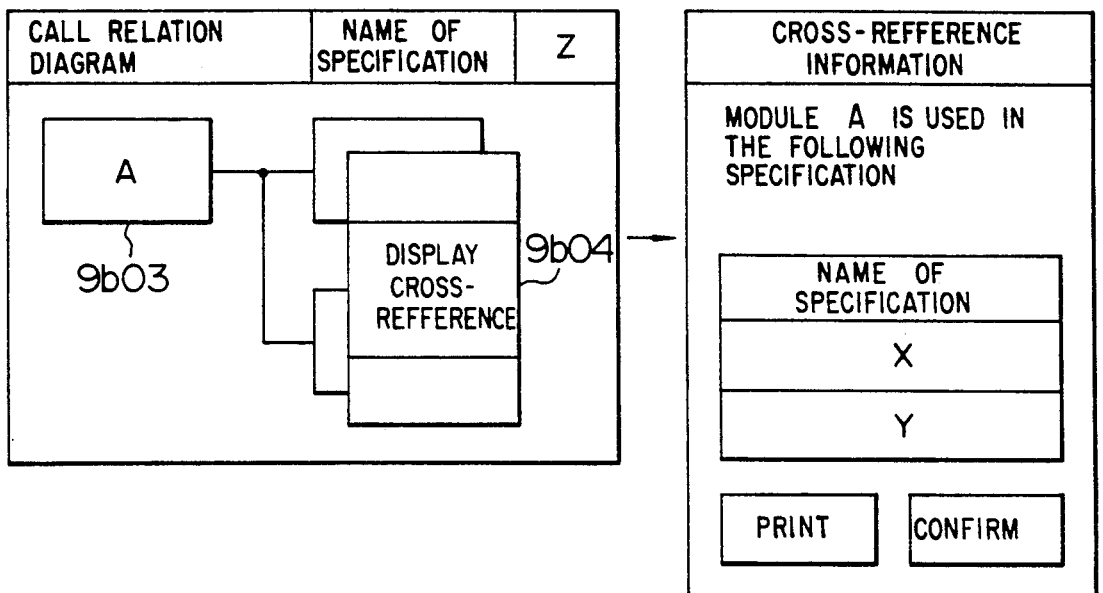
Figure 89C:
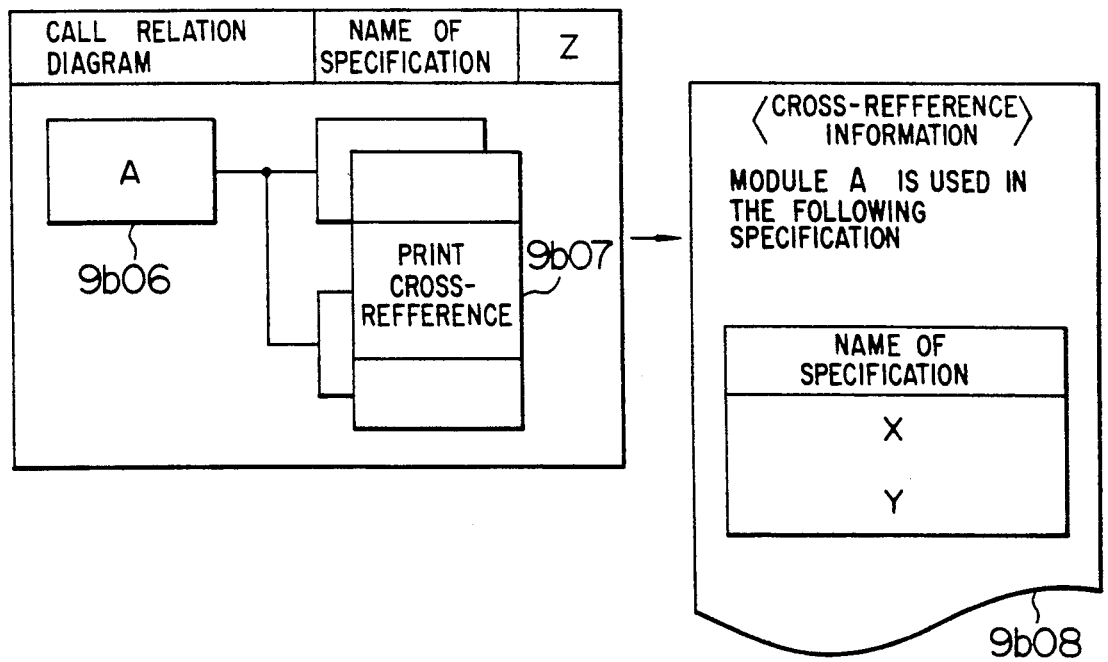

In a step 9302, the edit operation of the user such as a command to add or delete data is accepted. In a step 9303, the content of the command or data inputted in the step 9302 is analyzed. In a step 9304, the process is determined in accordance with the command analyzed in the step 9303. In the editor used in the present embodiment, the commands inputted in the step 9302 include "add", "delete" and "store" data, "terminate" the editor, and a command from the user to request output of the cross-reference information (FIGS. 89A, 89B and 89C).

Figure 84:
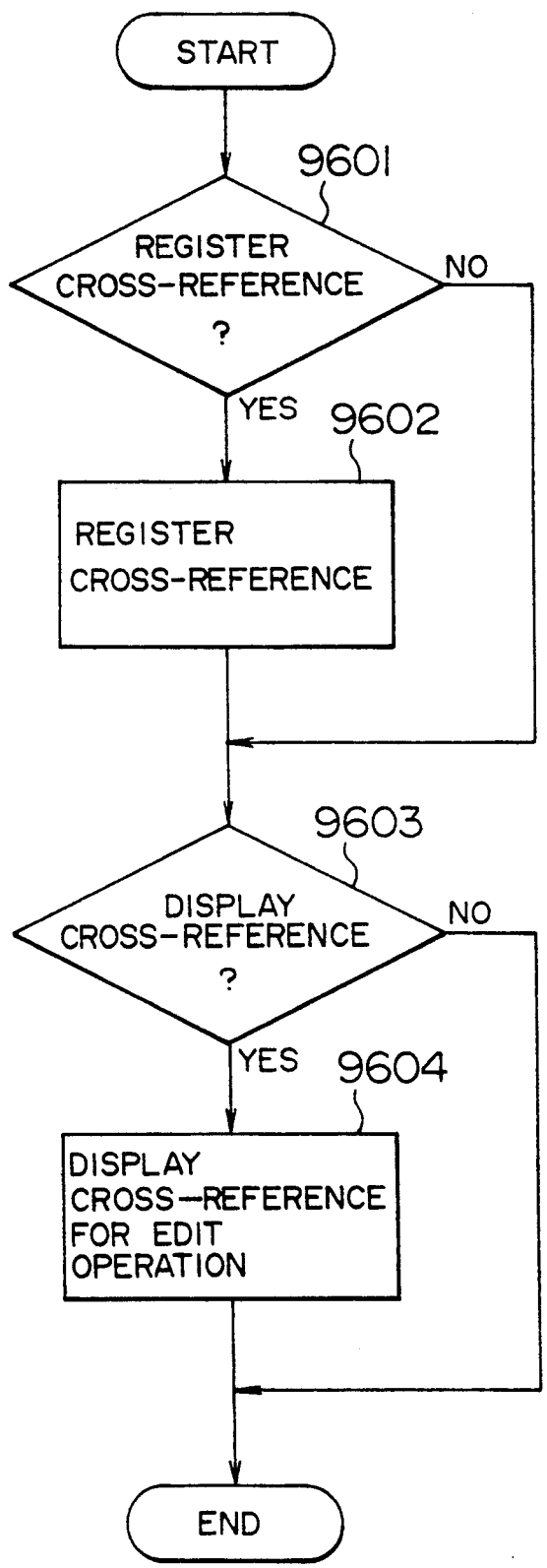
FIG. 84 shows a detailed flow chart of a cross-reference process in the embodiment.
Figure 91:
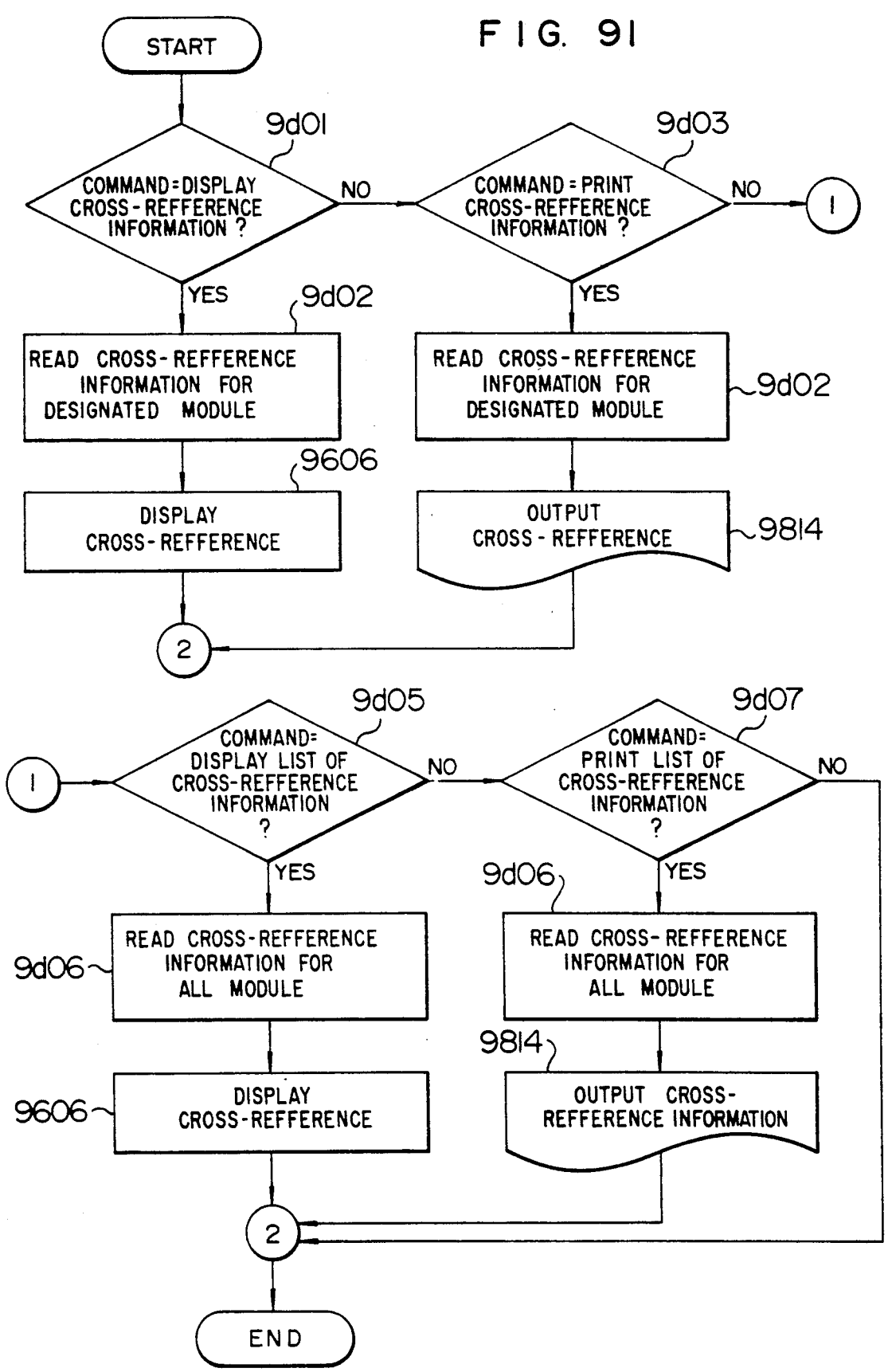
FIG. 91 shows a detailed flow chart for outputting cross-reference information when the user requests it.

If the command is "add", the user inputted data is added in an add step 9305. If the command is "delete", the user designated data is deleted in a delete step 9306. If the command is "store", the specification which is under edition and stored in the edition data storage 9104 is stored into the external storage 9206 in a store step 9307. If the command is "terminate", the operation of editor is terminated in an editor terminate step 9308 such as by erasing the displayed screen. After the command has been executed, a cross-reference step 9309 is executed. In the step 9309, the cross-reference information is displayed or registered in accordance with the inputted edit operation. In a designated cross-reference output step 9310, the cross-reference information of the user requested data is outputted. (A detailed flow chart of the cross-reference step 9309 is shown in FIG. 84, and a detailed flow chart of the designated cross-reference output step 9310 is shown in FIG. 91.)

Figure 82:
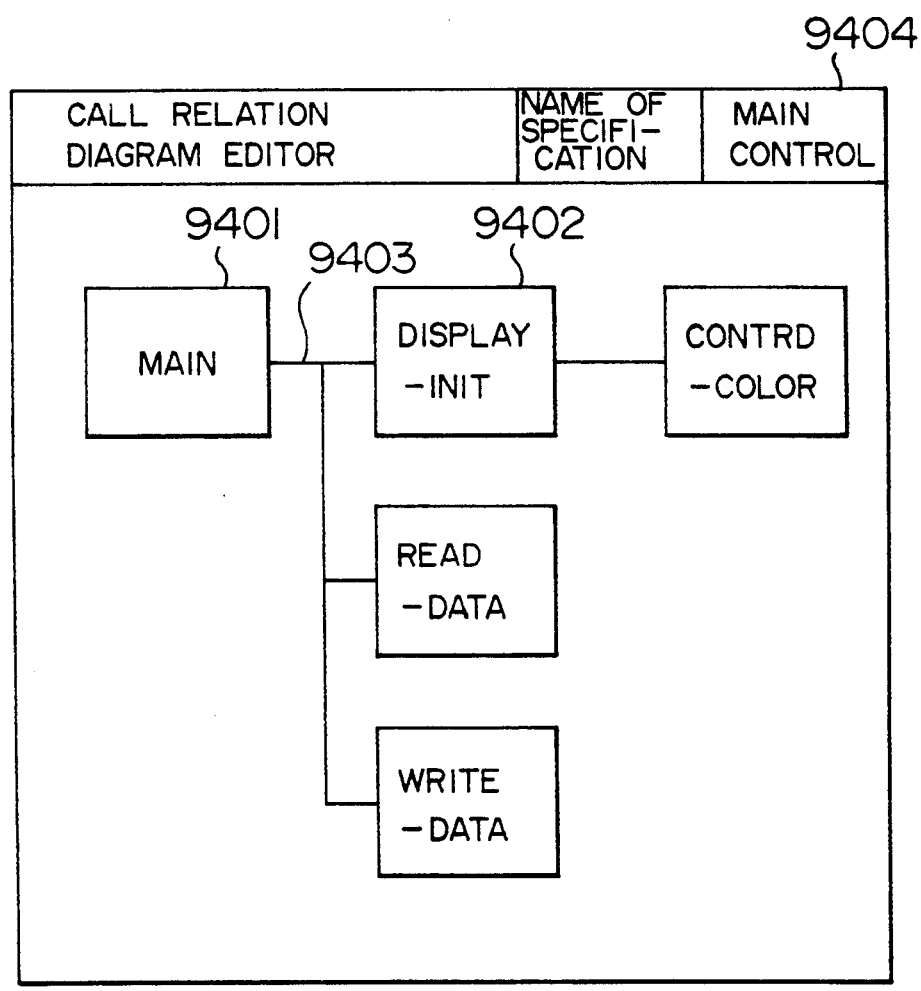
FIG. 82 shows an example of display of an editor used in the embodiment.

FIG. 82 shows an example of screen display of an editor used in the present embodiment. In the present embodiment, an editor called a call relation diagram is used. The call relation diagram is a kind of specification used in the software development, and it is a specification which illustrates individual modules and relation thereof (call relation). In FIG. 82, boxes 9401 and 9402 are modules and character strings in the boxes (for example, "main" in 9401) represent the module names. A line 9403 connecting the boxes indicates that the two modules are related by the call relation. That is, the module 9401 calls the module 9402. The "main control" 9404 is the name of specification displayed on the screen. This name is used for the cross-reference information.

FIG. 83 shows the timing to display the cross-reference information (FIG. 83A) and the display content of the cross-reference information (FIG. 83B) in the call relation diagram used in the present embodiment.

In FIG. 83A, a module 9501 (name C) is deleted. The user selects the module 9501 by the mouse 9102 and selects a command "delete" 9502 by the mouse 9102. When the command 9502 is selected and executed, the screen changes from FIG. 83A to FIG. 83B.

In FIG. 83B, the cross-reference information is displayed in 9503. Numeral 9504 denotes a name of other specification in which the module 9501 is used. In the present case, it represents that the module C is used in other specification "initial screen display". By displaying the portions at which the data is used in other specification whenever the user operates the data, the necessity of the same operation to those portions can be implied.

When the displayed cross-reference information is to be printed, a "print" command 9505 is selected by the mouse 9102. When the display screen of the cross-reference information is to be closed, a "confirm" command 9506 is selected.

FIG. 84 shows a flow chart for displaying/registering the cross-reference information.

In a step 9601, whether the cross-reference information such as what other specification (the call relation diagram in the present example) use the data which is the object of the edit operation is to be displayed or not is determined, in accordance with the input command. If the decision is to display, the cross-reference information of the data for the edit operation is displayed in a step 9602. In a step 9603, whether the cross-reference information(the information which indicates that the data is under use in the specification under edition) of the data for the edit operation is to be registered or not is determined in accordance with the input command. If the decision is to register, the cross-reference information of the data for the edit operation is registered in a step 9604. A decision table of FIG. 85 defines decision criteria for the steps 9601 and 9603, that is, whether or not to execute the display (step 9602) or the registration (step 9604) of the cross-reference information, in accordance with the input command.

FIG. 85 shows the decision table to determine whether the cross-reference information is to be displayed/registered or not, for the edit operation.

When an edit operation item "add" 9701 is inputted, the cross-reference information is not displayed but it is registered. In the decision table, the execution and non-execution of the display and registration of the cross-reference information are shown by "○" and "X". For example, when the user deletes data in the edit operation, the cross-reference information is displayed, and the cross-reference information of the data is also registered.

If the command is the store or end command 9703, it is not a command to edit the data directly and there is not cross-reference information for the edit operation. Thus, the decision table shows by "—" that there is no display or registration of the cross-reference information. In the present embodiment, the display or registration of the cross-reference information is done only when the data is added or deleted.

Figure 86A:
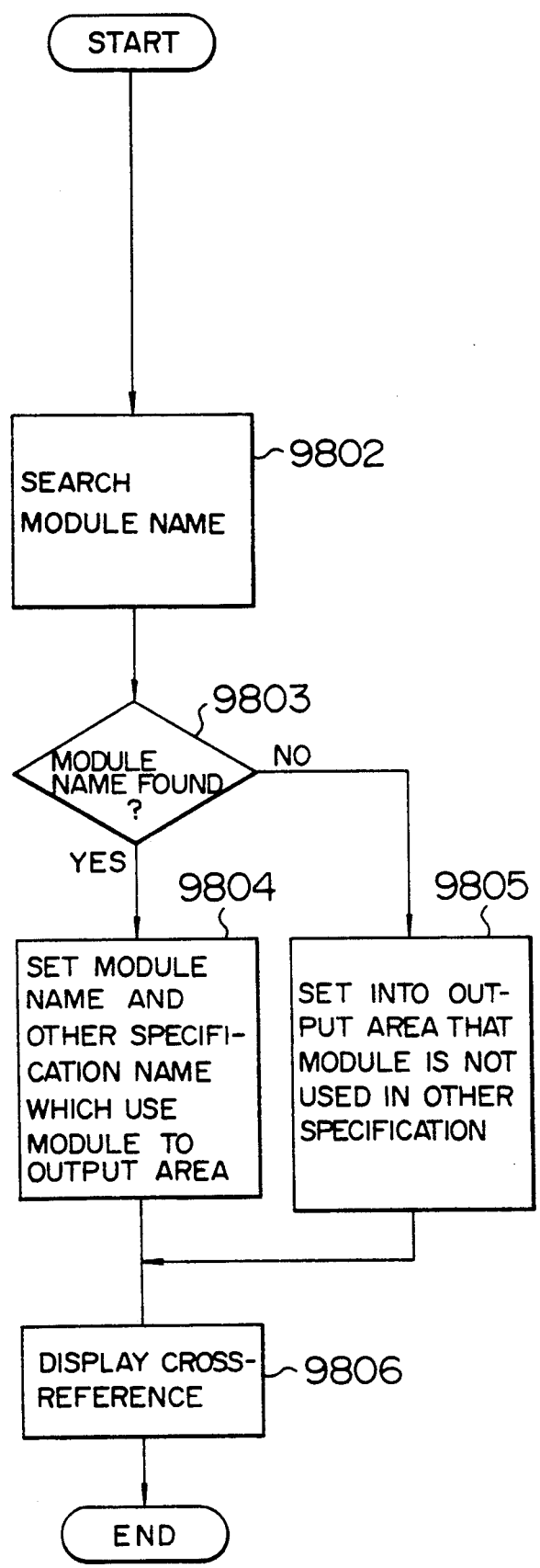
FIGS. 86A and 86B show detailed flow charts of the cross-reference display step.

FIG. 86A shows a flow chart for displaying the cross-reference information.

In a step 9802, the name of module which is the object of edit operation (only the addition and deletion in the present embodiment) is searched from the data in the cross-reference storage 9107. In a step 9803, whether the same module name is stored in the data of the cross-reference storage 9107 or not is determined. If the same module name is stored, the module name and the names of other specifications (there are more than one) which uses that module are set into an output area. In a step 9806, the cross-reference information set in the output area is displayed. If the same module name is not in the storage, a message indicating that there is no other specification which uses the module is set in the output area in a step 9805, and it is displayed in a step 9806.

The step 9805 per se may not exist. In this case, when the step 9803 determines that the module is not in the store, the process of the flow chart shown in FIG. 86A is terminated.

Figure 86B:
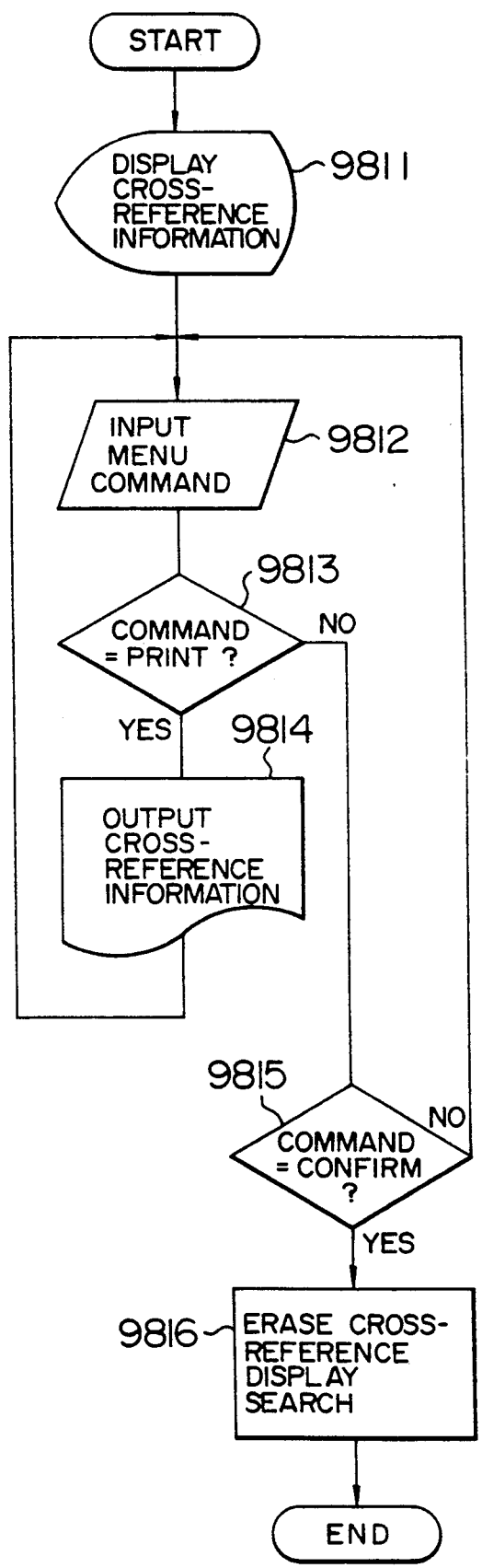

FIG. 86B shows a detailed flow chart of the step 9806 of FIG. 86A.

In a step 9811, the output area set in the steps 9804 and 9805 of FIG. 86A is outputted to the screen 9209. In a step 9812, the input of the menu command ("print" or "confirm" in the present example) from the user is accepted. In a step 9813, whether the input menu command is "print" or not is determined. If it is "print", the cross-reference information or the absence of cross-reference information is outputted to the printer 9208 in a step 9814. In a step 9815, whether the input command is "confirm" or not is determined. If it is the "confirm", the cross-reference information displayed in the step 9811 is erased from the screen 9209 in a step 9811, and the process is terminated.

When other menu command than those two is inputted, the process returns to the step 9812 and the same process as that described above is repeated.

FIG. 87 shows a data structure of the cross-reference storage 9107. The table comprises a column for representing the data which is the object of the edit operation, that is, a module name column 9901, and a column 9902 for the name of specification which uses the module which is the object data and the number of times of usage. The module name column 9901 retains all module names defined in all specifications which are objects of the call relation diagram editor of the present embodiment.

A line 9903 indicates that the module having the module name "C" is used once in the specification "main control" and once in the specification "initial screen display".

Figure 88:
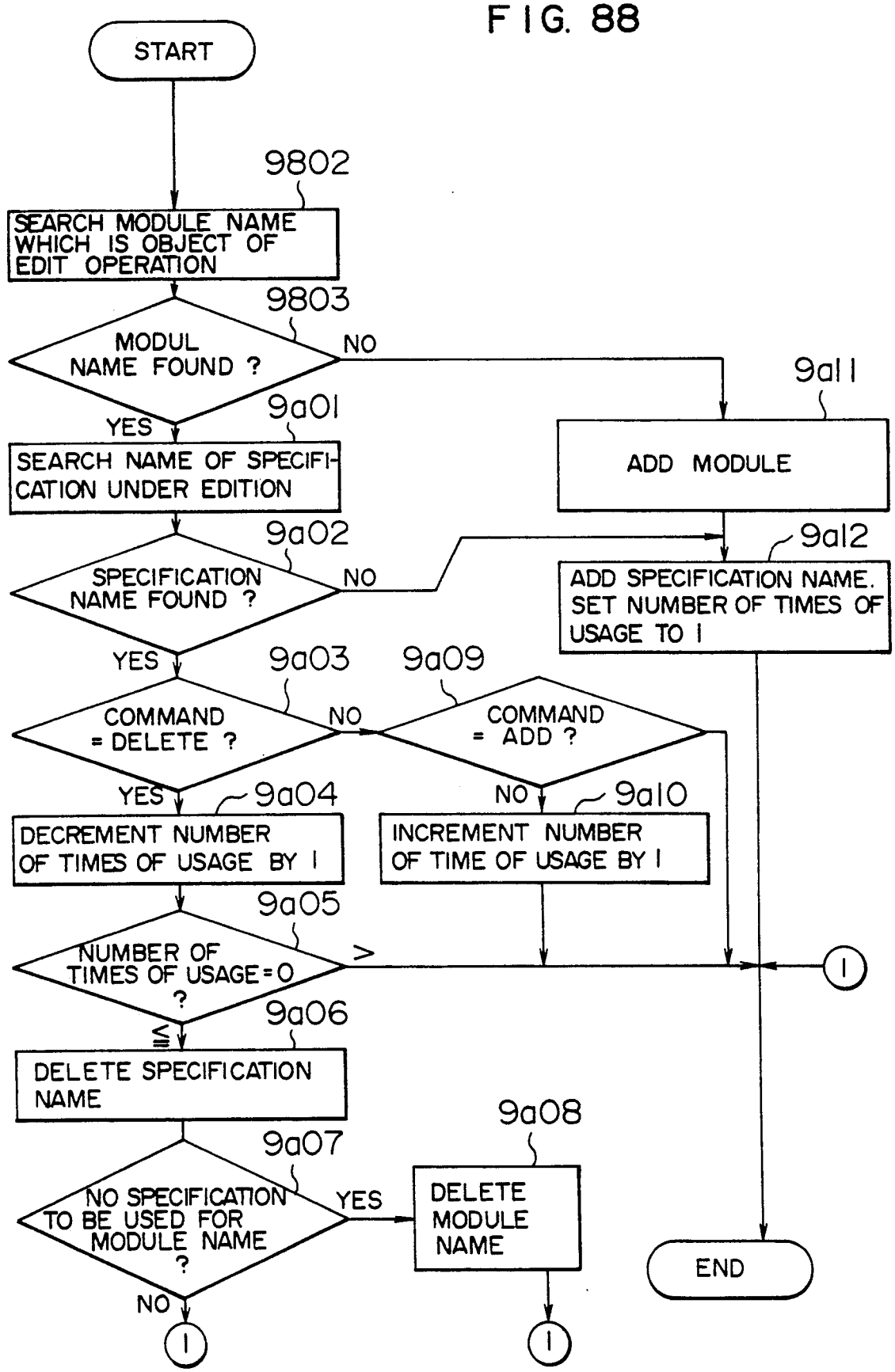
FIG. 88 shows a detailed flow chart of a cross-reference registration step.

FIG. 88 shows a flow chart for registering the cross-reference information.

Steps 9802 and 9803 are same as the steps shown in the display process of the cross-reference information in FIG. 86A. In the step 9802, whether the same name as the module name which is the object of the edit operation is in the module name column 9901 of the cross-reference storage 9107 or not is searched. In the step 9803, if the same name is in the storage, a step 9a01 is executed, and if it is not in the storage, a step 9a11 is executed. In the step 9a01, whether the name of specification under edition is in the name of specification which the module uses or not is searched. If it is in the storage, a step 9203 is executed through a decision step 9a02. In the step 9a03, whether the edit operation (command) is "delete" or not is determined. If it is the "delete", the number of times of usage for the specification under edition is decremented by one in a step 9a04. If the number of times of usage reaches zero or below zero by decrementing the count, it means that any data in the specification under edition is no longer used, and the name of specification under edition is deleted from the column 9902 of the name of specification which uses the module and the member of times of usage, in a step 9a06. If there is no specification which uses the module name as the result of the deletion in the step 9a06 (as determined in a step 9a07), the module name is deleted from the module name column 9901 in a step 9a08.

If the input edit operation is not the "delete" in the decision of the step 9a03, whether it is "add" or not is determined in a step 9209. If it is the "add", the number of times of usage of the specification under edition is incremented by one in a step 9a10.

If the decision in the step 9a02 is that the name of the specification under edition is not stored in the column 9902 of the name of specification which uses the module and the number of times of usage, the name of the specification is added to the column 9902 and the number of times of usage is set to "1". If the decision in the step 9803 is that the name of module is not stored in the module name column 901, the name of the module is added to the module name column 9901 in a step 9a11, and the name of the specification under edition is added to the column 9902 and the number of times of usage is set to "1" in a step 9a12.

FIGS. 89A, 89B and 89C show operation of outputting the cross-reference information for a specific module in the specification upon user request and an example of output.

FIG. 89A shows, in a menu form, output commands for the designated cross-reference information for outputting the cross-reference information. A command 9b01 is used to display the cross-reference information for a specific module. A command 9b02 is used to print out the cross-reference information for a specific module.

FIG. 89B shows an operation for displaying the cross-reference information for the specific module and an example of display. The specific module (module A in the present example) is designated by the mouse 9202 (operation 9b03) and the cross-reference display command 9b01 which is one of the designated cross-reference information output commands is selected by the mouse 9202 (operation 9b04) so that a screen 9b05 is displayed. This represents the cross-reference information of the module designated by the user. It shows that the module A (the module designated by the user) is used by the specifications "X" and "Y".

FIG. 89C shows an operation to print out the cross-reference information for the specific module and an example of print. The specific module is designated by the mouse 9202 (operation 9b06), and when the cross-reference print command which is one of the designated cross-reference information output commands is selected by the mouse 9202 (operation 9b07), it is printed out as shown by 9b08. This represents the cross-reference information of the module designated by the user.

Figure 90C:
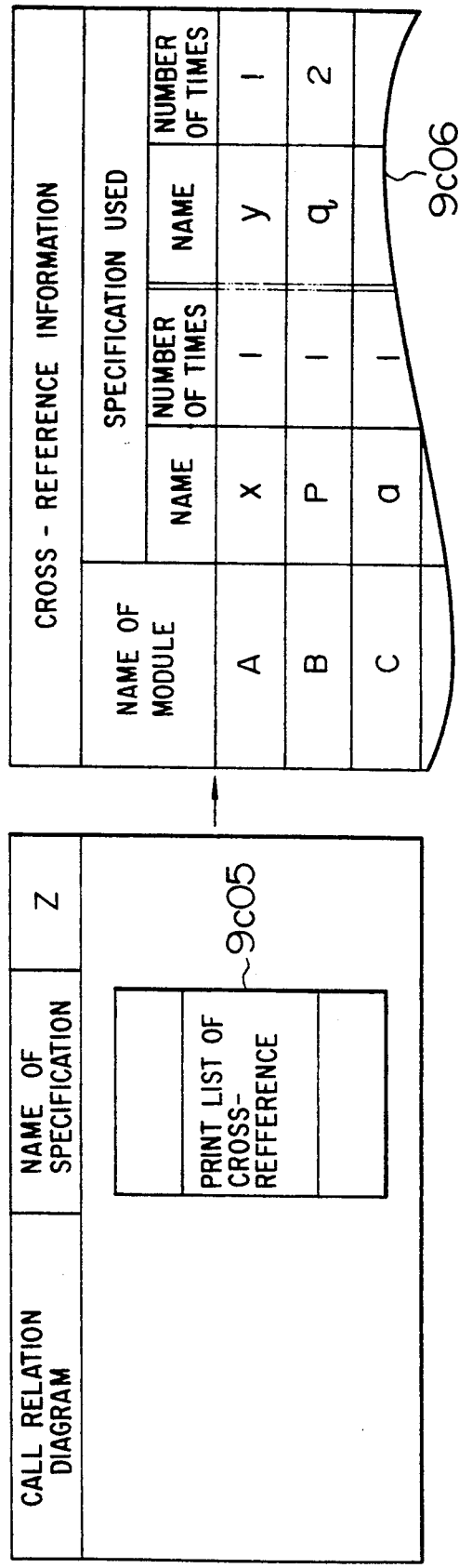

FIGS. 90A, 90B and 90C show an operation to output the cross-reference information for all modules used in the specification upon user request and an example of output.

FIG. 90A shows, in a menu form, the designated cross-reference information output command for displaying the cross-reference information. A command 9c01 is used to display a list of cross-reference information for all modules used in the specification under edition, and a command 9c02 is used to print out the list.

FIG. 90B shows an operation to display the cross-reference information for all modules used in the specification under edition and an example of display. When the cross-reference list display command 9c01 which is one of the designated cross-reference information output commands is selected by the mouse 9202 (operation 9c03), a screen 9c04 is displayed. It represents the list of cross-reference information of all modules used in the specification.

FIG. 90C shows an operation to print out the cross-reference information for all modules used in the specification under edition and an example of print. When the cross-reference list print command 9c02 which is one of the designated cross-reference information output commands is selected by the mouse 9202 (operation 9c05), it is printed out as shown by 9c06. It represents the cross-reference information for all modules used in the specification.

When the designated cross-reference information output command is inputted, the step 9310 in the flow chart of FIG. 81 executes the process. The step 9310 is shown in further detail in a flow chart of FIG. 91.

In a step 9d01, whether the designated cross-reference information output command is the cross-reference display command 9b01 or not is determined. If it is the cross-reference display command 9b01, a step 9b02 is executed. In the step 9b02, the cross-reference information for the module designated by the user is searched from the cross-reference storage 9107, and the result is displayed on the screen in a step 9806.

If the decision in the step 9d01 is that the command is not the cross-reference display command 9b01, whether it is the cross-reference print command 9b02 or not is determined in a step 9d03. If it is the cross-reference print command 9b02, the cross-reference information for the module designated by the user is searched from the cross-reference storage 9107 in a step 9d02, and the result is printed out in a step 9814.

If the decision in the step 9d03 is that the command is not the cross-reference print command 9b02, whether it is the cross-reference list display command 9c01 or not is determined in a step 9d05. If it is the cross-reference list display command 9c01, a step 9d06 is executed. In the step 9d06, the cross-reference information for all modules used in the specification under modification is searched from the cross-reference storage 9107, and the result is outputted to the screen in a step 9806.

If the decision in the step 9d05 is that the command is not the cross-reference list display command 9c01, whether it is the cross-reference list print command 9c02 or not is determined in a step 9d07. If it is the cross-reference print command 9c02, a step 9d06 is executed. In the step 9d06, the cross-reference information for all modules used in the specification under edition is searched from the cross-reference storage 9107, and the result is printed out in a step 9814.

In the above embodiment, the display timing of the cross-reference information is limited to the time of input of the edit operation. An embodiment which permits the display at other timing is now explained.

In the present embodiment, the cross-reference information can be displayed out only at the time of entry of the edit operation (deletion/addition of data) but also at the time of storing data and further at the end time of the editor operation.

In the display timing in the embodiment of FIG. 79, the display is made at each operation. Accordingly, there is a risk that most user edit operations are interrupted. In the present embodiment, the cross-reference information for the past edit operations is collectively displayed at the delimitation of the edit operation, that is, at the time of storing data or at the end of editor operation so that the user edit operation is not impeded.

Figure 92:
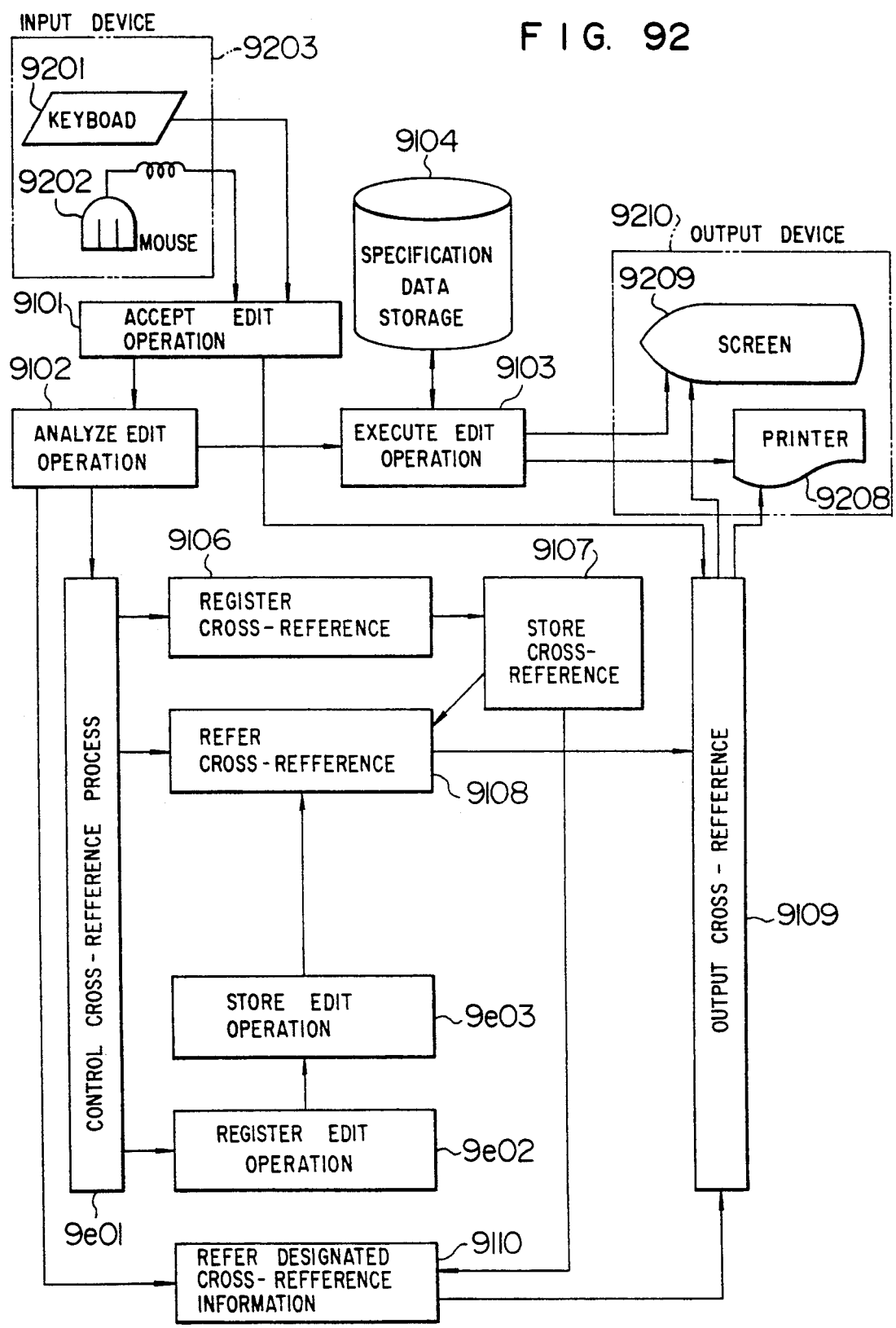
FIG. 92 shows a functional configuration of an embodiment.

FIG. 92 shows a functional configuration for collectively displaying the cross-reference information for the past edit operation at the time of storing data or at the end of the editor operation.

It adds an edit operation register process 9e02 for temporarily storing the edit operation, and an edit operation storage 9e03 for storing the edit operation, to the functional configuration of FIG. 79, and adds a cross-reference process control process 9e01 which is modification of the function 9105 of FIG. 79 in order to conduct the cross-reference process.

At the time of storing data or at the end of the editor operation, the cross-reference information for the edit operation, which has so far been stored is referred in the cross-reference reference process 9108, and the result is outputted to the output device such as screen 9209 or printer 9208 in the cross-reference output process 9109.

The timing is taken by the cross-reference process control process 9e01. The content thereof is shown in FIG. 93 as a decision table.

FIG. 93 shows a table to determine whether the cross-reference processing is to be executed for the input operation such as edit operation. It adds to the decision table of FIG. 85 in the previous embodiment an edit operation registration decision column 9f01, and a stored edit operation cross-reference display decision column 9f02 to indicate whether the cross-reference information for the edit operation stored in the edit operation storage 9e02 is to be outputted or not. Instead of displaying the cross-reference when the edit operation is inputted (this is shown by X in the cross-reference information display column 9f03), the cross-reference information is displayed when the data is stored or when the end of editor operation is inputted. (The stored edit operation cross-reference display decision column 9f02 is "○").

FIG. 94 shows a table which indicates a structure of the edit operation storage 9e02.

The table comprises a module name column 9g01 which stores the data which is the object of the edit operation, and an edit operation column 9g02 which stores the edit operation.

Figure 95:
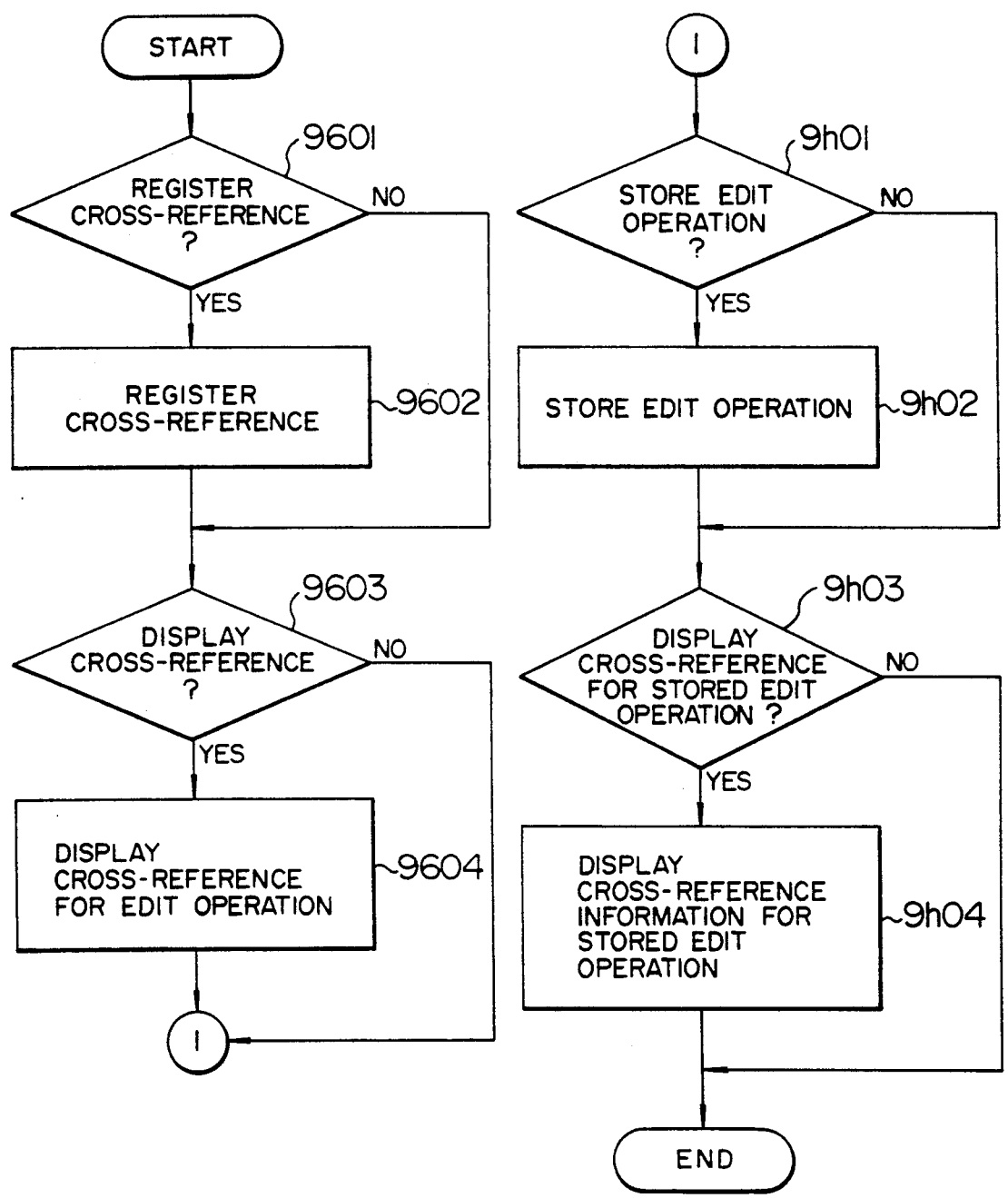
FIG. 95 shows a detailed flow chart of a cross-reference processing step of the embodiment.

FIG. 95 shows a detailed flow chart in the present embodiment of the cross-reference step 9309 of the flow chart shown in FIG. 81. It adds to the detailed flow chart of FIG. 84 an edit operation registration decision step 9h01, an edit operation registration step 9h02, a stored edit operation cross-reference display decision step 9h03, and a stored edit operation cross-reference display step 9h04.

In the edit operation registration decision step 9h01, when the edit operation marked with "○" in the edit operation registration decision column 9f01 of the decision table of FIG. 93 is inputted, the edit operation registration step 9h02 is executed.

In the edit operation registration step 9h02, the input edit operation is stored into the edit operation storage 9e02 in the form shown in FIG. 94.

In the stored edit operation cross-reference display decision step 9h03, when the edit operation marked with "○" in the stored edit operation cross-reference display decision column 9f02 of the decision table of FIG. 93 is inputted, the stored edit operation cross-reference display step 9h04 is executed.

In the stored edit operation cross-reference display step 9h04, the cross-reference information stored in the edit operation storage 9e02 is referred and it is outputted.

Figure 96:
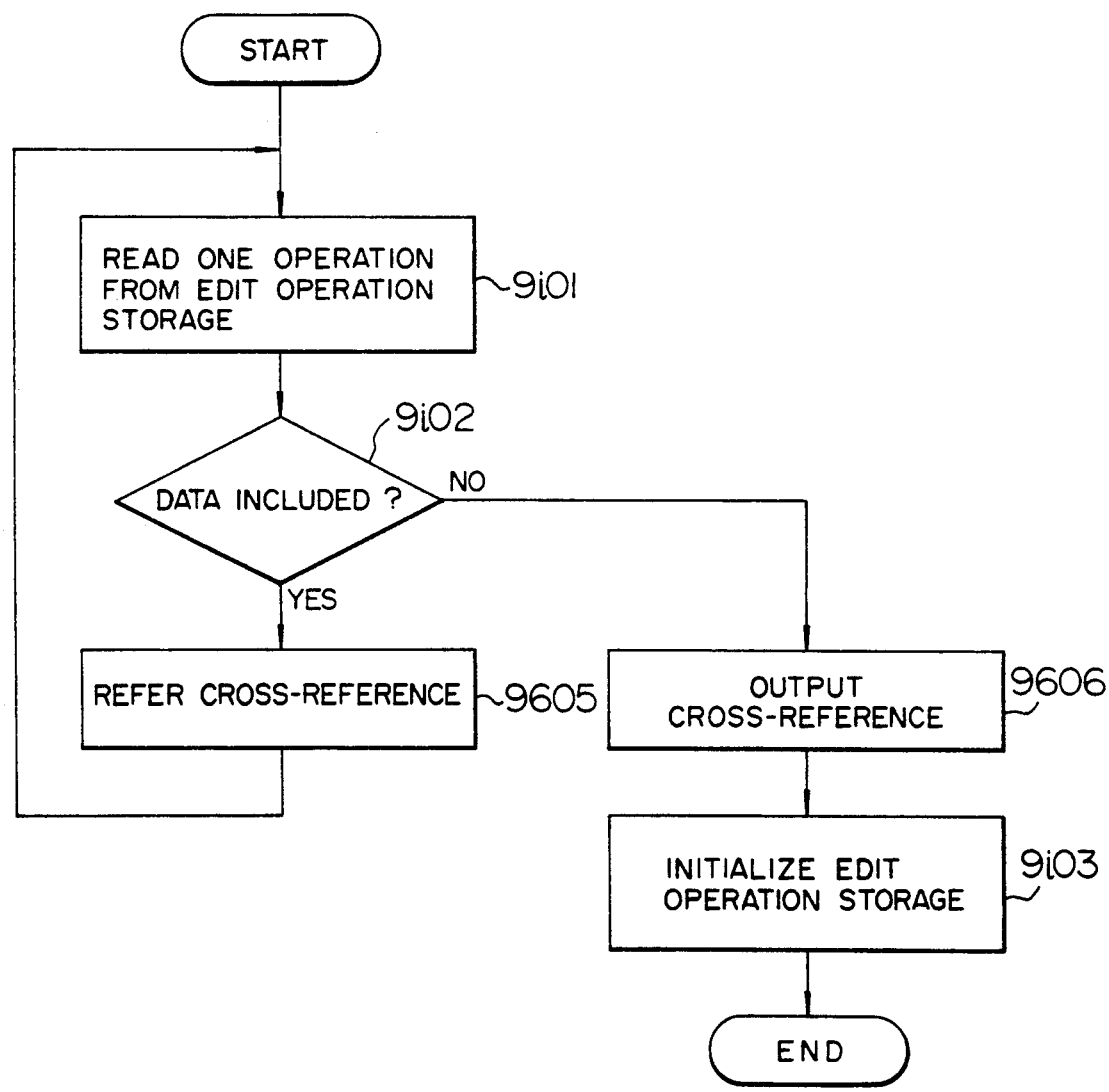
FIG. 96 shows a detailed flow chart of a cross-reference display step of the embodiment.

FIG. 96 shows a detailed flow chart of the step 9h04 of FIG. 95.

In a step 9i01, one of the edit operations stored in the edit operation storage 9e02 is read. In a step 9i02, whether there is an edit operation read in the step 9i01 or not is determined. If there is such edit operation, a step 9605 is executed. If the decision in the step 9i02 is that there is no data read in the step 9i01, a step 9606 is executed. In the step 9605, the cross-reference information for the edit operation read in the step 9i01 is referred. In the step 9606, the cross-reference information referred in the step 9605 is outputted to the screen 9209 or the printer 9208. After the cross-reference has been displayed, all edit operations so far stored in the edit operation storage 9e02 are erased, and the edit operation storage 9e02 is initialized.

In this manner, the cross-reference information for the edit operation can be displayed not only when the edit operation is inputted but also when the data is stored or the editor operation is terminated. The cross-reference information may also be displayed for other normal editor operations at those timings.

In the above embodiment, the edit operation is temporarily stored and the cross-reference information is collectively displayed at other timing. An embodiment in which the cross-reference information for the edit operation is referred and stored each time the edit operation is inputted, instead of storing the edit operation is now explained.

Figure 97:
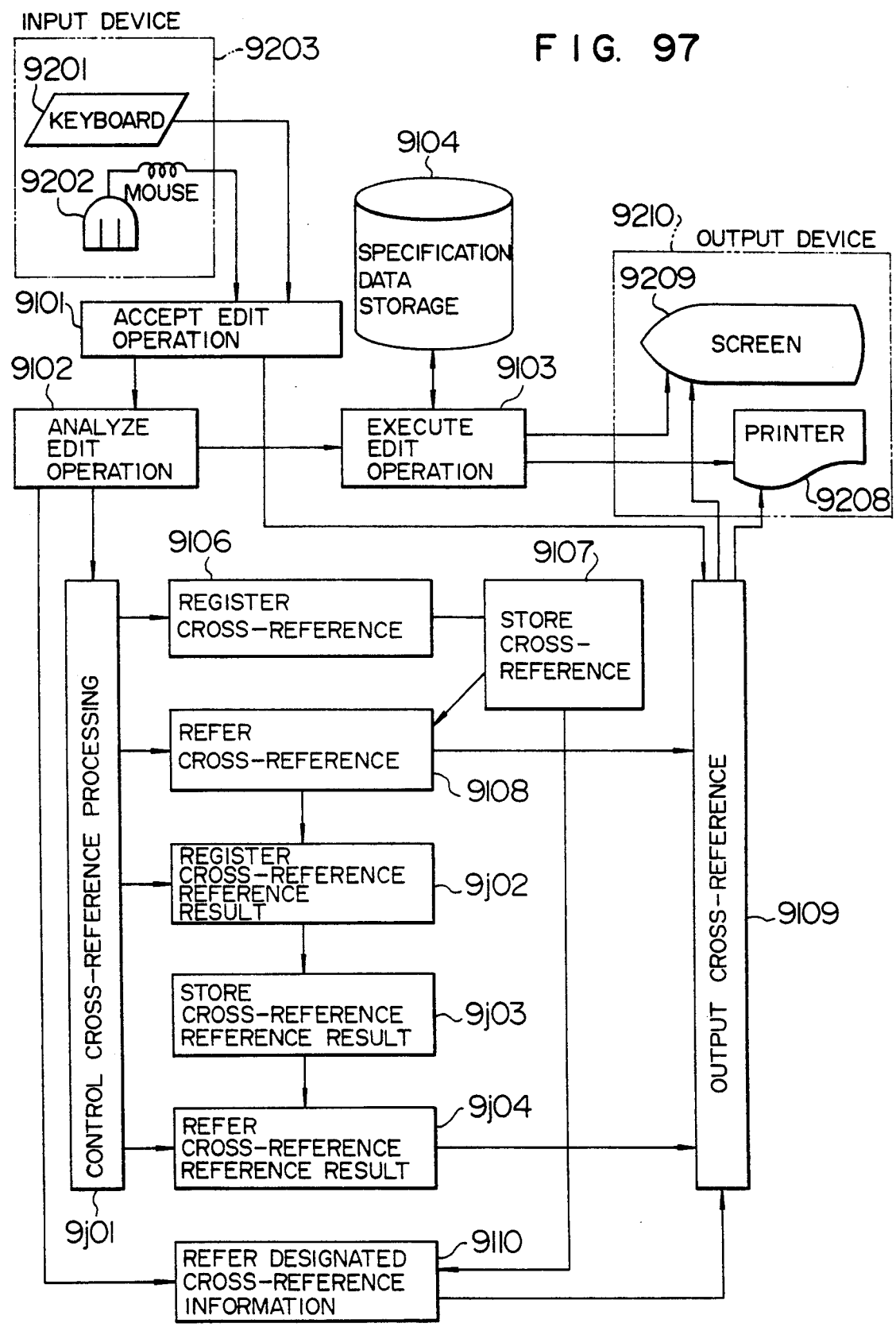
FIG. 97 shows a functional configuration of an embodiment.

FIG. 97 shows a functional configuration of the present embodiment. In FIG. 97, it adds to the functional configuration of FIG. 79 a cross-reference reference result storage 9j03 which stores a result of reference to the cross-reference, a cross-reference reference result registration process 9j02 for referring the cross-reference and registering it into the cross-reference reference result storage 9j03, and a cross-reference reference result reference process 9j04 for referring the cross-reference reference result from the cross-reference reference result storage 9j03, and substitutes the cross-reference process control process 9105 of FIG. 79 with a cross-reference process control process 9j01 for controlling the cross-reference processing. The result of reference by the cross-reference reference process 9108 for the input edit operation is registered into the cross-reference reference result storage 9j03 by the cross-reference reference result registration process 9j02. When the data is stored or the editor operation is terminated, the result of the cross-references so far made is stored into the cross-reference reference result storage by the cross-reference reference result reference process 9j04, and it is outputted to the output device such as the screen 9209 or the printer 9208 by the cross-reference output process 9109.

FIG. 98 shows a decision table which determines which one of the cross-reference processing is to be executed.

It adds to the decision table shown in FIG. 85 a cross-reference reference result registration decision column 9k01 and a cross-reference reference result display decision column 9k02. When an edit operation marked with "○" in the cross-reference reference result registration decision column 9k01 is inputted, the cross-reference information for the edit operation is referred and the result is stored into the cross-reference reference result storage 9j03. When an edit operation marked with "○" in the cross-reference reference result display decision column 9k02 is inputted, the result of reference is read from the cross-reference reference result storage 9j03 and it is displayed.

FIG. 99 shows a table which shows a structure of the cross-reference reference result storage 9j03. The table comprises a module name column 9j01 of the edit operation storage of FIG. 94, an edit operation column 9j02 which stores the content of the edit operation, and a name of specification used column 9w03 which stores the cross-reference information for the edit operation (which other specification the module which is the object of edition is used in). The name of specification column 9w03 can store a plurality of specifications, because the specification which uses the module is not always one.

FIG. 100 shows a detailed flow chart in the present embodiment, of the cross-reference step 9309 of the flow chart shown in FIG. 81. Steps 9601 and 9602 execute the same function as that of the steps of FIG. 84. In a step 9m01, whether one or both of displaying the cross-reference information for the input edit operation and registering the cross-reference information as the cross-reference reference result is determined in accordance with the columns 9k01 and 9k02 of the decision table of FIG. 98. If the decision is to execute, the step 9605 is executed, and if the decision is not to execute, a step 9m05 is executed.

If the decision in the step 9m01 is that one or both of displaying the cross-reference information for the input edit operation and registering the cross-reference information as the cross-reference reference result is to be executed, the cross-reference information for the edit operation inputted in the step 9605 is referred. Further, whether the cross-reference information is to be stored as the reference result or not is determined in accordance with the column 9k01 of the decision table of FIG. 98 in a step 9m02. If the decision in the step 9m02 is to execute, the cross-reference information is stored into the cross-reference reference result storage 9j03 in a step 9m03. In a step 9m04, whether the cross-reference information referred in the step 9605 is to be outputted or not is determined in accordance with the decision table of FIG. 98. If the decision is to execute, it is outputted in a step 9606.

Whether the cross-reference information stored in the cross-reference reference result storage 9j03 or not is determined in accordance with the column 9k02 of the decision table of FIG. 98. If the decision is to execute, the cross-reference information stored in the cross-reference reference result storage 9j03 is read in a step 9m06, and it is displayed in a step 9606.

In this manner, the cross-reference information for the past edit operations can be collectively displayed.

After the cross-reference information has been displayed in the step 9606, all data so far stored in the cross-reference reference result storage 9j03 are erased in a step 9m07.

In the above embodiment, the cross-reference information is displayed only during the start of the specification which is the object of the edit operation. An embodiment in which related cross-reference information is also displayed when a specification other than the specification which is the object of the edit operation is started is now explained.

Figure 101A:
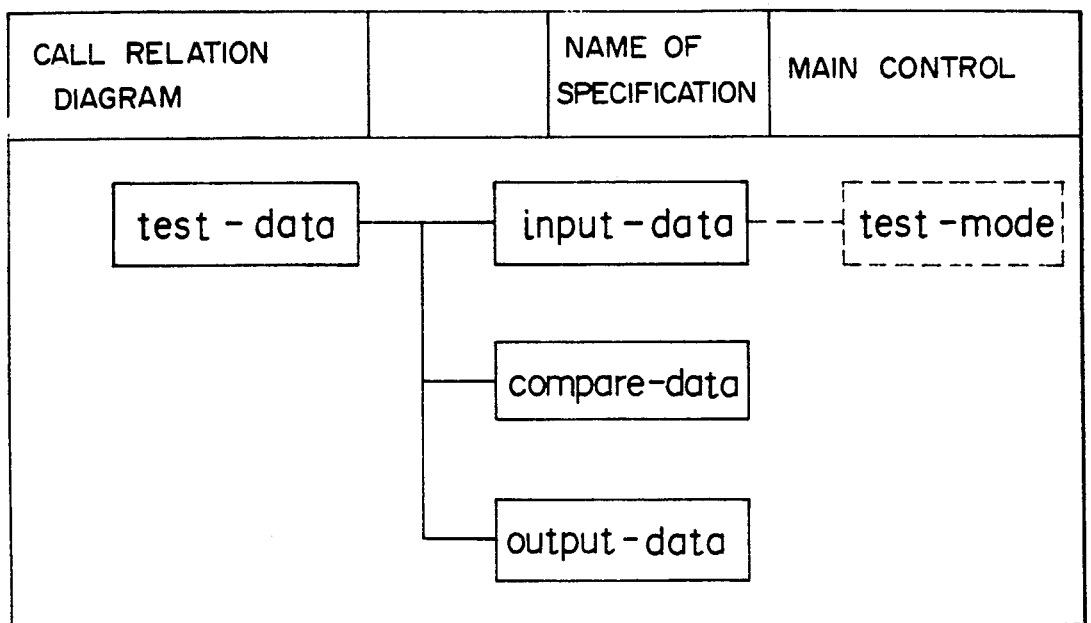
FIGS. 101A and 101B show examples of display of the embodiment.
Figure 101B:
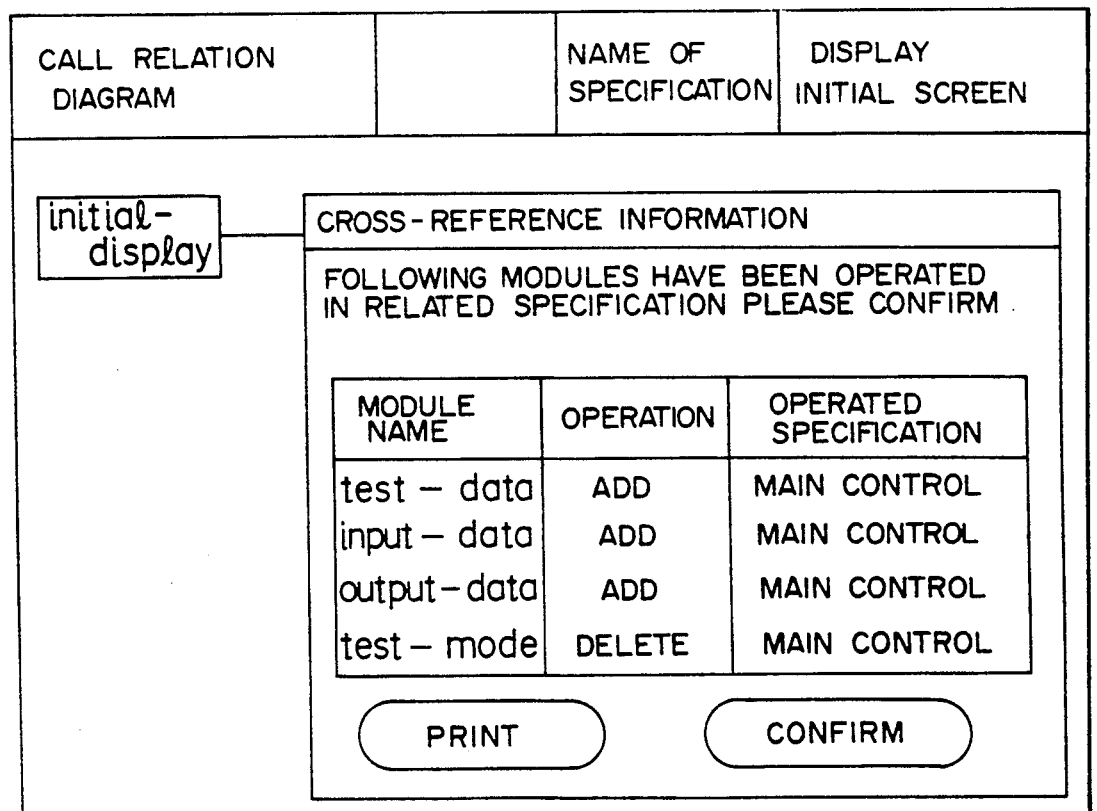

FIGS. 101A and 101B illustrate implementation of the present embodiment.

When an edit operation is performed for the specification shown in FIG. 101A, the cross-reference information for the edit operation is stored. When the specification shown in FIG. 101B is started, the edit operation in the specification of FIG. 101A and the cross-reference information thereof are displayed.

Figure 102:
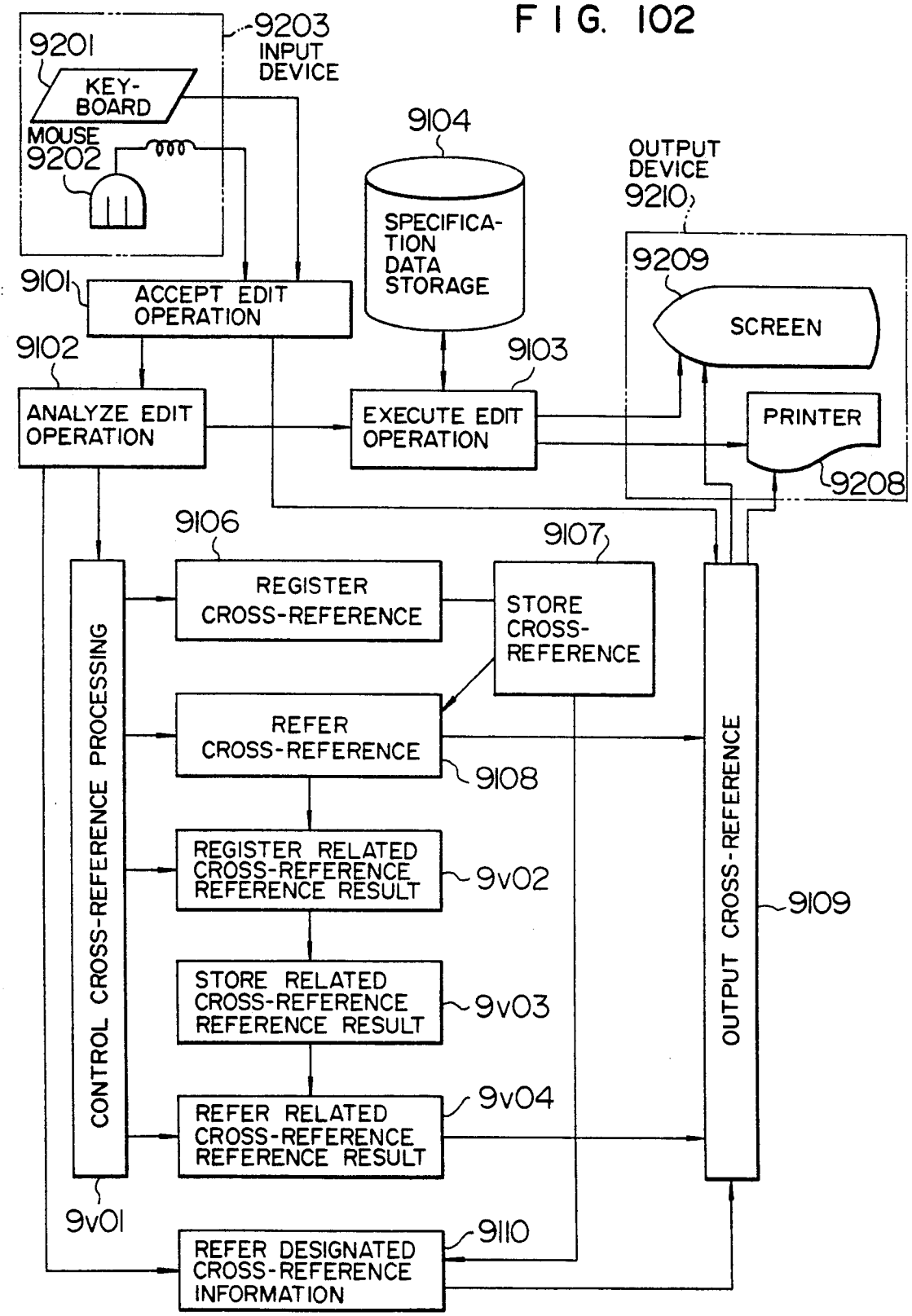
FIG. 102 shows a functional configuration of an embodiment.

FIG. 102 shows a functional configuration of the present embodiment.

In FIG. 102, it adds to the functional configuration of FIG. 79 a related cross-reference reference result storage 9v03 which stores the cross-reference information for the input edit operation as related cross-reference information, a related cross-reference reference result registration process 9v02 for registering the cross-reference information for the input edit operation into the related cross-reference reference result storage 9v03, and a related cross-reference reference result reference process 9v04 for referring the related cross-reference information from the related cross-reference reference result storage 9v03, and further adds a cross-reference process control process 9v01 which is modification of the content of the cross-reference process control process 9105 of FIG. 79, for controlling the cross-reference processing.

FIG. 103 shows a table to determine which one of the cross-reference processings is to be executed.

In FIG. 103, it adds to the decision table of FIG. 85 a related cross-reference reference result registration decision column 9p01, and a related cross-reference reference result display decision column 9p02, and further adds to the edit item column a start item. The start means the start of the editor. Since it is not a command which is inputted by the user with the understanding of "the editor has started", it is shown with ( ) in the item column to discriminate it from other commands.

When the edit operation marked with "○" in the related cross-reference reference result registration decision column 9p01 is inputted, the cross-reference information is registered into the related cross-reference reference result storage 9v03. When the edit operation marked with "○" in the related cross-reference reference result display decision column 9p02 is inputted, the related information is referred from the cross-reference information stored in the related cross-reference reference result storage 9v03 and it is displayed.

FIG. 104 shows a table which shows an internal structure of the related cross-reference reference result storage 9v03. In FIG. 104, it adds an edit operation specification name column 9q01 to the table shown in FIG. 99.

The edit operation specification name column 9q01 stores the name of specification for which the operation is performed.

FIG. 105 shows a flow chart of the present embodiment.

In FIG. 105, a cross-reference step 9309 is added to FIG. 81 immediately after the initial screen display step 9301. Thus, when the editor is started, the related cross-reference information can be displayed.

Figure 106:
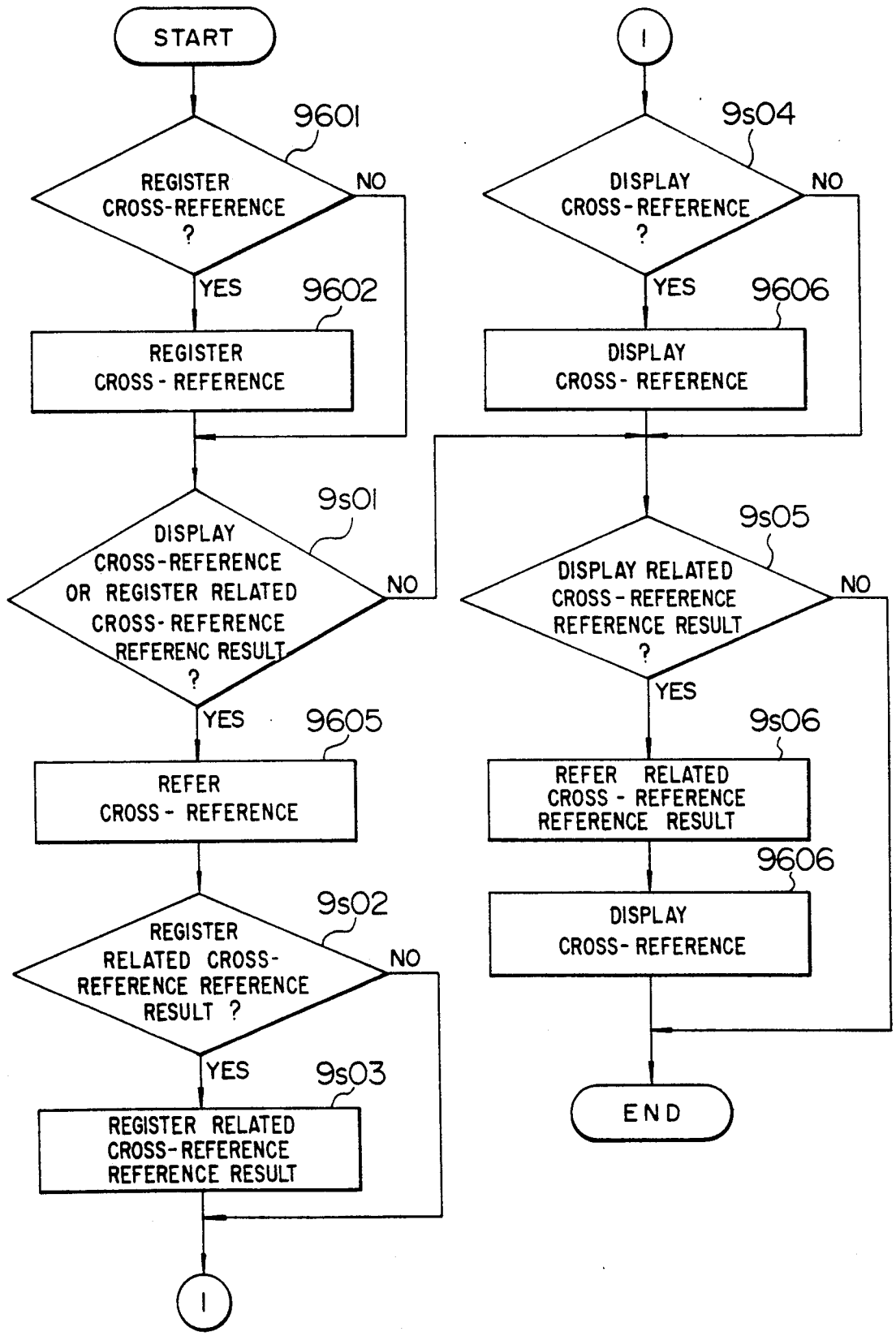
FIG. 106 shows a detailed flow chart of a cross-reference processing step of the embodiment.

FIG. 106 shows a detailed flow chart in the present embodiment, of the cross-reference step 9309 of the flow chart shown in FIG. 81. Steps 9601 and 9602 perform the same function as that of the steps of FIG. 84. In a step 9s01, whether one or both of displaying the cross-reference information for the input edit operation and registering the cross-reference information as the related cross-reference reference result is to be executed is determined in accordance with the columns 9p01 and 9p02 of the decision table of FIG. 103. If the decision is to execute, a step 9605 is executed, and if the decision is not to execute, a step 9s05 is executed.

If the decision in the step 9s01 is to display the cross-reference information for the input edit operation and-/or register the cross-reference information as the related cross-reference reference result, the cross-reference information for the input edit operation is referred in a step 9605. In a step 9s02, whether the cross-reference information is to be stored as the related cross-reference reference result or not is determined in accordance with the column 9p01 of the decision table of FIG. 103. If the decision in the step 9s02 is to execute, the cross-reference information is registered into the related cross-reference reference result storage 9v03 in a step 9s03. In a step 9s04, whether the cross-reference information referred in the step 9605 is to be outputted or not is determined in accordance with the decision table of FIG. 103. If the decision is to execute, it is outputted in a step 9806.

Whether the cross-reference information stored in the related cross-reference reference result storage 9v03 is to be displayed or not is determined in accordance with the column 9p02 of the decision table of FIG. 103. If the decision is to execute, the cross-reference information stored in the related cross-reference reference result storage 9v03 is read in a step 9s06, and it is displayed in a step 9806.

In this manner, the cross-reference information for the edit operations so far performed can be collectively displayed by other related specification.

In the above embodiment, one type of data (module) is handled by one type of editor (call relation diagram editor). In a fifth embodiment to be described later, a plurality of types of data are handled by a plurality of type of editor.

In order to accomplish the above embodiment for a plurality of types of editor, the data items are changed as shown in FIG. 107.

Figure 107A:
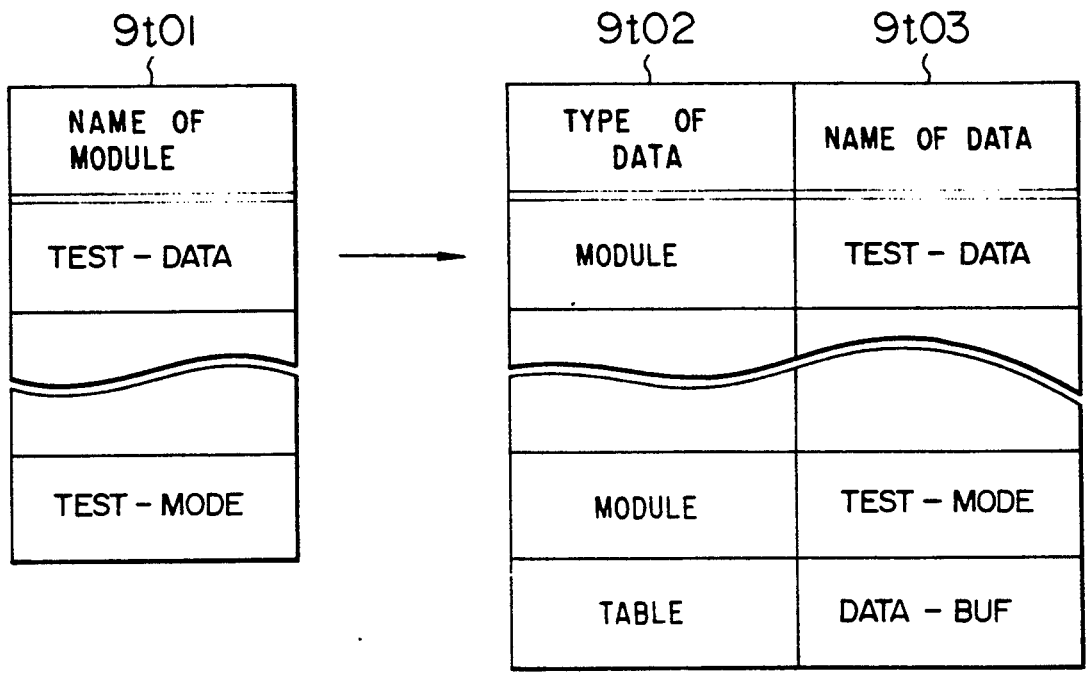
FIGS. 107A and 107B illustrate the implementation of the embodiment.
Figure 107B:
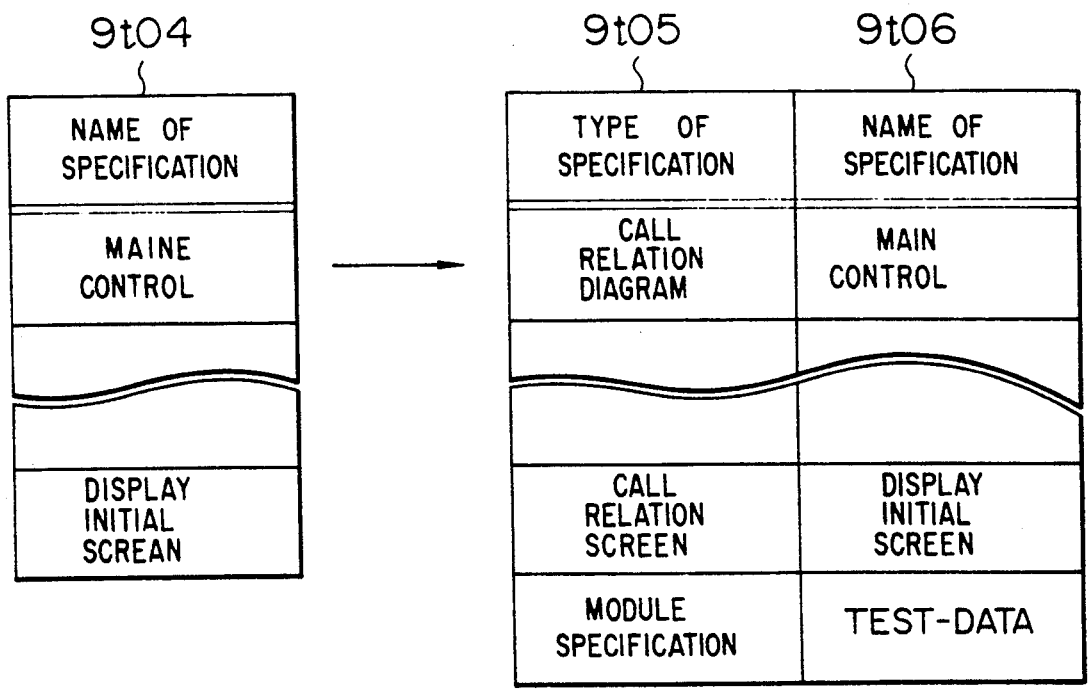

FIGS. 107A and 107B illustrate a manner of data modification in the present embodiment.

As shown in FIG. 107A, data (9t01) in the module name of the table used in the above embodiment is expressed by a set of data comprising a type of data (9t02) and a name of data (9t03). As shown in FIG. 107B, the specification data (9t04) used in the above embodiment is expressed by a set of data comprising a type of specification (9t05) and a name of specification (9t06).

Figure 108A:
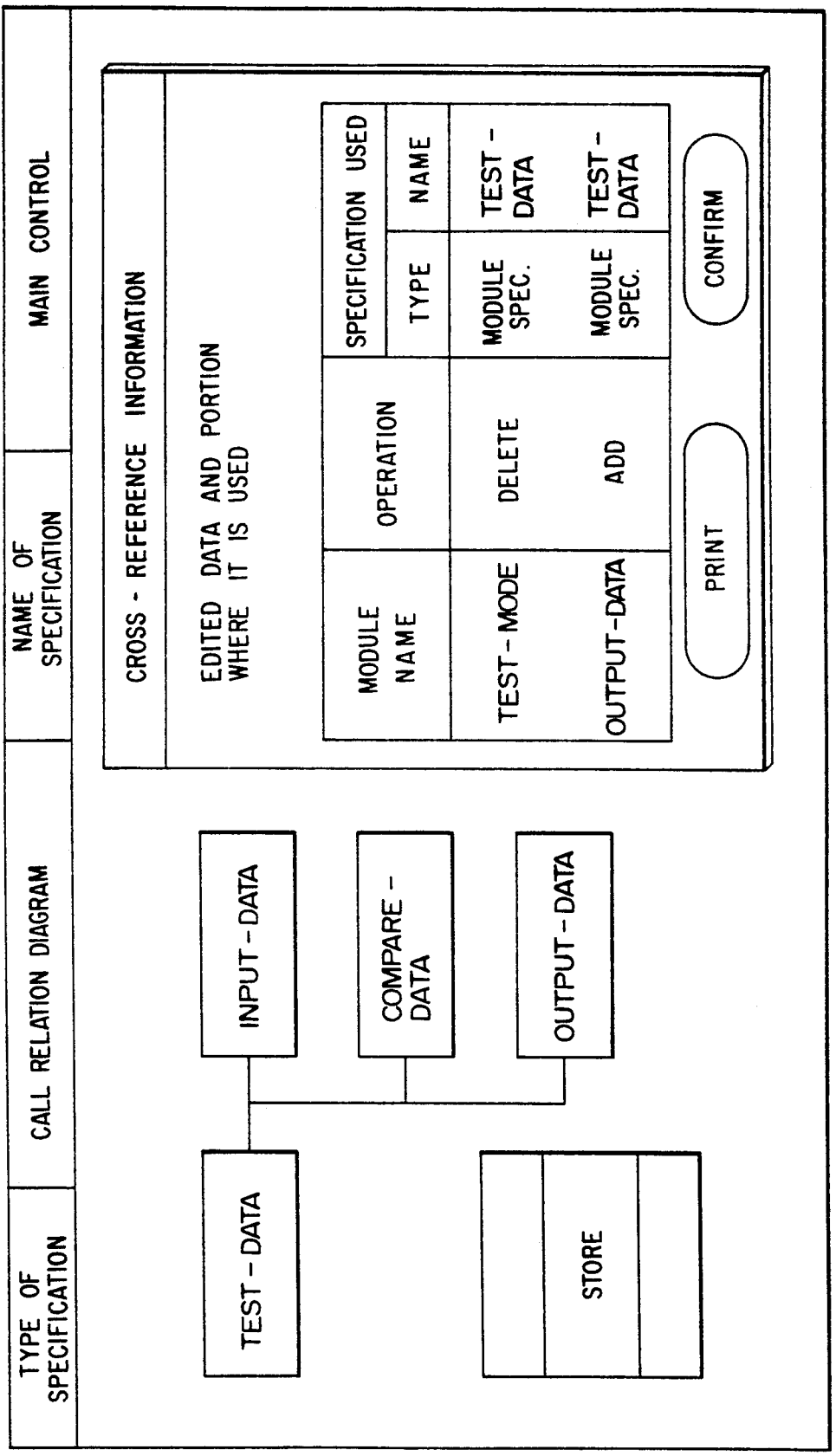

FIGS. 108A and 108B show implementation of the present embodiment.

FIG. 108A shows an example of display of the cross-reference information in the editor called the call relation editor used in the above embodiment.

FIG. 108B shows that for the editor called the module specification The module specification is prepared for each module, and it describes detailed information of the module to define it. A reference module column 9u01 defines a module which that module calls (refers). An external information column 9u02 define a table used by the module, out of the tables referred/registered by the respective modules.

As shown by 9u03, the content edited in FIG. 108A is displayed in other editor as the cross-reference information.

Figure 110:
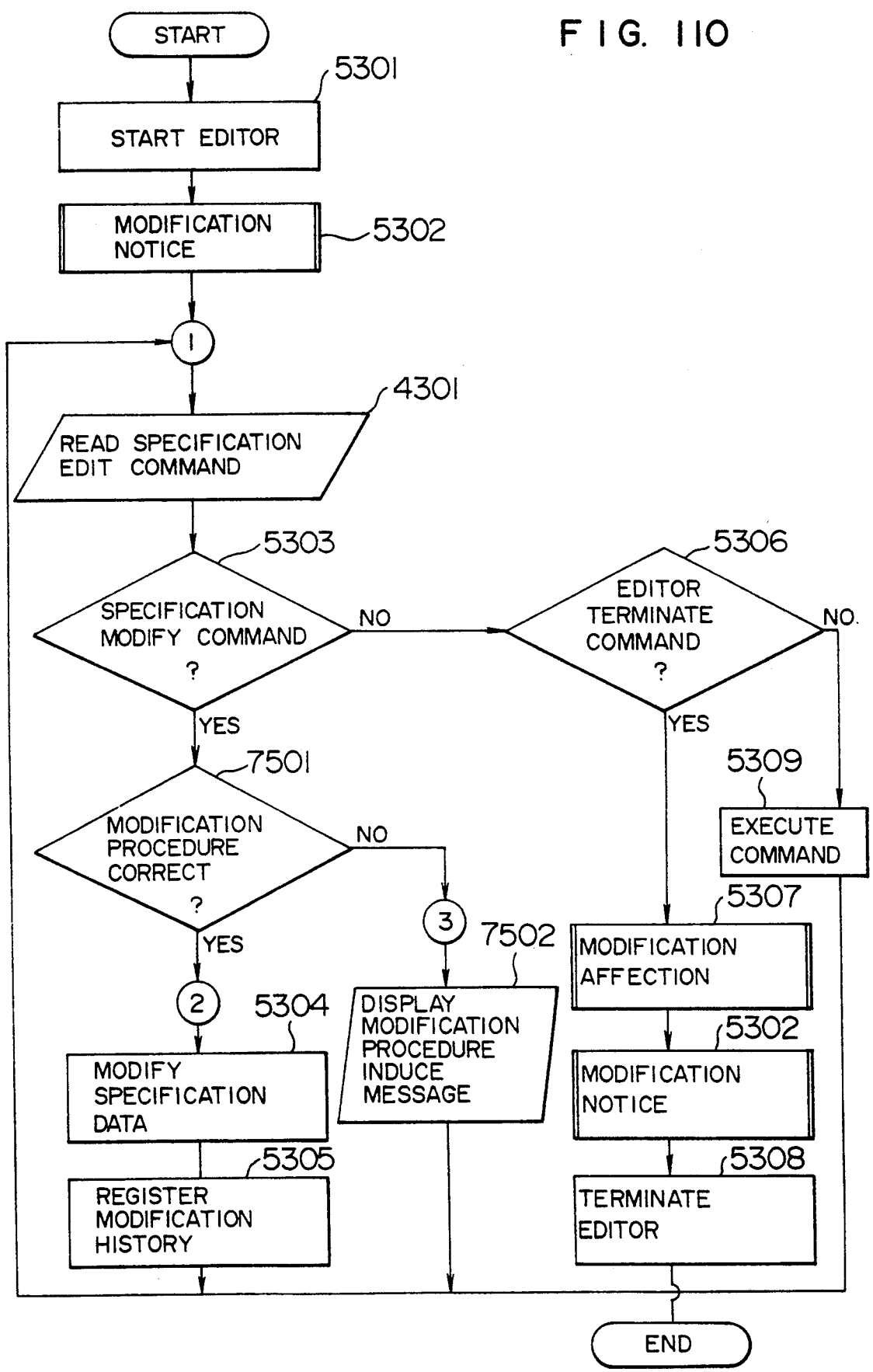
FIG. 110 shows a flow chart of an embodiment.
Figures 111, 112:
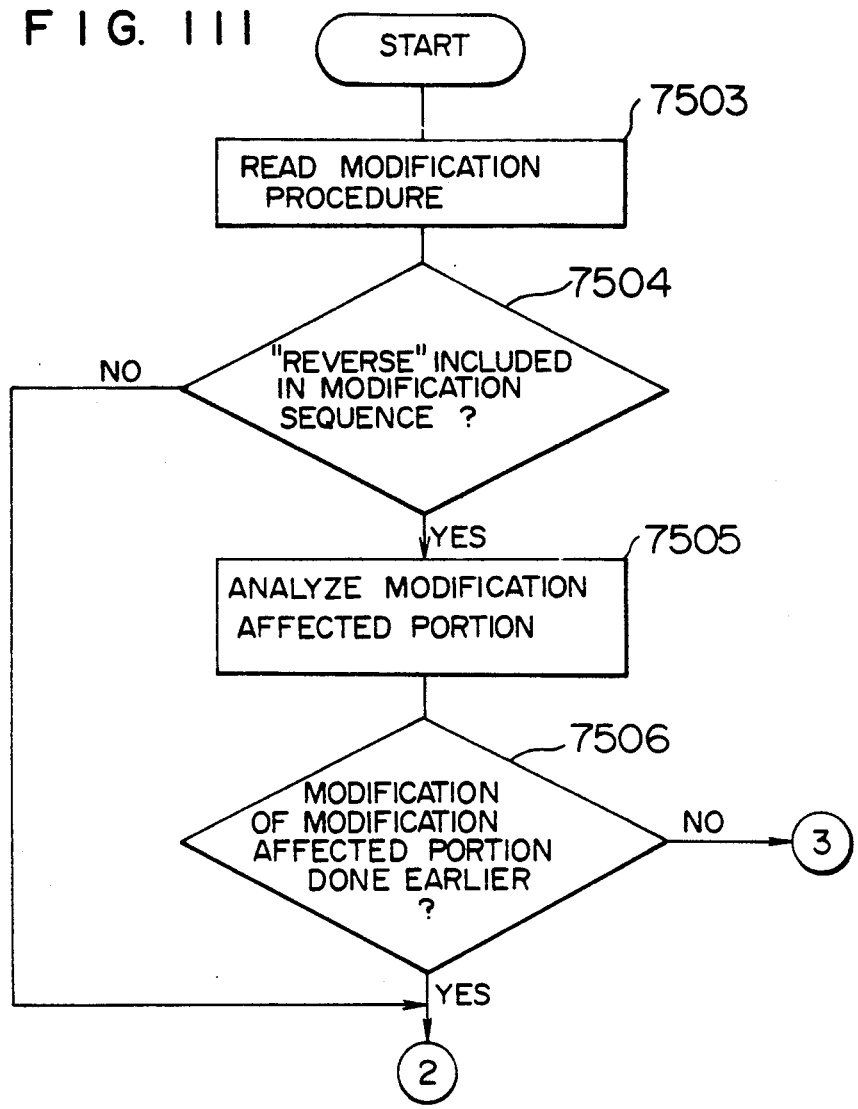
FIG. 111 shows a detailed flow chart of a portion of FIG. 110.
FIG. 112 shows a table of design procedure.

If the manner, the data edited by the variety of editors can be quickly and automatically referred by the system. FIG. 109 shows rules of modification procedures in addition to the modification rule 1b01 of FIG. 12. It adds a sequence 74 to the content of the modification rule shown in FIG. 13. These sequence 7401 indicates whether the procedure of performing the modification represented by the modified specification 1c01, the modification operation 1c02 and the object of modification 1c03 prior to the modification of the affected portion represented by the affection specification 1c04, the relation 1c05 and the affected portion 1c06 is correct or not. "Correct" means that the procedure is correct, and "reverse" means that the procedure is not correct, that is, it is reverse. The sequence is "reverse" where the sequence is "correct" if the relation of the modified portion and the affected portion is reversed. A process flow when the modification procedure is induced by using the modification rule is shown in FIG. 110. This flow chart incorporates the inducing method of the modification procedure in the display method of the modification affected portion shown in the flow charts of FIGS. 62, 63A and 63B. It adds steps 7501 and 7502 to FIG. 62. The step 7501 is executed when the command to modify the specification is read and it determines whether the modification procedure is correct or not. If the decision is correct, steps 5304 and 5305 are executed. If the decision is not correct, a modification procedure induce message is displayed in a step 7502. The modification procedure induce message indicates that there is a portion to be modified earlier and what portion of a what specification it is. FIG. 111 shows a detail of the step 7501. In a step 7503, the modification rule shown in FIG. 109 is referred to search all lines which describe the affected portions of the modification commanded by the specification edit command, and the content of the sequence 7401 of the retrieved lines is read. In a step 7504, whether "reverse" is included in the sequence or not is determined, and if there is such, a step 7505 is executed, and if there is no such, it is determined that the modification procedure is correct. When the sequence includes "reverse" in the step 7503, it means that the affected portion represented by the affected specification 1c04, the relation 1c05 and the affected portion in the line including "reverse" in the sequence 7401 is to be modified earlier. In a step 7505, the affected portion represented by the affected specification 1c04, the relation 1c05 and the affected portion 1c06 of the line including "reverse" in the sequence 7401 is analyzed. In a step 7506, whether the modification of the analyzed affected portion has been done earlier or not is determined. If the modification of the affected portion has been done earlier, one of the affected portions for the early modification is the modification portion which the specification edit command commands. Thus, the decision as to whether the modification of the affected portion has been done earlier or not is to determine whether there is modification of the affected portion where is affected by the modification of the modification portion or not. If the decision in the step 7506 is that the modification of the affected portion has been done earlier, it is determined that the modification procedure is correct, and if the decision in the step 7506 is that the modification of the affected portion has not been done earlier, it is determined that the modification procedure is not correct.

Figure 113:
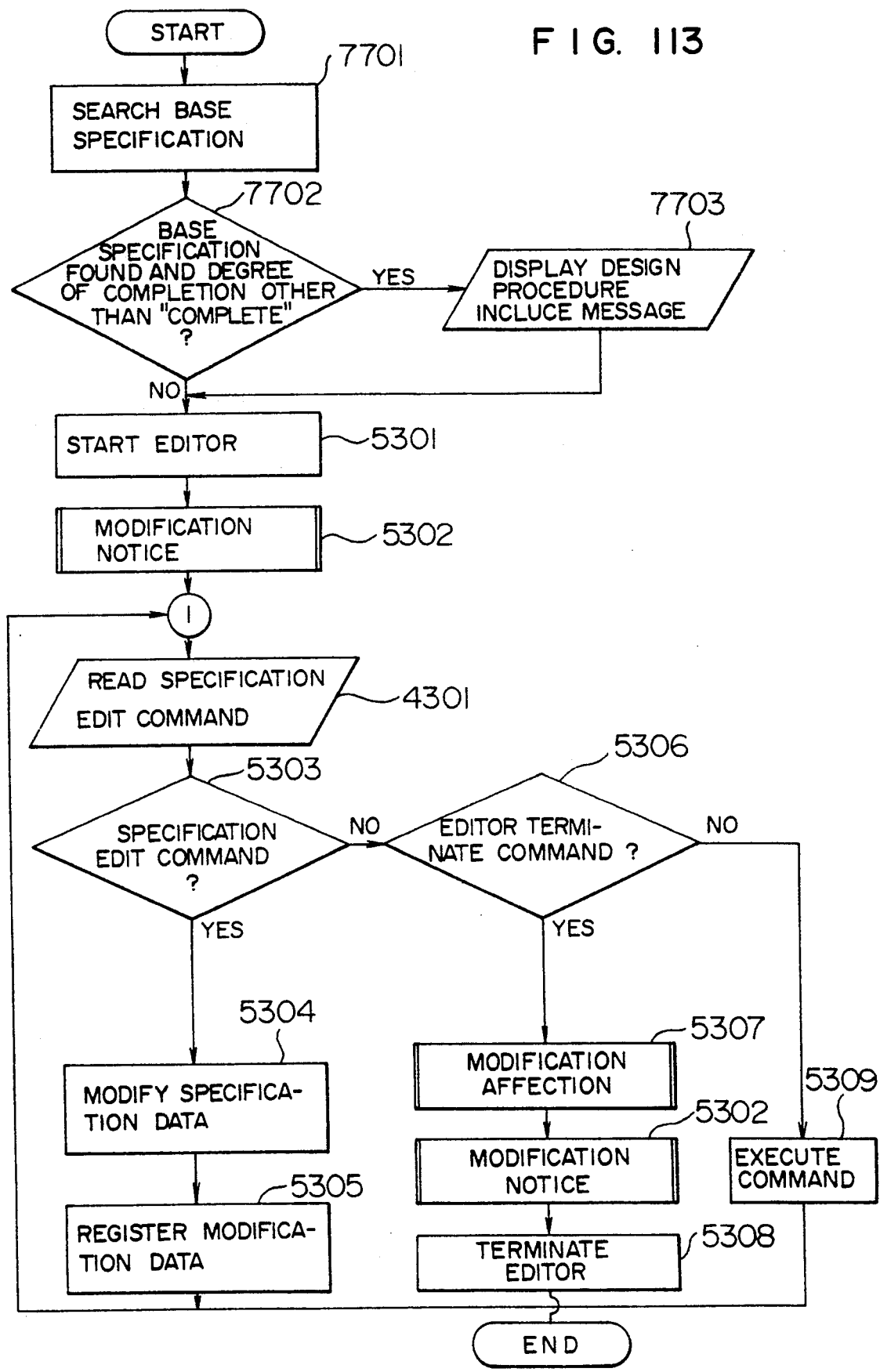
FIG. 113 shows a flow chart of an embodiment.

In the above embodiment, the modification procedure is induced. A method for inducing a procedure for designing a specification is now described. FIG. 112 shows an example of data which represents a rule of design procedure for each specification. A design specification 7601 indicates a type of specification to be designed, and a base specification 7602 indicates a type of specification (base specification) to be designed prior to the design of the specification to be designed, and a relation 7603 indicate a relation between the base specification and the design specification. Where the relation 7603 is "inclusive", it means that the base specification includes the module or table which is the object of description of the design specification, and "same" means that the base specification describes the same module or table as that which is the object of description of the design specification. The PAD 7604 is a kind of specification which shows a detailed process of the module. In the present embodiment, the data of the degree of completion of the specification shown in FIG. 78 is used in order to determine whether the design of the base specification has been done earlier or not. The data of the degree of completion is set in the method shown in FIG. 77. FIG. 113 shows a process flow when the design procedure is induced by using the data shown in FIG. 112. In FIG. 113, the inducing method of the design procedure is incorporated in the display method of the modification affected portion shown in the flow charts of FIGS. 62, 63A and 63B. It adds steps 7701, 7702 and 7703 to the flow chart of FIG. 62. The step 7701 is executed when the start of editor is commanded and it searches the base specification of the specification designated as the object of the started editor. In the step 7702, when the base specification is found in the step 7701, the degree of completion of the retrieved base specification is read from the data of the degree of completion of the specification shown in FIG. 78, and whether the degree of completion is "complete" or not is determined. If the base specification is found and the degree of specification is other than "complete", a step 7703 is executed. In other cases, it means that the design procedure is not correct, and the editor is started in a step 5301. In a step 7703, the design procedure induce message is displayed. The design procedure induce message indicates that a specification which is to be designed earlier has not yet been designed and the type and name of the specification to be designed earlier. The specification to be designed earlier is the base specification retrieved in the step 7701. By inducing the modification procedure at the time of modification of the specification or inducing the design procedure at the time of design of the specification in the manner described in the present embodiment, an error in the design due to an error in the modification procedure of the design or the design procedure can be reduced. By adding a step of storing the content of the displayed message and the user response to the message as the history when the modification procedure induce message or the design procedure induce message is displayed, the user can later check whether there is an error in design due to violation of the procedure for those portions which were designed by not following the message.

Figure 114:
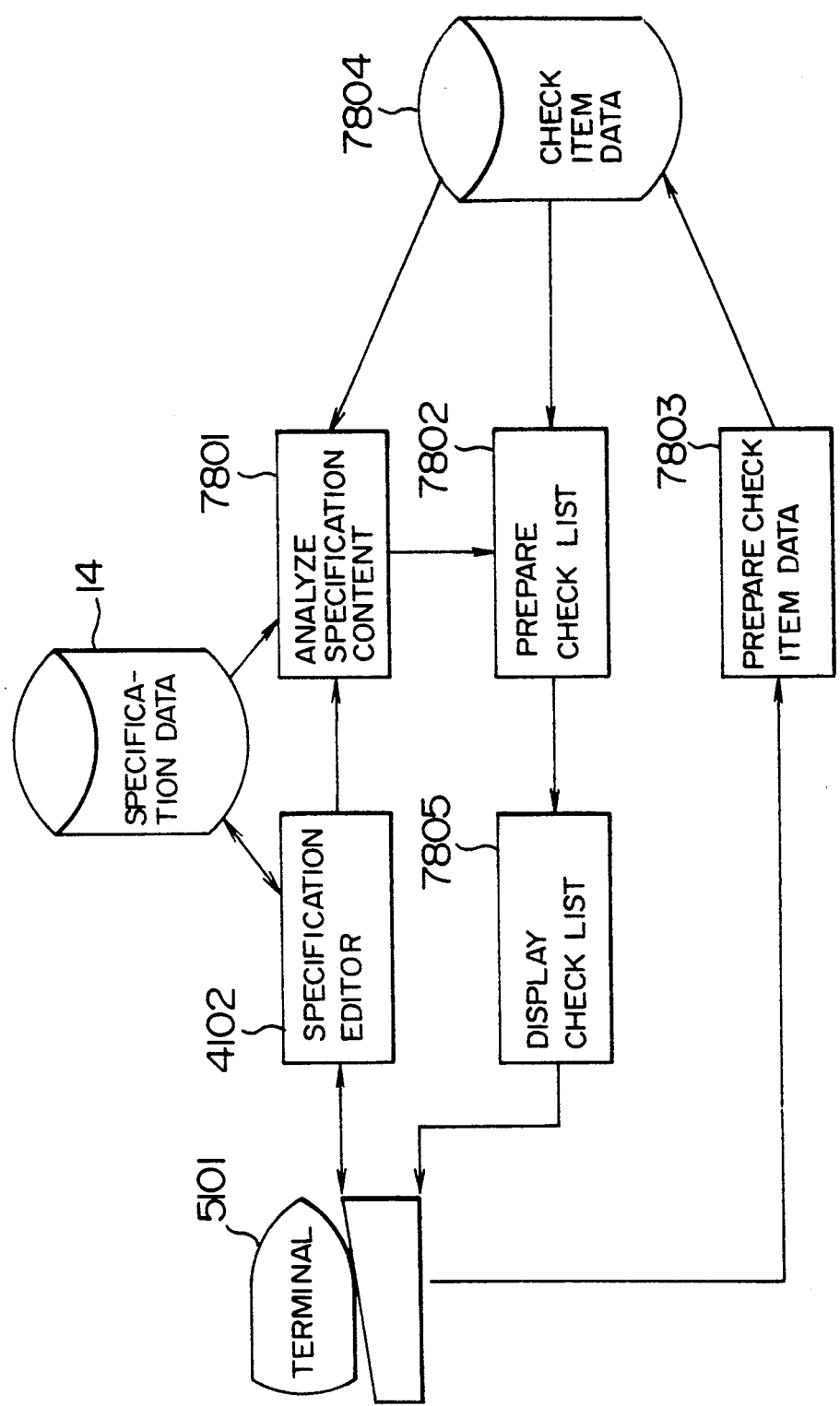
FIG. 114 shows a functional configuration of an embodiment.
Figure 116:
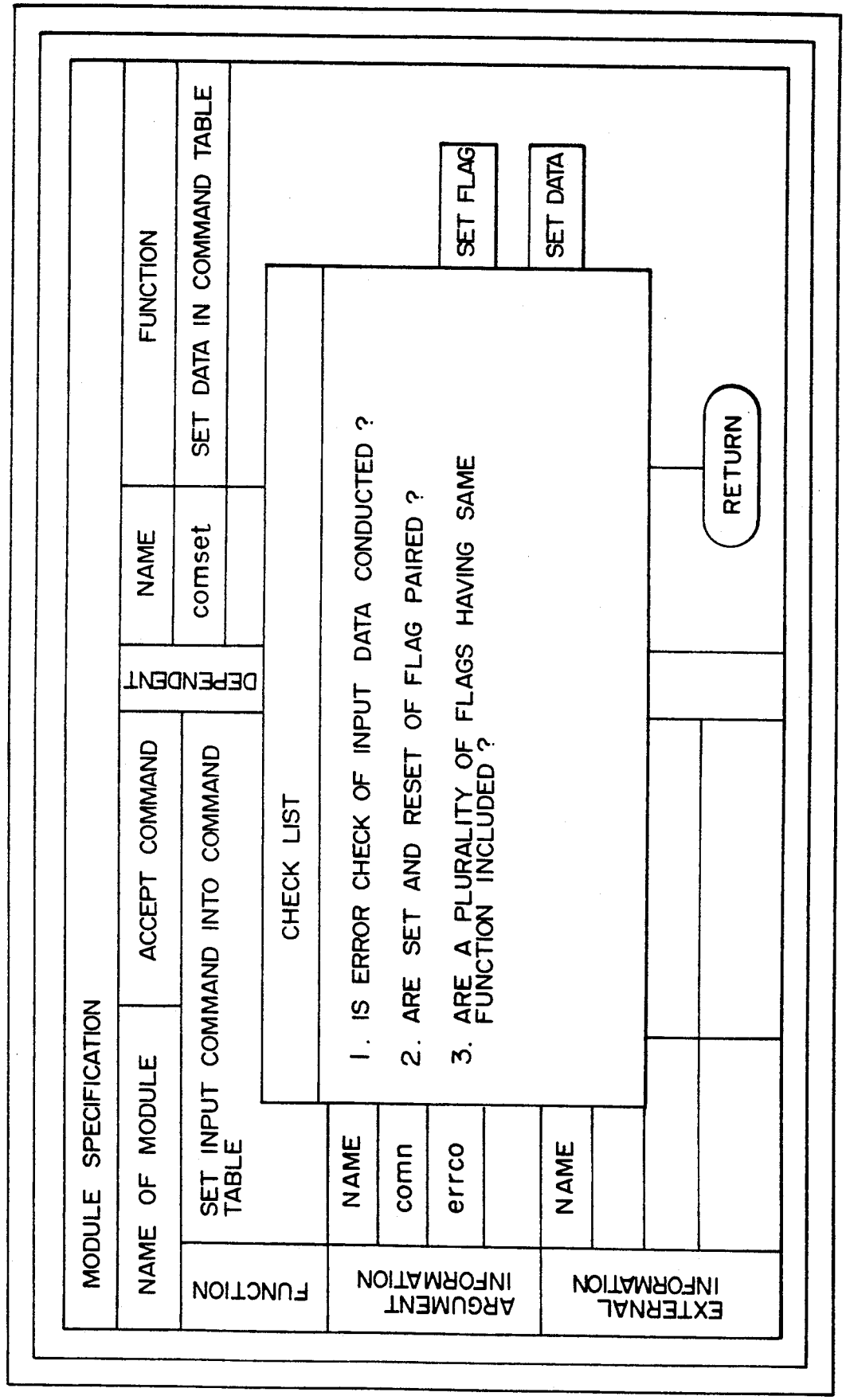
FIG. 116 shows an example of display of check list.
Figure 117:
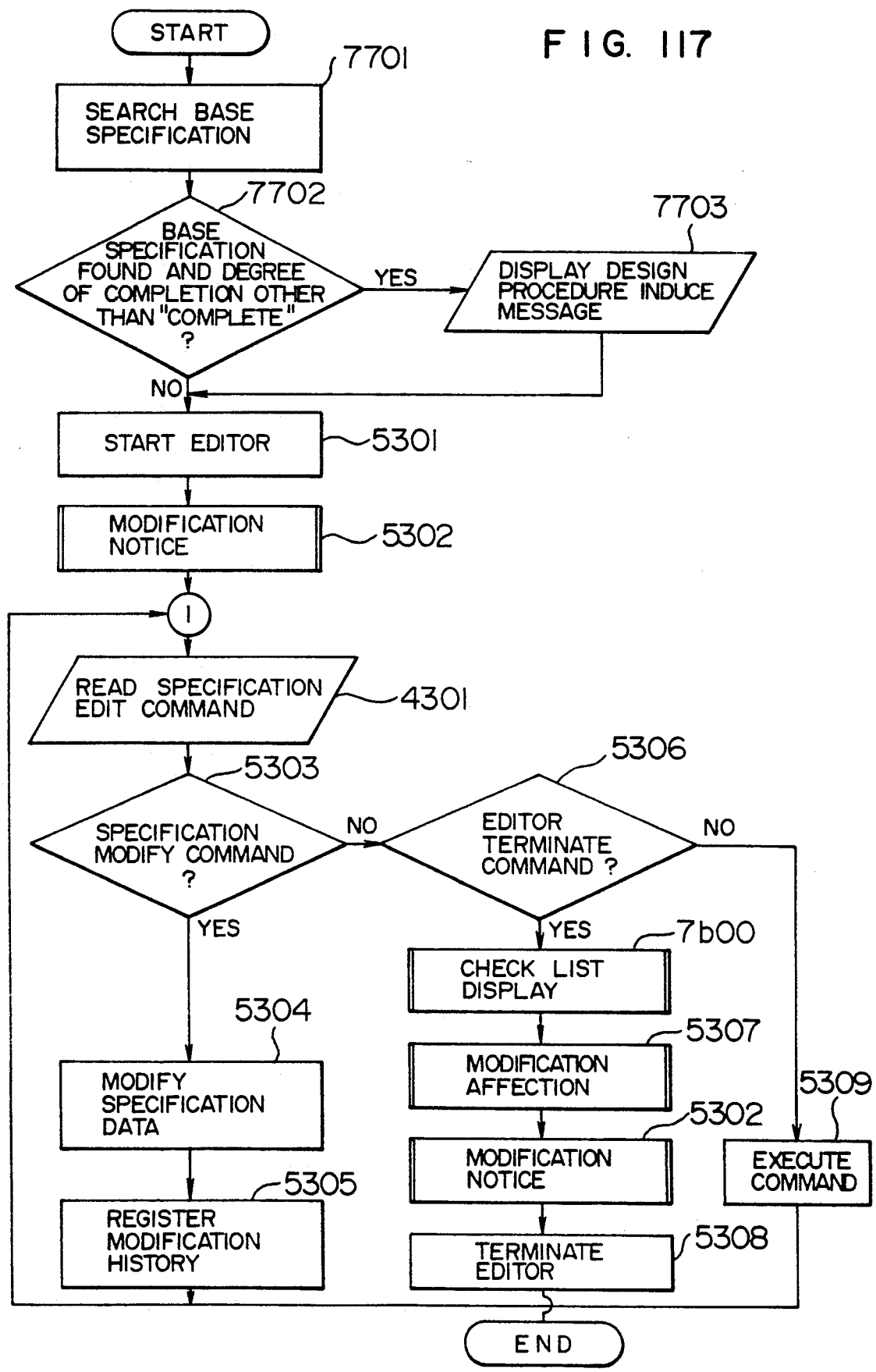
FIG. 117 shows a flow chart of an embodiment.
Figure 118:
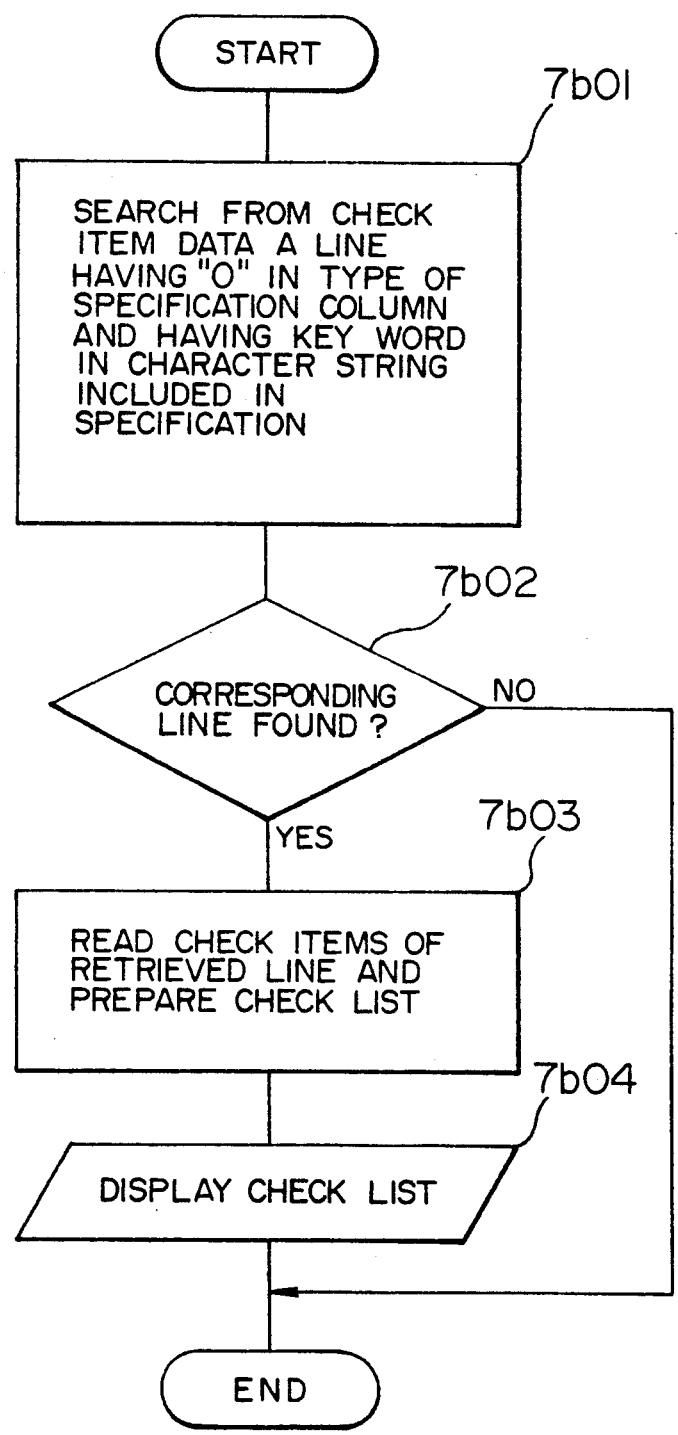
FIG. 118 shows a detailed flow chart of a portion of FIG. 117.
Figure 120:
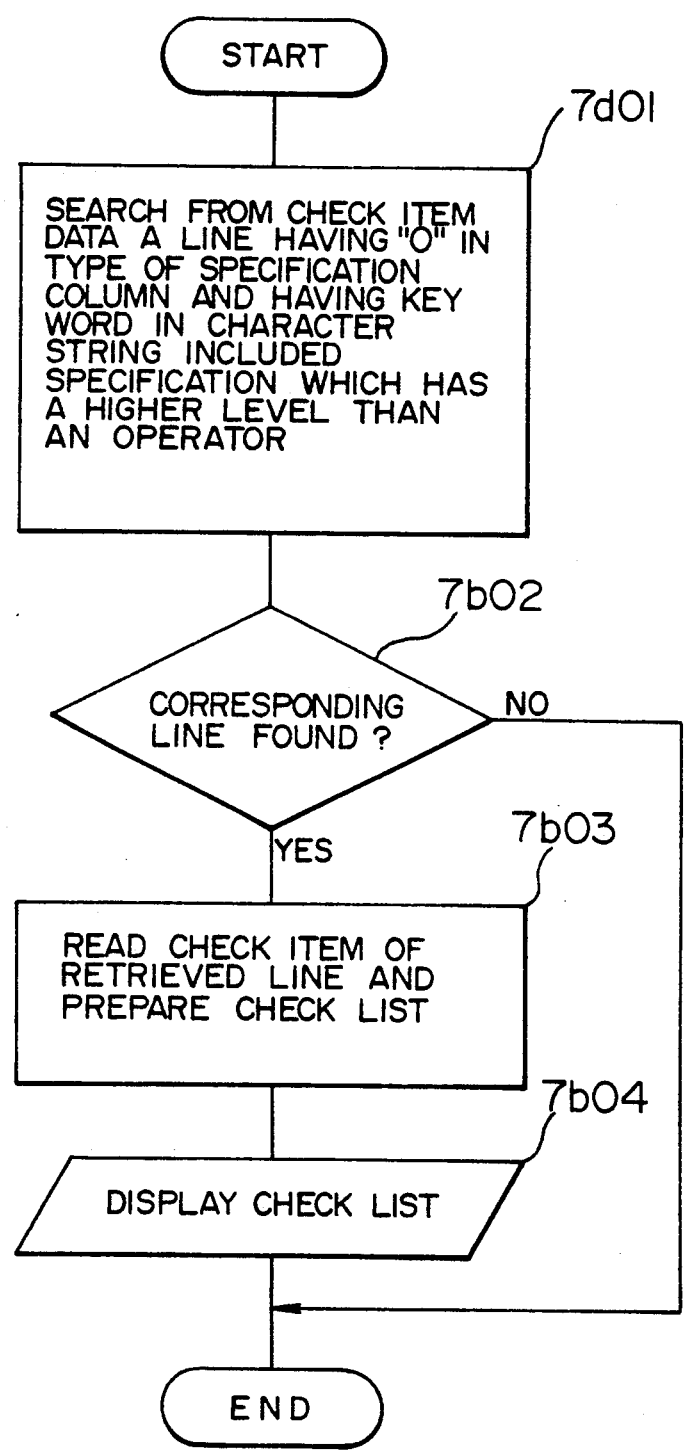
FIG. 120 shows a flow chart of an embodiment.

An embodiment in which a check list of items to which attention is to be paid at the time of design is automatically displayed in accordance with the content of the designed specification is now explained. FIG. 114 shows a functional configuration of the present embodiment. In a specification content analyze process 7801, the specification data 14 is referred and the content of the data of the specification to be edited by a specification editor 4102 is analyzed. In a check list prepare process 7802, check items corresponding to the analysis result in the specification content analyze process 7801 are searched from check item data 7804, and the retrieved check items are collected to prepare a check list. In a check list display process 7805, the check list prepared in the check list prepare process 7802 is displayed on a terminal 5101. On the other hand, in a check item data prepare process 7803, the check items inputted from the terminal 5101 are registered into check item data 7804. An embodiment in which key words described in the specification are searched in the specification content analyze process 7801 and the check items relating to the retrieved key words are searched from the check item data 7804 to prepare the list in the check list prepare step is now explained. FIG. 15 shows an example of content of the check item data 7804. One line of the table type data represents data for one check item. It comprises a type of specification 7901, a key word 7902 and a check item 7903. The type of specification 7901 indicates a type of specification which the check item relates to. It is represented by marking "O" in one of the type of specification columns "module relation diagram", "module specification" and "table specification". The key word 7902 indicates a key word which the check item relates to. The check item 7903 shows a text to be displayed as the check item. FIG. 116 shows an example of check list displayed in the present embodiment. The check list for the specification is displayed on the screen of the specification editor. FIG. 117 shows a flow chart of a process flow of the present invention. This flow chart adds a check list display function to the flow chart of displaying the modification affected portion and inducing the design procedure shown in FIG. 113. A step 7b00 is added to the flow chart of FIG. 113. The step 7b00 is executed when the command read in the step 4301 is the editor terminate command, and it displays the check list for the content of specification edited by the specification editor. FIG. 118 shows a detail of the step 7b00. In a step 7b01, the line which is marked with "O" in the type of specification column 7901 of the specification to be modified and the key word of which is a character string included in the specification to be modified is searched. In a step 7b02, whether the corresponding line has been retrieved or not is determined, and if it has, a step 7b03 is executed, and if it has not, no action is taken. In the step 7b03, all check items described in the check item column of the line retrieved in the step 7b01 are read and the check list is prepared. In a step 7b04, the check list prepared in the step 7b03 is displayed on the screen as shown in FIG. 116. In the present embodiment, an expert prepares the check list and a beginner checks his/her design by watching the check list displayed at the time of design. Thus, the beginner can proceeds his/her design by utilizing the design know-how of the expert so that the error in the design can be reduced and the high efficiency design is supported. In the present embodiment, the check list is displayed at the end time of the editor. Alternatively, the check list for the user designated specification may be displayed at the user designated time. In order to more effectively utilize the check list, the check items to be displayed may be changed in accordance with the level of design capability of the user. An embodiment thereof is now explained. FIG. 119 adds a level 7c01 to FIG. 115. In the level 7c01, the user of which level or below thereof the check item is to be displayed is indicated. In the present example, the levels are represented by numerals 1 to 3, with the larger numeral representing higher level. The levels of the users are defined as shown in FIG. 72A. FIG. 120 shows a flow chart of a process flow of the present embodiment. In this flow chart, the step 7b01 of the flow chart of FIG. 118 is substituted by a step 7d01. From the content of the check items shown in FIG. 119, a line which is marked with "O" in the type of specification column 7901 of the specification to be edited and whose key words is a character string included in the specification to be edited and whose level is no lower than the level of the user who is editing is searched. The level of the user who is editing is defined by the data shown in FIG. 72A. By adding to the check list of the present embodiment a check column which the user can enter for each check item so that the countermeasured check item is marked with a check mark, and storing and redisplaying the check item which is not marked or storing the history of the displayed check list and the check result, the user can more positively check the check items.

EFFECTS OF THE INVENTION

In accordance with the present invention, the failure of modification of the modification affected portion including that which cannot be automatically detected, the misdesign due to lack of communication of the modification in a shared development of a large scale software by a plurality of designers is prevented, the inconsistency of the specification due to the design work of detailed specification while a common specification is undefined, which is likely to occur in the shared development, is prevented by inducing the design procedure and the modification procedure, a high quality of design is attained by utilizing the stored design know-how, and the error in the software design is reduced and the overall efficiency of the software development is improved.

By storing and displaying the know-how of the software design, the knowledge obtained from the experience and the teaching obtained from the failure are accumulated so that a better design can be attained as the system is more frequently used.

Further, since the relation of modification affection, the relation of design procedure and the know-how of design can be customized, the design support which fits to the manner of design of the department concerned or the characteristic of the system to be designed can be provided. Thus, the error in the design is further reduced and the user of the design support system which uses the present invention can learn the manner of design determined by the department and the know-how which is inherent to the system, while he/she designs the system.

We claim:

1. A computer software design supporting method in an information processing system for designing a general purpose computer program specification from a plurality of software modules represented by a plurality of software module specifications of various types, the modules being modified using said information processing system which includes a supervisory CPU, an input device connected to the CPU, a specification data table connected to the CPU and an output terminal connected to the CPU, the design supporting method comprising the steps of:

inputting into the information processing system through the input device correlation information for correlating i) items to be described in the general purpose computer program specification with ii) said plurality of software module specification of various types;

storing the inputted correlation information in said specification data table;

inputting into the information processing system through the input device a modify command for modification of a content of a first item of a one of said plurality of software modules described in said computer program specification; and, analyzing said computer program specification using said CPU to generate a signal representative of a first portion of said computer program specification possibly affected by said modification of said content of said first item described in the computer program specification based on the inputted correlation information when such modification is made, the analyzing step including a step of classifying, with the CPU, the first portion possibly affected by said modification into one of: i) a first classified portion automatically modified by the information processing system, ii) a second classified portion needing modification by the information processing system but whose content of modification cannot be analyzed, and iii) a third classified portion related to the modified portion but whose need for modification cannot be analyzed by the information processing system.

2. The design supporting method according to claim 1 wherein said correlation information inputting step includes inputting into the information processing system through the input device relation information data representing a rule of correlation of items of the software module specifications of a like type.

3. The design supporting method according to claim 1 wherein said correlation information inputting step includes inputting into the information processing system through the input device cross-reference information correlating means of data to be described in the computer program specification with said ones of said plurality of software module specification types.

4. The design supporting method according to claim 3 wherein said cross-reference information inputting step includes inputting dependency relation information comprising dependency relation information representing which item the cross-reference information and the content of item depend on.

5. The design supporting method according to claim 1 further comprising the steps of:
designating with the CPU a second portion of the program specification which will be affected by a modification of a content of a first item described in the program specification; and
outputting on the output terminal of said information processing system i) the affected first portion analyzed in said analyzing step and ii) the affected second portion designated in said affected second portion designating step.

6. The design supporting method according to claim 1 wherein said analyzing step further includes a step of automatically modifying with the CPU the affected first classified portion for the modification of the specification when the analysis indicates that the affected first portion can be automatically modified.

7. The design supporting method according to claim 1 further comprising the step of:
automatically displaying on the output terminal of the information processing system the first portion affected by the modification of the content of said first item described in the program specification based on said analyzing step when such modification is made.

8. The design supporting method according to claim 1 further comprising the step of:
collectively displaying on the output terminal of the information processing system a plurality of portions affected by the modification of the program specification when such plurality of portions have been analyzed by said CPU in said analyzing step and the modification of the program specification has been completed.

9. The design supporting method according to claim 1 further comprising the steps of:
inputting into the information processing system through the input device a content of a modification to be made;
analyzing the program specification with the CPU to uncover a portion of the program specification affected by said content of the modification to be made; and
displaying a result of the analysis on the output terminal of the information processing system.

10. The design supporting method according to claim 1 further comprising the steps of:
designating with the CPU and displaying on said output terminal said first portion of said computer program specification possibly affected by said modification when the specification is modified; and
analyzing with the CPU an affected portion for the content of modification designated to display in said display designating step and displaying a result of analysis on said output terminal.

11. The design supporting method according to claim 1 further comprising the steps of:
editing with said input device and said CPU of the information processing system said first portion of said computer program specification possibly affected by said modification; and,
analyzing the edited first portion using said CPU to generate a signal representative to an edited portion affected by the edit modification of said affected first portion.

12. The design supporting method according to claim 11 further comprising the step of displaying on the output terminal the affected edited portion generated by the CPU when the program specification modified by the automatic modification is to be edited.

13. The design supporting method according to claim 1 further comprising the steps of:
storing in said specification data table of the information processing system the contents of the modification of the program specification for a design and the corresponding first portion affected by the modification analyzed in said analyzing step when the program specification for the design is modified; and
displaying on the output terminal of the information processing system the contents of the modification affecting the program specification for the design, and the first portion stored in said store step when the specification is to be accessed.

14. The design supporting method according to claim 1 further comprising a step of:
determining in the CPU as a decision result whether a user of the information processing system has actually modified the affected first portion due to the modification of the program specification, based on a presence or absence of the modification to the first portion of the computer program specification possibly affected by said modification and the content of modification.

15. The design supporting method according to claim 14 further comprising the step of:
storing in the specification data table of the information processing system the content of said modification of the program specification, the corresponding first portion of the program specification affected by said modification and the corresponding decision result in said determining step.

16. The design supporting method according to claim 15 further comprising the steps of:
inputting into the input device of the information processing system a response from the user whether the user has modified the first portion affected by the modification for the display of the first portion due to the modification of the specification; and storing the content of the response inputted in said inputting step together with a corresponding content of said modification and said first portion affected by the modification.

17. The design supporting method according to claim 15 further comprising a step of:

displaying on the output terminal an unmodified portion of the specification affected by said modification determined based on the content stored in said storing step as to whether the system user has actually modified the affected first portion.

18. The design supporting method according to claim 16 further comprising a step of:

multi-stage-level evaluating how sufficiently the user has modified the first portion affected by the modification based on the decision result as to whether or not the user has modified the affected portion in said determining step and the content as to whether or not the first portion which the user responded in said response in the response inputting step has been modified.

19. The design supporting method according to claim 1 further comprising the steps of:

storing information in the specification data table of program specification designers when a program specification unit is sharedly developed by a plurality of designers using the information processing system; and informing the designers of modification affects when the program specification of a system user other than the user who modified the program specification is affected by such modification.

20. The design supporting method according to claim 1 further comprising the steps of:

storing the specification data table information on degree of completion of the program specification for each specification and displaying the degree of completion of the program specification on said output terminal; and setting a not complete status to the program specification of the first portion affected by said modification when the specification is modified.

21. The design supporting method according to claim 1 further comprising the steps of:

defining with the CPU a modification sequence among items of related program specifications and determining int he CPU whether the defined modification sequence is followed when the modification of the program specification is designated, and displaying on the output terminal a correct sequence of modification when the decision in said determining step indicates that the modification sequence is wrong.

22. A computer software design supporting method in an information processing system having a computer with a specification editing function for editing specifications of software modules comprising the software design, a storage memory connected to the computer and an interactive terminal connected to the computer for bidirectional communication between the information processing system and a system user, the method comprising the steps of:

displaying a series of specification editing related messages on said interactive terminal directed to the system user during an interactive specification editing function operation;

analyzing in said computer a portion of the specifications possibly affected by a modification of a content of the specifications resulting from the specification editing operation when said modification is made, the analyzing step including a step of classifying the portion possibly affected by said modification int one of: i) a first classified portion automatically modified by the information processing system, ii) a second classified portion needing modification by the information processing system but whose content of modification cannot be analyzed, and iii) a third classified portion related to the modified portion but whose need for modification cannot be analyzed by the information processing system; and, storing a history of the displayed series of specification editing related messages in said storage memory of the information processing system.

23. The design supporting method according to claim 22 further comprising the step of displaying on the interactive terminal the portion of the specifications possibly affected by the modification of the specification analyzed in said analyzing step.

24. The design supporting method according to claim 22 further comprising a step of:

multi-stage evaluating accomplishment by said computer to a request message for the system user based on request accomplishment determination criteria for the message relating to the request to the system user stored in the message storing step, by providing the request accomplishment of multi-stage levels representing how sufficient the system user has executed the request after the request message was displayed, the request accomplishment determination criteria used by the computer for each level to determine a unique level.

25. A software design supporting method having a specification edit function for use in an information processing system having a computer, a memory means connected to the computer and an interactive terminal connected thereto, the method comprising the steps of:

storing cross-reference data in the memory means indicating in which first specification among a plurality of specifications comprising said software design, a specification item described in a specification under edition by the edit function is described, when the specification item is inputted into the system through the interactive terminal;

analyzing a portion of the first specification possibly affected by a modification of a content of the first specification resulting from the edit function when said modification is made, the analyzing step including a step of classifying the portion possibly affected by said modification into one of: i) a first classified portion automatically modified by the information processing system, ii) a second classified portion needing modification by the information processing system but whose content of modification cannot be analyzed, and iii) a third classified portion related to the modified portion but whose need for modification cannot be analyzed by the information processing system; and, referring to the cross-reference data stored in said cross-reference storing step to determine in the computer the first specification describing the specification item in the specification under edition in the edit function and displaying the first specification on the interactive terminal each time the specification item is modified.

26. A software design support method having a specification edit function for editing specifications of modules comprising the software design in an information handling system having a computer and an interactive terminal connected to the computer, the support method comprising the steps of:

defining in said computer a sequence of design of specifications comprising said software design and determining in the computer a first specification to be designed earlier than a second specification when said second specification is yet to be designed, based on the defined sequence of design of specifications;

analyzing a portion of the first specification possibly affected by a modification of a content of the first specification resulting from said specification edit function when said modification is made, the analyzing step including a step of classifying the portion possibly affected by said modification into one of: i) a first classified portion automatically modified by the information handling system, ii) a second classified portion needing modification by the information handling system but whose content of modification cannot be analyzed, and iii) a third classified portion related to the modified portion but whose need for modification cannot be analyzed by the information handling system; and, displaying on the interactive terminal the determined first specification to design the first specification before said second specification when the determined specification is not completed.

* * * * *

UNITED STATES PATENT AND TRADEMARK OFFICE
CERTIFICATE OF CORRECTION

PATENT NO. : 5,287,488
DATED : February 15, 1994
INVENTOR(S) : Junko Sakata, et al.

It is certified that error appears in the above-indentified patent and that said Letters Patent is hereby corrected as shown below:

Claim 1, column 60, line 49, delete "specification" and substitute therefor --specifications--.

Claim 3, column 61, line 18, delete "means" and substitute therefor --names--.

Claim 20, column 63, line 37, after "storing" insert --in--.

Claim 21, column 63, line 49, delete "int he" and substitute therefor --in the--.

Claim 22, column 64, line 7, delete "int" and substitute therefor --into--.

Claim 24, column 64, line 32, delete "sufficient" and substitute therefor --sufficiently--.

Signed and Sealed this

Second Day of August, 1994

Attest:

BRUCE LEHMAN

Attesting Officer

Commissioner of Patents and Trademarks